US012751488B2

(12) United States Patent
Raichman

(10) Patent No.: US 12,751,488 B2
(45) Date of Patent: Oct. 6, 2026

(54) VAPING AND SMOKING DEVICE AND CAPSULES

(71) Applicant: N2B limited, Limassol (CY)

(72) Inventor: Yossef Raichman, Limassol (CY)

(73) Assignee: N2B limited, Limassol (CY)

( * ) Notice: Subject to any disclaimer, the term of this patent is extended or adjusted under 35 U.S.C. 154(b) by 593 days.

(21) Appl. No.: 18/211,849

(22) Filed: Jun. 20, 2023

(65) Prior Publication Data

US 2024/0251850 A1 Aug. 1, 2024

Related U.S. Application Data

(63) Continuation-in-part of application No. 18/303,627, filed on Apr. 20, 2023, now abandoned, which is a continuation of application No. PCT/IB2023/052518, filed on Mar. 15, 2023.

(60) Provisional application No. 63/521,685, filed on Jun. 18, 2023, provisional application No. 63/468,418, filed on May 23, 2023, provisional application No. 63/463,117, filed on May 1, 2023, provisional (Continued)

(51) Int. Cl.

| | |
|---|---|
| ***A24F 40/42*** | (2020.01) |
| ***A24F 40/10*** | (2020.01) |
| ***A24F 40/46*** | (2020.01) |
| ***H05B 3/00*** | (2006.01) |

(52) U.S. Cl.

CPC .............. *A24F 40/42* (2020.01); *A24F 40/10* (2020.01); *A24F 40/46* (2020.01); *H05B 3/0014* (2013.01); *H05B 2203/016* (2013.01); *H05B 2203/037* (2013.01)

(58) Field of Classification Search

CPC ......... A24F 40/20; A24F 40/465; A24F 40/46

See application file for complete search history.

(56) References Cited

U.S. PATENT DOCUMENTS

| | | | |
|---|---|---|---|
| 818,150 | A | 4/1906 | Du Brul |
| 4,184,495 | A | 1/1980 | Rainer et al. |

(Continued)

FOREIGN PATENT DOCUMENTS

| | | | |
|---|---|---|---|
| CA | 3208054 A1 | 8/2022 | |
| CN | 203012511 | 6/2013 | |

(Continued)

OTHER PUBLICATIONS

U.S. Appl. No. 18/303,623, filed Apr. 20, 2023.

(Continued)

*Primary Examiner* — Alex B Efta

(74) *Attorney, Agent, or Firm* — Ballard Spahr LLP

(57) ABSTRACT

Apparatus and methods are described for use with a smoking device that includes at least first and second electrodes. A capsule includes an absorbent material having a liquid material containing one or more active agents absorbed therein. A housing is disposed around the absorbent material, the housing being an electrical insulator, and the housing defining one or more lateral windows. Metallic foil surrounds the housing, the metallic foil being configured to be heated via resistive heating by the first electrode driving a current to the second electrode through the metallic foil, such as to vaporize liquid material within the absorbent material that is disposed at the one or more lateral windows. Other applications are also described.

20 Claims, 63 Drawing Sheets

Related U.S. Application Data application No. 63/457,182, filed on Apr. 5, 2023, provisional application No. 63/438,643, filed on Jan. 12, 2023.

(56) References Cited

U.S. PATENT DOCUMENTS 4,928,714 A 5/1990 Shannon
5,144,962 A 9/1992 Counts et al.
5,379,789 A 1/1995 Schneider et al.
10,179,215 B2 1/2019 Raichman
10,542,776 B2 1/2020 Lavanchy et al.
10,721,967 B2 7/2020 Raichman
10,765,821 B2 9/2020 Raichman
11,058,834 B2 7/2021 Raichman
11,058,835 B2 7/2021 Raichman
11,076,642 B1 8/2021 Fuisz et al.
11,382,356 B2 7/2022 Worm et al.
11,478,016 B2 10/2022 John et al.
11,696,599 B2 7/2023 Raichman
11,696,989 B2 7/2023 Raichman
2004/0016427 A1* 1/2004 Byron .................. A61M 11/007 128/200.14
2007/0215167 A1* 9/2007 Llewellyn Crooks ....................... A24B 15/165 131/335
2008/0092912 A1 4/2008 Robinson et al.
2011/0126848 A1 6/2011 Zuber et al.
2011/0155153 A1* 6/2011 Thorens .................. A24F 40/46 131/329
2011/0192408 A1* 8/2011 Inagaki .................... A24D 1/20 131/194
2013/0042865 A1 2/2013 Monsees et al.
2013/0143468 A1 6/2013 Raichman et al.
2014/0083438 A1 3/2014 Sebastian et al.
2014/0301721 A1 10/2014 Ruscio et al.
2014/0305449 A1 10/2014 Plojoux et al.
2015/0083150 A1 3/2015 Conner et al.
2015/0111059 A1 4/2015 Tanaka et al.
2015/0157052 A1 6/2015 Ademe et al.
2015/0257443 A1 9/2015 Rado
2016/0143348 A1* 5/2016 Camus ................... A24D 3/061 131/365
2016/0271347 A1 9/2016 Raichman
2016/0295926 A1* 10/2016 Zuber ...................... A24D 1/20
2016/0309779 A1 10/2016 Liu
2017/0018863 A1 1/2017 Gao et al.
2017/0055580 A1 3/2017 Blandino et al.
2017/0055581 A1 3/2017 Wilke et al.
2017/0119048 A1 5/2017 Kaufman et al.
2017/0119049 A1 5/2017 Blandino et al.
2017/0188632 A1 7/2017 Hon
2017/0231284 A1 8/2017 Newns
2017/0314094 A1 11/2017 Ooyama et al.
2017/0360092 A1 12/2017 Althorpe et al.
2017/0367407 A1 12/2017 Althorpe et al.
2018/0007974 A1* 1/2018 Thorens .................. A24F 40/40
2018/0015237 A1 1/2018 Thorens
2018/0104214 A1 4/2018 Raichman
2018/0110943 A1 4/2018 Raichman
2018/0168224 A1 6/2018 Naughton et al.
2018/0235279 A1* 8/2018 Wilke ...................... H05B 3/58
2018/0271147 A1 9/2018 Rado
2019/0000133 A1 1/2019 Park et al.
2019/0008208 A1 1/2019 Cirillo et al.
2019/0037924 A1 2/2019 Habicht et al.
2019/0098927 A1 4/2019 Mironov
2019/0117915 A1 4/2019 Raichman
2019/0124988 A1 5/2019 Hu et al.
2019/0133187 A1 5/2019 Spencer et al.
2019/0208823 A1 7/2019 Raichman
2019/0224430 A1 7/2019 Raichman
2019/0261683 A1 8/2019 Reevell
2019/0261684 A1 8/2019 Reevell
2019/0289908 A1 9/2019 Worm et al.
2019/0380390 A1 12/2019 Jeong et al.
2019/0387806 A1 12/2019 Nakano et al.
2020/0037669 A1 2/2020 Bowen et al.
2020/0046023 A1 2/2020 Reevell
2020/0093181 A1 3/2020 Hubbard et al.
2020/0093185 A1 3/2020 Lim
2020/0154784 A1 5/2020 Sebastian et al.
2020/0179625 A1 6/2020 Raichman
2020/0187556 A1 6/2020 Raichman
2020/0187563 A1 6/2020 Raichman
2020/0188614 A1 6/2020 Raichman
2020/0221782 A1 7/2020 Lim
2020/0236998 A1 7/2020 Batista et al.
2020/0237004 A1 7/2020 Larsen
2020/0238027 A1 7/2020 Raichman
2020/0245683 A1 8/2020 Batista et al.
2020/0246563 A1 8/2020 Raichman
2021/0015153 A1 1/2021 Raichman
2021/0178090 A1 6/2021 Lahoud et al.
2021/0235747 A1 8/2021 Iwanaga et al.
2021/0244079 A1 8/2021 Iadanza et al.
2021/0244082 A9 8/2021 Monsees et al.
2021/0289841 A1 9/2021 Batista et al.
2021/0322688 A1 10/2021 Raichman
2021/0378318 A1* 12/2021 Reevell ................... B29C 63/40
2022/0110368 A1* 4/2022 Jang .......................... A24D 1/20
2022/0143338 A1 5/2022 Davidson et al.
2022/0167663 A1 6/2022 Paton et al.
2022/0183394 A1 6/2022 Halliday et al.
2022/0218023 A1* 7/2022 Fuisz ...................... A24F 40/20
2022/0279838 A1 9/2022 Graf et al.
2022/0322747 A1* 10/2022 Zominy .................. A24F 40/53
2022/0354183 A1 11/2022 Bouchuiguir et al.
2022/0369705 A1 11/2022 Besso et al.
2023/0018415 A1 1/2023 Abi Aoun et al.
2023/0058955 A1 2/2023 Selby et al.
2023/0107605 A1 4/2023 Tasselli
2023/0114383 A1 4/2023 Jiang et al.
2023/0210169 A1 7/2023 Liu
2023/0346019 A1 11/2023 Saygili
2024/0099391 A1 3/2024 Parry et al.
2024/0237701 A1 7/2024 Raichman
2024/0237703 A1 7/2024 Raichman
2024/0237704 A1 7/2024 Raichman
2024/0237705 A1 7/2024 Raichman
2024/0237707 A1 7/2024 Raichman
2024/0237708 A1 7/2024 Raichman
2024/0237709 A1 7/2024 Raichman
2024/0237714 A1 7/2024 Raichman
2024/0237720 A1 7/2024 Raichman
2024/0237721 A1 7/2024 Raichman
2024/0237722 A1 7/2024 Raichman
2024/0237723 A1 7/2024 Raichman
2024/0237724 A1 7/2024 Raichman
2024/0237725 A1 7/2024 Raichman
2024/0237726 A1 7/2024 Raichman
2024/0237737 A1 7/2024 Raichman
2024/0237738 A1 7/2024 Raichman
2024/0237739 A1 7/2024 Raichman
2024/0237740 A1 7/2024 Raichman
2024/0237741 A1 7/2024 Raichman
2024/0237742 A1 7/2024 Raichman
2024/0237743 A1 7/2024 Raichman
2024/0237751 A1 7/2024 Raichman
2024/0237753 A1 7/2024 Raichman
2024/0237754 A1 7/2024 Raichman
2024/0237758 A1 7/2024 Raichman
2024/0237759 A1 7/2024 Raichman
2024/0237760 A1 7/2024 Raichman
2024/0245116 A1 7/2024 Raichman
2025/0000168 A1 1/2025 Bessant et al.
2025/0057249 A1 2/2025 Murray et al.
2025/0176625 A1 6/2025 Monticone et al.
2025/0287468 A1* 9/2025 Emmett .................. A24F 40/57

FOREIGN PATENT DOCUMENTS

CN 203676129 7/2014
CN 114868972 A 8/2022

(56) References Cited

FOREIGN PATENT DOCUMENTS

| | | | |
|---|---|---|---|
| DE | 102018207126 | | 6/2018 |
| EP | 0305788 | | 3/1989 |
| EP | 3610743 | | 2/2020 |
| EP | 3925461 | A1 | 12/2021 |
| EP | 3957196 | A1 | 2/2022 |
| EP | 3984387 | A1 | 4/2022 |
| EP | 4091486 | A1 | 11/2022 |
| GB | 2069310 | | 8/1981 |
| GB | 2534208 | A | 7/2016 |
| KR | 101345117 | | 12/2013 |
| KR | 20190049389 | | 5/2019 |
| KR | 20200045818 | | 5/2020 |
| WO | 2016147188 | A1 | 9/2016 |
| WO | 2018031546 | A1 | 2/2018 |
| WO | 2018051346 | A1 | 3/2018 |
| WO | 2018141467 | A1 | 8/2018 |
| WO | 2019005526 | A1 | 1/2019 |
| WO | 2019030168 | A1 | 2/2019 |
| WO | 2019073237 | A1 | 4/2019 |
| WO | 2019101623 | A1 | 5/2019 |
| WO | 2020070109 | A1 | 4/2020 |
| WO | 2020074744 | A1 | 4/2020 |
| WO | 2020182772 | | 9/2020 |
| WO | 2020211315 | A1 | 10/2020 |
| WO | 2021171180 | | 9/2021 |
| WO | 2022155175 | A1 | 7/2022 |
| WO | 2022189452 | A1 | 9/2022 |
| WO | 2023170182 | A1 | 9/2023 |
| WO | 2024150033 | A1 | 7/2024 |
| WO | 2024150034 | A1 | 7/2024 |
| WO | 2024150035 | A1 | 7/2024 |
| WO | 2024150036 | A1 | 7/2024 |
| WO | 2024150037 | A1 | 7/2024 |
| WO | 2024150038 | A1 | 7/2024 |
| WO | 2024150183 | A1 | 7/2024 |

OTHER PUBLICATIONS

U.S. Appl. No. 18/303,624, filed Apr. 20, 2023.
U.S. Appl. No. 18/303,627, filed Apr. 20, 2023.
U.S. Appl. No. 18/303,629, filed Apr. 20, 2023.
U.S. Appl. No. 18/303,633, filed Apr. 20, 2023.
U.S. Appl. No. 18/303,636, filed Apr. 20, 2023.
U.S. Appl. No. 18/307,516, filed Apr. 26, 2023.
U.S. Appl. No. 18/307,524, filed Apr. 26, 2023.
U.S. Appl. No. 18/307,534, filed Apr. 26, 2023.
U.S. Appl. No. 18/308,162, filed Apr. 27, 2023.
U.S. Appl. No. 18/308,170, filed Apr. 27, 2023.
U.S. Appl. No. 18/308,173, filed Apr. 27, 2023.
U.S. Appl. No. 18/312,058, filed May 4, 2023.
U.S. Appl. No. 18/312,061, filed May 4, 2023.
U.S. Appl. No. 18/312,063, filed May 4, 2023.
U.S. Appl. No. 18/312,066, filed May 4, 2023.
U.S. Appl. No. 18/312,070, filed May 4, 2023.
U.S. Appl. No. 18/314,265, filed May 9, 2023.
U.S. Appl. No. 18/314,269, filed May 9, 2023.
U.S. Appl. No. 18/314,271, filed May 9, 2023.
U.S. Appl. No. 18/314,274, filed May 9, 2023.
U.S. Appl. No. 18/314,314, filed May 9, 2023.
U.S. Appl. No. 18/314,316, filed May 9, 2023.
U.S. Appl. No. 18/314,321, filed May 9, 2023.
U.S. Appl. No. 18/314,325, filed May 9, 2023.
U.S. Appl. No. 18/315,052, filed May 10, 2023.
U.S. Appl. No. 18/315,059, filed May 10, 2023.
U.S. Appl. No. 18/315,063, filed May 10, 2023.
U.S. Appl. No. 18/315,068, filed May 10, 2023.
U.S. Appl. No. 18/315,073, filed May 10, 2023.
U.S. Appl. No. 18/315,697, filed May 11, 2023.
U.S. Appl. No. 18/315,700, filed May 11, 2023.
U.S. Appl. No. 18/315,702, filed May 11, 2023.
U.S. Appl. No. 18/315,704, filed May 11, 2023.
U.S. Appl. No. 63/438,643, filed Jan. 12, 2023.
U.S. Appl. No. 63/457,182, filed Apr. 5, 2023.
U.S. Appl. No. 63/463,117, filed May 1, 2023.
U.S. Appl. No. 63/468,418, filed May 23, 2023.
U.S. Appl. No. 63/521,685, filed Jun. 18, 2023.
International Search Report and Written Opinion from International Application No. PCT/IB2023/052518 mailed Oct. 19, 2023.
International Search Report and Written Opinion from International Application No. PCT/IB2023/052519 mailed Oct. 18, 2023.
International Search Report and Written Opinion from International Application No. PCT/IB2023/052520 mailed Oct. 18, 2023.
International Search Report and Written Opinion from International Application No. PCT/IB2023/052521 mailed Dec. 12, 2023.
International Search Report and Written Opinion from International Application No. PCT/IB2023/052523 mailed Oct. 18, 2023.
International Search Report and Written Opinion from International Application No. PCT/IB2023/052526 mailed Dec. 11, 2023.
International Search Report and Written Opinion from International Application No. PCT/IB2024/050322 mailed Jun. 4, 2024.
Invitation to Pay Additional Fees for International Application No. PCT/IB2023/052521 mailed Oct. 19, 2023.
Invitation to Pay Additional Fees for International Application No. PCT/IB2023/052526 mailed Oct. 19, 2023.
Invitation to Pay Additional Fees for International Application No. PCT/IB2024/050322 mailed Apr. 12, 2024.
Notice of Allowance from U.S. Appl. No. 16/851,804 mailed Jul. 25, 2022.
U.S. Appl. No. 63/522,303, filed Jun. 21, 2023.
U.S. Appl. No. 63/524,736, filed Jul. 3, 2023.
U.S. Appl. No. 63/531,667, filed Jul. 9, 2023.
Written Opinion from International Application No. PCT/IB2022/012084 mailed May 23, 2022.
Corrected Notice of Allowance for U.S. Appl. No. 18/308,170 mailed Jan. 5, 2026.
Dr. Dabber Knowledge Base, "Switch User Manual" https://drdabber.helpscoutdocs.com/article/76-switch-user-manual, Jan. 27, 2023.
Final Office Action for U.S. Appl. No. 18/303,624 mailed Mar. 10, 2026.
Final Office Action for U.S. Appl. No. 18/303,633 mailed Mar. 9, 2026.
Final Office Action for U.S. Appl. No. 18/307,524 mailed Jan. 28, 2026.
Final Office Action for U.S. Appl. No. 18/307,534 mailed Dec. 19, 2025.
Final Office Action for U.S. Appl. No. 18/308,162 mailed Dec. 10, 2025.
Final Office Action for U.S. Appl. No. 18/312,061 mailed Dec. 19, 2025.
Final Office Action for U.S. Appl. No. 18/312,066 mailed Jan. 6, 2026.
Final Office Action for U.S. Appl. No. 18/312,070 mailed Dec. 19, 2025.
Final Office Action for U.S. Appl. No. 18/314,274 mailed Jan. 8, 2026.
Final Office Action for U.S. Appl. No. 18/315,059 mailed Feb. 20, 2026.
Issue Notification for U.S. Appl. No. 18/303,629 mailed Jan. 7, 2026.
Issue Notification for U.S. Appl. No. 18/308,170 mailed Mar. 4, 2026.
Issue Notification for U.S. Appl. No. 18/314,316 mailed Jan. 28, 2026.
Issue Notification for U.S. Appl. No. 18/314,325 mailed Mar. 4, 2026.
Non-Final Office Action for U.S. Appl. No. 18/303,623 mailed Nov. 14, 2025.
Non-Final Office Action for U.S. Appl. No. 18/303,624 mailed Nov. 19, 2025.
Non-Final Office Action for U.S. Appl. No. 18/303,627 mailed Sep. 3, 2025.
Non-Final Office Action for U.S. Appl. No. 18/303,633 mailed Nov. 20, 2025.

(56) References Cited

OTHER PUBLICATIONS

Non-Final Office Action for U.S. Appl. No. 18/303,636 mailed Nov. 4, 2025.
Non-Final Office Action for U.S. Appl. No. 18/307,516 mailed Oct. 2, 2025.
Non-Final Office Action for U.S. Appl. No. 18/307,524 mailed Sep. 17, 2025.
Non-Final Office Action for U.S. Appl. No. 18/307,534 mailed Jul. 22, 2025.
Non-Final Office Action for U.S. Appl. No. 18/308,162 mailed Aug. 14, 2025.
Non-Final Office Action for U.S. Appl. No. 18/308,170 mailed Aug. 11, 2025.
Non-Final Office Action for U.S. Appl. No. 18/308,173 mailed Oct. 2, 2025.
Non-Final Office Action for U.S. Appl. No. 18/312,058 mailed Oct. 2, 2025.
Non-Final Office Action for U.S. Appl. No. 18/312,061 mailed Aug. 5, 2025.
Non-Final Office Action for U.S. Appl. No. 18/312,063 mailed Jan. 23, 2026.
Non-Final Office Action for U.S. Appl. No. 18/312,063 mailed Sep. 11, 2025.
Non-Final Office Action for U.S. Appl. No. 18/312,066 mailed Sep. 17, 2025.
Non-Final Office Action for U.S. Appl. No. 18/312,070 mailed Jul. 25, 2025.
Non-Final Office Action for U.S. Appl. No. 18/314,265 mailed Nov. 3, 2025.
Non-Final Office Action for U.S. Appl. No. 18/314,269 mailed Dec. 11, 2025.
Non-Final Office Action for U.S. Appl. No. 18/314,274 mailed Sep. 5, 2025.
Non-Final Office Action for U.S. Appl. No. 18/314,314 mailed Aug. 8, 2025.
Non-Final Office Action for U.S. Appl. No. 18/314,316 mailed Aug. 1, 2025.
Non-Final Office Action for U.S. Appl. No. 18/314,321 mailed Sep. 16, 2025.
Non-Final Office Action for U.S. Appl. No. 18/314,325 mailed Aug. 12, 2025.
Non-Final Office Action for U.S. Appl. No. 18/315,052 mailed Aug. 8, 2025.
Non-Final Office Action for U.S. Appl. No. 18/315,059 mailed Sep. 23, 2025.
Non-Final Office Action for U.S. Appl. No. 18/315,063 mailed Dec. 29, 2025.
Non-Final Office Action for U.S. Appl. No. 18/315,068 mailed Oct. 1, 2025.
Non-Final Office Action for U.S. Appl. No. 18/315,073 mailed Nov. 6, 2025.
Non-Final Office Action for U.S. Appl. No. 18/315,697 mailed Aug. 12, 2025.
Non-Final Office Action for U.S. Appl. No. 18/315,700 mailed Aug. 4, 2025.
Non-Final Office Action for U.S. Appl. No. 18/315,702 mailed Sep. 17, 2025.
Notice of Allowance for U.S. Appl. No. 18/303,629 mailed Sep. 16, 2025.
Notice of Allowance for U.S. Appl. No. 18/307,516 mailed Mar. 3, 2026.
Notice of Allowance for U.S. Appl. No. 18/308,170 mailed Dec. 23, 2025.
Notice of Allowance for U.S. Appl. No. 18/314,316 mailed Dec. 10, 2025.
Notice of Allowance for U.S. Appl. No. 18/314,325 mailed Dec. 23, 2025.
Restriction Requirement for U.S. Appl. No. 18/303,623 mailed Aug. 4, 2025.
Restriction Requirement for U.S. Appl. No. 18/303,624 mailed Aug. 13, 2025.
Restriction Requirement for U.S. Appl. No. 18/303,633 mailed Aug. 27, 2025.
Restriction Requirement for U.S. Appl. No. 18/303,636 mailed Aug. 4, 2025.
Restriction Requirement for U.S. Appl. No. 18/314,265 mailed Aug. 11, 2025.
Restriction Requirement for U.S. Appl. No. 18/314,271 mailed Oct. 3, 2025.
Restriction Requirement for U.S. Appl. No. 18/315,704 mailed Sep. 16, 2025.
U.S. Appl. No. 18/349,477, filed Jul. 10, 2023.
U.S. Appl. No. 19/259,644, filed Jul. 3, 2025.
U.S. Appl. No. 19/259,703, filed Jul. 3, 2025.
U.S. Appl. No. 19/564,677, filed Mar. 12, 2026.
U.S. Appl. No. 63/602,545, filed Nov. 24, 2023.
Wilmot et al. "Electrically conductive adhesives. Permabond" https://permabond.com/electrically-conductive-adhesives /#:-:text= Depending %20on %20the%20gap%20between ,act%20as %20an %20electrical %20insulator, 2016, last accessed online Jan. 2, 2026, 11 pages.

* cited by examiner 150
30

190
30
152, 154
192
184
180A
190
30
30
150
180
192
152, 154

VAPING AND SMOKING DEVICE AND CAPSULES

CROSS-REFERENCES TO RELATED APPLICATIONS

The present application:

(a) is a continuation-in-part of U.S. application Ser. No. 18/303,627 to Raichman, filed Apr. 20, 2023, which is a continuation of International application PCT/IB2023/052518 to Raichman, filed Mar. 15, 2023, entitled "Smoking capsule with flattened profile," which claims priority from U.S. Provisional Patent Application 63/438,643 to Raichman, filed Jan. 12, 2023, entitled "Smoking device and capsule for use therewith;" and (b) claims priority from:

U.S. Provisional Patent Application 63/457,182 to Raichman, filed Apr. 5, 2023, entitled "Smoking device with capsule detecting function,"

U.S. Provisional Patent Application 63/463,117 to Raichman, filed May 1, 2023, entitled "Vaping and smoking device and capsules,"

U.S. Provisional Patent Application 63/468,418 to Raichman, filed May 23, 2023, entitled "Vaping and smoking device and capsules," and U.S. Provisional Patent Application 63/521,685 to Raichman, filed Jun. 18, 2023, entitled "Vaping and smoking device and capsules."

All of the above-referenced applications are incorporated herein by reference.

FIELD OF EMBODIMENTS OF THE INVENTION

The present invention relates to methods and apparatus relating to smoking devices, and particularly apparatus and methods relating to vaping and heat-not-burn smoking devices.

BACKGROUND

Heat-not-burn smoking devices (also known as "smokeless" devices) are devices that heat a smoking material that contains active agents (e.g., a plant material, such as tobacco and/or a cannabinoid-containing plant material (such as marijuana), or a non-plant material) without burning the smoking material. The user sucks in vaporized active agents that are generated. Such devices have become popular in recent years, and in particular some users who previously smoked traditional cigarettes have switched to using such products.

An electronic cigarette (also known as a "vaping device") is an electronic device that generates vapors from a liquid material that typically contains one or more active agents, such as nicotine. The vapors are inhaled by a user, with the process commonly being referred to as "vaping."

SUMMARY OF EMBODIMENTS

In accordance with some applications of the present invention, a capsule is configured to be inserted in a smoking device. Typically, the capsule is a disposable capsule that is configured to be used during a single smoking session, whereas the smoking device is configured to be reusable. The capsule typically has the general structure (e.g., shape and size) of a traditional cigarette. Many users and manufacturers of such capsule and smoking devices have a preference for single-use capsules having the general structure of a traditional cigarette, due to (a) habitual preferences of the users, (b) habitual preferences of the manufacturers, (c) production lines of the manufacturers being best-equipped to manufacture such capsules relative to capsules that differ from traditional cigarettes, (d) single-use capsules being more hygienic than capsules that are designed for repeated use, and/or (e) additional reasons.

Typically, the capsule includes a first portion that contains a smoking material (that contains active agents) and a heating element. The smoking material is typically a plant material, such as tobacco and/or a cannabinoid-containing plant material (such as marijuana). For some applications, the smoking material is a non-plant material that contains active agents. The smoking device is configured to heat the smoking material, such as to generate vapors containing active agents within the smoking material in a heat-not-burn manner. The user typically sucks the generated vapors out of a second portion of the capsule that functions as a mouthpiece.

As described hereinabove in the Background, heat-not-burn smoking devices (also known as "smokeless" devices) are devices that heat a smoking material without burning (i.e., pyrolyzing) the smoking material. The user sucks in vaporized active agents that are generated. An important element in heat-not-burn smoking devices is the time that it takes to heat the smoking material and the uniformity of the heating. The time that it takes to heat up the smoking material is defined by the following equation:

$$t=Q*d/(K*A*\Delta T) \quad \text{[Equation 1]}$$

where

- t is the time taken to heat the smoking material,
- Q is the quantity of heat transferred to the smoking material,
- d is the distance from the location at which the heat is generated to the smoking material that is being heated,
- K is the constant that defines the heat conduction of the smoking material (which is relatively low for smoking materials as they are relatively non-conductive), and any other material between the heating element and the smoking material,
- A is the area of contact between the heating element and the smoking material, and
- T is temperature change that is applied at the heating element.

There are several challenges to heating up smoking material in a heat-not-burn process, including the following:

- low heat conduction of the smoking material (i.e., a low value of K in Equation 1);
- a limited temperature to which the heating element can be heated in order to avoid pyrolysis (i.e., burning) of the smoking material (i.e., a low value of ΔT in Equation 1);
- many designs of heating-elements-capsule combinations providing a relatively small area of contact between the heating elements and the smoking material (i.e., a low value of A in Equation 1), particularly if the capsule is designed to have the general shape of a traditional cigarette;
- in order to provide the appearance and feel of a traditional cigarette, there may be a heat-insulating material (e.g., paper) between the heating element and the smoking material (thereby further decreasing K in Equation 1), for example, if heating is applied by a heating element that is disposed within the smoking device outside the capsule;

the distance from the heating element to the smoking material that is located toward the radial center of the capsule is relatively large (i.e., a high value of d in Equation 1).

In accordance with some applications of the present invention, apparatus and methods are provided that (a) provide a relatively large area of contact between the heating element and the smoking material (i.e., A in Equation 1), and (b) provide a relatively small distance between the heating element and the smoking material even at the radial center of the capsule (i.e., d in Equation 1), while (c) providing the user with a capsule having the same general structure as a traditional cigarette.

Typically, the heating element is built-in to the capsule, such that it is in direct contact with smoking material. For some applications, at least some of the heating element is embedded within the smoking material, as described in further detail hereinbelow. For some applications, the heating element comprises a metal material (such as metallic foil, e.g., stainless steel foil, nickel-titanium foil, titanium foil, copper foil, aluminum foil, steel foil), which is typically disposed within the capsule and/or is typically in direct contact with the smoking material, and that is heated via electrical resistive heating, as described in further detail hereinbelow. Alternatively or additionally, the heating element comprises one or more magnetically-heated materials that are susceptible to being heated by a magnetic field (such as, magnetic materials and/or ferromagnetic materials), which are typically disposed within the capsule and/or are typically in direct contact with smoking material and that are heated via magnetic induction, as described in further detail hereinbelow.

Typically, the capsule is an elongate capsule. For some applications, the capsule has a length of between 15 mm and 150 mm (e.g., between 50 mm and 90 mm). For some applications, the capsule has the same general structure as a traditional cigarette, but differs from the general structure of a cigarette in that the capsule is provided to the user with at least a portion of the capsule having a shape that is flattened relative to a traditional cigarette (e.g., such that it has an elliptical, rectangular, pill-shaped, or racetrack-shaped cross-sectional shape). Typically, by being flattened, the smoking material that is disposed toward the radial center of the capsule is disposed closer to the heating element than if the capsule had a circular cross section with a similar cross-sectional area, as described in further detail hereinbelow. Alternatively, the capsule is provided to the user with a circular cross-section shape, typically having a diameter of between 4 mm and 12 mm (e.g., between 5 and 8.5 mm). Typically, for such applications, although the capsule is provided to the user with the capsule having a circular cross-sectional shape, at least a portion of the capsule is flattened upon being inserted into the smoking device (e.g., such that it has an elliptical, rectangular, pill-shaped, or racetrack-shaped cross-sectional shape), such that the smoking material that was disposed toward the radial center of the capsule is disposed closer to the heating element than it would have been before being flattened, as described in further detail hereinbelow.

For some applications, the smoking device includes two or more electrodes that are configured (a) to heat a heating element that is disposed within the capsule via electrical resistive heating, and (b) to apply mechanical pressure to the capsule in order to flatten all or part of the portion of the capsule that contains the smoking material.

For some applications, a capsule is provided for use with a liquid material that is configured to be vaporized by the above-described smoking device (or a different smoking device). For some applications, the liquid material includes vegetable glycerin, propylene glycol, nicotine, nicotine salt and/or additional taste and/or scent materials. Typically, for such applications, the capsule is a "vaping" capsule and the smoking device acts as a "vaping device." Nevertheless, the device is referred to herein as a smoking device, since it is typically also used with a capsule that is used for smoking (typically in a heat-not-burn manner).

For some applications, the liquid material is held within a reservoir that comprises an absorbent material with the liquid material absorbed therein. Typically, the absorbent material is solid and/or flexible, is capable of withstanding the high temperatures that might develop during the vaporization process, and is safe for human inhalation. For example, the absorbent material may include cotton, hemp, wool, plastic material, cellulose material, paper, woven or non-woven fabrics, threads, etc. (In other instances of an "absorbent material" being described in the present disclosure, the term "absorbent material" should be interpreted as including any one of the aforementioned types of material or a combination thereof.) For some such applications, a layer of material extends from reservoir around the circumference of the capsule. For some applications, the layer of material is made of a similar absorbent material to the absorbent material disposed within the reservoir. Typically, the layer of material has a thickness of more than 0.1 mm (e.g., more than 0.2 mm), and/or less than 3 mm (e.g., less than 1 mm), for example between 0.1 mm and 3 mm, or between 0.2 mm and 1 mm. The layer of material is typically configured such that the liquid material flows from the reservoir along the layer of material via capillary forces. For some applications, metallic foil is disposed around the outside of the layer of material. The metallic foil is typically heated via the electrodes (via resistive heating), in a generally similar manner to that described hereinabove. Typically, the metallic foil thereby heats and vaporizes the liquid material within the layer of material.

For some applications, the vaping capsule including a housing that houses a reservoir of absorbent material that has the liquid material absorbed therein, in accordance with some applications of the present invention. Typically, the housing is an electrical insulator and is impermeable to the liquid material. Further typically, the housing defines one or more lateral windows. The absorbent material is configured such that the liquid material flows to the lateral windows via capillary forces. Typically, at the lateral windows the liquid material within the absorbent material is exposed to the metallic foil of the capsule, and the liquid material is thereby vaporized. Typically, the metallic foil contacts the electrodes at locations that are remote from each of the one or more lateral windows.

For some applications, a vaping capsule including a housing that houses a reservoir of the liquid material. Typically, the housing is an electrical insulator and is impermeable to the liquid material. Further typically, the housing defines one or more lateral windows. For some applications, an absorbent material is disposed within the reservoir with the absorbent material extending from the reservoir to the one or more lateral windows, the absorbent material being configured to transport the liquid material from the reservoir to the one or more lateral windows via capillary forces. Typically, at the lateral windows the liquid material within the absorbent material is exposed to a metallic foil of the capsule, and the liquid material is thereby vaporized. Typically, the metallic foil contacts the electrodes at locations that are remote from each of the one or more lateral windows. Typically, the absorbent material is shaped such as to enhance capillary flow of the liquid material toward the lateral windows, in accordance with some applications of the present invention.

In accordance with respective applications, the vaping capsule is rigid or is flexible. For some applications, the capsule is configured to be flattened, for example, using the techniques described hereinabove. For example, the capsule may be flattened in order to enhance electrical contact between the electrodes and the metallic foil, by applying mechanical pressure to the capsule using the electrodes. For some applications, the capsule is flattened in order to generate a desired heating profile and/or a desired airflow profile. For some applications, the smoking device includes a non-contact temperature sensor (such as an infrared temperature sensor). For some such applications, the portion of the capsule at which the sensor is configured to sense the temperature (i.e., a portion of the capsule that is configured to be adjacent to the temperature sensor) is flattened such as to facilitate the temperature sensing (typically by creating a flat surface upon which to perform the temperature sensing). For some applications, the capsule is flattened in order to increase capillary flow through an absorbent material disposed within the capsule. It is noted that the aforementioned techniques associated with flattening a capsule are typically applicable to any one of the embodiments of capsules described herein.

There is therefore provided, in accordance with some applications of the present invention, apparatus for use with a smoking device, the apparatus including:

a capsule including:

- a smoking material containing one or more active agents; and
- one or more heating elements disposed within the capsule, the one or more heating elements being configured to vaporize one or more of the active agents from within the smoking material, by the one or more heating elements being heated by the smoking device,
- at least a portion of the capsule being configured to be flattened by the smoking device prior to the one or more heating elements being heated by the smoking device.

In some applications, the capsule has a circular cross-sectional shape and is configured to be flattened to define a non-circular cross-sectional shape.

In some applications, the capsule includes a collapse-prevention element disposed along a portion of the capsule that contains the smoking material, the collapse-prevention element being configured to prevent the portion of the capsule that contains the smoking material from collapsing when mechanical pressure is applied to the portion of the capsule that contains the smoking material.

In some applications, the capsule includes two or more cylindrical collapse-prevention elements disposed at respective ends of a portion of the capsule that contains the smoking material, the cylindrical collapse-prevention elements being configured to prevent the portion of the capsule that contains the smoking material from collapsing when mechanical pressure is applied to the portion of the capsule that contains the smoking material.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, the metallic foil has a thickness of between 1 micron and 20 microns. In some applications, the metallic foil has a thickness of between 3 microns and 10 microns.

In some applications, the capsule includes an elongate capsule having a length of between 15 mm and 150 mm. In some applications, the elongate capsule has a length of between 50 mm and 90 mm.

In some applications, the capsule is configured to be flattened such as to define a cross-sectional shape having a ratio of more than 2:1 between a long side of the cross-sectional shape and a short side of the cross-sectional shape. In some applications, the capsule is configured to be flattened such as to define a cross-sectional shape having a ratio of more than 3:1 between a long side of the cross-sectional shape and a short side of the cross-sectional shape. In some applications, the capsule is configured to be flattened such as to define a cross-sectional shape having a ratio of more than 4:1 between a long side of the cross-sectional shape and a short side of the cross-sectional shape. In some applications, the capsule is configured to be flattened such as to define a cross-sectional shape having a ratio of more than 6:1 between a long side of the cross-sectional shape and a short side of the cross-sectional shape.

There is further provided, in accordance with some applications of the present invention, apparatus for use with a smoking device, the apparatus including:

an elongate capsule including:

- a smoking material containing one or more active agents; and
- one or more heating elements disposed within the capsule, the one or more heating elements being configured to vaporize one or more of the active agents from within the smoking material, by the one or more heating elements being heated by the smoking device,
- at least when the one or more heating elements are being heated by the smoking device, the elongate capsule being configured such as to define a cross-sectional shape having a ratio of more than 2:1 between a long side of the cross-sectional shape and a short side of the cross-sectional shape.

In some applications, the elongate capsule is manufactured such as to define the cross-sectional shape having a ratio of more than 2:1 between a long side of the cross-sectional shape and a short side of the cross-sectional shape.

In some applications, the elongate capsule includes a collapse-prevention element disposed along a portion of the capsule that contains the smoking material, the collapse-prevention element being configured to prevent the portion of the capsule that contains the smoking material from collapsing when mechanical pressure is applied to the portion of the capsule that contains the smoking material.

In some applications, the elongate capsule includes two or more cylindrical collapse-prevention elements disposed at respective ends of a portion of the capsule that contains the smoking material, the collapse-prevention elements being configured to prevent the portion of the capsule that contains the smoking material from collapsing when mechanical pressure is applied to the portion of the capsule that contains the smoking material.

In some applications, the one or more heating elements include one or more magnetically-heated materials that are susceptible to being heated by a magnetic field.

In some applications, the elongate capsule has a length of between 15 mm and 150 mm. In some applications, the elongate capsule has a length of between 50 mm and 90 mm.

In some applications, the elongate capsule is manufactured such as to define a cylindrical shape and at least a portion of the capsule is configured to be flattened by the smoking device such as to define the cross-sectional shape having a ratio of more than 2:1 between a long side of the cross-sectional shape and a short side of the cross-sectional shape, prior to the one or more heating elements being heated by the smoking device.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, at least when the one or more heating elements are being heated by the smoking device, the elongate capsule is configured such as to define a cross-sectional shape having a ratio of more than 3:1 between a long side of the cross-sectional shape and a short side of the cross-sectional shape. In some applications, at least when the one or more heating elements are being heated by the smoking device, the elongate capsule is configured such as to define a cross-sectional shape having a ratio of more than 4:1 between a long side of the cross-sectional shape and a short side of the cross-sectional shape. In some applications, at least when the one or more heating elements are being heated by the smoking device, the elongate capsule is configured such as to define a cross-sectional shape having a ratio of more than 6:1 between a long side of the cross-sectional shape and a short side of the cross-sectional shape.

In some applications, the one or more heating elements include a metallic foil that is configured to be heated via resistive heating. In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device, the apparatus including:

a capsule including:

a smoking material containing one or more active agents;

one or more heating elements disposed within the capsule, the one or more heating elements being configured to vaporize one or more of the active agents from within the smoking material, by the one or more heating elements being heated by the smoking device; and a collapse-prevention element disposed along an axis of a portion of the capsule that contains the smoking material, the collapse-prevention element being configured to prevent the portion of the capsule that contains the smoking material from collapsing when mechanical pressure is applied to the portion of the capsule that contains the smoking material.

In some applications, at least part of the portion of the capsule that contains the smoking material is configured to be flattened by the smoking device and the collapse-prevention element is configured to prevent the portion of the capsule that contains the smoking material from collapsing when at least part of the portion of the capsule that contains the smoking material is flattened by the smoking device.

In some applications, the collapse-prevention element is configured to diffuse one or more chemicals. In some applications, the collapse-prevention element includes a phase-change material that is configured to prevent the temperature of the smoking material from exceeding the phase-change temperature of the phase-change material. In some applications, the collapse-prevention element is configured to absorb chemicals that are generated by pyrolysis of the smoking material.

In some applications, the capsule includes two or more cylindrical collapse-prevention elements disposed at respective ends of a portion of the capsule that contains the smoking material, the collapse-prevention elements being configured to prevent the portion of the capsule that contains the smoking material from collapsing when mechanical pressure is applied to the portion of the capsule that contains the smoking material.

In some applications, the collapse-prevention element is configured to facilitate adequate airflow through the capsule by preventing the portion of the capsule that contains the smoking material from collapsing when mechanical pressure is applied to the portion of the capsule that contains the smoking material.

In some applications, the one or more heating elements include one or more magnetically-heated materials that are susceptible to being heated by a magnetic field.

In some applications, the capsule is manufactured such as to define a cross-sectional shape having a ratio of more than 2:1 between a long side of the cross-sectional shape and a short side of the cross-sectional shape.

In some applications, the smoking device includes two or more electrodes, and the one or more heating elements include a metallic foil that is configured to be heated via resistive heating via the two or more electrodes.

In some applications, the collapse-prevention element is configured to facilitate electrical contact between the two or more electrodes and the metallic foil by preventing the portion of the capsule that contains the smoking material from collapsing when mechanical pressure is applied to the portion of the capsule that contains the smoking material.

In some applications, the metallic foil has a thickness of between 1 micron and 20 microns. In some applications, the metallic foil has a thickness of between 3 microns and 10 microns.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the one or more heating elements include one or more magnetically-heated materials that are susceptible to being heated by a magnetic field.

In some applications, the portion of the capsule that is configured to be flattened by the smoking device is configured to be inserted into a coil that has a non-circular cross-sectional shape.

In some applications, the portion of the capsule is configured to be flattened by the smoking device is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, the collapse-prevention element is shaped as at least one rod that extends axially along a longitudinal axis of the portion of the capsule that contains the smoking material. In some applications, the rod has a diameter of between 0.5 mm and 5 mm. In some applications, the rod extends along only part of the portion of the capsule that contains the smoking material. In some applications, the collapse-prevention element is shaped as two or more rods. In some applications, the smoking device includes two or more electrodes that are configured to drive an electrical current into the capsule, and at locations at which the electrodes are configured to come into contact with the capsule, the rod includes radially-protruding portions having a greater diameter than at other locations along the rod.

In some applications, the collapse-prevention element is shaped as at least one tube that extends axially along a longitudinal axis of the portion of the capsule that contains the smoking material. In some applications, the tube contains one or more chemicals that are configured to be released from the tube during heating of the smoking material.

In some applications, the capsule includes a mouthpiece, and the tube is configured to collect vaporized active agents generated by the heating of the smoking material and direct the vapors toward the mouthpiece.

In some applications, the capsule includes an elongate capsule having a length of between 15 mm and 150 mm. In some applications, the elongate capsule has a length of between 50 mm and 90 mm.

There is further provided, in accordance with some applications of the present invention, apparatus for use with a smoking device, the apparatus including:

a capsule including:

a smoking material containing one or more active agents;

one or more heating elements disposed within the capsule the one or more heating elements being configured to vaporize one or more of the active agents from within the smoking material, by the one or more heating element being heated by the smoking device; and two or more cylindrical collapse-prevention elements disposed at respective ends of a portion of the capsule that contains the smoking material, the collapse-prevention elements being configured to prevent the portion of the capsule that contains the smoking material from collapsing when mechanical pressure is applied to the portion of the capsule that contains the smoking material.

In some applications, at least part of the portion of the capsule that contains the smoking material is configured to be flattened by the smoking device and the cylindrical collapse-prevention elements are configured to prevent the portion of the capsule that contains the smoking material from collapsing when at least part of the portion of the capsule that contains the smoking material is flattened by the smoking device.

In some applications, the capsule further includes a rod-shaped collapse-prevention element disposed along a portion of the capsule that contains the smoking material, the rod-shaped collapse-prevention element being configured to prevent the portion of the capsule that contains the smoking material from collapsing when mechanical pressure is applied to the portion of the capsule that contains the smoking material.

In some applications, the capsule further includes a tube-shaped collapse-prevention element disposed along a portion of the capsule that contains the smoking material, the tube-shaped collapse-prevention element being configured to prevent the portion of the capsule that contains the smoking material from collapsing when mechanical pressure is applied to the portion of the capsule that contains the smoking material.

In some applications, the cylindrical collapse-prevention elements are configured to facilitate adequate airflow through the capsule by preventing the portion of the capsule that contains the smoking material from collapsing when mechanical pressure is applied to the portion of the capsule that contains the smoking material.

In some applications, the one or more heating elements include one or more magnetically-heated materials that are susceptible to being heated by a magnetic field.

In some applications, the capsule is manufactured such as to define a cross-sectional shape having a ratio of more than 2:1 between a long side of the cross-sectional shape and a short side of the cross-sectional shape.

In some applications, the smoking device includes two or more electrodes, and the one or more heating elements include a metallic foil that is configured to be heated via resistive heating via the two or more electrodes.

In some applications, the cylindrical collapse-prevention elements are configured to facilitate electrical contact between the two or more electrodes and the metallic foil by preventing the portion of the capsule that contains the smoking material from collapsing when mechanical pressure is applied to the portion of the capsule that contains the smoking material.

In some applications, the metallic foil has a thickness of between 1 micron and 20 microns. In some applications, the metallic foil has a thickness of between 3 microns and 10 microns.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, the capsule includes an elongate capsule having a length of between 15 mm and 150 mm. In some applications, the elongate capsule has a length of between 50 mm and 90 mm.

There is further provided, in accordance with some applications of the present invention, apparatus for use with a smoking device, the apparatus including:

an elongate capsule including:

- a smoking material containing one or more active agents disposed along a portion of a length of the capsule;
- two cylindrical elements disposed at respective ends of the portion of the length of the capsule that contains the smoking material, such that a predefined quantity of smoking material disposed between the two cylindrical elements;
- one or more heating elements disposed within the capsule, the one or more heating elements being configured to vaporize one or more of the active agents from within the smoking material, by the one or more heating elements being heated by the smoking device,
- the predefined quantity of smoking material disposed between the two cylindrical elements is configured to provide a metered dose of the one or more active agents to a user.

In some applications, the one or more heating elements include a metallic foil that is configured to be heated via resistive heating.

In some applications, the one or more heating elements include one or more magnetically-heated materials that are susceptible to being heated by a magnetic field.

In some applications, the elongate capsule is manufactured such as to define a cross-sectional shape having a ratio of more than 2:1 between a long side of the cross-sectional shape and a short side of the cross-sectional shape.

In some applications, the two cylindrical elements are configured to prevent the portion of the capsule that contains the smoking material from collapsing when mechanical pressure is applied to the portion of the capsule that contains the smoking material.

In some applications, at least part of the portion of the elongate capsule that contains the smoking material is configured to be flattened by the smoking device and the cylindrical elements are configured to prevent the portion of the capsule that contains the smoking material from collapsing when at least part of the portion of the capsule that contains the smoking material is flattened by the smoking device.

In some applications, the elongate capsule further includes a rod-shaped collapse-prevention element disposed along a portion of the capsule that contains the smoking material, the rod-shaped collapse-prevention element being configured to prevent the portion of the capsule that contains the smoking material from collapsing when mechanical pressure is applied to the portion of the capsule that contains the smoking material.

In some applications, the elongate capsule further includes a tube-shaped collapse-prevention element disposed along a portion of the capsule that contains the smoking material, the tube-shaped collapse-prevention element being configured to prevent the portion of the capsule that contains the smoking material from collapsing when mechanical pressure is applied to the portion of the capsule that contains the smoking material.

In some applications, the cylindrical elements are configured to facilitate adequate airflow through the capsule by preventing the portion of the capsule that contains the smoking material from collapsing when mechanical pressure is applied to the portion of the capsule that contains the smoking material.

In some applications, the smoking device includes two or more electrodes, and the one or more heating elements include a metallic foil that is configured to be heated via resistive heating via the two or more electrodes.

In some applications, the cylindrical collapse-prevention elements are configured to facilitate electrical contact between the two or more electrodes and the metallic foil by preventing the portion of the capsule that contains the smoking material from collapsing when mechanical pressure is applied to the portion of the capsule that contains the smoking material.

In some applications, the metallic foil has a thickness of between 1 micron and 20 microns. In some applications, the metallic foil has a thickness of between 3 microns and 10 microns.

In some applications, at least a portion of the capsule is configured to be flattened by the smoking device prior to the one or more heating elements being heated by the smoking device.

In some applications, the cylindrical elements are configured to facilitate adequate airflow through the capsule by preventing the portion of the capsule that contains the smoking material from collapsing when the portion of the capsule is flattened.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating. In some applications, the smoking device includes two or more electrodes that are configured to drive an electrical current through the metallic foil, and the capsule is configured to be flattened by the two or more electrodes.

In some applications, the elongate capsule has a length of between 15 mm and 150 mm. In some applications, the elongate capsule has a length of between 50 mm and 90 mm.

There is further provided, in accordance with some applications of the present invention, apparatus for use with a smoking device including an infrared temperature sensor, the apparatus including:

a capsule including:

a smoking material containing one or more active agents;

a metallic foil disposed around at least a portion of the smoking material, the metallic foil being configured to vaporize one or more of the active agents from within the smoking material, by the metallic foil being heated by the smoking device via resistive heating; and a coating disposed around at least a portion of the metallic foil at which the infrared temperature sensor is configured to detect a temperature of the capsule, the coating having an emissivity value of at least 0.5.

In some applications, the coating has an emissivity value of at least 0.95.

There is further provided, in accordance with some applications of the present invention, apparatus for use with a smoking device including an infrared temperature sensor, the apparatus including:

a capsule including:

a smoking material containing one or more active agents;

a metallic foil disposed around at least a portion of the smoking material, the metallic foil being configured to vaporize one or more of the active agents from within the smoking material, by the metallic foil being heated by the smoking device via resistive heating; and at least a portion of the metallic foil at which the infrared temperature sensor the infrared temperature sensor is configured to detect a temperature of the capsule the metallic foil being treated such as to have an emissivity value of at least 0.5.

In some applications, the portion of the metallic foil is treated such as to have an emissivity value of at least 0.95.

There is further provided in accordance with some applications of the present invention, apparatus for use with a smoking device including an infrared temperature sensor, the apparatus including:

a capsule including:

a smoking material containing one or more active agents;

one or more resistive elements, the resistive elements being configured to provide an electrical resistance profile to the capsule that provides identifying information regarding the capsule.

There is further provided, in accordance with some applications of the present invention, apparatus for use with a smoking device that includes at least first and second electrodes, the apparatus including:

an elongate capsule having a length of between 15 mm and 150 mm, the elongate capsule including:

a smoking material containing one or more active agents; and metallic foil surrounding the smoking material, the metallic foil being configured to be heated via resistive heating by the first electrode driving a current to the second electrode along a length of more than 5 mm in an axial direction along the metallic foil.

In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 15 mm in the axial direction along the metallic foil.

In some applications, the capsule further includes a paper covering that covers the metallic foil, the paper covering defining openings via which the electrodes are configured to make electrical contact with the metallic foil.

In some applications, the metallic foil is shaped such that at least a portion of the metallic foil is embedded within the smoking material.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

- a smoking material containing one or more active agents; and
- metallic foil surrounding the smoking material, the metallic foil being configured to be heated via resistive heating by the electrodes driving a current into the metallic foil; and
- a paper covering that covers the metallic foil, the paper covering defining openings via which the electrodes are configured to make electrical contact with the metallic foil.

In some applications, the metallic foil is shaped such that at least a portion of the metallic foil is embedded within the smoking material.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the paper covering is adhered to itself along a band of overlap, such as to form a cylindrical shape, and an electrically insulating material is disposed along the band of overlap, to isolate an inner layer of the metallic foil from the electrodes. In some applications, the paper covering is adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

- a smoking material containing one or more active agents; and
- metallic foil surrounding the smoking material, the metallic foil being configured to be heated via resistive heating by the electrodes driving a current into the metallic foil, the metallic foil being shaped such that at least a portion of the metallic foil is embedded within the smoking material.

In some applications, the metallic foil is folded such as to define ribs that are embedded within the smoking material.

In some applications, the metallic foil is shaped to define a flap that is embedded within the smoking material.

In some applications, the metallic foil is shaped to define a spiral that spirals through the smoking material.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

a smoking material containing one or more active agents; and metallic foil surrounding the smoking material, the metallic foil being configured to be heated via resistive heating by the electrodes driving a current into the metallic foil, the metallic foil including a plurality of regions along its length, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, the capsule is configured for use with a smoking device that includes respective temperature sensors that are configured to detect temperatures of the respective regions along the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

In some applications, each of the regions along the length of the metallic foil includes a respective, different material that is configured to be vaporized by heating of the metallic foil.

In some applications, the capsule is configured for use with a smoking device that is configured to receive an input from a user indicating a preferred mix of vapors of the user, and to heat the respective regions along the length of the metallic foil to respective, different temperatures responsively thereto.

There is further provided, in accordance with some applications of the present invention, apparatus for use with a smoking device that includes at least first and second electrodes, the apparatus including:

a capsule including:

- a smoking material containing one or more active agents; and
- metallic foil surrounding the smoking material, the metallic foil being configured to be heated via resistive heating by the electrodes driving a current into the metallic foil; and
- a collapse-prevention element configured to facilitate electrical contact between the electrodes and the metallic foil, by preventing the capsule from collapsing.

In some applications, the metallic foil includes a plurality of regions, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, the collapse-prevention element is configured to diffuse one or more chemicals. In some applications, the collapse-prevention element includes a phase-change material that is configured to prevent the temperature of the smoking material from exceeding the phase-change temperature of the phase-change material. In some applications, the collapse-prevention element is configured to absorb chemicals that are generated by pyrolysis of the smoking material. In some applications, the collapse-prevention element includes two or more cylindrical collapse-prevention elements disposed at respective ends of the portion of the capsule that contains the smoking material.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the collapse-prevention element is shaped as at least one rod that extends axially along a longitudinal axis of the portion of the capsule that contains the smoking material. In some applications, the rod has a diameter of between 0.5 mm and 5 mm. In some applications, the rod extends along only part of the portion of the capsule that contains the smoking material. In some applications, the collapse-prevention element is shaped as two or more rods. In some applications, the smoking device includes two or more electrodes that are configured to drive an electrical current into the capsule, and at locations at which the electrodes are configured to come into contact with the capsule, the rod includes radially-protruding portions having a greater diameter than at other locations along the rod.

In some applications, the collapse-prevention element is shaped as at least one tube that extends axially along a longitudinal axis of the portion of the capsule that contains the smoking material. In some applications, the tube contains one or more chemicals that are configured to be released from the tube during heating of the smoking material. In some applications, the capsule includes a mouthpiece, and the tube is configured to collect vaporized active agents generated by the heating of the smoking material and direct the vapors toward the mouthpiece.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes and one or more batteries, the apparatus including:

a capsule including:
- a smoking material containing one or more active agents; and
- metallic foil surrounding the smoking material, the metallic foil being configured to be heated via resistive heating by the electrodes driving a current into the metallic foil, an overall resistance to the current that is provided by the capsule is configured to substantially match an internal resistance of the one or more batteries of the smoking device.

In some applications, the capsule further includes a collapse-prevention element configured to facilitate electrical contact between the electrodes and the metallic foil, by preventing the capsule from collapsing.

In some applications, the metallic foil includes a plurality of regions, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

a smoking material containing one or more active agents; and metallic foil surrounding the smoking material, the metallic foil being configured to be heated via resistive heating by the electrodes driving a current into the metallic foil; and an electrical-contact coating that coats the metallic foil at locations at which the electrodes are configured to contact the capsule.

In some applications, the electrical-contact coating coats an outside of the metallic foil. In some applications, the electrical-contact coating coats an inside of the metallic foil.

In some applications, the electrical-contact coating has a lower resistance than a resistance of the metallic foil. In some applications, the electrical-contact coating is configured to prevent generation of hotspots at the locations at which the electrodes are configured to contact the capsule. In some applications, the electrical-contact coating includes a ring-shaped coating at each of the locations at which the electrodes are configured to contact the capsule. In some applications, an edge of the electrical-contact coating is zigzagged at a side at which the coating contacts the metallic foil to thereby conduct electrical current to the metallic foil in a uniform manner.

In some applications, the capsule further includes a collapse-prevention element configured to facilitate electrical contact between the electrodes and the metallic foil, by preventing the capsule from collapsing.

In some applications, the metallic foil includes a plurality of regions, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

a smoking material containing one or more active agents; and metallic foil surrounding the smoking material, the metallic foil being configured to be heated via resistive heating by the electrodes driving a current into the metallic foil; and the metallic foil having a first configuration at locations at which the electrodes are configured to contact the metallic foil, and the metallic foil having a second configuration along a region in which the metallic foil surrounds the smoking material that is between the locations at which the electrodes are configured to contact the metallic foil.

In some applications, the first configuration of the metallic foil is thicker than the second configuration of the metallic foil.

In some applications, the capsule further includes a collapse-prevention element configured to facilitate electrical contact between the electrodes and the metallic foil, by preventing the capsule from collapsing.

In some applications, the metallic foil includes a plurality of regions, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the capsule further includes an electrical-contact coating that coats the metallic foil at locations at which the electrodes are configured to contact the capsule.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the first configuration of the metallic foil is configured to provide lower electrical resistance than the second configuration of the metallic foil. In some applications, the metallic foil is etched in the second configuration of the metallic foil. In some applications, the metallic foil defines openings therethrough in the second configuration of the metallic foil.

In some applications, the capsule further includes a paper covering that covers the metallic foil, and the paper covering covers the openings. In some applications, the capsule further includes a paper covering that covers the metallic foil, and the paper covering does not cover the openings.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:
- a smoking material containing one or more active agents; and
- metallic foil surrounding the smoking material, the metallic foil being configured to be heated via resistive heating by the electrodes driving a current into the metallic foil; and
- an inner lining that lines an inside of the metallic foil, the inner lining being configured to diffuse heat that is generated by the metallic foil.

In some applications, the inner lining includes polyimide. In some applications, the inner lining is configured to diffuse heat that is generated by the metallic foil across the smoking material, thereby preventing hotspots from being generated within the smoking material. In some applications, the inner lining is configured to provide mechanical strength to the capsule, such as to reduce a likelihood of the capsule tearing as a result of mechanical pressure being applied to the capsule. In some applications, the electrodes are configured to apply mechanical pressure to the capsule, and the inner lining is disposed at regions of the capsule that are configured to be compressed by the electrodes.

In some applications, the inner lining is configured to diffuse one or more chemicals. In some applications, the inner lining includes a phase-change material that is configured to prevent the temperature of the smoking material from exceeding the phase-change temperature of the phase-change material. In some applications, the inner lining is configured to absorb chemicals that are generated by pyrolysis of the smoking material.

In some applications, the capsule further includes a collapse-prevention element configured to facilitate electrical contact between the electrodes and the metallic foil, by preventing the capsule from collapsing.

In some applications, the metallic foil includes a plurality of regions, each of the regions having a respective, different electrical resistance profile, such that upon a given current being driven through the metallic foil each of the regions heats to a respective, different temperature.

In some applications, the metallic foil is shaped such that at least a portion of the metallic foil is embedded within the smoking material.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the smoking device includes one or more batteries, and an overall resistance to the current that is provided by the capsule is configured to substantially match an internal resistance of the one or more batteries of the smoking device.

In some applications, the capsule further includes a paper covering that covers the metallic foil, the paper covering being adhered to itself along a band of overlap, such as to form a cylindrical shape, and an electrically insulating material is disposed along the band of overlap, to isolate an inner layer of the metallic foil from the electrodes.

In some applications, the capsule further includes a paper covering that covers the metallic foil, the paper covering being adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

- a capsule including:
  - a smoking material containing one or more active agents; and
  - metallic foil surrounding the smoking material, the metallic foil being configured to be heated via resistive heating by the electrodes driving a current into the metallic foil; and
  - a paper covering that covers the metallic foil,
  - the paper covering being adhered to itself along a band of overlap, such as to form a cylindrical shape, and
  - an electrically insulating material being disposed along the band of overlap, to isolate an inner layer of the metallic foil from the electrodes.

In some applications, the electrically insulating material includes an adhesive that is used to adhere the paper covering to itself along the band of overlap. In some applications, the electrically insulating material includes polyimide.

In some applications, the metallic foil is shaped such that at least a portion of the metallic foil is embedded within the smoking material.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the paper covering defines openings via which the electrodes are configured to make electrical contact with the metallic foil.

In some applications, the paper covering is adhered to itself along a band of overlap, such as to form a cylindrical shape, and the metallic foil is treated along the band of overlap, in order to increase resistance of the metallic foil along the band of overlap.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a smoking device that includes at least first and second electrodes, the apparatus including:

a capsule including:

- a smoking material containing one or more active agents; and
- metallic foil surrounding the smoking material, the metallic foil being configured to be heated via resistive heating by the electrodes driving a current into the metallic foil; and
- a paper covering that covers the metallic foil,
- the paper covering being adhered to itself along a band of overlap, such as to form a cylindrical shape, and
- the metallic foil being treated along the band of overlap, in order to increase resistance of the metallic foil along the band of overlap.

In some applications, the metallic foil defines slits along the band of overlap, in order to increase resistance of the metallic foil along the band of overlap.

In some applications, the metallic foil is shaped such that at least a portion of the metallic foil is embedded within the smoking material.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes a collapse-prevention element configured to facilitate electrical contact between the electrodes and the metallic foil, by preventing the capsule from collapsing.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil surrounds the smoking material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the paper covering defines openings via which the electrodes are configured to make electrical contact with the metallic foil.

In some applications, the paper covering is adhered to itself along a band of overlap, such as to form a cylindrical shape, and an electrically insulating material is disposed along the band of overlap, to isolate an inner layer of the metallic foil from the electrodes.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the one or more heating elements being heated by the smoking device. In some applications, the capsule has a circular cross-sectional shape and is configured to be flattened to define a non-circular cross-sectional shape. In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm. In some applications, the elongate capsule has a length of between 50 mm and 90 mm.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 5 mm in an axial direction along the metallic foil. In some applications, the capsule is configured such that airflow through the capsule is substantially in the axial direction along a length of the capsule. In some applications, the metallic foil is configured to be heated via resistive heating by the first electrode driving a current to the second electrode along a length of more than 15 mm in the axial direction along the metallic foil.

In some applications, the metallic foil has a thickness of between 1 micron and 20 microns. In some applications, the metallic foil has a thickness of between 3 microns and 10 microns.

There is further provided, in accordance with some applications of the present invention, apparatus for use with a cylindrically-shaped capsule that contains a smoking material containing one or more active agents, the apparatus including:

a smoking device configured to:

receive the cylindrically-shaped capsule that contains the smoking material;

flatten at least part of a portion of the capsule that contains the smoking material; and vaporize one or more of the active agents from within the smoking material by heating the smoking material while at least part of the portion of the capsule that contains the smoking material is flattened.

In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device includes two or more electrodes that are configured to heat the smoking material by generating resistive heating within the capsule by driving a current through a portion of the capsule. In some applications, the electrodes are configured to move axially along a length of the capsule. In some applications, the smoking device includes a mechanism configured to bring the electrodes into pressurized contact with the capsule, in order to enhance electrical contact between the electrodes and the capsule.

In some applications, the capsule includes an elongate capsule, and during the heating of the smoking material, the smoking device is configured to house the capsule such that airflow through the capsule is substantially along a length of the elongate capsule, and a first one of the electrodes is configured to drive a current toward a second one of the electrodes along a length of more than 5 mm in an axial direction along a length of the capsule. In some applications, the first one of the electrodes is configured to drive the current toward the second one of the electrodes along a length of more than 15 mm in the axial direction along the length of the capsule.

In some applications, the smoking device is configured to receive a capsule that includes a metallic foil surrounding the smoking material, and the electrodes are configured to drive the current through the metallic foil. In some applications, the smoking device is configured to receive a capsule that includes a metallic foil surrounding the smoking material and a paper covering that covers the metallic foil, and the electrodes are needle shaped and are configured to make electrical contact with the metallic foil by piercing through the paper covering.

In some applications, the smoking device includes a coil that is configured to heat the smoking material by generating a magnetic field such as to heat the capsule via magnetic induction. In some applications, the coil is configured to be flattened while at least part of the portion of the capsule that contains the smoking material is disposed within the coil. In some applications, the coil is shaped to define a non-circular cross-sectional shape even before part of the portion of the capsule that contains the smoking material is introduced to within the coil, and the smoking device is configured to flatten the part of the portion of the capsule that contains the smoking material prior to the part of the portion of the capsule that contains the smoking material being introduced to within the coil.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

There is further provided, in accordance with some applications of the present invention, apparatus for use with a cylindrically-shaped capsule that contains a smoking material containing one or more active agents, the apparatus including:

a smoking device configured to vaporize one or more of the active agents from within the smoking material by heating the smoking material, the smoking device including:

a cylindrically-shaped insertion port configured to receive the cylindrically-shaped capsule that contains the smoking material; and a non-cylindrical housing configured to house at least part of a portion of the capsule that contains the smoking material, while the smoking device heats the smoking material.

In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device includes a coil that is configured to heat the smoking material by generating a magnetic field such as to heat the capsule via magnetic induction. In some applications, the coil is configured to be flattened while at least part of the portion of the capsule that contains the smoking material is disposed within the coil. In some applications, the coil is shaped to define a non-circular cross-sectional shape even before part of the portion of the capsule that contains the smoking material is introduced to within the coil, and the smoking device is configured to flatten the part of the portion of the capsule that contains the smoking material prior to the part of the portion of the capsule that contains the smoking material being introduced to within the coil.

In some applications, the non-cylindrical housing defines a cross-sectional shape having a ratio of more than 2:1 between a long side of the cross-sectional shape and a short side of the cross-sectional shape. In some applications, the non-cylindrical housing defines a cross-sectional shape having a ratio of more than 3:1 between a long side of the cross-sectional shape and a short side of the cross-sectional shape. In some applications, the non-cylindrical housing defines a cross-sectional shape having a ratio of more than 4:1 between a long side of the cross-sectional shape and a short side of the cross-sectional shape. In some applications, the non-cylindrical housing defines a cross-sectional shape having a ratio of more than 6:1 between a long side of the cross-sectional shape and a short side of the cross-sectional shape.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the smoking device includes two or more electrodes that are configured to heat the smoking material by generating resistive heating within the capsule by driving a current through a portion of the capsule. In some applications, the electrodes are configured to move axially along a length of the capsule. In some applications, the smoking device includes a mechanism configured to bring the electrodes into pressurized contact with the capsule, in order to enhance electrical contact between the electrodes and the capsule.

In some applications, the capsule includes an elongate capsule, during the heating of the smoking material, the smoking device is configured to house the capsule such that airflow through the capsule is substantially along a length of the elongate capsule, and a first one of the electrodes is configured to drive the current toward a second one of the electrodes along a length of more than 5 mm in an axial direction along a length of the capsule. In some applications, the first one of the electrodes is configured to drive the current toward the second one of the electrodes along a length of more than 15 mm in the axial direction along the length of the capsule.

In some applications, the smoking device is configured to receive a capsule that includes a metallic foil surrounding the smoking material, and the electrodes are configured to drive the current through the metallic foil. In some applications, the smoking device is configured to receive a capsule that includes a metallic foil surrounding the smoking material and a paper covering that covers the metallic foil and the electrodes are needle shaped and are configured to make electrical contact with the metallic foil by piercing through the paper covering.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

two or more sensors, each of which is configured to detect a temperature of the capsule at the same location along a length of the capsule as each other.

In some applications, the sensors are configured to be placed on respective sides of the capsule. In some applications, the sensors include infrared temperature sensors. In some applications, the sensors include thermocouple sensors. In some applications, the sensors include contact sensors that are configured to contact the smoking material. In some applications, the sensors are configured to move axially along a length of the capsule.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the apparatus further includes a control component configured to determine a temperature of the smoking material at the location along the length of the capsule based upon the temperatures detected by each of the sensors. In some applications, the control component is configured to determine an average temperature of the smoking material at the location along the length of the capsule based upon the temperatures detected by each of the sensors. In some applications, the control component is configured to determine a maximum temperature of the smoking material at the location along the length of the capsule based upon the temperatures detected by each of the sensors. In some applications, the control component is configured to determine a minimum temperature of the smoking material at the location along the length of the capsule based upon the temperatures detected by each of the sensors. In some applications, the control component is configured to determine a temperature range of the smoking material at the location along the length of the capsule based upon the temperatures detected by each of the sensors. In some applications, based upon the temperatures detected by each of the sensors, the control component is configured to determine that the temperature detected by a first one of the sensors is indicative of a fault with the first one of the sensors, and, in response thereto, the control component is configured to determine the temperature of the smoking material based upon the temperature detect by a second one of the sensors.

In some applications, the control component is configured to control heating of the smoking material in response to the determined temperature of the smoking material. In some applications, the control component is configured to control heating of the smoking material such as to maintain the smoking material within a predefined temperature range.

In some applications, the smoking device includes:

two or more electrodes that are configured to heat the smoking material by generating resistive heating within the capsule by driving a current through a portion of the capsule; and a control component that is configured to detect an amount of current that must be applied to the capsule in order to maintain the smoking material at a substantially constant temperature and to thereby detect that the user has puffed the smoking device.

In some applications, the control component is configured to determine a parameter of the puff. In some applications, the control component is configured to determine a length of the puff. In some applications, the control component is configured to determine a depth of the puff. In some applications, the control component is configured to determine an amount of one or more of the active agents that has been vaporized from the capsule by monitoring a number of puffs and parameters of the puffs that have been taken from the capsule.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

one or more sensors configured to detect temperature of the smoking material within the capsule and configured to be moveable axially along a length of the capsule.

In some applications, the sensor includes an infrared temperature sensor. In some applications, the sensor includes a thermocouple sensor. In some applications, the sensor includes a contact sensor that is configured to contact the smoking material.

In some applications, the smoking device includes two or more electrodes that are configured to heat the smoking material by driving a current through the capsule, and the two or more electrodes are configured to configured to be moveable axially along the length of the capsule together with the one or more sensors. In some applications, the smoking device includes a motor and a rail and the motor is configured to move the one or more sensors axially along the length of the capsule by sliding the one or more sensors along the rail.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the sensor includes two or more sensors, each of which is configured to detect a temperature of the capsule at the same location along a length of the capsule as each other, at a given time. In some applications, the sensors are configured to be placed on respective sides of the capsule. In some applications, the apparatus further includes a control component configured to determine a temperature of the smoking material at the location along the length of the capsule based upon the temperatures detected by the sensors. In some applications, the control component is configured to determine an average temperature of the smoking material at the location along the length of the capsule based upon the temperatures detected by each of the sensors. In some applications, the control component is configured to determine a maximum temperature of the smoking material at the location along the length of the capsule based upon the temperatures detected by each of the sensors. In some applications, the control component is configured to determine a minimum temperature of the smoking material at the location along the length of the capsule based upon the temperatures detected by each of the sensors. In some applications, the control component is configured to determine a temperature range of the smoking material at the location along the length of the capsule based upon the temperatures detected by each of the sensors. In some applications, based upon the temperatures detected by each of the sensors the control component is configured to determine that the temperature detected by a first one of the sensors is indicative of a fault with the first one of the sensors, and, in response thereto, the control component is configured to determine the temperature of the smoking material based upon the temperature detect by a second one of the sensors.

In some applications, the apparatus further includes a control component configured to determine a temperature of the smoking material based upon the temperature detected by the sensor. In some applications, the control component is configured to control heating of the smoking material in response to the determined temperature of the smoking material. In some applications, the control component is configured to control heating of the smoking material such as to maintain the smoking material within a predefined temperature range.

In some applications, the smoking device includes:

two or more electrodes that are configured to heat the smoking material by generating resistive heating within the capsule by driving a current through a portion of the capsule; and a control component that is configured to detect an amount of current that must be applied to the capsule in order to maintain the smoking material at a substantially constant temperature and to thereby detect that the user has puffed the smoking device.

In some applications, the control component is configured to determine a parameter of the puff. In some applications, the control component is configured to determine a length of the puff. In some applications, the control component is configured to determine a depth of the puff. In some applications, the control component is configured to determine an amount of one or more of the active agents that has been vaporized from the capsule by monitoring a number of puffs and parameters of the puffs that have been taken from the capsule.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, heat the smoking material to the vaporization temperature only while receiving an active input from the user that they wish for the smoking material to be heated.

In some applications, the control component is configured, in response to receiving an indication that the user wishes to smoke the active agents in the first mode, to heat the smoking material to the vaporization temperature for a predefined period of time that is between 60 seconds and 600 seconds.

In some applications, the smoking device includes a button configured to be pressed by a user, and the control component is configured such that:

the user pressing the button for a duration that is less than a threshold duration, is interpreted by the control component that the user wishes to smoke the active agents in the second mode; and the user pressing the button for a duration that is more than the threshold duration, is interpreted by the control component that the user wishes to smoke the active agents in the first mode.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device includes a button configured to be pressed by a user, and the control component is configured such that:

the user pressing the button for a duration that is less than a threshold duration, is interpreted by the control component that the user wishes to smoke the active agents in the first mode; and the user pressing the button for a duration that is more than the threshold duration, is interpreted by the control component that the user wishes to smoke the active agents in the second mode.

In some applications, the threshold duration is between 0 and 2 seconds.

In some applications, the smoking device is configured such that during a smoking session, the user can switch from the first mode to the second mode by pressing the button for more than the threshold duration.

In some applications, the smoking device is configured such that during a smoking session, the user can switch from the second mode to the first mode by pressing the button for less than the threshold duration.

In some applications, the smoking device is configured to:

flatten at least part of a portion of the capsule that contains the smoking material; and vaporize one or more of the active agents from within the smoking material by heating the smoking material while at least part of the portion of the capsule that contains the smoking material is in a flattened configuration.

In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device includes two or more electrodes that are configured to heat the smoking material by generating resistive heating within the capsule by driving a current through a portion of the capsule. In some applications, the electrodes are configured to move axially along a length of the capsule. In some applications, the smoking device includes a mechanism configured to bring the electrodes into pressurized contact with the capsule, in order to enhance electrical contact between the electrodes and the capsule.

In some applications, the capsule includes an elongate capsule, during the heating of the smoking material, the smoking device is configured to house the capsule such that airflow through the capsule is substantially along a length of the elongate capsule, and a first one of the electrodes is configured to drive the current toward a second one of the electrodes along a length of more than 5 mm in an axial direction along a length of the capsule. In some applications, the first one of the electrodes is configured to drive the current toward the second one of the electrodes along a length of more than 15 mm in the axial direction along a length of the capsule.

In some applications, the smoking device is configured to receive a capsule that includes a metallic foil surrounding the smoking material, and the electrodes are configured to drive a current through the metallic foil. In some applications, the smoking device is configured to receive a capsule that includes a metallic foil surrounding the smoking material and a paper covering that covers the metallic foil and the electrodes are needle shaped and are configured to make electrical contact with the metallic foil by piercing through the paper covering.

In some applications, the smoking device includes a coil that is configured to heat the smoking material by generating a magnetic field such as to heat the capsule via magnetic induction. In some applications, the coil is configured to be flattened while at least part of the portion of the capsule that contains the smoking material is disposed within the coil. In some applications, the coil is shaped to define a non-circular cross-sectional shape even before part of the portion of the capsule that contains the smoking material is introduced to within the coil, and the smoking device is configured to flatten the part of the portion of the capsule that contains the smoking material prior to the part of the portion of the capsule that contains the smoking material being introduced to within the coil.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

roller wheels that are configured to change a shape of the capsule upon the capsule being inserted into the smoking device.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

a funnel that is configured to change a shape of the capsule upon the capsule being inserted into the smoking device.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

a control component configured to:

detect an amount of current that is required to maintain the smoking material at a given temperature;

thereby derive an indication of an amount of the one or more active agents that has been vaporized; and terminate heating of the smoking material in response to detecting an indication that more than a given amount of the one or more of the active agents has been vaporized.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device including:

an electrode configured to drive a current into the capsule at one or more locations on the capsule;

a sensor configured to detect an amount of resistance that is generated by the capsule at the one or more locations; and a control component configured to derive identifying information regarding the capsule based on the amount of resistance that is generated by the capsule at the one or more locations.

There is further provided, in accordance with some applications of the present invention, apparatus for use with a capsule that contains a smoking material containing one or more active agents, the apparatus including:

a smoking device configured to receive the capsule, the smoking device including:

two or more electrodes that are configured to:

change a shape of the capsule upon the capsule being inserted into the smoking device, by exerting mechanical pressure upon the capsule; and vaporize one or more of the active agents from within the smoking material by heating the smoking material, by driving a current through a portion of the capsule.

In some applications, the electrodes are configured to move axially along a length of the capsule. In some applications, the smoking device includes a mechanism configured to bring the electrodes into pressurized contact with the capsule, in order to enhance electrical contact between the electrodes and the capsule.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to receive a capsule that includes a metallic foil surrounding the smoking material, and the electrodes are configured to drive a current through the metallic foil. In some applications, the smoking device is configured to receive a capsule that includes a metallic foil surrounding the smoking material and a paper covering that covers the metallic foil and the electrodes are needle shaped and are configured to make electrical contact with the metallic foil by piercing through the paper covering.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive a current toward a second one of the electrodes along a length of more than 5 mm in an axial direction along a length of the capsule. In some applications, the first one of the electrodes is configured to drive the current toward the second one of the electrodes along a length of more than 15 mm in the axial direction along the length of the capsule.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the electrodes are configured to flatten at least a part of a portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

There is further provided, in accordance with some applications of the present invention, apparatus for use with a capsule that contains a smoking material containing one or more active agents, the apparatus including:

- a smoking device configured to receive the capsule, the smoking device including:
  - two or more electrodes that are configured to:
    - vaporize one or more of the active agents from within the smoking material by heating the smoking material, by driving a current into a portion of the capsule; and
    - move axially along a length of the capsule.

In some applications, the smoking device is configured to receive a cylindrically-shaped capsule, and the smoking device includes a cylindrically-shaped insertion port configured to receive the cylindrically-shaped capsule and a non-cylindrical housing configured to house at least part of a portion of the capsule that contains the smoking material, while the smoking material is heated.

In some applications, the smoking device includes a mechanism configured to bring the electrodes into pressurized contact with the capsule, in order to enhance electrical contact between the electrodes and the capsule.

In some applications, the smoking device includes one or more sensors configured to detect temperature of the smoking material within the capsule, and the one or more sensors are configured to configured to be moveable axially along the length of the capsule together with the two or more electrodes.

In some applications, the smoking device includes a motor and a rail and the motor is configured to move the two or more electrodes axially along the length of the capsule by sliding the two or more electrodes along the rail.

In some applications, the smoking device includes a control component configured to:

- receive an indication from a user indicating whether they wish to smoke the active agents in a first mode or a second mode;
- in response to receiving an indication that the user wishes to smoke the active agents in the first mode, heat the smoking material to a vaporization temperature of the one or more active agents for a predefined period of time; and
- in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to receive a capsule that includes a metallic foil surrounding the smoking material, and the electrodes are configured to drive a current through the metallic foil. In some applications, the smoking device is configured to receive a capsule that includes a metallic foil surrounding the smoking material and a paper covering that covers the metallic foil and the electrodes are needle shaped and are configured to make electrical contact with the metallic foil by piercing through the paper covering.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive the current toward a second one of the electrodes along a length of more than 5 mm in an axial direction along a length of the capsule. In some applications, the first one of the electrodes is configured to drive the current toward the second one of the electrodes along a length of more than 15 mm in the axial direction along a length of the capsule.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the electrodes are configured to change a shape of the capsule upon the capsule being inserted into the smoking device, by exerting mechanical pressure upon the capsule. In some applications, the electrodes are configured to flatten at least a part of a portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to flatten at least part of a portion of the capsule that contains the smoking material. In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

There is further provided, in accordance with some applications of the present invention, apparatus for use with a capsule that contains a smoking material containing one or more active agents, the smoking material being covered with a metallic foil, the apparatus including:

- a smoking device configured to receive the capsule, the smoking device including:
  - two or more electrodes that are configured to vaporize one or more of the active agents from within the smoking material by heating the smoking material, by driving a current into the metallic foil; and
  - a mechanism configured to bring the electrodes into pressurized contact with the capsule, in order to enhance electrical contact between the electrodes and the metallic foil of the capsule.

In some applications, the smoking device is configured to receive a cylindrically-shaped capsule, and the smoking device includes a cylindrically-shaped insertion port configured to receive the cylindrically-shaped capsule and a non-cylindrical housing configured to house at least part of a portion of the capsule that contains the smoking material, while the smoking material is heated.

In some applications, the electrodes are configured to move axially along a length of the capsule.

In some applications, the smoking device includes a control component configured to:

- receive an indication from a user indicating whether they wish to smoke the active agents in a first mode or a second mode;
- in response to receiving an indication that the user wishes to smoke the active agents in the first mode, heat the smoking material to a vaporization temperature of the one or more active agents for a predefined period of time; and
- in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to receive a capsule that includes a metallic foil surrounding the smoking material, and the electrodes are configured to drive a current through the metallic foil. In some applications, the smoking device is configured to receive a capsule that includes a metallic foil surrounding the smoking material and a paper covering that covers the metallic foil and the electrodes are needle shaped and are configured to make electrical contact with the metallic foil by piercing through the paper covering.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive the current toward a second one of the electrodes along a length of more than 5 mm in an axial direction along a length of the capsule. In some applications, the first one of the electrodes is configured to drive the current toward the second one of the electrodes along a length of more than 15 mm in the axial direction along the length of the capsule.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the electrodes are configured to change a shape of the capsule upon the capsule being inserted into the smoking device, by exerting mechanical pressure upon the capsule. In some applications, the electrodes are configured to flatten at least a part of a portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to flatten at least part of a portion of the capsule that contains the smoking material. In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device.

In some applications, the smoking device includes mechanical elements that are configured to flatten at least part of the portion of the capsule that contains the smoking material by applying mechanical pressure to the capsule. In some applications, the mechanism configured to bring the electrodes into pressurized contact with the capsule includes one or more compression springs that are configured to generate a counterforce in response to being compressed.

In some applications:

the smoking device includes a button that is coupled to a gear track; and the smoking device is configured such that:

insertion of the capsule requires the button to be pressed, and pressing of the button causes compression of the compression springs, such that upon release of the button, the compression springs bring the electrodes into pressurized contact with the capsule.

There is further provided, in accordance with some applications of the present invention, apparatus for use with a capsule that contains a smoking material containing one or more active agents, the smoking material being covered with a metallic foil and a paper covering, the apparatus including:

a smoking device configured to receive the capsule, the smoking device including:

two or more electrodes that are configured to vaporize one or more of the active agents from within the smoking material by heating the smoking material, by driving a current into the metallic foil, the two or more electrodes being needle shaped and being configured to make electrical contact with the metallic foil by piercing through the paper covering.

In some applications, the smoking device is configured to receive a cylindrically-shaped capsule, and the smoking device includes a cylindrically-shaped insertion port configured to receive the cylindrically-shaped capsule and a non-cylindrical housing configured to house at least part of a portion of the capsule that contains the smoking material, while the smoking material is heated.

In some applications, the electrodes are configured to move axially along a length of the capsule.

In some applications, the smoking device includes a mechanism configured to bring the electrodes into pressurized contact with the capsule, in order to enhance electrical contact between the electrodes and the capsule.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive the current toward a second one of the electrodes along a length of more than 5 mm in an axial direction along a length of the capsule. In some applications, the first one of the electrodes is configured to drive the current toward the second one of the electrodes along a length of more than 15 mm in the axial direction along the length of the capsule.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

In some applications, the electrodes are configured to change a shape of the capsule upon the capsule being inserted into the smoking device, by exerting mechanical pressure upon the capsule. In some applications, the electrodes are configured to flatten at least a part of a portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to flatten at least part of a portion of the capsule that contains the smoking material. In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

There is further provided, in accordance with some applications of the present invention, apparatus for use with an elongate capsule that contains a smoking material containing one or more active agents, the smoking material being covered with a metallic foil, the apparatus including:

a smoking device including:

a receptacle configured to house the elongate capsule such that airflow through the capsule is substantially along a length of the elongate capsule;

first and second electrodes that are configured to vaporize one or more of the active agents from within the smoking material by heating the smoking material, by the first electrode driving a current toward the second electrode along a length of the metallic foil of more than 5 mm in an axial direction along a length of the capsule.

In some applications, the first and second electrodes are configured to vaporize one or more of the active agents from within the smoking material by heating the smoking material, by the first electrode driving the current toward the second electrode along a length of the metallic foil of more than 15 mm in the axial direction along the length of the capsule.

In some applications, the smoking device is configured to receive a cylindrically-shaped capsule, and the smoking device includes a cylindrically-shaped insertion port configured to receive the cylindrically-shaped capsule and a non-cylindrical housing configured to house at least part of a portion of the capsule that contains the smoking material, while the smoking material is heated.

In some applications, the smoking device includes a mechanism configured to bring the electrodes into pressurized contact with the capsule, in order to enhance electrical contact between the electrodes and the capsule.

In some applications, the electrodes are configured to move axially along a length of the capsule.

In some applications, the smoking device is configured to receive a capsule that includes the metallic foil surrounding the smoking material and a paper covering that covers the metallic foil, and the electrodes are needle shaped and are configured to make electrical contact with the metallic foil by piercing through the paper covering.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to receive an elongate capsule having a length of between 15 mm and 150 mm. In some applications, the smoking device is configured to receive an elongate capsule having a length of between 50 mm and 90 mm.

In some applications, the electrodes are configured to change a shape of the capsule upon the capsule being inserted into the smoking device, by exerting mechanical pressure upon the capsule. In some applications, the electrodes are configured to flatten at least a part of a portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the electrodes are configured to flatten at least a part of a portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to flatten at least part of a portion of the capsule that contains the smoking material. In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes mechanical elements that are configured to flatten at least part of the portion of the capsule that contains the smoking material by applying mechanical pressure to the capsule.

There is further provided, in accordance with some applications of the present invention, apparatus for use with a cylindrically-shaped capsule that contains a smoking material containing one or more active agents, the apparatus including:

a smoking device including:

one or more mechanical elements configured to flatten at least a portion of the capsule;

a coil receive at least the portion the capsule, when the portion of the capsule is in a flattened configuration; and a power source configured to vaporize one or more of the active agents from within the smoking material by heating the smoking material via magnetic induction, by driving a current into the coil.

In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the coil has a non-circular cross-sectional shape having a ratio of more than 2:1 between a long side of the cross-sectional shape and a short side of the cross-sectional shape. In some applications, the coil has a non-circular cross-sectional shape having a ratio of more than 3:1 between a long side of the cross-sectional shape and a short side of the cross-sectional shape. In some applications, the coil has a non-circular cross-sectional shape having a ratio of more than 4:1 between a long side of the cross-sectional shape and a short side of the cross-sectional shape. In some applications, the coil has a non-circular cross-sectional shape having a ratio of more than 6:1 between a long side of the cross-sectional shape and a short side of the cross-sectional shape.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

There is further provided, in accordance with some applications of the present invention, apparatus for use with a capsule that contains a smoking material containing one or more active agents, the apparatus including:

a smoking device including:

a coil configured to receive at least part of a portion of the capsule that contains the smoking material;

a mechanical element configured to flatten at least a portion the coil while the portion of the capsule is disposed within the coil, such as to flatten the portion of the capsule; and a power source configured to vaporize one or more of the active agents from within the smoking material by heating the smoking material via magnetic induction, by driving a current into the coil while the portion of the coil and the portion of the capsule are in flattened configurations.

In some applications, the smoking device includes roller wheels that are configured to flatten the portion the coil while the portion of the capsule is disposed within the coil.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

There is further provided, in accordance with some applications of the present invention, apparatus for use with a capsule that contains a smoking material containing one or more active agents, the apparatus including:

- a smoking device including:
  - a coil having a non-circular cross-sectional shape and configured to receive at least a portion the capsule; and
  - a power source configured to vaporize one or more of the active agents from within the smoking material by heating the smoking material via magnetic induction, by driving a current into the coil,
  - a magnetic flux density generated within the coil being greater than that generated by a coil having a similar perimeter and a circular shape.

In some applications, the smoking device includes a control component configured to:

- receive an indication from a user indicating whether they wish to smoke the active agents in a first mode or a second mode;
- in response to receiving an indication that the user wishes to smoke the active agents in the first mode, heat the smoking material to a vaporization temperature of the one or more active agents for a predefined period of time; and
- in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the coil has a non-circular cross-sectional shape having a ratio of more than 2:1 between a long side of the cross-sectional shape and a short side of the cross-sectional shape. In some applications, the coil has a non-circular cross-sectional shape having a ratio of more than 3:1 between a long side of the cross-sectional shape and a short side of the cross-sectional shape. In some applications, the coil has a non-circular cross-sectional shape having a ratio of more than 4:1 between a long side of the cross-sectional shape and a short side of the cross-sectional shape. In some applications, the coil has a non-circular cross-sectional shape having a ratio of more than 6:1 between a long side of the cross-sectional shape and a short side of the cross-sectional shape.

In some applications, the smoking device includes one or more mechanical elements configured to flatten at least part of a portion of the capsule that contains the smoking material. In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

There is further provided, in accordance with some applications of the present invention, apparatus for use with a capsule that contains a smoking material containing one or more active agents, the apparatus including:

a smoking device including:

a material configured to form a magnetic circuit and defining a gap within the circuit, the gap being sized such as to receive a portion of the capsule;

a coil disposed around a portion of the magnetic circuit; and a power source configured to vaporize one or more of the active agents from within the smoking material by heating the smoking material via magnetic induction, by driving a current into the coil while portion of the capsule is disposed within the gap.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode. In some applications, the control component is configured to preheat the smoking material to the temperature that is below the vaporization temperature of the one or more active agents automatically, in response to the capsule being inserted into the smoking device. In some applications, the control component is configured to preheat the smoking material to the temperature that is below the vaporization temperature of the one or more active agents, in response to an input from the user.

In some applications, the smoking device is configured to flatten the portion of the capsule, and the gap is sized such as to receive the portion of the capsule when the portion of the capsule is in a flattened configuration.

In some applications, magnetic permeability of the circuit is increased by virtue of the gap being sized such as to receive the portion of the capsule when the portion of the capsule is in a flattened configuration relative to if the gap were sized such as to receive the capsule in a non-flattened configuration.

In some applications, the smoking device includes roller wheels that are configured to flatten at least part of the portion of the capsule that contains the smoking material upon the capsule being inserted into the smoking device. In some applications, the smoking device includes a funnel that is configured to flatten at least part of the portion of the capsule that contains the smoking material upon the capsule being inserted into the smoking device. In some applications, the smoking device includes one or more mechanical elements that are configured to flatten at least part of the portion of the capsule that contains the smoking material upon the capsule being inserted into the smoking device.

In some applications, the smoking device is configured to flatten the at least part of the portion of the capsule that contains the smoking material such that the part of the portion of the capsule that contains the smoking material defines a cross-sectional shape having a ratio of more than 2:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 3:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 4:1 between a long side of the cross-sectional shape and a short side of the cross-sectional shape. In some applications, the smoking device is configured to flatten the at least part of the portion of the capsule that contains the smoking material such that the part of the portion of the capsule that contains the smoking material defines a cross-sectional shape having a ratio of more than 6:1 between a long side of the cross-sectional shape and a short side of the cross-sectional shape.

In some applications, the smoking device is configured to receive a cylindrically-shaped elongate capsule having a length of between 15 mm and 150 mm. In some applications, the smoking device is configured to receive a cylindrically-shaped elongate capsule having a length of between 50 mm and 90 mm.

There is further provided, in accordance with some applications of the present invention, apparatus for use with a capsule that contains a smoking material containing one or more active agents, the smoking material being covered with a metallic foil, the apparatus including:

a smoking device configured to receive the capsule, the smoking device including:

two or more electrodes that are configured to vaporize one or more of the active agents from within the smoking material by heating the smoking material, by driving a current into the metallic foil; and a control component configured to periodically drive a test current through the electrodes and detect insertion and/or removal of the capsule from the smoking device based upon a response to the test current.

There is further provided, in accordance with some applications of the present invention, apparatus for use with a capsule that contains a smoking material containing one or more active agents, the smoking material being covered with a metallic foil, the apparatus including:

a smoking device configured to receive the capsule, the smoking device including:

two or more electrodes that are configured to vaporize one or more of the active agents from within the smoking material by heating the smoking material, by driving a current into the metallic foil; and a control component configured to:

drive a test current through the electrodes;

measure resistance between the electrodes in response to the test current; and detect a fault within the capsule, the smoking device, and/or an electrical contact between the electrodes and the capsule in response thereto.

There is further provided, in accordance with some applications of the present invention, apparatus for use with a capsule that contains a smoking material containing one or more active agents, the smoking material being covered with a metallic foil, the apparatus including:

a smoking device configured to receive the capsule, the smoking device including:

two or more electrodes that are configured to vaporize one or more of the active agents from within the smoking material by heating the smoking material, by driving a current into the metallic foil; and a control component configured to:

drive a test current through the electrodes;

measure a change in temperature of a portion of the capsule in response to the test current; and detect a fault within the capsule, the smoking device, and/or an electrical contact between the electrodes and the capsule in response thereto.

There is further provided, in accordance with some applications of the present invention, apparatus for use with a smoking device that includes at least first and second electrodes, the apparatus including:

a capsule including:

an absorbent material having a liquid material containing one or more active agents absorbed therein;

a housing disposed around the absorbent material, the housing being an electrical insulator, and the housing defining one or more lateral windows; and metallic foil surrounding the housing, the metallic foil being configured to be heated via resistive heating by the first electrode driving a current to the second electrode through the metallic foil, such as to vaporize liquid material within the absorbent material that is disposed at the one or more lateral windows.

In some applications, the housing is impermeable to the liquid material, apart from at the one or more lateral windows.

In some applications, the housing is partially permeable to the liquid material, apart from at the one or more lateral windows.

In some applications, the capsule is configured such that the metallic foil contacts the first and second electrodes at locations that are remote from each of the one or more lateral windows.

In some applications, the capsule is configured such that airflow through the capsule is substantially in an axial direction along a length of the capsule.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contact the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the metallic foil being heated by the smoking device.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the absorbent material is configured such that the liquid material flows toward the one or more lateral windows via capillary flow.

In some applications, the absorbent material is configured such that the flattening of the portion of the capsule increases capillary flow of the liquid material through the absorbent material.

In some applications, the metallic foil has a thickness of between 1 micron and 20 microns.

In some applications, the metallic foil has a thickness of between 3 microns and 10 microns.

In some applications, the metallic foil is configured to be heated via resistive heating by the first electrode driving a current to the second electrode along a length of more than 5 mm in an axial direction along the metallic foil.

In some applications, the metallic foil is configured to be heated via resistive heating by the first electrode driving a current to the second electrode along a length of more than 15 mm in the axial direction along the metallic foil.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device that includes at least first and second electrodes, the apparatus including:

a capsule including:

a reservoir containing a liquid material containing one or more active agents absorbed therein;

a housing disposed around the absorbent material, the housing being an electrical insulator, and the housing defining one or more lateral windows;

an absorbent material extending from the reservoir to the one or more lateral windows, the absorbent material being configured to transport the liquid material from the reservoir to the one or more lateral windows via capillary forces; and metallic foil surrounding the housing, the metallic foil being configured to be heated via resistive heating by the first electrode driving a current to the second electrode through the metallic foil, such as to vaporize liquid material within the absorbent material that is disposed at the one or more lateral windows.

In some applications, the housing is impermeable to the liquid material, apart from at the one or more lateral windows.

In some applications, the housing is partially permeable to the liquid material, apart from at the one or more lateral windows.

In some applications, the capsule is configured such that the metallic foil contacts the first and second electrodes at locations that are remote from each of the one or more lateral windows.

In some applications, the capsule is configured such that airflow through the capsule is substantially in an axial direction along a length of the capsule.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contact the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the metallic foil being heated by the smoking device.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the absorbent material is configured such that the flattening of the portion of the capsule increases capillary flow of the liquid material through the absorbent material.

In some applications, the metallic foil has a thickness of between 1 micron and 20 microns.

In some applications, the metallic foil has a thickness of between 3 microns and 10 microns.

In some applications, the metallic foil is configured to be heated via resistive heating by the first electrode driving a current to the second electrode along a length of more than 5 mm in an axial direction along the metallic foil.

In some applications, the metallic foil is configured to be heated via resistive heating by the first electrode driving a current to the second electrode along a length of more than 15 mm in the axial direction along the metallic foil.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a capsule that contains a smoking material containing one or more active agents, the smoking material being covered with a metallic foil, the apparatus including:

a smoking device configured to receive the capsule, the smoking device including:

two or more electrodes that are configured to vaporize one or more of the active agents from within the smoking material by heating the smoking material, by driving a current into the metallic foil; and a control component configured to periodically drive a test current through the electrodes and detect whether a capsule is disposed within the smoking device based upon a response to the test current.

In some applications, when a capsule is disposed within the smoking device, the control component is further configured to:

drive a further test current through the electrodes;

measure resistance between the electrodes in response to the test current; and in response thereto, detect at least one fault selected from the group consisting of: a fault within a capsule, a fault with the smoking device, and a fault with electrical contact between the electrodes and the capsule.

In some applications, when a capsule is disposed within the smoking device, the control component is further configured to:

drive a further test current through the electrodes;

measure a change in temperature of a portion of the capsule in response to the test current; and in response thereto, detect at least one fault selected from the group consisting of: a fault within a capsule, a fault with the smoking device, and a fault with electrical contact between the electrodes and the capsule.

In some applications, the smoking device is configured for use with a capsule that contains a plant-based smoking material and the smoking device is configured vaporize one or more of the active agents from within the plant-based smoking material by heating the plant-based smoking material.

In some applications, the smoking device is configured for use with a capsule that contains a liquid material and the smoking device is configured to vaporize one or more of the active agents from within the liquid material by vaporizing the liquid material.

In some applications, the control component is configured to detect that there is no capsule disposed within the smoking device is response to the test current not flowing from a first one of the electrodes to a second one of the electrodes.

In some applications, the control component is configured to detect that there is a capsule disposed within the smoking device is response to the test current flowing, with a given resistance profile, from a first one of the electrodes to a second one of the electrodes.

In some applications, the smoking device further includes at least one sensor configured to detect temperature of the smoking material within a capsule that is disposed within the smoking device.

In some applications, the sensor includes an infrared temperature sensor.

In some applications, the sensor includes a thermocouple sensor.

In some applications, the sensor includes a contact sensor that is configured to contact the smoking material.

In some applications, the control component is configured to control heating of the smoking material in response to the detected temperature of the smoking material.

In some applications, the control component is configured to control heating of the smoking material such as to maintain the smoking material within a predefined temperature range.

In some applications, the control component is further configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode.

In some applications, the control component is configured to preheat the smoking material to the temperature that is below the vaporization temperature of the one or more active agents automatically, in response to the capsule being inserted into the smoking device.

In some applications, the control component is configured to preheat the smoking material to the temperature that is below the vaporization temperature of the one or more active agents, in response to an input from the user.

In some applications, the control component is configured to detect an amount of current that must be applied to a capsule that is disposed within the smoking device in order to maintain the smoking material at a substantially constant temperature and to thereby detect that the user has puffed the smoking device.

In some applications, the control component is configured to determine a parameter of the puff.

In some applications, the control component is configured to determine a length of the puff.

In some applications, the control component is configured to determine a depth of the puff.

In some applications, the control component is configured to determine an amount of one or more of the active agents that has been vaporized from the capsule by monitoring a number of puffs and parameters of the puffs that have been taken from the capsule.

There is further provided, in accordance with some applications of the present invention, apparatus for use with a capsule that contains a smoking material containing one or more active agents, the smoking material being covered with a metallic foil, the apparatus including:

a smoking device configured to receive the capsule, the smoking device including:

two or more electrodes that are configured to vaporize one or more of the active agents from within the smoking material by heating the smoking material, by driving a current into the metallic foil; and a control component configured to:

drive a test current through the electrodes;

measure resistance between the electrodes in response to the test current; and in response thereto, detect at least one fault selected from the group consisting of: a fault within a capsule, a fault with the smoking device, and a fault with electrical contact between the electrodes and the capsule.

In some applications, the control component is further configured to:

drive a further test current through the electrodes;

measure a change in temperature of a portion of the capsule in response to the test current; and in response thereto, detect at least one fault selected from the group consisting of: a fault within a capsule, a fault with the smoking device, and a fault with electrical contact between the electrodes and the capsule.

In some applications, the control component is further configured to periodically drive a further test current through the electrodes, and detect whether a capsule is disposed within the smoking device based upon a response to the test current.

In some applications, the smoking device is configured for use with a capsule that contains a plant-based smoking material and the smoking device is configured vaporize one or more of the active agents from within the plant-based smoking material by heating the plant-based smoking material.

In some applications, the smoking device is configured for use with a capsule that contains a liquid material and the smoking device is configured to vaporize one or more of the active agents from within the liquid material by vaporizing the liquid material.

In some applications, the smoking device further includes at least one sensor configured to detect temperature of the smoking material within a capsule that is disposed within the smoking device.

In some applications, the sensor includes an infrared temperature sensor.

In some applications, the sensor includes a thermocouple sensor.

In some applications, the sensor includes a contact sensor that is configured to contact the smoking material.

In some applications, the control component is configured to control heating of the smoking material in response to the detected temperature of the smoking material.

In some applications, the control component is configured to control heating of the smoking material such as to maintain the smoking material within a predefined temperature range.

In some applications, the control component is further configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode.

In some applications, the control component is configured to preheat the smoking material to the temperature that is below the vaporization temperature of the one or more active agents automatically, in response to the capsule being inserted into the smoking device.

In some applications, the control component is configured to preheat the smoking material to the temperature that is below the vaporization temperature of the one or more active agents, in response to an input from the user.

In some applications, the control component is configured to detect an amount of current that must be applied to a capsule that is disposed within the smoking device in order to maintain the smoking material at a substantially constant temperature and to thereby detect that the user has puffed the smoking device.

In some applications, the control component is configured to determine a parameter of the puff.

In some applications, the control component is configured to determine a length of the puff.

In some applications, the control component is configured to determine a depth of the puff.

In some applications, the control component is configured to determine an amount of one or more of the active agents that has been vaporized from the capsule by monitoring a number of puffs and parameters of the puffs that have been taken from the capsule.

There is further provided, in accordance with some applications of the present invention, apparatus for use with a capsule that contains a smoking material containing one or more active agents, the smoking material being covered with a metallic foil, the apparatus including:

- a smoking device configured to receive the capsule, the smoking device including:
  - two or more electrodes that are configured to vaporize one or more of the active agents from within the smoking material by heating the smoking material, by driving a current into the metallic foil; and
  - a control component configured to:
    - drive a test current through the electrodes;
    - measure a change in temperature of a portion of the capsule in response to the test current; and
  - in response thereto, detect at least one fault selected from the group consisting of: a fault within a capsule, a fault with the smoking device, and a fault with electrical contact between the electrodes and the capsule.

In some applications, the control component is further configured to:

- drive a further test current through the electrodes;
- measure resistance between the electrodes in response to the test current; and
- in response thereto, detect at least one fault selected from the group consisting of: a fault within a capsule, a fault with the smoking device, and a fault with electrical contact between the electrodes and the capsule.

In some applications, the control component is further configured to periodically drive a further test current through the electrodes, and detect whether a capsule is disposed within the smoking device based upon a response to the test current.

In some applications, the smoking device is configured for use with a capsule that contains a plant-based smoking material and the smoking device is configured vaporize one or more of the active agents from within the plant-based smoking material by heating the plant-based smoking material.

In some applications, the smoking device is configured for use with a capsule that contains a liquid material and the smoking device is configured to vaporize one or more of the active agents from within the liquid material by vaporizing the liquid material.

In some applications, the smoking device further includes at least one sensor configured to detect a temperature of the smoking material within a capsule that is disposed within the smoking device, and the control component is configured to measure the change in temperature of the portion of the capsule using the temperature sensor.

In some applications, the sensor includes an infrared temperature sensor.

In some applications, the sensor includes a thermocouple sensor.

In some applications, the sensor includes a contact sensor that is configured to contact the smoking material.

In some applications, the control component is configured to control heating of the smoking material in response to the detected temperature of the smoking material.

In some applications, the control component is configured to control heating of the smoking material such as to maintain the smoking material within a predefined temperature range.

In some applications, the control component is further configured to:

- receive an indication from a user indicating whether they wish to smoke the active agents in a first mode or a second mode;
- in response to receiving an indication that the user wishes to smoke the active agents in the first mode, heat the smoking material to a vaporization temperature of the one or more active agents for a predefined period of time; and
- in response to receiving an indication that the user wishes to smoke the active agents in the second mode, only heat the smoking material to the vaporization temperature while receiving an active input from the user that they wish for the smoking material to be heated.

In some applications, the control component is configured to preheat the smoking material to a temperature that is below the vaporization temperature of the one or more active agents, prior to receiving the indication from the user indicating whether they wish to smoke the active agents in the first mode or the second mode.

In some applications, the control component is configured to preheat the smoking material to the temperature that is below the vaporization temperature of the one or more active agents automatically, in response to the capsule being inserted into the smoking device.

In some applications, the control component is configured to preheat the smoking material to the temperature that is below the vaporization temperature of the one or more active agents, in response to an input from the user.

In some applications, the control component is configured to detect an amount of current that must be applied to a capsule that is disposed within the smoking device in order to maintain the smoking material at a substantially constant temperature and to thereby detect that the user has puffed the smoking device.

In some applications, the control component is configured to determine a parameter of the puff.

In some applications, the control component is configured to determine a length of the puff.

In some applications, the control component is configured to determine a depth of the puff.

In some applications, the control component is configured to determine an amount of one or more of the active agents that has been vaporized from the capsule by monitoring a number of puffs and parameters of the puffs that have been taken from the capsule.

There is further provided, in accordance with some applications of the present invention, apparatus for use with a smoking device that includes a non-contact temperature sensor, the apparatus including:

an elongate capsule including:

a smoking material containing one or more active agents; and one or more heating elements disposed within the capsule, the one or more heating elements being configured to vaporize one or more of the active agents from within the smoking material, by the one or more heating elements being heated by the smoking device, and at least when the one or more heating elements are being heated by the smoking device, a portion of the capsule that is configured to be adjacent to the temperature sensor is configured to have a flattened cross-sectional shape such as to facilitate temperature sensing of the capsule by the non-contact temperature sensor.

In some applications, the elongate capsule is configured for use with a smoking device including an infrared temperature sensor.

In some applications, at the portion of the capsule that is configured to be adjacent to the temperature sensor the capsule includes a coating having an emissivity value of at least 0.5.

In some applications, at least when the one or more heating elements are being heated by the smoking device, the portion of the capsule is configured such as to define a flattened cross-sectional shape having a ratio of more than 2:1 between a long side of the cross-sectional shape and a short side of the cross-sectional shape.

In some applications, the elongate capsule is manufactured such that the portion of the capsule that is configured to be adjacent to the temperature sensor is configured to have a flattened cross-sectional shape.

In some applications, the one or more heating elements include one or more magnetically-heated materials that are susceptible to being heated by a magnetic field.

In some applications, the smoking material includes a plant-based smoking material and the one or more of the active agents are configured to be vaporized from within the plant-based smoking material by heating the plant-based smoking material.

In some applications, the smoking material includes a liquid material and the one or more of the active agents are configured to be vaporized from within the liquid material by the liquid material being vaporized.

In some applications, the flattened cross-sectional shape of the portion of the capsule is configured to drive the liquid material toward a region within the capsule at which the liquid material is vaporized.

In some applications, the elongate capsule is manufactured such as to define a cylindrical shape and the portion of the capsule is configured to be flattened by the smoking device, prior to the one or more heating elements being heated by the smoking device.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, at the portion of the capsule that is configured to be adjacent to the temperature sensor, the metallic foil is treated such as to have an emissivity value of at least 0.5.

In some applications, the one or more heating elements include a metallic foil that is configured to be heated via resistive heating.

In some applications, the metallic foil has a thickness of between 1 micron and 20 microns.

In some applications, the metallic foil has a thickness of between 3 microns and 10 microns.

In some applications, the elongate capsule has a length of between 15 mm and 150 mm.

In some applications, the elongate capsule has a length of between 50 mm and 90 mm.

There is further provided, in accordance with some applications of the present invention, apparatus for use with a capsule that contains a smoking material containing one or more active agents, the apparatus including:

a smoking device configured to vaporize one or more of the active agents from within the smoking material by heating the smoking material, the smoking device:

including at least one non-contact sensor configured to detect temperature of the smoking material within the capsule; and being configured to flatten a portion of the capsule that is configured to be adjacent to the non-contact sensor.

In some applications, the smoking device is configured to flatten the portion of the capsule that is configured to be adjacent to the non-contact sensor such that the portion of the capsule that is configured to be adjacent to the non-contact sensor defines a cross-sectional shape having a ratio of more than 2:1 between a long side of the cross-sectional shape and a short side of the cross-sectional shape.

In some applications, the smoking device includes mechanical elements that are configured to flatten the portion of the capsule that is configured to be adjacent to the non-contact sensor by applying mechanical pressure to the capsule.

In some applications, the non-contact sensor includes an infrared temperature sensor.

In some applications, the smoking device is configured for use with a capsule that contains a plant-based smoking material and the smoking device is configured vaporize one or more of the active agents from within the plant-based smoking material by heating the plant-based smoking material.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, the smoking device is configured for use with a capsule that contains a liquid material and the smoking device is configured to vaporize one or more of the active agents from within the liquid material by vaporizing the liquid material.

In some applications, the smoking device is configured to drive the liquid material toward a region within the capsule at which the liquid material is vaporized by flattening the portion of the capsule that is configured to be adjacent to the non-contact sensor.

In some applications, the smoking device includes a control component configured to determine a temperature of the smoking material based upon the temperature detected by the sensor.

In some applications, the control component is configured to control heating of the smoking material in response to the determined temperature of the smoking material.

In some applications, the control component is configured to control heating of the smoking material such as to maintain the smoking material within a predefined temperature range.

In some applications, the smoking device includes two or more electrodes that are configured to heat the smoking material by generating resistive heating within the capsule by driving a current through a portion of the capsule.

In some applications, the smoking device includes a mechanism configured to bring the electrodes into pressurized contact with the capsule, in order to enhance electrical contact between the electrodes and the capsule.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive a current toward a second one of the electrodes along a length of more than 5 mm in an axial direction along a length of the capsule.

In some applications, the first one of the electrodes is configured to drive the current toward the second one of the electrodes along a length of more than 15 mm in the axial direction along the length of the capsule.

In some applications, the smoking device is configured to receive a capsule that includes a metallic foil surrounding the smoking material, and the electrodes are configured to drive the current through the metallic foil.

In some applications, the smoking device is configured to receive a capsule that includes a metallic foil surrounding the smoking material and a paper covering that covers the metallic foil, and the electrodes are needle shaped and are configured to make electrical contact with the metallic foil by piercing through the paper covering.

In some applications, the smoking device includes a coil that is configured to heat the smoking material by generating a magnetic field such as to heat the capsule via magnetic induction.

In some applications, the coil is configured to be flattened while the portion of the capsule that is configured to be adjacent to the non-contact sensor is disposed within the coil.

In some applications, the coil is shaped to define a non-circular cross-sectional shape even before the portion of the capsule that is configured to be adjacent to the non-contact sensor is introduced to within the coil, and the smoking device is configured to flatten the portion of the capsule that is configured to be adjacent to the non-contact sensor prior to the portion of the capsule that is configured to be adjacent to the non-contact sensor being introduced to within the coil.

In some applications, the smoking device is configured to receive a cylindrically-shaped elongate capsule having a length of between 15 mm and 150 mm.

In some applications, the smoking device is configured to receive a cylindrically-shaped elongate capsule having a length of between 50 mm and 90 mm.

There is further provided, in accordance with some applications of the present invention, apparatus for use with a smoking device, the apparatus including:

a capsule including:

a smoking material containing one or more active agents;

one or more heating elements disposed within the capsule, the one or more heating elements being configured to vaporize one or more of the active agents from within the smoking material, by the one or more heating elements being heated by the smoking device; and a mouthpiece defining an opening therethrough, the mouthpiece including a first portion that is shaped cylindrically via which a user is configured to draw vaporized active agents from the capsule into a mouth of the user, and a second portion being shaped as a cone with a narrow end of the cone adjacent to the smoking material such as to prevent solid matter from passing from the capsule into the user's mouth.

In some applications, the mouthpiece includes paper that is shaped to define the first and second portions of the mouthpiece.

In some applications, the second portion of the mouthpiece is shaped such that a diameter of the opening through the mouthpiece at the narrow end of the cone is between 1 mm and 3 mm In some applications, the second portion of the mouthpiece is sized such as to provide a desired level of resistance to airflow through the mouthpiece.

In some applications, the one or more heating elements include one or more magnetically-heated materials that are susceptible to being heated by a magnetic field.

In some applications, the smoking material includes a plant-based smoking material and the one or more of the active agents are configured to be vaporized from within the plant-based smoking material by heating the plant-based smoking material.

In some applications, the smoking material includes a liquid material and the one or more of the active agents are configured to be vaporized from within the liquid material by the liquid material being vaporized.

In some applications, the one or more heating elements include one or more magnetically-heated materials that are susceptible to being heated by a magnetic field.

In some applications, the elongate capsule is manufactured such as to define a cylindrical shape and a portion of the capsule is configured to be flattened by the smoking device, prior to the one or more heating elements being heated by the smoking device.

In some applications, the one or more heating elements include one or more magnetically-heated materials that are susceptible to being heated by a magnetic field.

In some applications, the portion of the capsule is configured to be inserted into a coil that has a non-circular cross-sectional shape.

In some applications, the portion of the capsule is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, the one or more heating elements include a metallic foil that is configured to be heated via resistive heating.

In some applications, the metallic foil has a thickness of between 1 micron and 20 microns.

In some applications, the metallic foil has a thickness of between 3 microns and 10 microns.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a first capsule that contains a solid smoking material containing one or more active agents and for use with a second capsule that contains a liquid material containing one or more active agents, the apparatus including:

a smoking device configured:

when the first capsule is inserted into the smoking device, to vaporize one or more of the active agents contained within the solid smoking material by heating the first capsule; and when the second capsule is inserted into the smoking device, to vaporize at least some of the liquid vaping material by heating the second capsule.

In some applications, the smoking device includes a control component configured to detect whether the first or second capsule is currently disposed within the smoking device and to control heating of the capsule that is currently disposed within the smoking device responsively thereto.

In some applications, the smoking device includes a control component configured to:

receive an indication from a user indicating whether they wish to smoke the active agents in a first mode or a second mode;

in response to receiving an indication that the user wishes to smoke the active agents in the first mode, heat the smoking material to a vaporization temperature of the one or more active agents for a predefined period of time; and in response to receiving an indication that the user wishes to smoke the active agents in the second mode, only heat the smoking material to the vaporization temperature while receiving an active input from the user that they wish for the smoking material to be heated.

In some applications, when either the first or second capsule is disposed within the smoking device, the smoking device is configured to flatten at least a portion of the capsule.

In some applications, the smoking device is configured to flatten at least the portion of the capsule that is disposed within the smoking device such that the portion of the capsule defines a cross-sectional shape having a ratio of more than 2:1 between a long side of the cross-sectional shape and a short side of the cross-sectional shape.

In some applications, the smoking device includes mechanical elements that are configured to flatten at the portion of the capsule is disposed within the smoking device by applying mechanical pressure to the capsule.

In some applications, when the second capsule is disposed within the smoking device, the smoking device is configured to drive the liquid material toward a region within the capsule at which the liquid material is vaporized by flattening the portion of the capsule.

In some applications, the smoking device further includes a temperature sensor and a control component configured to determine a temperature of the solid smoking material within the first capsule or the liquid material within the second capsule based upon the temperature detected by the temperature sensor.

In some applications, the control component is configured to control heating of the solid smoking material within the first capsule or the liquid material within the second capsule in response to the determined temperature of the solid smoking material within the first capsule or the liquid material within the second capsule.

In some applications, the control component is configured to control heating of the solid smoking material within the first capsule or the liquid material within the second capsule such as to maintain the solid smoking material within the first capsule or the liquid material within the second capsule within a predefined temperature range.

In some applications, the smoking device includes two or more electrodes that are configured to heat the solid smoking material within the first capsule or the liquid material within the second capsule by generating resistive heating within the capsule by driving a current through a portion of the capsule.

In some applications, the smoking device includes a mechanism configured to bring the electrodes into pressurized contact with a capsule that is currently disposed within the smoking device, in order to enhance electrical contact between the electrodes and the capsule.

In some applications, each of the first and second capsules include a metallic foil surrounding the solid smoking material or the liquid material respectively, and the electrodes are configured to drive the current through the metallic foils of the first capsule and the second capsule.

In some applications, each of the first and second capsules are elongate capsules, during the heating of the solid smoking material within the first capsule or the liquid material within the second capsule, the smoking device is configured to house the first capsule or the second capsule such that airflow through the capsule is substantially along a length of the capsule, and a first one of the electrodes is configured to drive a current toward a second one of the electrodes along a length of more than 5 mm in an axial direction along a length of the capsule.

In some applications, the first one of the electrodes is configured to drive the current toward the second one of the electrodes along a length of more than 15 mm in the axial direction along the length of the capsule.

In some applications, the smoking device includes a coil that is configured to heat the solid smoking material within the first capsule or the liquid material within the second capsule by generating a magnetic field such as to heat the capsule via magnetic induction.

In some applications, the coil is configured to be flattened while at least part of the portion of the capsule that contains the smoking material is disposed within the coil.

In some applications, the coil is shaped to define a non-circular cross-sectional shape, and the smoking device is configured to flatten a part at least a portion of each of the first and second capsules prior to the portions of the first and second capsules introduced to within the coil.

In some applications, the smoking device is configured to receive first and second capsules that are cylindrically-shaped elongate capsules having lengths of between 15 mm and 150 mm.

In some applications, the smoking device is configured to receive cylindrically-shaped elongate capsules having lengths of between 50 mm and 90 mm.

There is further provided, in accordance with some applications of the present invention, apparatus for use with a smoking device that includes at least first and second electrodes, the apparatus including:

- a capsule defining an airway therethrough, the capsule including:
  - a first axial portion including a reservoir containing a liquid material containing one or more active agents;
  - a second axial portion including:
    - a layer of absorbent material configured such that liquid material flows along the layer from the reservoir via capillary forces; and
    - metallic foil surrounding the layer of absorbent material, the metallic foil being configured to be heated via resistive heating by the first electrode driving a current to the second electrode through the metallic foil, such as to vaporize liquid material within the layer of absorbent material.

In some applications, the layer of absorbent material has a non-uniform thickness, with the thickness of the layer of absorbent material varying along a length of the second axial portion of the capsule.

In some applications, the layer of absorbent material defines holes therethrough to facilitate airflow from through the layer of absorbent material into the airway.

In some applications, the metallic foil contacts the layer of absorbent material only at selected regions, and only the selected regions of the layer of absorbent material are configured by be heated by the metallic foil.

In some applications, the layer of absorbent material is shaped to define one or more airflow passages along a perimeter of the layer of absorbent material.

In some applications, the reservoir includes a reservoir of absorbent material that has absorbed the liquid material.

In some applications, the reservoir includes a solid housing containing the liquid material in an unabsorbed form.

In some applications, the capsule further includes a third axial portion including a mouthpiece configured such that a user can draw the vaporized liquid material from the capsule via the mouthpiece, the second axial portion is disposed between the first axial portion and the second axial portion.

In some applications, the first axial portion is shaped to define a mouthpiece configured such that a user can draw the vaporized liquid material from the capsule via the mouthpiece, the second axial portion is disposed between the first axial portion and the second axial portion.

In some applications, the metallic foil is configured to be heated via resistive heating by the first electrode driving a current to the second electrode along a length of more than 5 mm in an axial direction along the metallic foil.

In some applications, the capsule is configured such that airflow through the capsule is substantially in an axial direction along a length of the capsule.

In some applications, the metallic foil is configured to be heated via resistive heating by the first electrode driving a current to the second electrode along a length of more than 15 mm in the axial direction along the metallic foil.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contact the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the capsule is shaped to define a cross-sectional shape having a ratio of more than 2:1 between a long side of the cross-sectional shape and a short side of the cross-sectional shape.

In some applications, at least a portion of the capsule is configured to be flattened by the smoking device prior to the metallic foil being heated by the smoking device.

In some applications, the layer of absorbent material is configured such that the flattening of the portion of the capsule increases capillary flow of the liquid material through the layer of absorbent material.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the metallic foil has a thickness of between 1 micron and 20 microns.

In some applications, the metallic foil has a thickness of between 3 microns and 10 microns.

In some applications, the layer of absorbent material has a thickness of between 0.1 mm and 3 mm.

In some applications, the layer of absorbent material has a thickness of between 0.2 mm and 1 mm.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device, the apparatus including:

- a capsule defining an airway therethrough, the capsule including:
  - a first axial portion including a reservoir containing a liquid material containing one or more active agents;
  - a second axial portion including a layer of absorbent material configured such that liquid material flows along the layer from the reservoir via capillary forces, and:
    - the layer of absorbent material is configured by be heated by the smoking device, such as to vaporize liquid material within the layer of absorbent material; and
    - the layer of absorbent material defines holes therethrough to facilitate airflow from through the layer of into the airway.

In some applications, the layer of absorbent material has a non-uniform thickness, with the thickness of the layer of absorbent material varying along a length of the second axial portion of the capsule.

In some applications, only selected regions of the layer of absorbent material are configured by be heated by the smoking device, such as to vaporize liquid material within the layer of absorbent material.

In some applications, the layer of absorbent material is shaped to define one or more airflow passages along a perimeter of the layer of absorbent material.

In some applications, the reservoir includes a reservoir of absorbent material that has absorbed the liquid material.

In some applications, the reservoir includes a solid housing containing the liquid material in an unabsorbed form.

In some applications, the capsule further includes a third axial portion including a mouthpiece configured such that a user can draw the vaporized liquid material from the capsule via the mouthpiece, the second axial portion is disposed between the first axial portion and the second axial portion.

In some applications, the first axial portion is shaped to define a mouthpiece configured such that a user can draw the vaporized liquid material from the capsule via the mouthpiece, the second axial portion is disposed between the first axial portion and the second axial portion.

In some applications, the capsule is configured such that airflow through the capsule is substantially in an axial direction along a length of the capsule.

In some applications, the capsule is shaped to define a cross-sectional shape having a ratio of more than 2:1 between a long side of the cross-sectional shape and a short side of the cross-sectional shape.

In some applications, the smoking device includes first and second electrodes, the capsule includes a metallic foil surrounding the layer of absorbent material, and the metallic foil is configured to be heated via resistive heating by the first electrode driving a current to the second electrode through the metallic foil, such as to vaporize liquid material within the layer of absorbent material.

In some applications, the metallic foil is configured to be heated via resistive heating by the first electrode driving a current to the second electrode along a length of more than 5 mm in an axial direction along the metallic foil.

In some applications, the metallic foil is configured to be heated via resistive heating by the first electrode driving a current to the second electrode along a length of more than 15 mm in the axial direction along the metallic foil.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contact the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the metallic foil has a thickness of between 1 micron and 20 microns.

In some applications, the metallic foil has a thickness of between 3 microns and 10 microns.

In some applications, at least a portion of the capsule is configured to be flattened by the smoking device prior to the layer of absorbent material being heated by the smoking device.

In some applications, the layer of absorbent material is configured such that the flattening of the portion of the capsule increases capillary flow of the liquid material through the layer of absorbent material.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the layer of absorbent material has a thickness of between 0.1 mm and 3 mm.

In some applications, the layer of absorbent material has a thickness of between 0.2 mm and 1 mm.

In some applications, the layer of absorbent material defines holes therethrough with the holes having diameters of between 0.7 mm and 3 mm.

In some applications, the layer of absorbent material defines holes therethrough with the holes having diameters of between 1 mm and 2 mm.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device that includes at least first and second electrodes, the apparatus including:

a capsule defining an airway therethrough, the capsule including:

a reservoir including a liquid material containing one or more active agents, the liquid material being absorbed within an absorbent material; and metallic foil surrounding the reservoir, the metallic foil being configured to be heated via resistive heating by the first electrode driving a current to the second electrode through the metallic foil, such as to vaporize liquid material within the absorbent material within the reservoir, and only selected regions of the absorbent material within the reservoir are configured by be heated by the smoking device, such as to vaporize liquid material within the absorbent material within the reservoir.

In some applications, the absorbent material within the reservoir has a non-uniform thickness, with the thickness of the layer of absorbent material varying along a length of the reservoir.

In some applications, the absorbent material within the reservoir defines holes therethrough to facilitate airflow from through the layer of absorbent material into the airway.

In some applications, the absorbent material within the reservoir is shaped to define one or more airflow passages along a perimeter of the absorbent material within the reservoir.

In some applications, the capsule is configured such that airflow through the capsule is substantially in an axial direction along a length of the capsule.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contacts the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the metallic foil is configured to be heated via resistive heating by the first electrode driving a current to the second electrode along a length of more than 5 mm in an axial direction along the metallic foil.

In some applications, wherein the metallic foil is configured to be heated via resistive heating by the first electrode driving a current to the second electrode along a length of more than 15 mm in the axial direction along the metallic foil.

In some applications, wherein at least a portion of the capsule is configured to be flattened by the smoking device prior to the layer of absorbent material being heated by the smoking device.

In some applications, wherein absorbent material within the reservoir is configured such that the flattening of the portion of the capsule increases capillary flow of the liquid material through the absorbent material within the reservoir.

In some applications, wherein the capsule has a circular cross-sectional shape and is configured to be flattened to define a non-circular cross-sectional shape.

In some applications, wherein the capsule is configured to be flattened such as to define a cross-sectional shape having a ratio of more than 2:1 between a long side of the cross-sectional shape and a short side of the cross-sectional shape.

In some applications, wherein the metallic foil has a thickness of between 1 micron and 20 microns.

In some applications, wherein the metallic foil has a thickness of between 3 microns and 10 microns.

In some applications, wherein the absorbent material within the reservoir has a thickness of between 0.1 mm and 3 mm.

In some applications, wherein the absorbent material within the reservoir has a thickness of between 0.2 mm and 1 mm.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device that includes at least first and second electrodes, the apparatus including:

a capsule defining an airway therethrough, the capsule including:

a reservoir including a liquid material containing one or more active agents, the liquid material being absorbed within an absorbent material; and metallic foil surrounding the reservoir, the metallic foil being configured to be heated via resistive heating by the first electrode driving a current to the second electrode through the metallic foil, such as to vaporize liquid material within the absorbent material within the reservoir, the absorbent material within the reservoir being shaped to define one or more airflow channels along a perimeter of the layer of absorbent material.

In some applications, the absorbent material within the reservoir has a non-uniform thickness, with the thickness of the absorbent material within the reservoir varying along a length of the reservoir.

In some applications, the absorbent material within the reservoir defines holes therethrough to facilitate airflow through the reservoir into the airway.

In some applications, only selected regions of the absorbent material within the reservoir are configured by be heated by the metallic foil, such as to vaporize liquid material within the absorbent material within the reservoir.

In some applications, the capsule is configured such that airflow through the capsule is substantially in an axial direction along a length of the capsule.

In some applications, the capsule is shaped to define a cross-sectional shape having a ratio of more than 2:1 between a long side of the cross-sectional shape and a short side of the cross-sectional shape.

In some applications, the capsule further includes a paper covering that covers the metallic foil, the paper covering defining openings via which the electrodes are configured to make electrical contact with the metallic foil.

In some applications, the metallic foil includes a plurality of regions, each of the regions having a respective, different electrical resistance profile, such that upon a given current being driven through the metallic foil each of the regions heats to a respective, different temperature.

In some applications, the capsule further includes an electrical-contact coating that coats the metallic foil at locations at which the electrodes are configured to contact the capsule.

In some applications, the metallic foil has a first configuration at locations at which the electrodes are configured to contact the metallic foil, and a second configuration along a region in which the metallic foil contacts the layer of absorbent material that is between the locations at which the electrodes are configured to contact the metallic foil.

In some applications, the capsule further includes an inner lining that lines an inside of the metallic foil, the inner lining being configured to diffuse heat that is generated by the metallic foil.

In some applications, the smoking device includes one or more batteries, and an overall resistance to the current that is provided by the capsule is configured to substantially match an internal resistance of the one or more batteries of the smoking device.

In some applications, the metallic foil is configured to be heated via resistive heating by the first electrode driving a current to the second electrode along a length of more than 5 mm in an axial direction along the metallic foil.

In some applications, the metallic foil is configured to be heated via resistive heating by the first electrode driving a current to the second electrode along a length of more than 15 mm in the axial direction along the metallic foil.

In some applications, at least a portion of the capsule is configured to be flattened by the smoking device prior to absorbent material within the reservoir being heated by the smoking device.

In some applications, the absorbent material within the reservoir is configured such that the flattening of the portion of the capsule increases capillary flow of the liquid material through the absorbent material within the reservoir.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the metallic foil has a thickness of between 1 micron and 20 microns.

In some applications, the metallic foil has a thickness of between 3 microns and 10 microns.

In some applications, the absorbent material within the reservoir has a thickness of between 0.1 mm and 3 mm.

In some applications, the absorbent material within the reservoir has a thickness of between 0.2 mm and 1 mm.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device includes first and second electrodes, the apparatus including:

a capsule including:

a reservoir containing a liquid material containing one or more active agents;

an internal heating element disposed within the capsule the heating element being configured to be heated by the smoking device and to thereby vaporize the liquid material, the internal heating element including an electrically-resistive element that is configured to be heated via resistive heating by the first electrode driving a current to the second electrode through the electrically-resistive element; and a capillary-force-delivery element extending from the reservoir to the internal heating element configured to transport the liquid material from the reservoir to the internal heating element via capillary forces.

In some applications, the capsule includes a reusable housing, and a disposable component including the reservoir and at least a portion of the capillary-force-delivery element.

In some applications, the capillary-force-delivery element includes an absorbent material.

In some applications, the capillary-force-delivery element includes a capillary tube.

In some applications, the capsule define an airway therethrough and the capsule is configured such that the vaporized liquid material enters the airway.

In some applications, the capsule further includes a mouthpiece, the capsule defines an opening that is disposed adjacent to the internal heating element, and the capsule defines an airway extending from the opening to the mouthpiece configured such that the vaporized liquid material enters the airway.

In some applications, the reservoir includes a reservoir of absorbent material that has absorbed the liquid material.

In some applications, the reservoir includes a solid housing containing the liquid material in an unabsorbed form.

In some applications, the capsule further includes a mouthpiece configured such that a user can draw the vaporized liquid material from the capsule via the mouthpiece, and the reservoir is disposed within the mouthpiece.

In some applications, the capsule is configured such that airflow through the capsule is substantially in an axial direction along a length of the capsule.

In some applications, the capsule is shaped to define a cross-sectional shape having a ratio of more than 2:1 between a long side of the cross-sectional shape and a short side of the cross-sectional shape.

In some applications, the electrically-resistive element includes a coil.

In some applications, the electrically-resistive element includes a metallic element.

In some applications, the capsule includes a conductive housing and a metallic foil that are electrically insulated from each other and which are electrically coupled to respective ends of the resistive element, and the capsule is configured such that, when the capsule is disposed within the smoking device, one of the first and second electrodes is electrically coupled to the conductive housing and the other one of the first and second electrodes is coupled to the metallic foil.

In some applications, the metallic foil has a thickness of between 1 micron and 20 microns.

In some applications, the metallic foil has a thickness of between 3 microns and 10 microns.

In some applications, the capsule includes first and second metallic foils that are electrically insulated from each other and which are electrically coupled to respective ends of the electrically-resistive element, and the capsule is configured such that, when the capsule is disposed within the smoking device, one of the first and second electrodes is electrically coupled to the first metallic foil and the other one of the first and second electrodes is coupled to the second metallic foil.

In some applications, each of the first and second metallic foils has a thickness of between 1 micron and 20 microns.

In some applications, each of the first and second metallic foils has a thickness of between 3 microns and 10 microns.

In some applications, at least a portion of the capsule is configured to be flattened by the smoking device prior to the heating element being heated by the smoking device.

In some applications, the capsule has a circular cross-sectional shape and is configured to be flattened to define a non-circular cross-sectional shape.

In some applications, the capsule is configured to be flattened such as to define a cross-sectional shape having a ratio of more than 2:1 between a long side of the cross-sectional shape and a short side of the cross-sectional shape.

In some applications, the capsule includes an elongate capsule having a length of between 15 mm and 150 mm.

In some applications, the elongate capsule has a length of between 50 mm and 90 mm.

There is further provided, in accordance with some applications of the present invention, apparatus for use with a smoking device, a capsule housing, and an internal heating element, the apparatus including:

- a disposable capsule portion configured to be inserted into the capsule housing to thereby form a capsule, the disposable capsule portion including:
  - a reservoir containing a liquid material containing one or more active agents; and
  - a capillary-force-delivery element extending from the reservoir, the capillary-force-delivery element being configured such that, upon the disposable capsule portion being inserted into the capsule housing, the capillary-force-delivery element extends to the internal heating element and transports the liquid material from the reservoir to the internal heating element via capillary forces.

In some applications, the disposable capsule portion is configured for use with an internal heating element disposed within the capsule housing.

In some applications, the disposable capsule portion is configured for use with a capsule housing that is built into the smoking device.

In some applications, the disposable capsule portion is configured for use with a capsule housing that is not built into the smoking device.

In some applications, the capillary-force-delivery element includes an absorbent material.

In some applications, the capillary-force-delivery element includes a capillary tube.

In some applications, the reservoir includes a reservoir of absorbent material that has absorbed the liquid material.

In some applications, the reservoir includes a solid housing containing the liquid material in an unabsorbed form.

In some applications, the disposable capsule portion is configured, upon being inserted into the capsule housing, to thereby form a capsule configured such that airflow through the capsule is substantially in an axial direction along a length of the capsule.

In some applications, the disposable capsule portion is configured, upon being inserted into the capsule housing, to thereby form a capsule defining a cross-sectional shape having a ratio of more than 2:1 between a long side of the cross-sectional shape and a short side of the cross-sectional shape.

In some applications, the disposable capsule portion is configured for use with an internal heating element that includes one or more magnetically-heated materials that are susceptible to being heated by a magnetic field.

In some applications, the smoking device includes first and second electrodes, and the disposable capsule portion is configured for use with an internal heating element that includes an electrically-resistive element that is configured to be heated via resistive heating by the first electrode driving a current to the second electrode through the electrically-resistive element.

In some applications, the disposable capsule portion is configured, upon being inserted into the capsule housing, to thereby form a capsule at least a portion of which is configured to be flattened by the smoking device prior to the heating element being heated by the smoking device.

In some applications, the disposable capsule portion is configured, upon being inserted into the capsule housing, to thereby form an elongate capsule having a length of between 15 mm and 150 mm.

In some applications, the disposable capsule portion is configured, upon being inserted into the capsule housing, to thereby form an elongate capsule having a length of between 50 mm and 90 mm.

In some applications, the apparatus further includes the internal heating element, the internal heating element is disposed within the disposable capsule portion.

In some applications, the internal heating element includes one or more magnetically-heated materials that are susceptible to being heated by a magnetic field.

In some applications, the internal heating element includes an electrically-resistive element that is configured to be heated via resistive heating by the first electrode driving a current to the second electrode through the electrically-resistive element.

In some applications, the electrically-resistive element includes a coil.

In some applications, the electrically-resistive element includes a metallic element.

In some applications, the disposable capsule portion is configured for use with a conductive housing and a metallic foil that are electrically insulated from each other and which are electrically coupled to respective ends of the resistive element, and the capsule formed by inserting the disposable capsule portion into the capsule housing is configured such that, when the capsule is disposed within the smoking device, one of the first and second electrodes is electrically coupled to the conductive housing and the other one of the first and second electrodes is coupled to the metallic foil.

In some applications, the disposable capsule portion is configured for use with a capsule housing that includes first and second metallic foils that are electrically insulated from each other and which are electrically coupled to respective ends of the electrically-resistive element, and the capsule formed by inserting the disposable capsule portion into the capsule housing is configured such that, when the capsule is disposed within the smoking device, one of the first and second electrodes is electrically coupled to the first metallic foil and the other one of the first and second electrodes is coupled to the second metallic foil.

There is further provided, in accordance with some applications of the present invention, apparatus for use with a smoking device that includes first and second electrodes, an internal heating element, and a disposable capsule portion that includes a reservoir containing a liquid material containing one or more active agents and a capillary-force-delivery element extending from the reservoir, the apparatus including:

a capsule housing, the capsule housing being configured to receive the disposable capsule portion such as to form a capsule in which the capillary-force-delivery element extends to the internal heating element, such as to transport the liquid material from the reservoir to the internal heating element via capillary forces, the capsule housing including a first conductive portion and a second conductive portion that are electrically coupled to each other via the internal heating element, and the capsule housing being configured such that when the capsule formed by the capsule housing receiving the disposable capsule portion is disposed within the smoking device, the first and second electrodes heat the internal heating element via resistive heating to thereby vaporize the liquid material, by driving a current between the first and second conductive portions.

In some applications, the capsule housing is configured for use with a disposable capsule portion that contains the internal heating element.

In some applications, the capsule housing is built into the smoking device.

In some applications, the capsule housing is not built into the smoking device.

In some applications, the capsule housing is configured to receive the disposable capsule portion such as to form a capsule that defines an airway therethrough and the capsule is configured such that the vaporized liquid material enters the airway.

In some applications, the capsule housing further includes a mouthpiece, the capsule housing defines an opening that is disposed adjacent to the internal heating element, and the capsule housing is configured to receive the disposable capsule portion such as to form a capsule that defines an airway extending from the opening to the mouthpiece configured such that the vaporized liquid material enters the airway.

In some applications, the capsule housing is configured to receive the disposable capsule portion such as to form a capsule configured such that airflow through the capsule is substantially in an axial direction along a length of the capsule.

In some applications, the capsule housing is configured to receive the disposable capsule portion such as to form a capsule shaped to define a cross-sectional shape having a ratio of more than 2:1 between a long side of the cross-sectional shape and a short side of the cross-sectional shape.

In some applications, the capsule housing is configured to receive the disposable capsule portion such as to form a capsule at least a portion which is configured to be flattened by the smoking device prior to the internal heating element being heated by the smoking device.

In some applications, the internal heating element includes an electrically-resistive coil.

In some applications, the internal heating element includes a metallic element.

In some applications, the apparatus further includes the internal heating element, and the internal heating element is disposed within the capsule housing.

In some applications, the heating element includes one or more magnetically-heated materials that are susceptible to being heated by a magnetic field.

In some applications, the first and second conductive portions include a conductive housing of the capsule housing and a metallic foil that are electrically insulated from each other and which are electrically coupled to respective ends of the internal heating element.

In some applications, the metallic foil has a thickness of between 1 micron and 20 microns.

In some applications, the metallic foil has a thickness of between 3 microns and 10 microns.

In some applications, the first and second conductive portions include first and second metallic foils that are electrically insulated from each other and which are electrically coupled to respective ends of the internal heating element.

In some applications, each of the first and second metallic foils has a thickness of between 1 micron and 20 microns.

In some applications, each of the first and second metallic foils has a thickness of between 3 microns and 10 microns.

In some applications, the capsule housing is configured to receive the disposable capsule portion such as to form an elongate capsule having a length of between 15 mm and 150 mm.

In some applications, the capsule housing is configured to receive the disposable capsule portion such as to form an elongate capsule has a length of between 50 mm and 90 mm.

There is further provided, in accordance with some applications of the present invention, apparatus for use with a smoking device, the apparatus including:

a capsule including:

an absorbent material having a liquid material containing one or more active agents absorbed therein; and one or more heating elements disposed within the capsule, the one or more heating elements being configured to vaporize one or more of the active agents from within the smoking material, by the one or more heating elements being heated by the smoking device, and at least when the one or more heating elements are being heated by the smoking device, a portion of the capsule containing the absorbent material is configured to be flattened by the smoking device to thereby increase flow of the liquid material through the absorbent material and toward the one or more heating elements, relative to if the portion of the capsule is not flattened.

In some applications, the capsule further includes a reservoir configured to house the liquid material, and the absorbent material includes absorbent material extending from the reservoir to the one or more heating elements.

In some applications, the absorbent material includes a reservoir of absorbent material in which the liquid material is absorbed.

In some applications, at least when the one or more heating elements are being heated by the smoking device, the portion of the capsule containing the absorbent material is configured such as to define a flattened cross-sectional shape having a ratio of more than 2:1 between a long side of the cross-sectional shape and a short side of the cross-sectional shape.

In some applications, the one or more heating elements include one or more magnetically-heated materials that are susceptible to being heated by a magnetic field.

In some applications, the elongate capsule is manufactured such as to define a cylindrical shape and the portion of the capsule containing the absorbent material is configured to be flattened by the smoking device, prior to the one or more heating elements being heated by the smoking device.

In some applications, the one or more heating elements include one or more magnetically-heated materials that are susceptible to being heated by a magnetic field.

In some applications, the portion of the capsule containing the absorbent material is configured to be inserted into a coil that has a non-circular cross-sectional shape.

In some applications, the portion of the capsule containing the absorbent material is configured to be flattened while the portion of the capsule is disposed within a coil.

In some applications, the one or more heating elements include a metallic foil that is configured to be heated via resistive heating.

In some applications, the smoking device includes two or more electrodes that are configured to drive an electrical current through the metallic foil, and the capsule is configured to be flattened by the two or more electrodes.

In some applications, the metallic foil has a thickness of between 1 micron and 20 microns.

In some applications, the metallic foil has a thickness of between 3 microns and 10 microns.

In some applications, the elongate capsule has a length of between 15 mm and 150 mm.

In some applications, the elongate capsule has a length of between 50 mm and 90 mm.

There is further provided, in accordance with some applications of the present invention, apparatus for use with a capsule that contains one or more heating elements, and an absorbent material having a liquid material containing one or more active agents absorbed therein, the apparatus including:

- a smoking device including:
  - a capsule housing configured to receive the capsule;
  - two or more electrodes configured to vaporize the liquid material within the capsule by heating one or more heating elements within the capsule via resistive heating,
  - and prior to the two or more electrodes heating the one or more heating elements within the capsule, the smoking device is configured to flatten a portion of the capsule containing the absorbent material to thereby increase flow of the liquid material through the absorbent material and toward the one or more heating elements.

In some applications, the smoking device includes mechanical elements that are configured to flatten the portion of the capsule that is configured to be adjacent to the non-contact sensor by applying mechanical pressure to the capsule.

In some applications, the smoking device includes a control component configured to:

- receive an indication from a user indicating whether they wish to smoke the active agents in a first mode or a second mode;
- in response to receiving an indication that the user wishes to smoke the active agents in the first mode, heat the smoking material to a vaporization temperature of the one or more active agents for a predefined period of time; and
- in response to receiving an indication that the user wishes to smoke the active agents in the second mode, only heat the smoking material to the vaporization temperature while receiving an active input from the user that they wish for the smoking material to be heated.

In some applications, the smoking device includes a mechanism configured to bring the electrodes into pressurized contact with the capsule, in order to enhance electrical contact between the electrodes and the capsule.

In some applications, the smoking device includes a temperature sensor and a control component configured to determine a temperature of the liquid material based upon the temperature detected by the sensor.

In some applications, the control component is configured to control heating of the smoking material in response to the determined temperature of the liquid material.

In some applications, the control component is configured to control heating of the smoking material such as to maintain the liquid material within a predefined temperature range.

In some applications, the smoking device is configured to receive an elongate capsule, during the heating of the smoking material, the smoking device is configured to house the capsule such that airflow through the capsule is substantially along a length of the elongate capsule, and a first one of the electrodes is configured to drive a current toward a second one of the electrodes along a length of more than 5 mm in an axial direction along a length of the capsule.

In some applications, the first one of the electrodes is configured to drive the current toward the second one of the electrodes along a length of more than 15 mm in the axial direction along the length of the capsule.

In some applications, the smoking device is configured to receive a capsule that includes, as its heating element, a metallic foil surrounding the smoking material, and the electrodes are configured to drive the current through the metallic foil.

In some applications, the smoking device is configured to receive a capsule that includes a metallic foil surrounding the smoking material and a paper covering that covers the metallic foil, and the electrodes are needle shaped and are configured to make electrical contact with the metallic foil by piercing through the paper covering.

In some applications, the smoking device is configured to receive a cylindrically-shaped elongate capsule having a length of between 15 mm and 150 mm.

In some applications, the smoking device is configured to receive a cylindrically-shaped elongate capsule having a length of between 50 mm and 90 mm.

The present invention will be more fully understood from the following detailed description of applications thereof, taken together with the drawings, in which:

DETAILED DESCRIPTION OF EMBODIMENTS

Figure 1A:
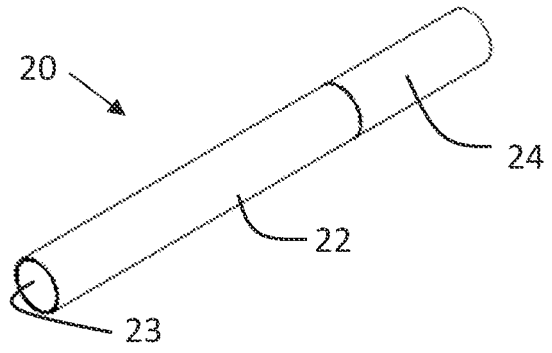
FIGS. 1A, 1B, 1C, and 1D are schematic illustrations of a capsule (FIGS. 1A-B), a smoking device (FIG. 1C), and the capsule inserted in the smoking device (FIG. 1D), in accordance with some applications of the present invention.
Figure 1B:
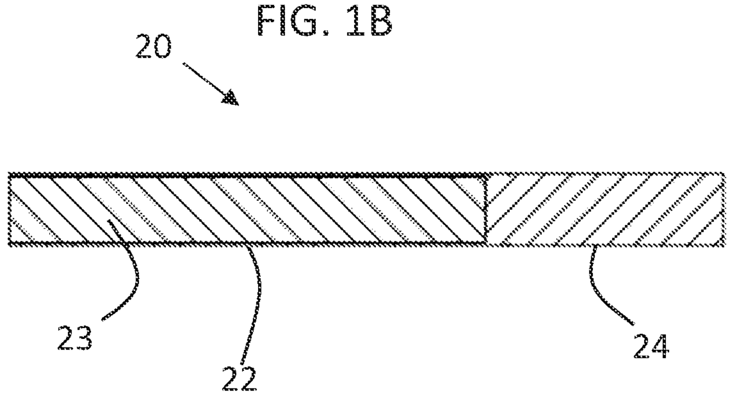
Figure 1C:
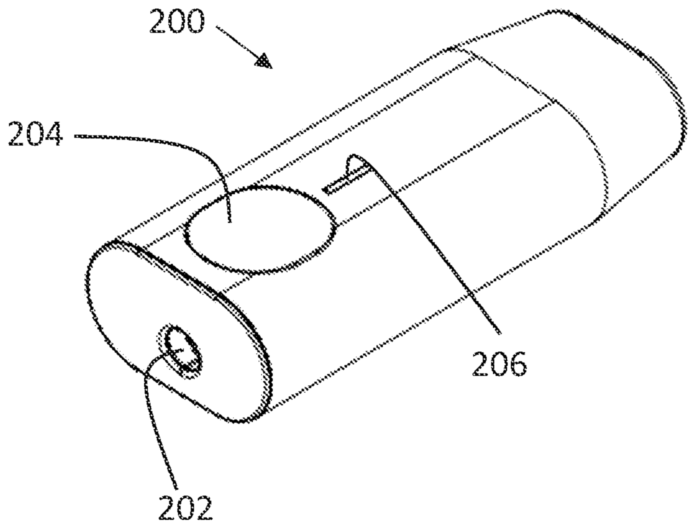
Figure 1D:
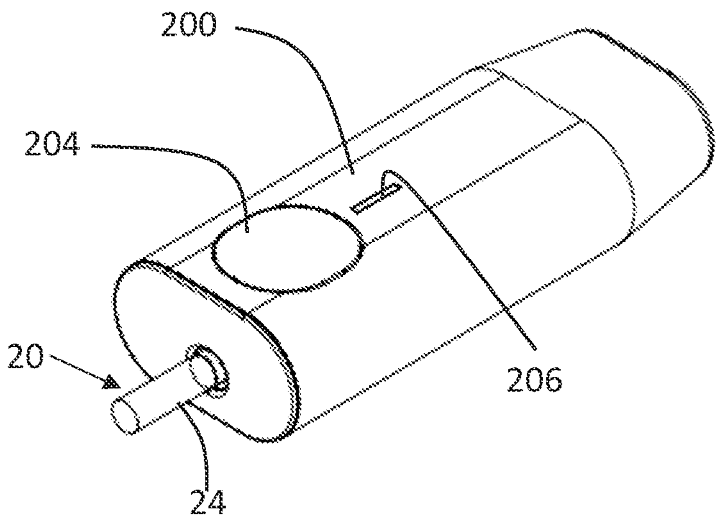

Reference is now made to FIGS. 1A, 1B, 1C, and 1D, which are schematic illustrations of a capsule 20 (FIGS. 1A-B), a smoking device 200 (FIG. 1C), and the capsule inserted in the smoking device (FIG. 1D), in accordance with some applications of the present invention. (It is noted that the term "smoking device" is used herein to describe device 200, since this terminology is used in the art. However, device 200 may also be referred to as a "vaping device." For some applications, the smoking device is configured to be used with both capsule 20 (which typically contains a solid matter smoking material, such as a plant material, that contains active agents) and with a capsule 150 (which typically contains a liquid material that contains active agents and that is configured to be vaporized), capsule 150 being as described hereinbelow with reference to FIGS. 35A-50B, for example. Typically, at any given time, the smoking device is used with either capsule 20 or with capsule 150. For some applications, the smoking device uses similar techniques to heat the plant material within capsule 20 (such as to release active agents from the plant material) and to heat the liquid material within capsule 150 (such as to vaporize the liquid material), as is described in further detail hereinbelow.

Typically, capsule 20 is a disposable capsule that is configured to be used during a single smoking session, whereas the smoking device is configured to be reusable. Capsule 20 typically has the general structure (e.g., shape and/or size) of a traditional cigarette. Many users and manufacturers of such capsule and smoking devices have a preference for single-use capsules having the general structure of a traditional cigarette, due to (a) habitual preferences of the users, (b) habitual preferences of the manufacturers, (c) production lines of the manufacturers being best-equipped to manufacture such capsules relative to capsules that differ from traditional cigarettes, (d) single-use capsules being more hygienic than capsules that are designed for repeated use, and/or (e) additional reasons.

Typically, capsule 20 includes a first portion 22 that contains a smoking material 23 (that contains active agents) and a heating element (as described in further detail hereinbelow). Smoking material 23 is typically a plant material, such as tobacco and/or a cannabinoid-containing plant material (such as marijuana). For some applications, the smoking material is a non-plant material that contains active agents. (It is noted that, in some of the figures (e.g., FIGS. 6A-7D, 9A-B, and 10B-14), the smoking material is not shaded, for illustrative purposes. However, all of the figures showing a capsule should be interpreted to be showing a capsule that contains smoking material.) The capsule is typically inserted into a slot 202 within smoking device 200. Smoking device 200 is configured to heat the smoking material, such as to generate vapors containing active agents within the smoking material in a heat-not-burn manner. The user typically sucks the generated vapors out of a second portion 24 of the capsule that functions as a mouthpiece.

As described hereinabove in the Background, heat-not-burn smoking devices (also known as "smokeless" devices) are devices that heat a smoking material without burning (i.e., pyrolyzing) the smoking material. The user sucks in vaporized active agents that are generated. An important element in heat-not-burn smoking devices is that time that it takes to heat the smoking material and the uniformity of the heating. The time that it takes to heat up the smoking material is defined by the following equation:

$$t = Q * d/(K * A * \Delta T) \qquad \text{[Equation 1]}$$

where t is the time taken to heat the smoking material,

Q is the quantity of heat transferred to the smoking material, d is the distance from the location at which the heat is generated to the smoking material that is being heated, K is the constant that defines the heat conduction of the smoking material (which is relatively low for smoking materials as they are relatively non-conductive), and any other material between the heating element and the smoking material, A is the area of contact between the heating element and the smoking material, and T is temperature change that is applied at the heating element.

There are several challenges to heating up smoking material in a heat-not-burn process, including the following:

low heat conduction of the smoking material (i.e., a low value of K in Equation 1);

a limited temperature to which the heating element can be heated in order to avoid pyrolysis (i.e., burning) of the smoking material (i.e., a low value of ΔT in Equation 1);

many designs of heating-elements-capsule combinations providing a relatively small area of contact between the heating elements and the smoking material (i.e., a low value of A in Equation 1), particularly if the capsule is designed to have the general shape of a traditional cigarette;

in order to provide the appearance and feel of a traditional cigarette, there may be a heat-insulating material (e.g., paper) between the heating element and the smoking material (thereby further decreasing K in Equation 1), for example, if heating is applied by a heating element that is disposed within the smoking device outside the capsule;

the distance from the heating element to the smoking material that is located toward the radial center of the capsule is relatively large (i.e., a high value of d in Equation 1).

In accordance with some applications of the present invention, apparatus and methods are provided that (a) provide a relatively large area of contact between the heating element and the smoking material (i.e., A in Equation 1), and (b) provide a relatively small distance between the heating element and the smoking material even at the radial center of the capsule (i.e., d in Equation 1), while (c) providing the user with a capsule having the same general structure as a traditional cigarette.

Typically, the heating element is built-in to the capsule, such that it is in direct contact with smoking material 23. For some applications, at least some of the heating element is embedded within the smoking material, as described in further detail hereinbelow. For some applications, the heating element comprises a metal material (such as metallic foil, e.g., stainless steel foil, nickel-titanium foil, titanium foil, copper foil, aluminum foil, steel foil), which is typically disposed within the capsule and/or is typically in direct contact with the smoking material, and that is heated via electrical resistive heating, as described in further detail hereinbelow. Alternatively or additionally, the heating element comprises one or more magnetically-heated materials that are susceptible to being heated by a magnetic field (such as, magnetic materials and/or ferromagnetic materials), which are typically disposed within the capsule and/or are typically in direct contact with smoking material and that are heated via magnetic induction, as described in further detail hereinbelow.

Typically, the capsule is an elongate capsule. For some applications, the elongate capsule has a length of between 15 mm and 150 mm (e.g., between 50 mm and 90 mm). For some applications, the capsule has the same general structure as a traditional cigarette, but differs from the general structure of a cigarette in that the capsule is provided to the user with at least a portion of the capsule having a shape that is flattened relative to a traditional cigarette (e.g., such that it has an elliptical, rectangular, pill-shaped, or racetrack-shaped cross-sectional shape). Typically, by being flattened, the smoking material that is disposed toward the radial center of the capsule is disposed closer to the heating element than if the capsule had a circular cross section with a similar cross-sectional area, as described in further detail hereinbelow. Alternatively, the capsule is provided to the user with a circular cross-section shape, typically having a diameter of between 4 mm and 12 mm (e.g., between 5 and 8.5 mm). Typically, for such applications, although the capsule is provided to the user with the capsule having a circular cross-sectional shape, at least a portion of the capsule is flattened upon being inserted into the smoking device (e.g., such that it has an elliptical, rectangular, pill-shaped, or racetrack-shaped cross-sectional shape), such that the smoking material that was disposed toward the radial center of the capsule is disposed closer to the heating element than it would have been before being flattened, as described in further detail hereinbelow.

Figure 2A:
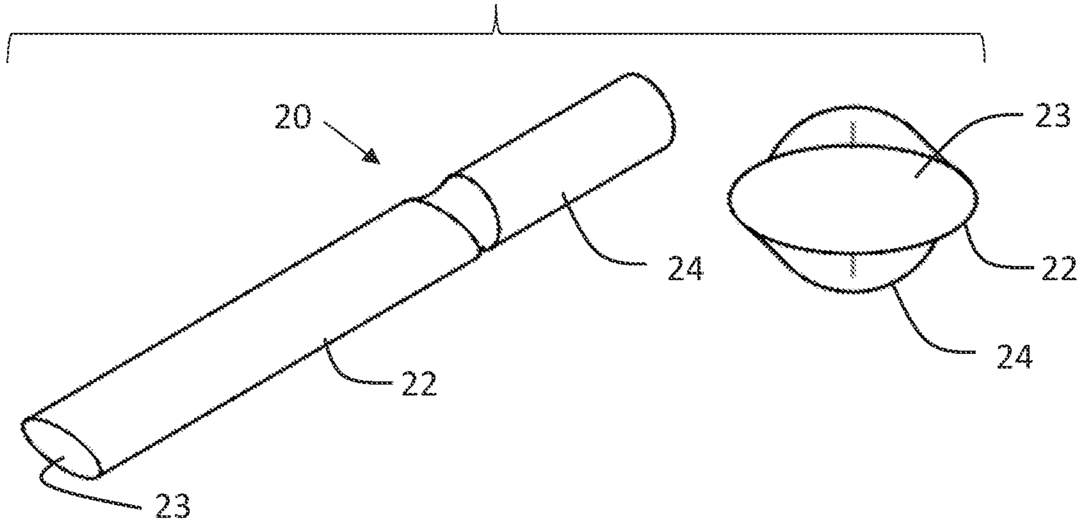
FIGS. 2A, 2B, 2C, and 2D are schematic illustrations of isometric views and end views of the capsule, with a portion of the capsule that contains smoking material and a heating element having a shape that is flattened relative to a traditional cigarette, such that it has an elliptical cross-sectional shape (FIG. 2A), a rectangular cross-sectional shape (FIG. 2B), a pill-shaped cross-sectional shape (FIG. 2C), or a racetrack-shaped cross-sectional shape (FIG. 2D), in accordance with some applications of the present invention.
Figure 2B:
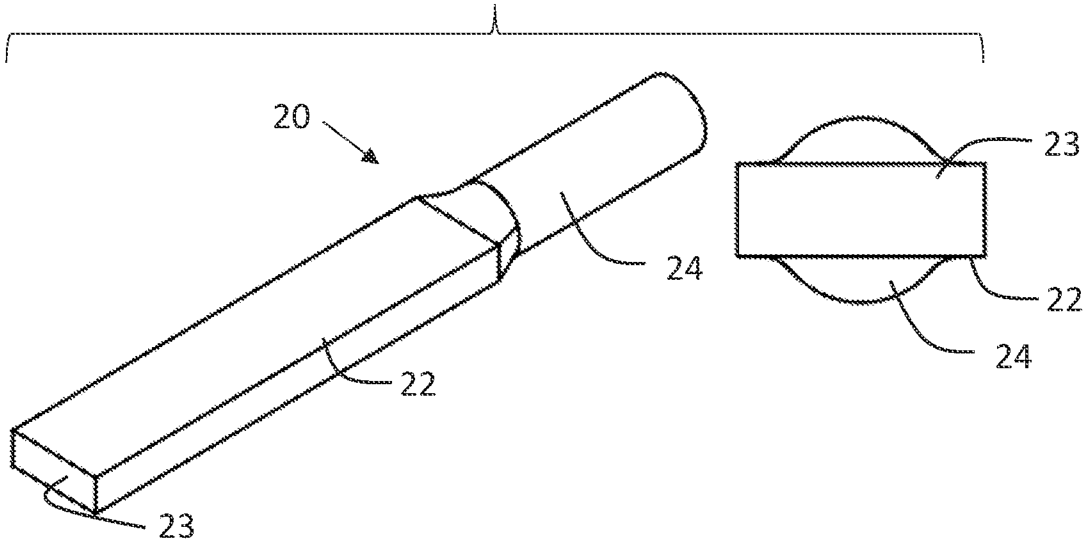
Figure 2C:
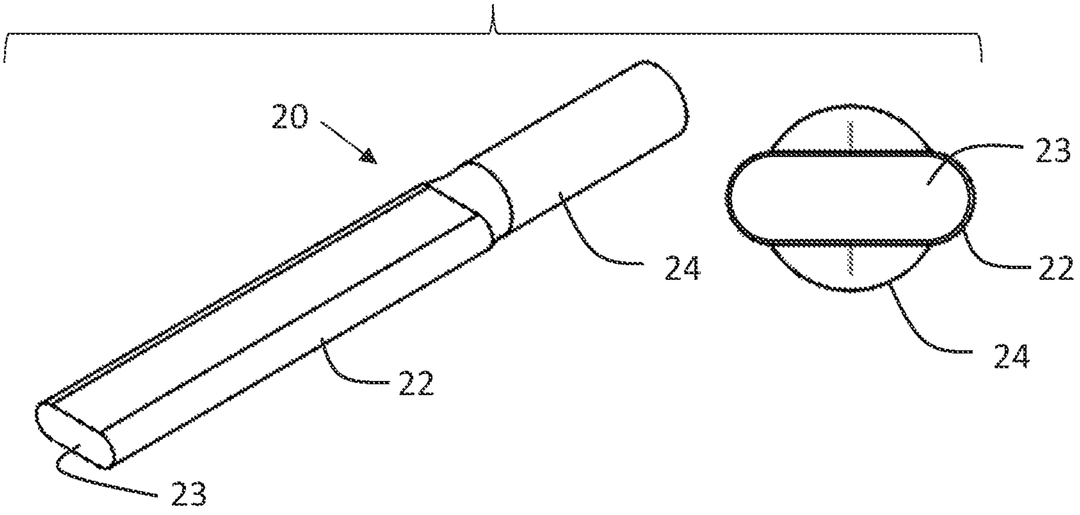
Figure 2D:
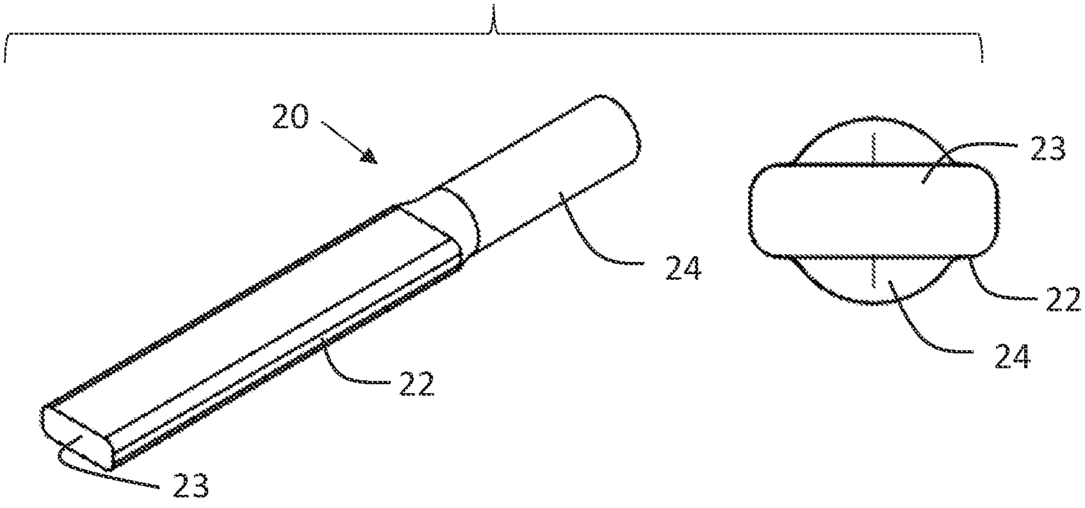

Reference is now made to FIGS. 2A, 2B, 2C, and 2D, which are schematic illustrations of isometric views and end views of capsule 20, with a portion 22 of the capsule that contains the smoking material and the heating element having a shape that is flattened relative to a traditional cigarette, such that it has an elliptical cross-sectional shape (FIG. 2A), a rectangular cross-sectional shape (FIG. 2B), a pill-shaped cross-sectional shape (FIG. 2C), or a racetrack-shaped cross-sectional shape (FIG. 2D). (Each of FIGS. 2A-D shows an isometric view and an end view of the capsule.) Typically, portion 24 of the capsule that serves as the mouthpiece has a circular cross-sectional shape. As described hereinabove, for some applications, the capsule is provided to the user with portion 22 of the capsule having a shape that is flattened relative to a traditional cigarette. Alternatively, the capsule is provided to the user with portion 22 of the capsule having a circular cross-sectional shape, but all or part of portion 22 of the capsule is flattened upon being inserted into the smoking device. For some applications, at least a part of portion 22 is flattened such that a ratio between the long side of the cross-sectional shape and the short side of the cross-sectional shape is greater than 2:1, 3:1, 4:1, or 6:1. Typically, the heating elements are disposed at least along the long sides of portion 22, such that the distance between the heating elements and the smoking material is less than if portion 22 had a circular cross-sectional shape with a similar perimeter.

Figure 3A:
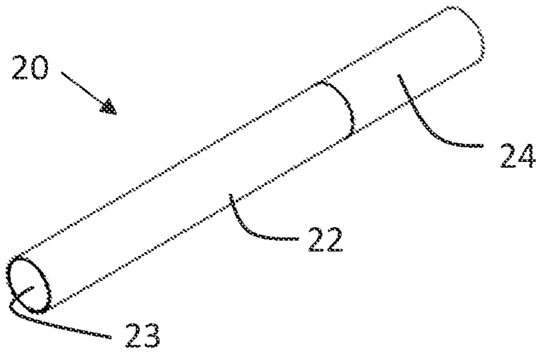
FIGS. 3A, 3B, and 3C are schematic illustrations of, respectively, a capsule having a circular cross-section, a capsule that has been flattened by having pressure applied to the capsule at discrete locations along its length, and a capsule that has been flattened along the entire length of the portion of the capsule that contains smoking material and a heating element, in accordance with some applications of the present invention.
Figure 3B:
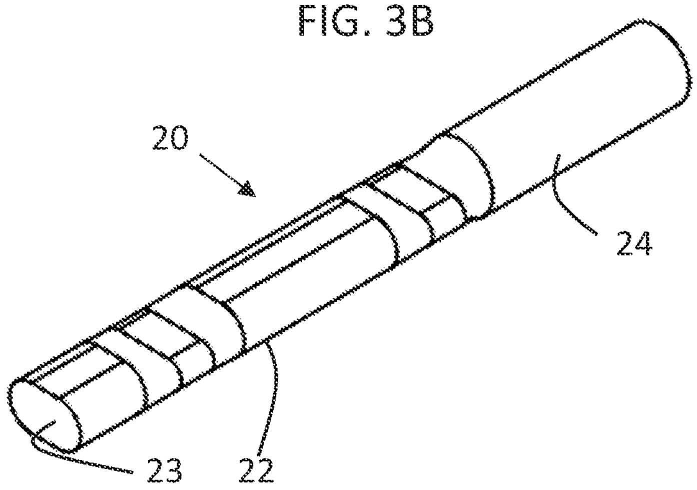
Figure 3C:
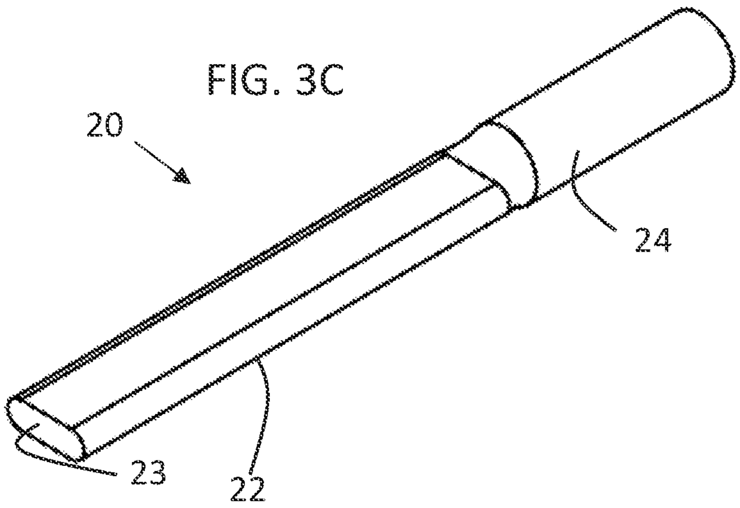

Reference is now made to FIGS. 3A, 3B, and 3C, which are schematic illustrations of respectively, a capsule having a circular cross-section, a capsule that has been flattened by having mechanical pressure applied to the capsule at discrete locations along its length, and a capsule that has been flattened along the entire length of portion 22, in accordance with some applications of the present invention. For some applications the capsule is flattened by smoking device 200. For some applications, smoking device 200 includes two or more electrodes that are configured (a) to heat a heating element that is disposed within the capsule via electrical resistive heating, and (b) to apply mechanical pressure to the capsule in order to flatten at least part of portion 22 of the capsule. For some applications, the electrodes apply mechanical pressure at discrete locations along its length (as indicated in FIG. 3B). For some applications, the electrodes apply mechanical pressure along the entire length of portion 22 (as indicated in FIG. 3C).

Figure 4A:
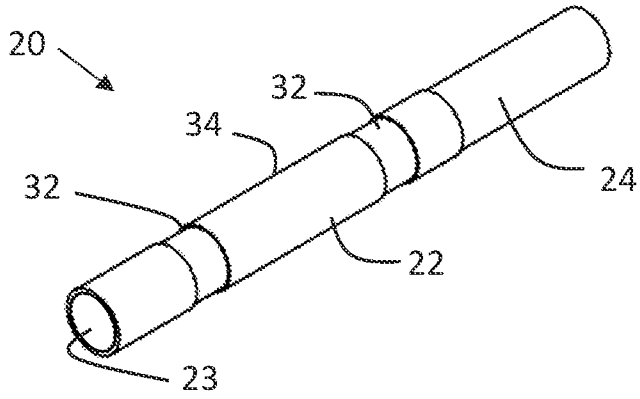
FIGS. 4A, 4B, and 4C are schematic illustrations of electrodes being placed in electrical contact with a heating element of a capsule, in accordance with some applications of the present invention.
Figure 4B:
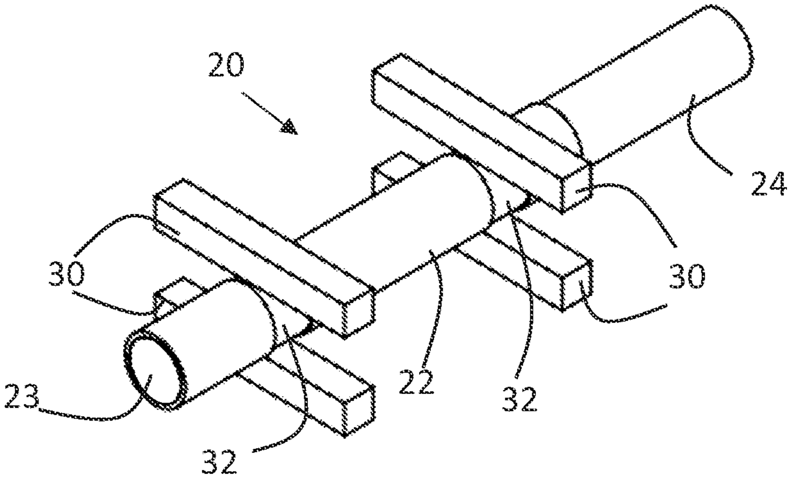
Figure 4C:
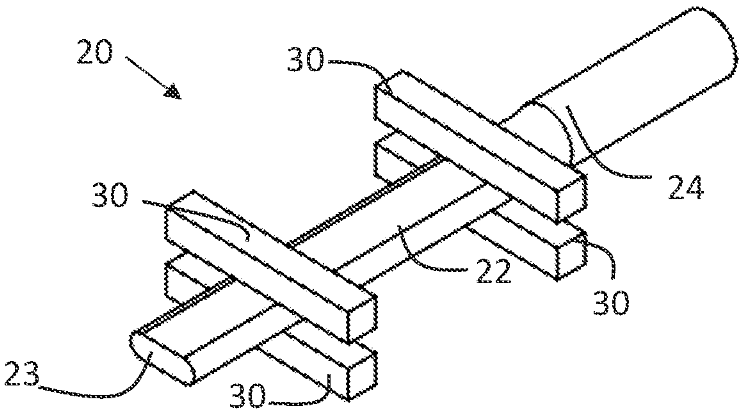

Reference is now made to FIGS. 4A, 4B, and 4C, which are schematic illustrations of electrodes 30 being placed in electrical contact with a heating element 32 of capsule 20, in accordance with some applications of the present invention. As described hereinabove, typically, the heating element is built-in to the capsule, such that it is in direct contact with smoking material. Also as described hereinabove, the capsule is typically configured to be disposable and for use in a single smoking session. Thus, problems associated with repeated use of heating elements, such as a build-up of dirt and/or impurities, as well as wear-and-tear due to repeated heating and/or mechanical interactions, are avoided. For some applications, the heating element comprises a metallic material, which is typically disposed within the capsule and/or is typically in direct contact with the smoking material, and that is heated via electrical resistive heating. For some applications, the heating element is a metallic foil (e.g., stainless steel foil, nickel-titanium foil, titanium foil, copper foil, aluminum foil, steel foil) that typically is in direct contact with, and surrounds, the smoking material within portion 22 of capsule 20. For some applications, the foil has a thickness of more than 1 micron (e.g., more than 3 microns) and/or less than 20 microns (e.g., less than 10 microns), for example, 1-20 microns, or 3-10 microns. Typically, a current is applied along the length of portion 22 (e.g. with a positive electrode at the first end and a negative electrode at the second end, or vice versa) and airflow is parallel to the direction of the current flow. For some applications, a current is applied along the metallic foil along a length of portion 22 that is greater than 5 mm, e.g., greater than 15 mm. Typically, the metallic foil is flexible such that it is configured to be flattened by mechanical flattening elements, as described in further detail hereinbelow.

As described hereinabove, it is typically desirable for capsule 20 to have the general structure of a traditional cigarette. Typically, the heating element extends along the entire length of the smoking-material-containing portion of the capsule. For some applications, the heating element only extends along a portion of the length and/or the circumference of the smoking-material-containing portion of the capsule, as described in further detail hereinbelow. For some applications, the capsule includes a paper covering 34, and the heating element 32 (which is typically as described hereinabove) is printed and/or is adhered to the paper covering. Typically, at the locations at which the electrodes contact the capsule, the heating element is exposed to the electrodes, such as to make direct electrical contact with the electrodes. For example, as shown in FIGS. 4A and 4B, at the locations at which the electrodes contact the capsule, the heating element is not covered with paper covering 34. As shown in FIG. 4C and as described hereinabove, for some applications, the electrodes apply mechanical pressure to portion 22 of the capsule, such as to flatten at least part of portion 22 of the capsule.

Figure 4D:
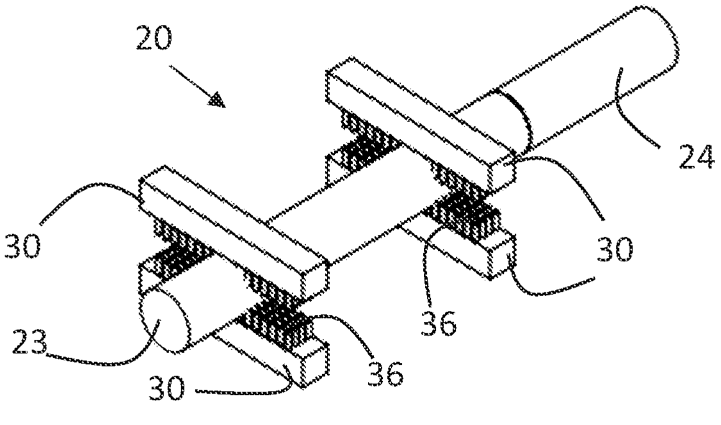
FIG. 4D is a schematic illustration of electrodes that include needle contacts that are configured to pierce a paper covering and directly contact a heating element of a capsule, in accordance with some applications of the present invention.

Referring to FIG. 4D, for some applications, the electrodes include needle contacts 36 that are configured to pierce the paper covering and directly contact the heating element.

For some applications, an electrically-conducting material is absorbed into the paper covering in order to facilitate electrical contact between the electrodes and the heating element. Alternatively or additionally, an electrically-conducting material passes through the paper from the heating element to contacts that directly contact the electrodes.

For some applications, the capsule includes a thermally-insulating material layer within at least a portion of the capsule, in order to reduce heat loss via the walls of the capsule.

Figure 5:
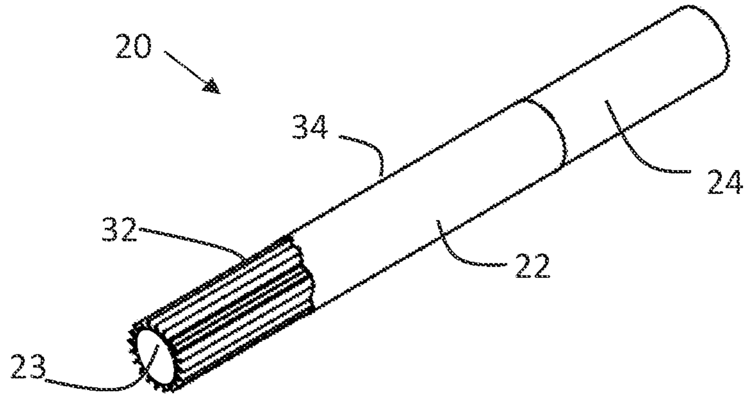
FIG. 5 is a schematic illustration of a heating element that includes folds, in accordance with some applications of the present invention.

Reference is now made to FIG. 5, which is a schematic illustration of a heating element that includes folds (e.g., zigzagging or undulating folds). Typically, by including folds, the area of contact between the heating element and the smoking material is increased relative to if it did not include folds. For some applications, by including folds, the heating element is shaped to define ribs that penetrate into the smoking material, thereby (a) increasing the area of contact between the heating element and the smoking material, and/or (b) decreasing the maximum distance between the heating element and the smoking material. For some applications, a folded heating element as shown in FIG. 5 is combined with one or more of the techniques described with reference to FIGS. 4A-D.

Figure 6A:
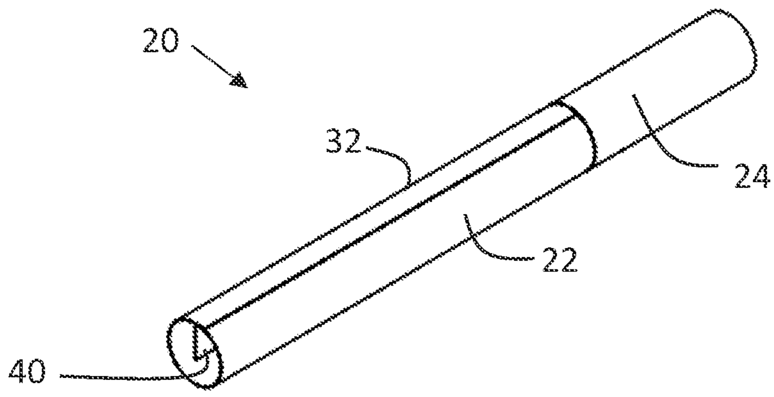
FIGS. 6A and 6B are schematic illustrations of a capsule that includes a heating element that penetrates into smoking material, in accordance with some applications of the present invention.
Figure 6B:
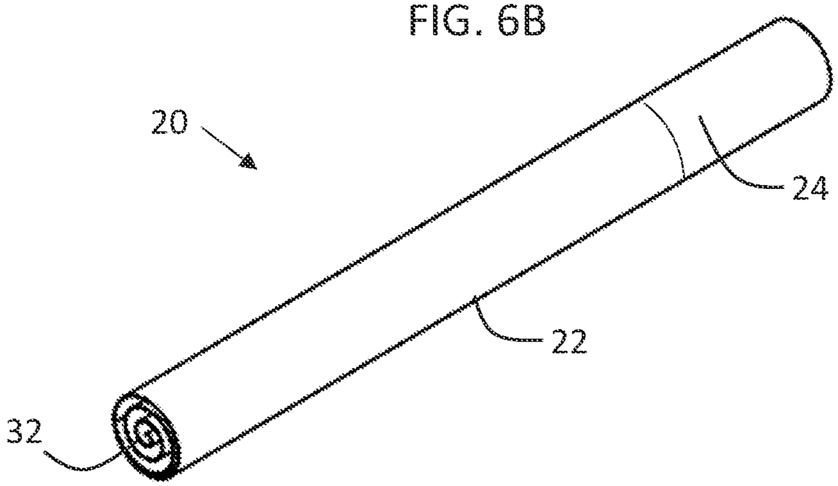

Reference is now made to FIGS. 6A and 6B, which are schematic illustrations of capsule 20, the capsule including a heating element 32 that penetrates into the smoking material. As described hereinabove, for some applications, the heating element is a metal foil (e.g., stainless steel foil, nickel-titanium foil, titanium foil, copper foil, aluminum foil, steel foil) that typically is in direct contact with, and surrounds, the smoking material within portion 22 of capsule 20. For some applications, the foil has a thickness of more than 1 micron (e.g., more than 3 microns) and/or less than 20 microns (e.g., less than 10 microns), for example, 1-20 microns, or 3-10 microns. Typically, a current is applied along the length of portion 22 (e.g. with a positive electrode at the first end and a negative electrode at the second end, or vice versa) and airflow is parallel to the direction of the current flow. For some applications, a current is applied along the metallic foil along a length of portion 22 in an axial direction along the metallic foil (i.e., along a direction that is parallel to the longitudinal axis of the capsule) that is greater than 5 mm, e.g., greater than 15 mm. For some applications, the foil is shaped and disposed within the capsule such that a flap 40 of the heating element penetrates into the smoking material, as shown in FIG. 6A. For some applications, the foil has a spiral shape that spiral through the smoking material, as shown in FIG. 6B. For some applications, by penetrating into the smoking material, the heating element (a) increases the area of contact between the heating element and the smoking material, and/or (b) decreases the maximum distance between the heating element and the smoking material.

Figure 7A:
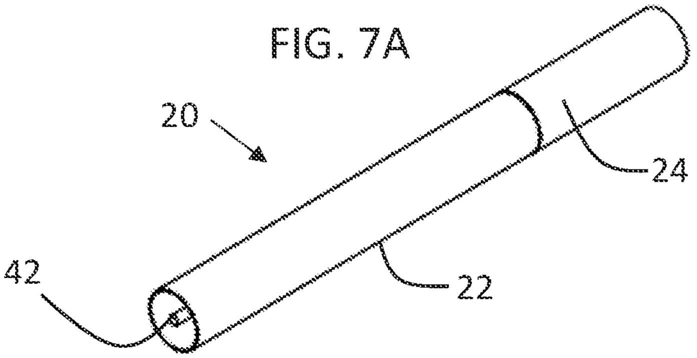
FIGS. 7A, 7B, 7C and 7D are schematic illustrations of a capsule that includes one or more magnetic heating elements, in accordance with some applications of the present invention.
Figure 7B:
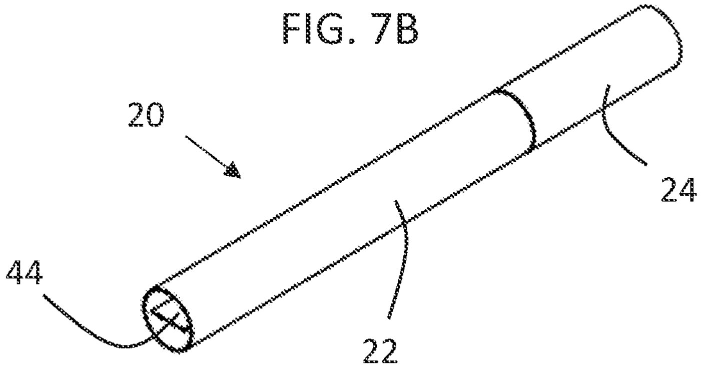
Figure 7C:
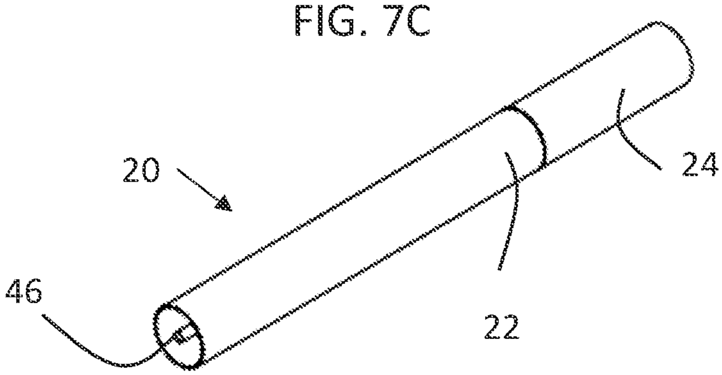
Figure 7D:
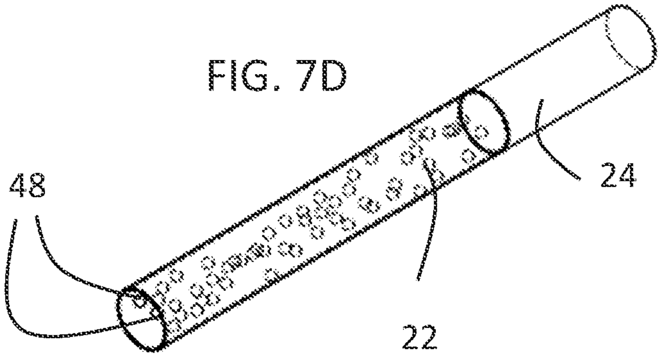

Reference is now made to FIGS. 7A, 7B, 7C and 7D, which are schematic illustrations of capsule 20, the capsule including one or more magnetic heating elements, in accordance with some applications of the present invention. As described hereinabove, typically, the heating element is built-in to the capsule, such that it is in direct contact with smoking material. For some applications, at least some of the heating element is embedded within the smoking material. For some applications, the heating element comprises one or more magnetically-heated materials (i.e., materials that are susceptible to being heated by a magnetic field (such as, magnetic materials and/or ferromagnetic materials)), which are typically disposed within the capsule and/or are typically in direct contact with smoking material, and that are heated via magnetic induction. For some applications smoking device 200 includes a coil that is configured to generate an electromagnetic field, as described in further detail hereinbelow. The coil is configured to heat the magnetically-heated material within the capsule via magnetic induction. In accordance with some applications, the magnetically-heated material is configured as a magnetically-heated rod 42 that is disposed along the length of a portion of the capsule (as shown in FIG. 7A), a magnetically-heated strip 44 that is disposed along the length of a portion of the capsule (as shown in FIG. 7B), a magnetically-heated tube 46 that is disposed along a portion of the length of the capsule (shown in FIG. 7C), and/or a plurality of magnetically-heated particles 48 (e.g., balls or beads) that are dispersed within the smoking material (as shown in FIG. 7D). Alternatively or additionally, a magnetically-heated material is disposed around the smoking material (e.g., underneath a paper covering), in a similar manner to that described with reference to the metallic foil that is heated via electrical resistive heating. For some applications, there is no magnetically-heated material disposed around the smoking material. Typically for applications in which the capsule includes one or more magnetically-heated materials, the smoking material is covered with a covering material that does not attenuate with an electromagnetic field that is generated by the smoking device (e.g., by a coil of the smoking device). For some such applications, the smoking material is covered with a paper covering as described in further detail hereinbelow. For some applications, the smoking material is covered with a cover which is itself a magnetically-heated material (e.g., a metallic foil). Typically, at least part of portion 22 is configured to be flattened by the smoking device (or to be provided to the user in a flattened shape). Typically, the material with which the smoking material is covered is flexible, such as to allow portion 22 to be flattened.

Figure 8A:
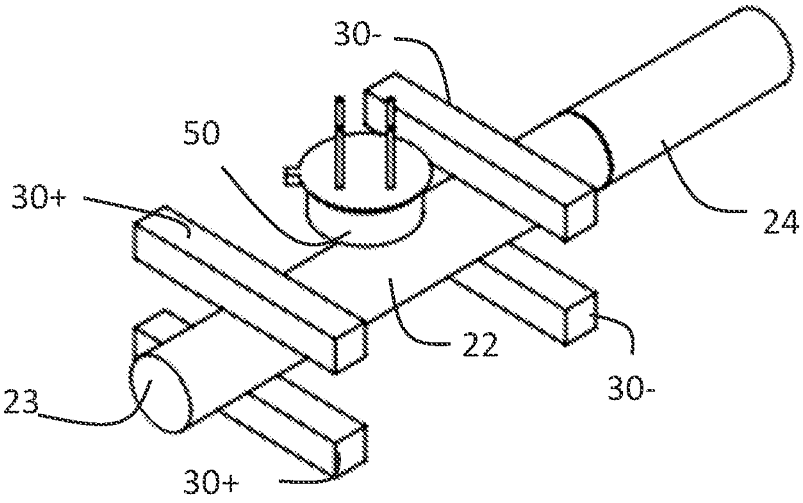
FIGS. 8A and 8B are schematic illustrations of one or more sensors for sensing the temperature of the smoking material within a capsule, in accordance with some applications of the present invention.
Figure 8B:
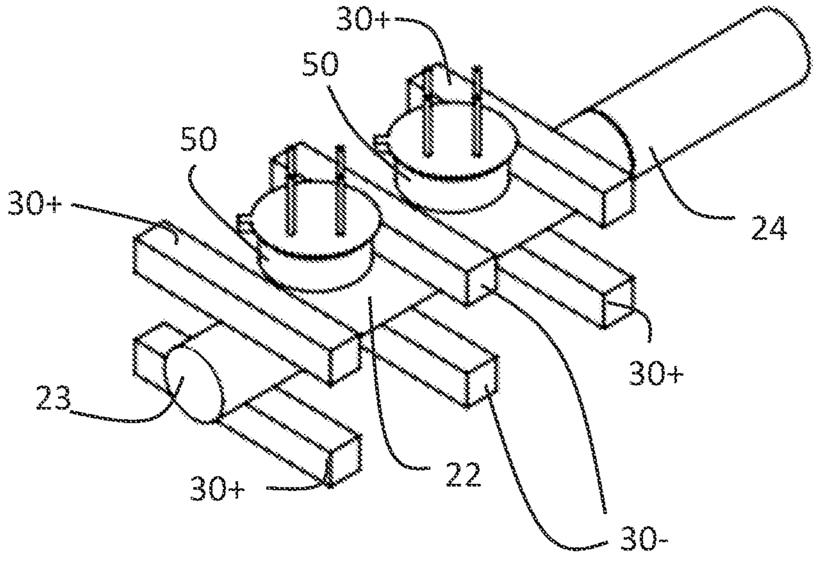

Reference is now made to FIGS. 8A and 8B, which are schematic illustrations of one or more sensors 50 for sensing the temperature of the smoking material within a capsule, in accordance with some applications of the present invention. FIGS. 8A and 8B show the sensors being used to sense the temperature of smoking material of a capsule that is being heated via electrical resistive heating of a heating element by electrodes 30. However, the sensors are typically also used with a capsule that is heated via magnetic induction, mutatis mutandis.

As described hereinabove, typically in order to heat smoking material via electrical resistive heating, a current is applied along the length of portion 22 of the capsule (e.g. with a positive electrode at the first end and a negative electrode at the second end, or vice versa) and airflow is parallel to the direction of the current flow. For some applications, the current is applied along the entire length of the heating element using a single pair of electrodes (or a respective single pair of electrodes along each side of the capsule), as shown in FIG. 8A. Alternatively, respective electrode pairs apply current along respective portions of the length of the heating element, as shown in FIG. 8B. (In FIGS. 8A and 8B, the electrodes are denoted to be positive and negative using reference numerals 30+ and 30– respectively, by way of example. The charges of the electrodes could be reversed.) For some applications, a current is applied along the metallic foil along a length of portion 22 in an axial direction along the metallic foil (i.e., along a direction that is parallel to the longitudinal axis of the capsule) that is greater than 5 mm, e.g., greater than 15 mm. For some applications, control of each portion of the heating element may thereby be controlled separately. For some such applications, respective portions along the length of the heating element are heated to respective, different temperatures. For some such applications, respective materials are vaporized by the respective portions of the heating element. For example, one portion may contain smoking material, while another portion may include materials that provide flavor to the vapor. For some applications, the user selects a type of vapor according to their preferences and the respective portions along the length of the heating element are heated accordingly (e.g., according to different temperature profiles). Typically, for applications in which respective electrode pairs apply current along respective portions along the length of the heating element (as shown in FIG. 8B), a respective temperature sensor is configured to detect the temperature of portions of the smoking material that are disposed within respective portions along the length of the heating element.

Figure 8C:
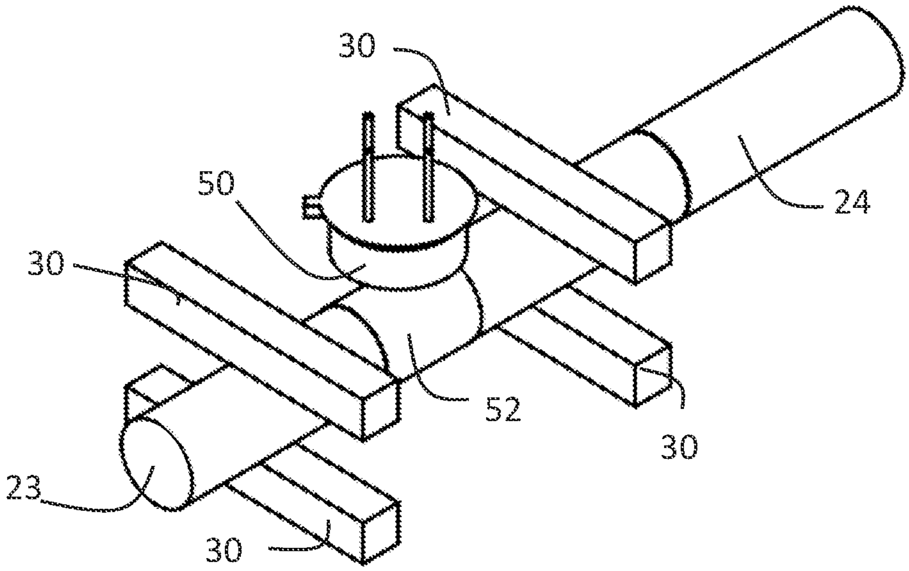
FIG. 8C is a schematic illustration of a capsule that includes a portion that is disposed in the vicinity of a temperature sensor, the portion being covered, coated, and/or treated such as to be non-reflective or to have a high emissivity value, in accordance with some applications of the present invention.

Reference is now made to FIG. 8C, which is a schematic illustration of a capsule that includes a portion 52 that is disposed in the vicinity of temperature sensor 50, portion 52 being covered, coated, and/or treated such as to be non-reflective or to have a high emissivity value (e.g., emissivity of at least 0.5, or at least 0.95), in accordance with some applications of the present invention. Typically, sensor 50 is configured to sense the temperature of the smoking material without extracting any heat from the smoking material. For some applications, sensor 50 is a contact sensor that contacts the smoking material in order to measure the temperature of the smoking material. For some applications, the temperature sensor is a thermal camera and/or a thermocouple sensor that senses the overall resistance of the capsule (or a portion thereof) and thereby derives the temperature of the capsule. For some applications, the sensor is an infrared temperature sensor that is configured to detect the temperature of the smoking material by detecting infrared thermal radiation from the smoking material (and typically without contacting the smoking material). As described hereinabove, typically capsule includes a heating element that is metallic and that surrounds the smoking material. Typically, the heating element comprises a reflective material. For some applications, in order to facilitate an accurate determination of the temperature of the smoking material using the infrared temperature sensor, the capsule is configured to be non-reflective, or to have a high emissivity value, at the location at which the sensor detects the temperature of the capsule. For example, the capsule is covered or coated with a non-reflective material, or with a material having a high emissivity value (e.g., emissivity of at least 0.5, or at least 0.95), at that location (e.g., polyimide tape, paper, or another thin material with high thermal conductivity and high emissivity). For some applications, the capsule is treated (e.g., via chemical treatment, sand-blasting, etching, coloring, knurling, and/or oxidation), such that the capsule is configured to be non-reflective, or to have a high emissivity value (e.g., emissivity of at least 0.5, or at least 0.95), at the location at which the sensor detects the temperature of the capsule.

Figure 8D:
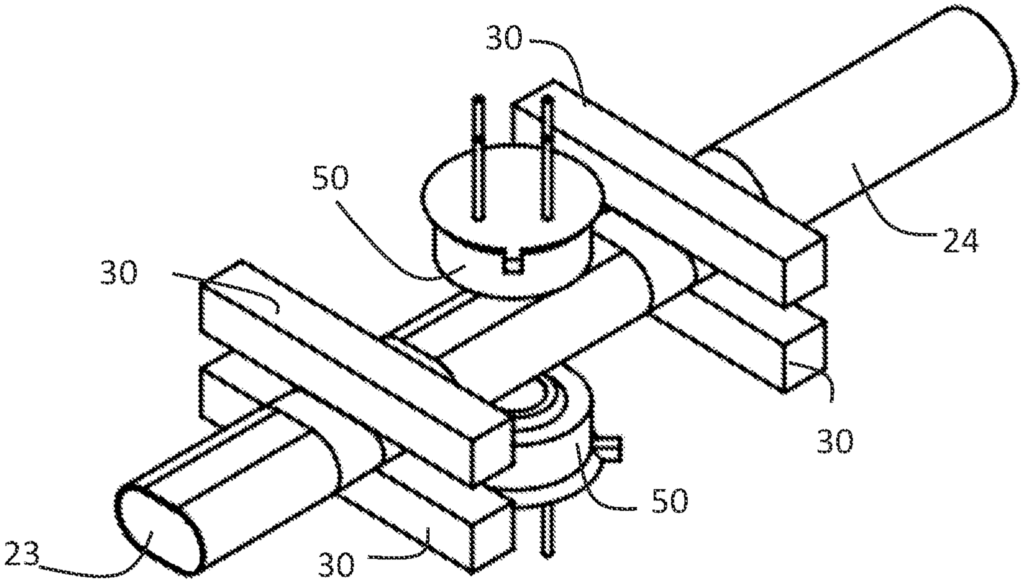
FIG. 8D is a schematic illustration of two or more sensors being used to detect the temperature of the smoking material within capsule at the same location along the length of the capsule as each other, in accordance with some applications of the present invention.

Reference is now made to FIG. 8D, which is a schematic illustration of two or more sensors 50 being used to detect temperature of the smoking material within capsule 20 at the same location along the length of the capsule as each other, in accordance with some applications of the present invention. For some applications, the sensors are placed on respective sides of the capsule. For some such applications, an average temperature of the smoking material is determined based upon the temperatures detected by each of the sensors. For some applications, a temperature range across the smoking material is determined, a maximum temperature of the smoking material is determined, and/or a minimum temperature of the smoking material is determined, based on the temperatures detected by each of the sensors. For some applications, the temperature of the smoking material is detected using the temperature that is detected by only one of the sensors, for example, if the temperature detected by the other sensor (or another indication from the other sensor) indicates that the other sensor is faulty, is dirty, has come into contact with the capsule, is detecting the temperature from a region of overlap of the cover of the capsule, etc.

For some applications, the temperature detected by the sensors described with reference to any one of FIGS. 8A-D is used as feedback in response to which heating of the heating element is controlled. Typically, the heating of the heating element is controlled such as to maintain the smoking material within a predefined temperature range, at which the active agents within the smoking material are vaporized but the smoking material isn't pyrolyzed. For some applications, a control component 233 (e.g., a control chip and/or a control microprocessor, shown in FIGS. 29C and 29D) within the smoking device is configured to detect that a user has puffed the smoking device (and/or a parameter of the puff, such as length of puff and/or depth of puff) based on the temperature of the smoking material that is detected by the sensor. Typically, the sensor detects the amount of current that must be applied to the heating element in order to maintain the smoking material at a constant (or substantially constant) temperature and thereby detects that the user has puffed the smoking device (and/or determines a parameter of the puff, such as length of puff and/or depth of puff).

For some applications, upon insertion of a capsule into the smoking device (or in response to being activated in a different manner, e.g. by the push of a button), the smoking device preheats the capsule to below the vaporization temperature of the smoking material, as described in further detail hereinbelow with reference to FIG. 34. Subsequently, in response to detecting that the user has puffed from the smoking device (or in response to being activated in a different manner, e.g. by the push of a button), the control component heats the smoking material to its vaporization temperature. For some applications, during the use of a given capsule, the control component detects the number of puffs, the lengths of the puffs, and/or the depths of the puffs that the user has taken from the capsule. For some such applications, the control component prevents the capsule from being heated, in response to detecting an indication that more than a given amount of the active agent has been vaporized. In this manner, the smoking device is configured to provide a metered dose of an active agent to the user. Alternatively or additionally, in this manner, the smoking device is configured to prevent further use of a capsule once the further use is likely to cause unwanted flavors, pyrolysis of the smoking material, etc. For some applications, the smoking device is configured to receive an input indicating the type of capsule that is placed in the device (and/or is configured to detect this automatically, as described in further detail hereinbelow), and is configured to control the heating of the smoking material in the above-described manner in response thereto.

Figure 9A:
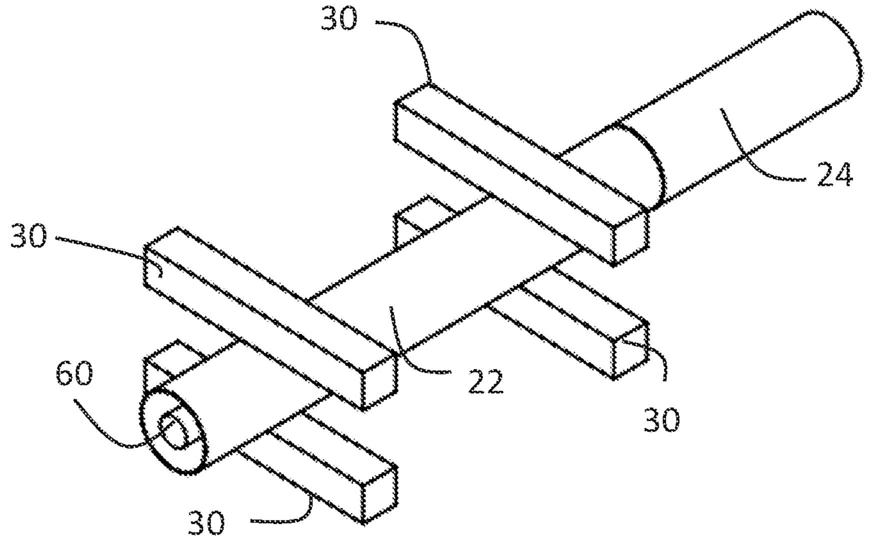
FIGS. 9A, 9B, and 9C are schematic illustrations of a capsule including a collapse-prevention element, in accordance with some applications of the present invention.
Figure 9B:
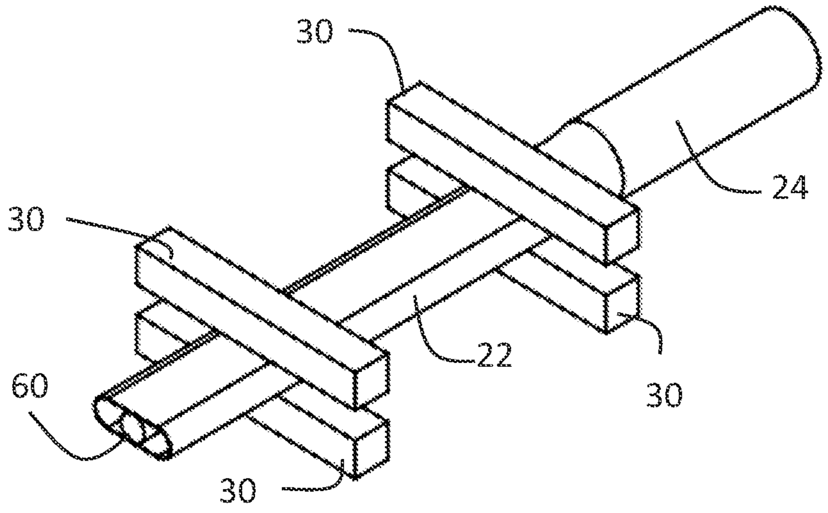
Figure 9C:
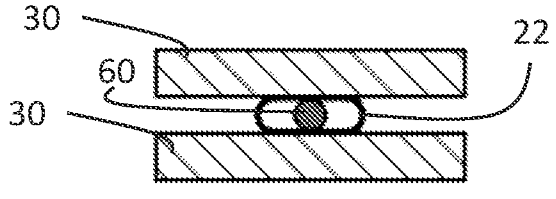

Reference is now made to FIGS. 9A, 9B, and 9C, which are schematic illustrations of capsule 20, the capsule including a collapse-prevention element 60, in accordance with some applications of the present invention. As shown in FIGS. 9A-C, the collapse-prevention element is shaped as a rod that extends axially along the longitudinal axis of portion 22 of the capsule. For some applications, the rod has a diameter of more than 0.5 (e.g., less than 2 mm) and/or less than 5 mm (e.g., less than 3 mm), e.g., 0.5-5 mm, or 2-3 mm. The collapse-prevention element is configured to prevent portion 22 of the capsule from collapsing when mechanical pressure is applied to portion 22 in order to flatten portion 22 of the capsule. It is noted that, in the absence of a collapse-prevention element, portion 22 of the capsule is susceptible to collapsing or becoming crushed, since the smoking material the heating element and the paper covering are typically all soft, non-rigid materials. By contrast, the rod is typically rigid and holds portion 22 of the capsule open at least to the diameter of the rod. Typically, the diameter of the rod defines the thickness of portion 22 when the capsule is in its flattened configuration. By defining the thickness of the portion 22 when the capsule is in its flattened configuration, the rod ensures that there is adequate airflow through portion 22. In addition, the rod ensures that there is good electrical contact between the electrodes and the heating element, by ensuring that the heating element is held in contact with the electrodes.

FIG. 9A shows the capsule before mechanical pressure has been applied to portion 22 by electrodes 30, and FIGS. 9B-C show the capsule after mechanical pressure has been applied to portion 22. As shown in FIGS. 9B-C, the rod holds open portion 22, such that the thickness of portion 22 when the capsule is in its flattened configuration is defined by the diameter of the rod.

It is noted that, for some applications, the rod does not extend along the entire length of portion 22 of the capsule. For example, the rod may only be disposed along a portion of the length of portion 22 within which the heating element is configured to contact the electrodes. For some applications, two or more rods are disposed within respective regions at which the heating element is configured to contact the electrodes, along the length of portion 22 of the capsule, as shown in FIG. 10A.

For some applications, the rod is a solid rod. As described above, typically the rod is rigid. For some applications, the rod is flexible, but it has a greater rigidity than the smoking material. Typically, the rod is made of a material that can withstand being heated to the temperatures to which the smoking material is heated. In accordance with respective applications, the rod is made of wood, metal, and/or a polymeric material, such as polyether ether ketone (PEEK). For some applications, the rod is made of a natural or smoking material, such as wood, tobacco, and/or hemp. For some applications, the rod is configured to diffuse one or more chemicals, such as flavoring, pharmaceuticals, and/or a vapor-generating chemical, such as glycerol. For some applications, the rod includes a phase-change material that is configured to prevent the temperature of the smoking material from exceeding the phase-change temperature of the phase-change material. Typically, the phase-change material is selected such as to prevent the temperature of the smoking material from exceeding a temperature at which the smoking material pyrolyzes. For some applications, the phase-change material is selected such as to maintain the temperature of the smoking material within an optimal range for vaporization and/or taste. For some applications the rod is configured to absorb chemicals that are generated by pyrolysis of the smoking material and/or other material within the capsule, such as nitric oxide and/or carbon monoxide. As noted above, the collapse-prevention element is not necessarily a rod, and the scope of the present disclosure includes collapse-prevention elements having different structure as would be apparent to a person of ordinary skill in the art, and as described hereinbelow. Typically, the configurations of the rod that are described above are applicable to any type of collapse-prevention element, mutatis mutandis.

Figure 10A:
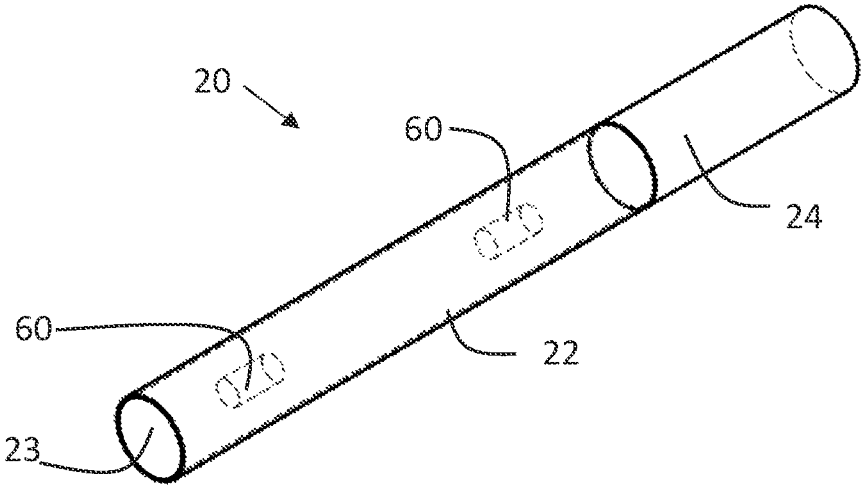
FIGS. 10A and 10B are schematic illustrations of a capsule including a collapse-prevention element, in accordance with some alternative applications of the present invention.
Figure 10B:
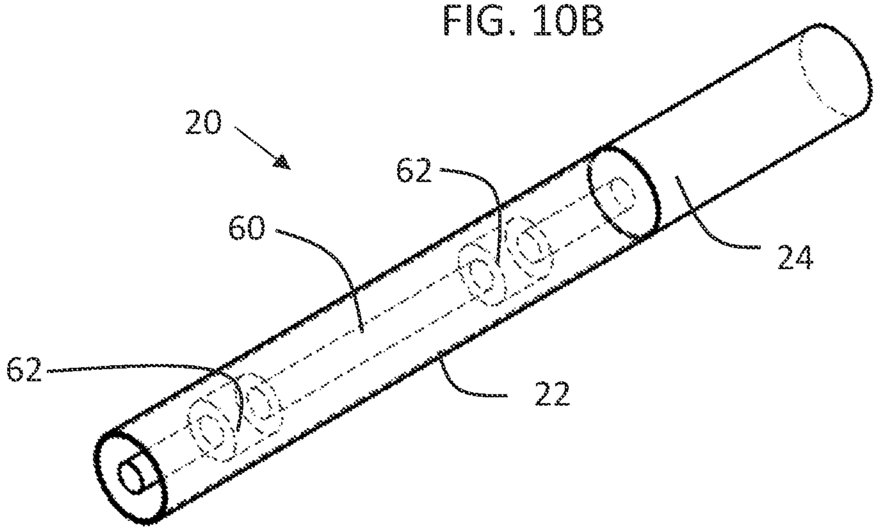

Reference is now made to FIGS. 10A and 10B, which are schematic illustrations of capsule 20, the capsule including a collapse-prevention element 60, in accordance with some applications of the present invention. With reference to FIG. 10A, and as described hereinabove, for some applications, the collapse-prevention element includes two or more rods are disposed within respective regions at which the heating element is configured to contact the electrodes, along the length of portion 22 of the capsule. With reference to FIG. 10B, for some applications, the rod has a non-uniform diameter. For example, as shown, at the location at which the electrodes are configured to come into contact with the capsule, the rod includes radially-protruding portions 62 having a greater diameter (typically, in order to ensure good electrical contact between the heating element and the electrodes), whereas at other locations, the rod has a smaller diameter.

Figure 11A:
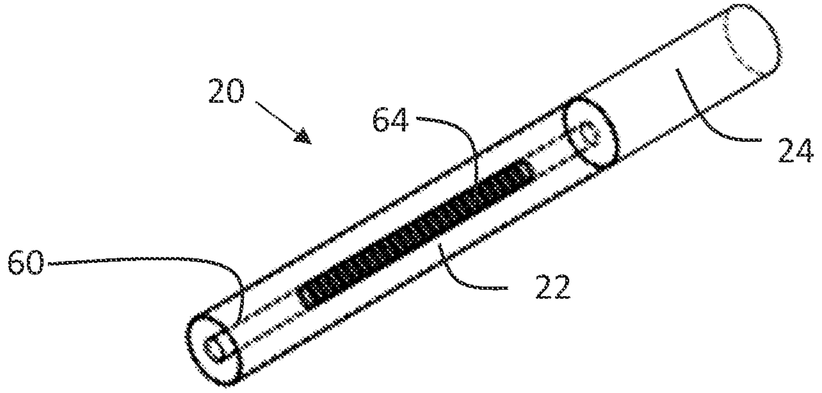
FIGS. 11A and 11B are schematic illustrations of a capsule including a collapse-prevention element, in accordance with some additional applications of the present invention.
Figure 11B:
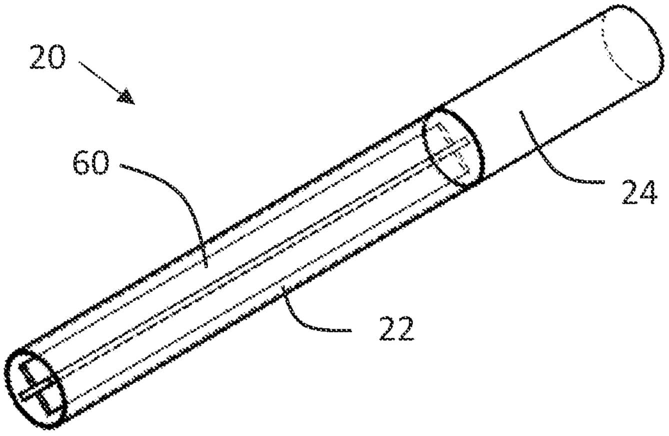
Figure 12:
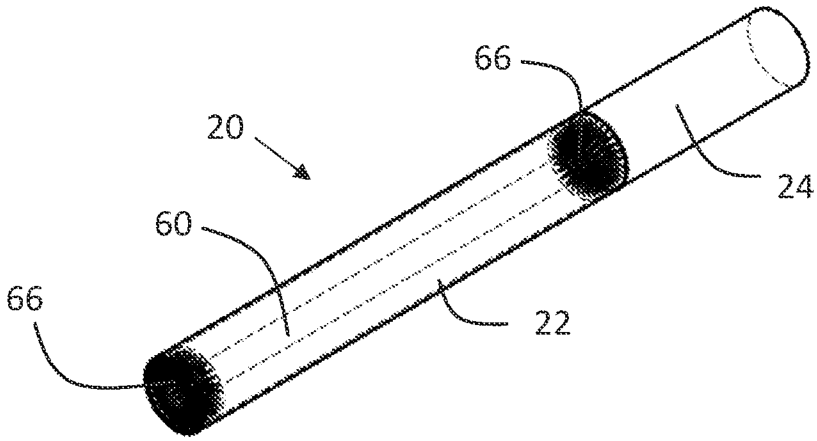
FIG. 12 is a schematic illustration of a capsule including a collapse-prevention element, in accordance with some additional applications of the present invention.

Reference is now made to FIGS. 11A and 11B, which are schematic illustrations of capsule 20, the capsule including a collapse-prevention element 60, in accordance with some applications of the present invention. For some applications, collapse-prevention element is a tube that contains chemicals (such as flavoring, pharmaceuticals, and/or a vapor-generating chemical (such as glycerol) in liquid, solid, gaseous, and/or gel form) that are released from the tube during heating of the smoking material. For example, the tube may be fenestrated (as shown in FIG. 11A), or it may include a membrane or slits, via which the chemicals are released. For some applications, the collapse-prevention element 60 is a tube that serves one or more additional functions. For example, along at least a portion of its length it may be hollow and it may define openings (such as holes or slits) that are configured to collect the vaporized active agents and direct them toward the mouthpiece. As shown in FIG. 11B, for some applications, the collapse-prevention element has a cross-shaped cross-sectional shape, such that (a) the collapse-prevention element holds open portion 22 of the capsule to a great enough thickness, but (b) the collapse-prevention element does not occupy as much of the volume of portion 22 as it would if it were to have a different shape, thereby leaving a greater volume within portion 22 to be occupied by the smoking material. Reference is now made to FIG. 12, which is a schematic illustration of capsule 20, the capsule including a collapse-prevention element 60, in accordance with some applications of the present invention. For some applications, disc-shaped or cylindrical structures 66 are disposed at one or both of the ends of the collapse-prevention element, as shown in FIG. 12. For some applications, structures 66 are configured to center the collapse-prevention element within portion 22 of the capsule. For some applications, structures 66 are configured to perform additional functions, such as to hold the collapse-prevention element in place, to prevent the smoking material from falling out of the capsule, and/or to hold the smoking material in place while allowing sufficient airflow through the capsule.

Figure 13:
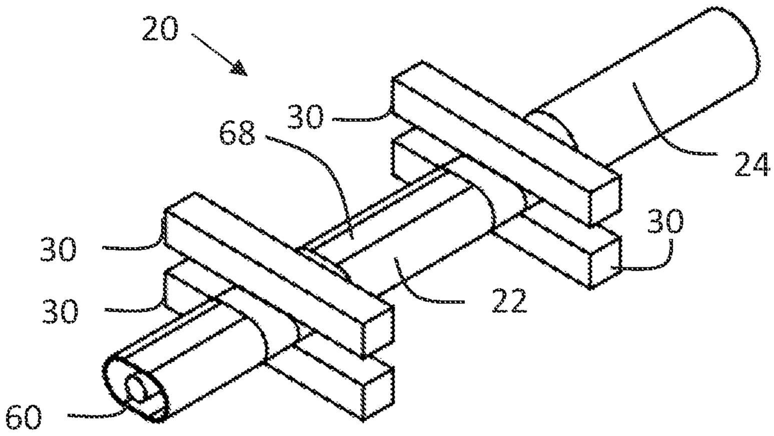
FIG. 13 is a schematic illustration of a capsule including a collapse-prevention element, in accordance with some further applications of the present invention.

Reference is now made to FIG. 13, which is a schematic illustration of capsule 20, the capsule including a collapse-prevention element 60, in accordance with some applications of the present invention. For some applications, the collapse-prevention element is configured to act as a heating element that is configured to be heated by the electrodes via electrical resistive heating. For example, when the electrodes flatten portion 22 of the capsule, the electrodes may be configured to become electrically connected to a conductive portion of the collapse-prevention element. For example, the mechanical pressure of the electrodes may be configured to bring an electrical contact 68 of portion 22 of the capsule (which is described hereinabove) into contact with a metallic coating that is disposed on the collapse-prevention element.

Figure 14:
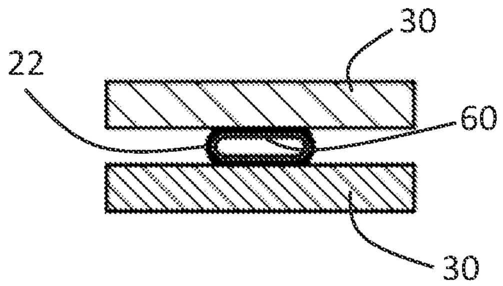
FIG. 14 is a schematic illustration of a capsule including a collapse-prevention element, in accordance with some additional applications of the present invention.

Reference is now made to FIG. 14, which is a schematic illustration of capsule 20, the capsule including a collapse-prevention element 60, in accordance with some applications of the present invention. For some applications the collapse-prevention element is a tube, e.g., a hollow, flexible tube, as shown in FIG. 14. The smoking material is disposed inside the tube and the tube typically adds rigidity to portion 22, thereby preventing it from collapsing when mechanical pressure is applied to portion 22 in order to flatten portion 22 of the capsule. Typically, the tube thereby ensures that there is adequate airflow through portion 22 and that there is good electrical contact between the electrodes and the heating element, by ensuring that the heating element is held in contact with the electrodes.

Figure 15A:
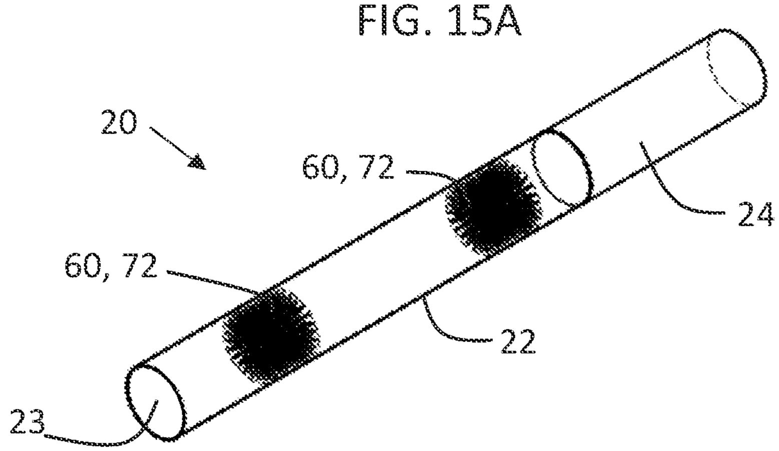
FIGS. 15A and 15B are schematic illustrations of a capsule including a collapse-prevention element, in accordance with some further applications of the present invention.
Figure 15B:
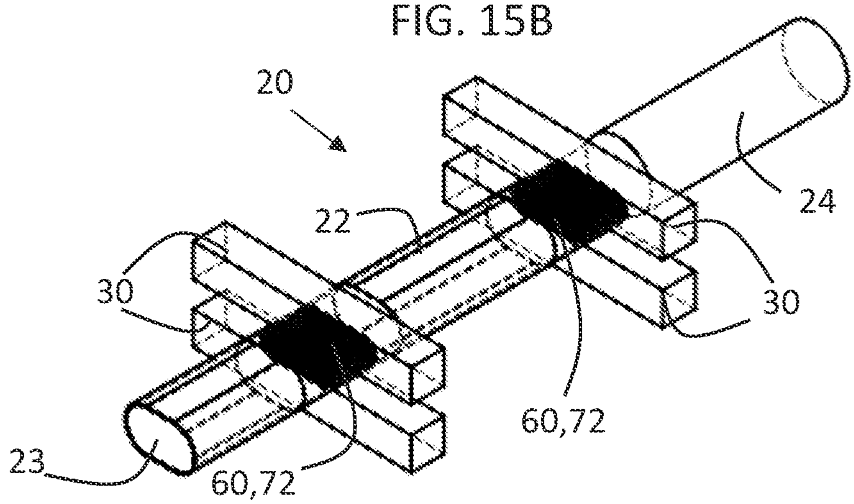

Reference is now made to FIGS. 15A and 15B, which are schematic illustrations of capsule 20, the capsule including a collapse-prevention element 60, in accordance with some applications of the present invention. FIG. 15A shows capsule 20 in a non-compressed configuration and FIG. 15B shows the capsule in a compressed configuration with mechanical pressure having been applied to the capsule by electrodes 30 (or a different mechanical flattening element), in order to flatten the capsule. For some applications, the collapse-prevention element is a spongy, or foam, disc-shaped or cylindrical element 72 that is disposed at one or both ends of portion 22 of the capsule. For some applications, the shape and/or material of element 72 is similar to that of a cigarette filter. Typically, element 72 is configured to allow airflow therethrough and is configured to maintain a given minimum thickness even when mechanical pressure is applied to element 72. Element 72 thereby ensures that there is adequate airflow through portion 22 and that there is good electrical contact between the electrodes and the heating element, by ensuring that the heating element is held in contact with the electrodes. For some applications, a cylindrical element is disposed at each end of portion 22, with a predefined quantity of smoking material disposed between the two cylindrical elements. For some applications, since there is a predefined quantity of smoking material disposed between the two cylindrical elements, the capsule is configured to provide a metered dose of an active agent to the user. For some such applications, the smoking device is configured to detect tampering with the capsule, to ensure that the dose that is being provided to the user has not been tampered with.

Figure 16A:
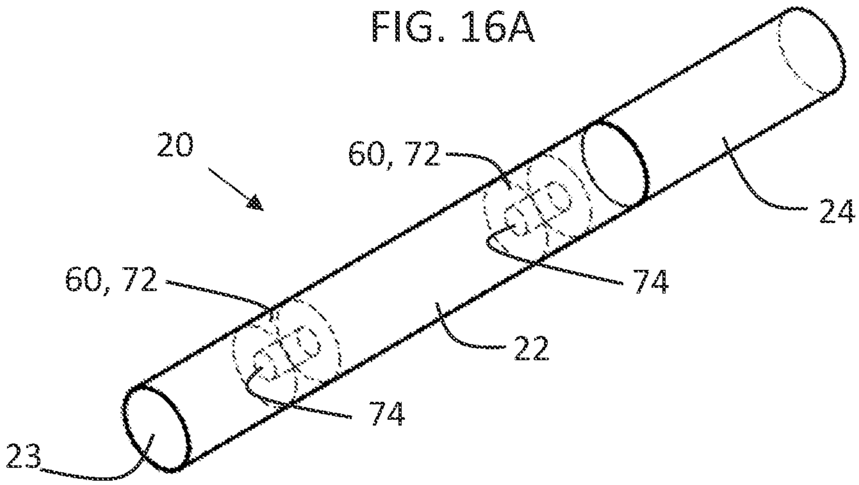
FIGS. 16A and 16B are schematic illustrations of a capsule including a collapse-prevention element, in accordance with some additional applications of the present invention.
Figure 16B:
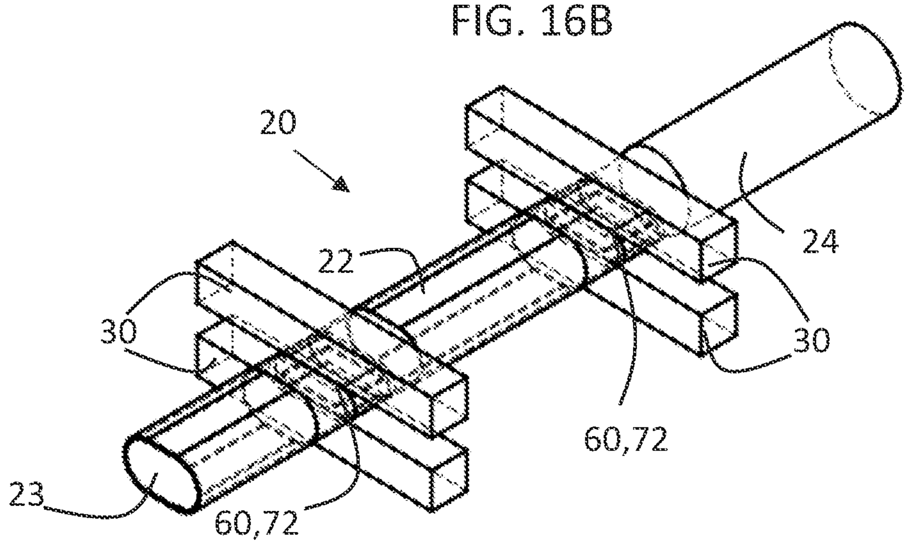

Reference is now made to FIGS. 16A and 16B, which are schematic illustrations of capsule 20, the capsule including a collapse-prevention element 60, in accordance with some applications of the present invention. As described with reference to FIGS. 15A and 15B, for some applications, the collapse-prevention element is a spongy or foam disc-shaped or cylindrical element 72 that is disposed at one or both ends of portion 22 of the capsule. For some applications, the shape and/or material of element 72 is similar to that of a cigarette filter. For some applications, element 72 defines a lumen 74 therethrough. The lumen is typically configured to allow airflow through element 72 even when element 72 has been compressed.

Figure 17:
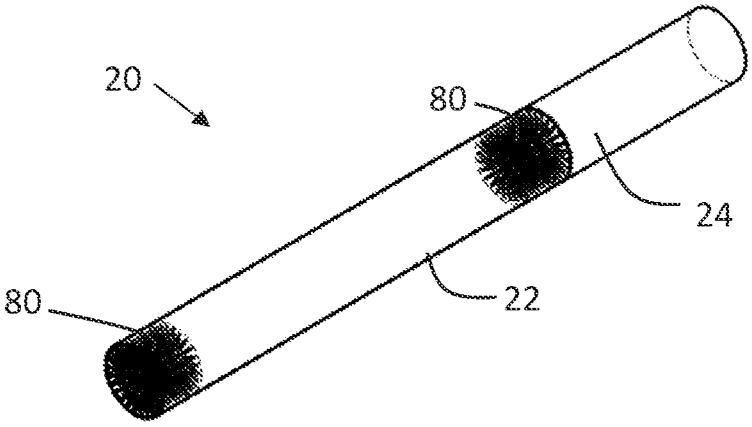
FIG. 17 is a schematic illustration of a capsule including one or more stoppers, in accordance with some applications of the present invention.

Reference is now made to FIG. 17, which is a schematic illustration of capsule 20, the capsule including one or more stoppers 80, in accordance with some applications of the present invention. For some applications, the stoppers are spongy or foam, disc-shaped or cylindrical elements that are disposed at one or both ends of portion 22 of the capsule. For some applications, the shape and/or material of each of the stoppers is similar to that of a cigarette filter. Typically, the stoppers are configured to prevent the smoking material from being dislodged from within the capsule (which can result in the smoking material itself entering the user's mouth and/or can lower the efficiency of the device). The stoppers are typically configured to allow airflow through the capsule while preventing the smoking material from becoming dislodged. For some applications, the stoppers include holes that are configured to allow airflow through the stoppers. For some applications, at least one of the stoppers is configured to adjust the airflow resistance of the capsule, for example, to make it similar to the airflow resistance of a traditional combustion cigarette.

Figure 18A:
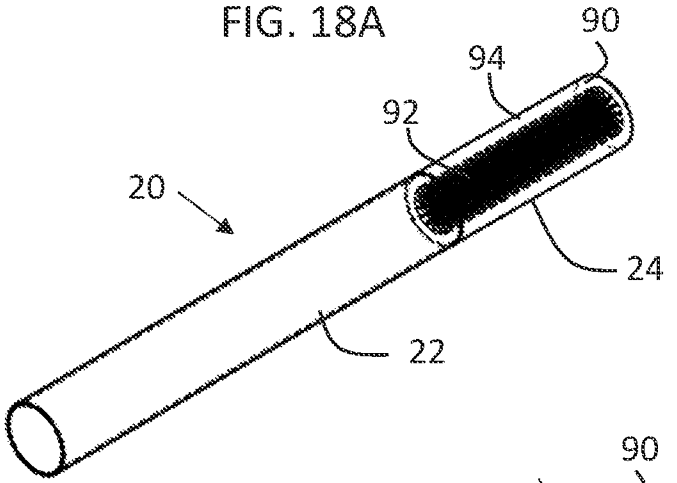
FIGS. 18A, 18B, and 18C are schematic illustrations of a capsule including a mouthpiece, in accordance with some applications of the present invention.
Figure 18B:
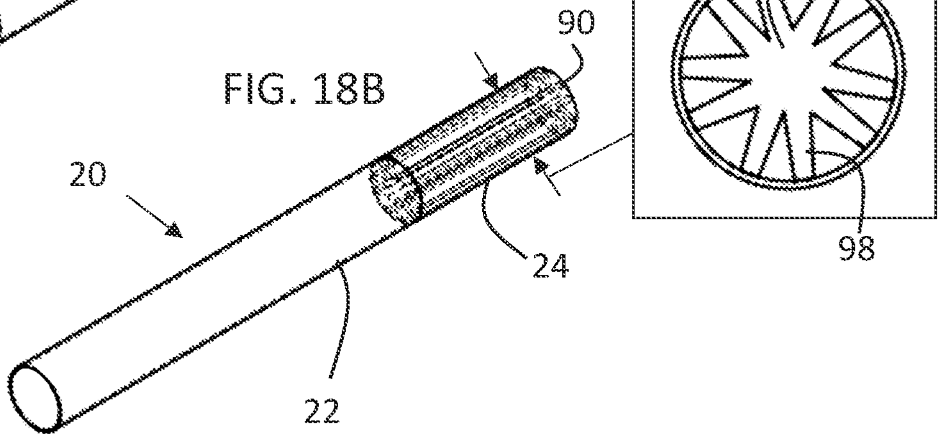
Figure 18C:
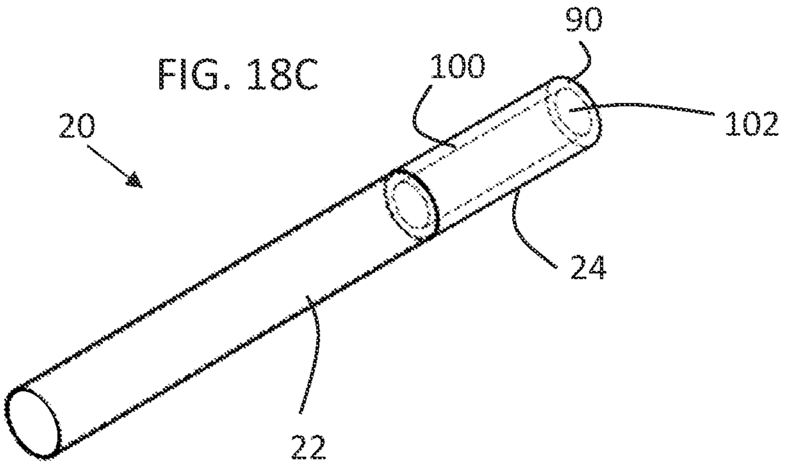

Reference is now made to FIGS. 18A, 18B, and 18C, which are schematic illustrations of capsule 20 including a mouthpiece 90, in accordance with some applications of the present invention. As described hereinabove, typically portion 24 of the capsule defines mouthpiece 90. Typically, the user sucks the vapors from the capsule via the mouthpiece. Typically, the mouthpiece is configured to prevent at least some of the heat from the heated portion of the capsule from reaching the user's mouth. For some applications, the mouthpiece includes flavoring agents. For some applications, the mouthpiece filters the vapors. For some applications, the mouthpiece cools the vapors. With reference to FIG. 18A, for some applications, the mouthpiece includes a spongy or foam disc-shaped or cylindrical element 92 that is typically similar to that of a cigarette filter, and which is covered with paper 94. With reference to FIG. 18B, for some applications, the mouthpiece comprises a tube 96 that has spokes 98 (e.g., plastic spoke or metal spokes) that are configured to cool the vapors. With reference to FIG. 18C, for some applications, the mouthpiece comprises a hollow tube 100 that defines a lumen 102 that is configured to allow airflow therethrough.

Figure 18D:
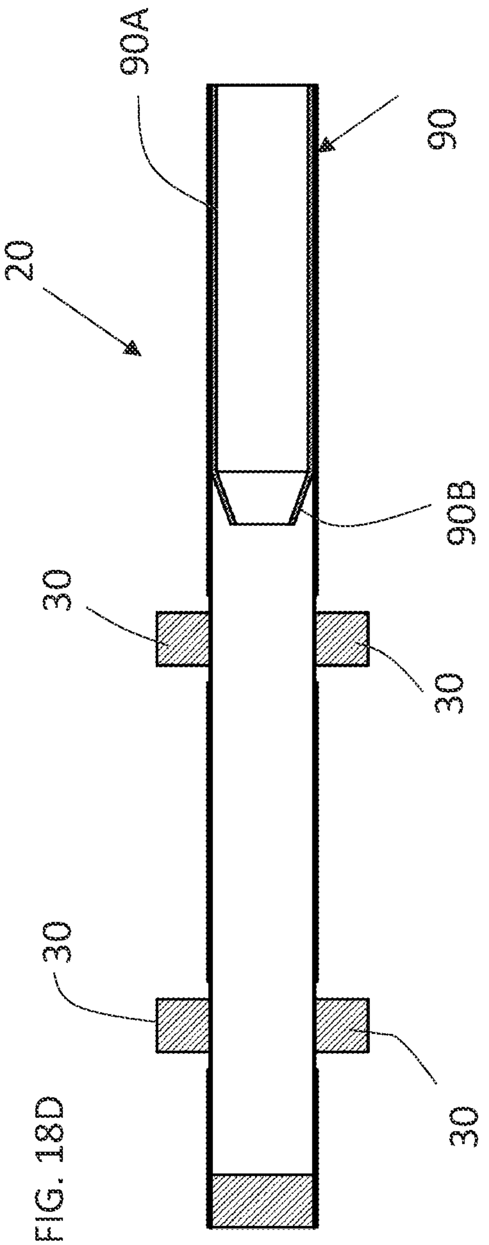
FIGS. 18D, 18E, and 18F are schematic illustrations of respective views of a capsule with a multi-purpose mouthpiece, in accordance with some applications of the present invention.
Figure 18F:
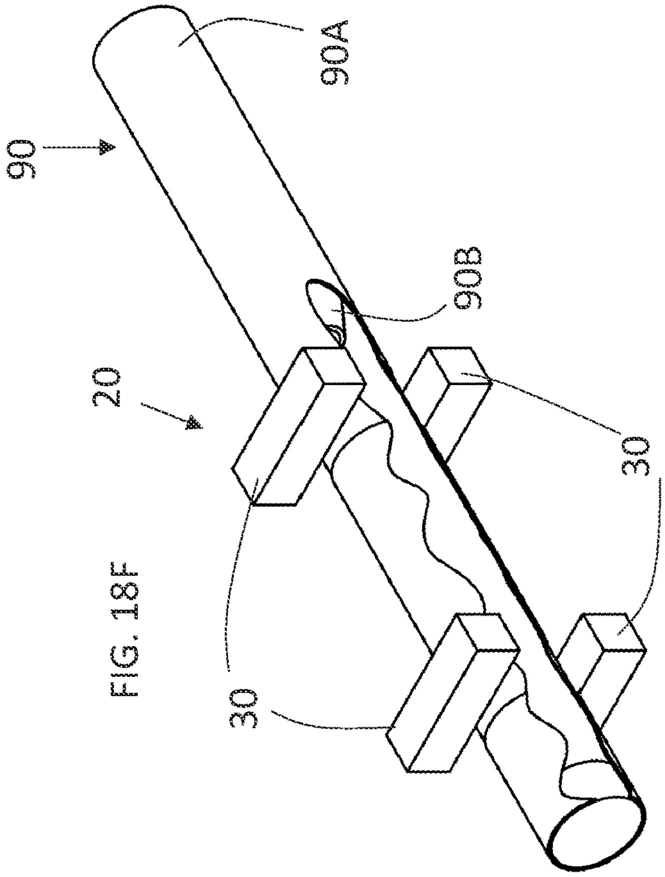
Figure 18E:
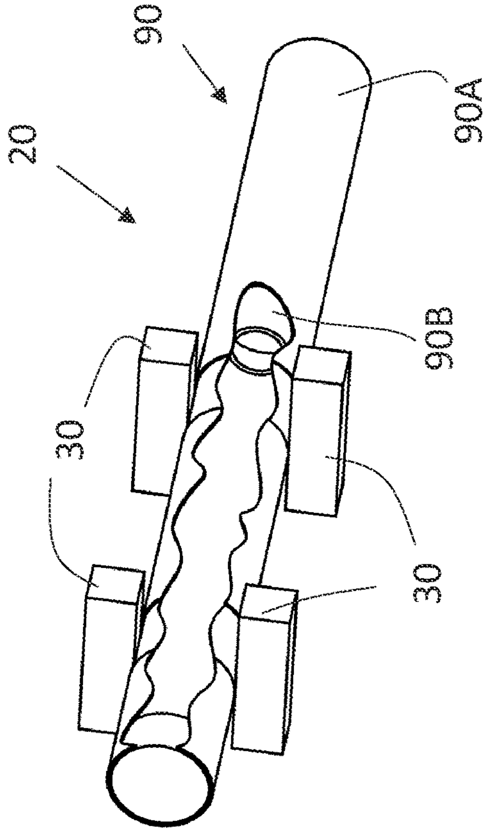

Reference is now made to FIGS. 18D, 18E, and 18F, which are schematic illustrations of respective views of capsule 20 with mouthpiece 90, the mouthpiece serving a number of purposes, in accordance with some applications of the present invention. Each of FIGS. 18D-F shows the capsule disposed between electrodes 30. FIG. 18E shows a cross-sectional view of the capsule and FIGS. 18E and 18F show respective oblique views of the capsule with some of the covering layers peeled away for illustrative purposes. For some application, the mouthpiece includes a first portion 90A that is shaped cylindrically via which a user is configured to draw vaporized active agents from the capsule into a mouth of the user, and a second portion 90B shaped as a cone with a narrow end of the cone adjacent to the smoking material such as to prevent solid matter (such as the smoking material and/or debris generated from the heating) from passing from the capsule into the user's mouth. For some applications, the mouthpiece is made of paper (e.g., card) that is shaped to define the first and second portions of the mouthpiece. For some applications, the second end of the mouthpiece is shaped such that the diameter of the opening through the mouthpiece at the narrow end of the cone is between 1 mm and 3 mm. For some applications, the second portion of the mouthpiece is sized such as to provide a desired level of resistance to airflow through the mouthpiece.

Figure 19A:
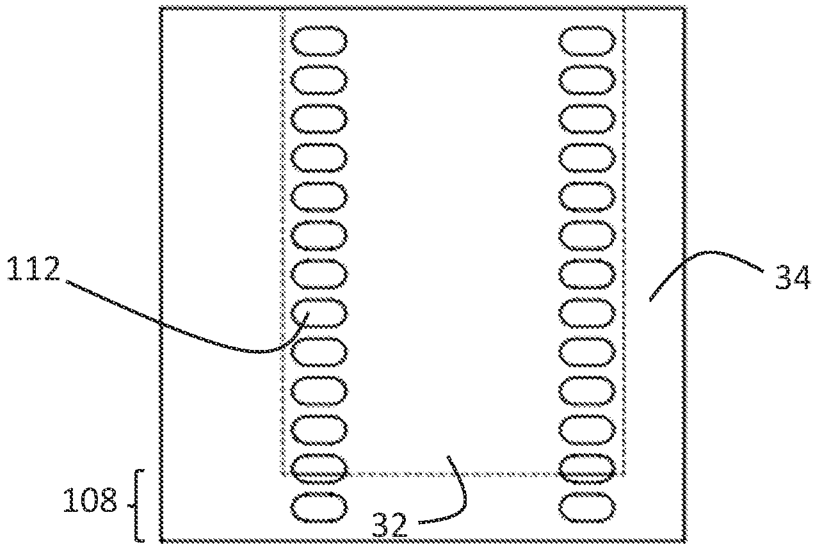
FIGS. 19A and 19B are schematic illustrations of a paper covering and heating element of a capsule, in accordance with some applications of the present invention.
Figure 19B:
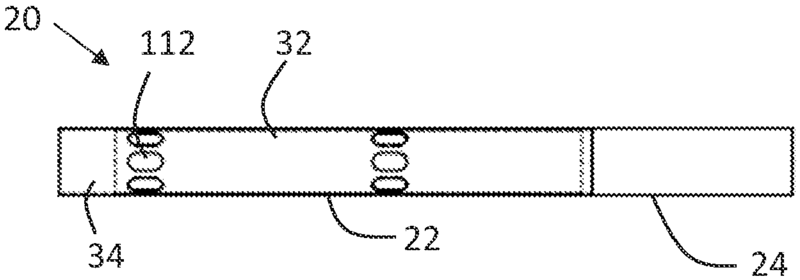

Reference is now made to FIGS. 19A and 19B, which are schematic illustrations of the paper covering 34 and heating element 32 of capsule 20, in accordance with some applications of the present invention. FIG. 19A shows the paper covering and metallic foil (acting as heating element 32) in a flattened configuration before smoking material has been inserted and the paper covering has formed a cylindrical housing for the smoking material. FIG. 19B shows the paper covering and the foil as configured after smoking material has been inserted and the paper covering has formed a cylindrical housing for the smoking material.

As described hereinabove, for some applications, the heating element comprises a metallic material, which is typically disposed within the capsule and/or is typically in direct contact with the smoking material, and that is heated via electrical resistive heating. For some applications, the heating element is a metal foil (e.g., stainless steel foil, nickel-titanium foil, titanium foil, copper foil, aluminum foil, steel foil) that typically is in direct contact with, and surrounds, the smoking material within portion 22 of capsule 20. For some applications, the foil has a thickness of more than 1 micron (e.g., more than 3 microns) and/or less than 20 microns (e.g., less than 10 microns), for example, 1-20 microns, or 3-10 microns. Typically, a current is applied along the length of portion 22 (e.g. with a positive electrode at the first end and a negative electrode at the second end, or vice versa) and airflow is parallel to the direction of the current flow. For some applications, a current is applied along the metallic foil along a length of portion 22 in an axial direction along the metallic foil (i.e., along a direction that is parallel to the longitudinal axis of the capsule) that is greater than 5 mm, e.g., greater than 15 mm. Typically, it is desirable for capsule 20 to have the general structure of a traditional cigarette. For some applications, the heating element extends along the entire length of the smoking-material-containing portion of the capsule. Alternatively, the heating element only extends along a portion of the length and/or the circumference of the smoking-material-containing portion of the capsule. For some applications, the heating element 32 (which is typically as described hereinabove) is printed and/or is adhered to the paper covering. Typically, at the locations at which the electrodes contact the capsule, the heating element is exposed to the electrodes, such as to make direct electrical contact with the electrodes.

As shown in FIGS. 19A-B, for some applications, the foil is adhered to the paper covering along only part of the length of portion 22 of the capsule. For some applications, the foil is not adhered to the paper covering around the full circumference of portion 22. For some applications, in order to form a cylindrical shape, there is a band 108 of overlap of the paper covering, in order to stick the paper covering to itself and form a closed cylinder. For some such applications, there is no foil within the band of overlap. For some applications, the paper covering defines openings 112 (e.g., holes or slits), in order to provide direct electrical contact between the electrodes and the foil.

Figure 20A:
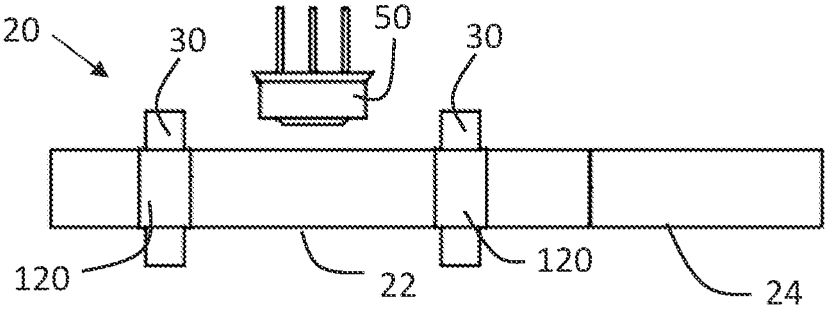
FIGS. 20A, 20B, and 20C are schematic illustrations of a capsule including an electrical contact coating at a region at which the capsule is configured to contact electrodes, in accordance with some applications of the present invention.
Figure 20B:
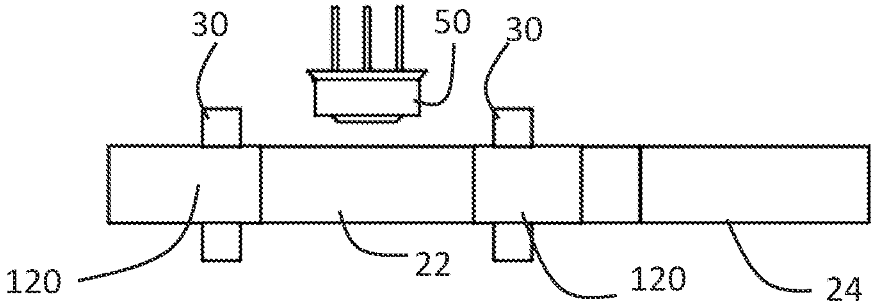
Figure 20C:
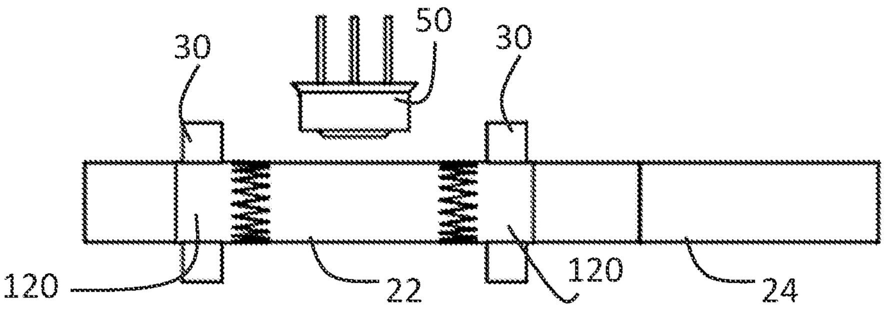

Reference is now made to FIGS. 20A, 20B, and 20C, which are schematic illustrations of capsule 20, the capsule including an electrical contact coating 120 at a region at which the capsule is configured to contact electrodes 30, in accordance with some applications of the present invention. For some applications, at a region at which the capsule is configured to contact electrodes 30, the capsule is coated with coating 120, which is configured to enhance the electrical contact between the electrode and the heating element. For example, the coating may be a gold or a copper coating, and may be an inner and/or an outer coating. For some applications, the coating has a lower resistance than that of metallic foil 32. Typically the coating extends until a region at which it is desirable for the heating element to be heating via electrical resistive heating. For some applications, the overall resistance of coating as well as that of the heating element is configured to provide a desired overall resistance, by configuring the materials, the thickness, and/or treatments that are applied to the coatings and/or to the heating element, as described in further detail hereinbelow. For example, the overall resistance may be configured to control the amount of heat that is generated, and/or to draw current from batteries of the smoking device in an efficient manner. For some applications, the overall resistance is set such as to substantially match the internal resistance of the (one or more) batteries of the smoking device, such that current is drawn from batteries of the smoking device in an efficient manner.

For some applications, the coating is configured to prevent the generation of hotspots at the region at which the capsule is configured to contact electrodes 30. For example, if there is suboptimal contact between an electrode and the heating element this can lead to the generation of a hotspot at the region at which the capsule is configured to contact electrodes 30, which can cause pyrolysis of the smoking material at the hotspot, and/or can lead to inadequate heating of the heating element. Typically, coating 120 is configured to prevent such hotspots from occurring.

For some applications, the coating is applied in a ring shape, as shown in FIGS. 20A and 20B. Alternatively, the coating is applied in a different shape. For example, the coating may have a zigzagged edge on the side at which the coating contacts the metallic foil (as shown in FIG. 20C), in order to conduct electrical current to the heating element in a uniform manner.

For some applications, the coating extends around the full circumference of the capsule, such that the coating diffuses the current, which is applied to the capsule by electrodes, uniformly around the circumference of the capsule. For some such applications, the smoking device includes only a single pair of electrodes disposed on one side of the capsule, rather than having a plurality of pairs of electrodes that are disposed at respective circumferential locations around the capsule. For some such applications, the smoking device includes a pair of electrodes disposed on one side of the capsule and a pair of mechanical elements that are configured to apply mechanical pressure to the capsule on the other side of the capsule.

For some applications, the capsule has a structure as shown in FIGS. 19A-B, with the metallic foil being exposed via openings in the paper covering, and coating 120 is disposed outside the paper covering over the regions of the paper covering that define the openings. Thus, the coating electrically couples the electrodes to the metallic foil via the openings in the paper covering.

Figure 21A:
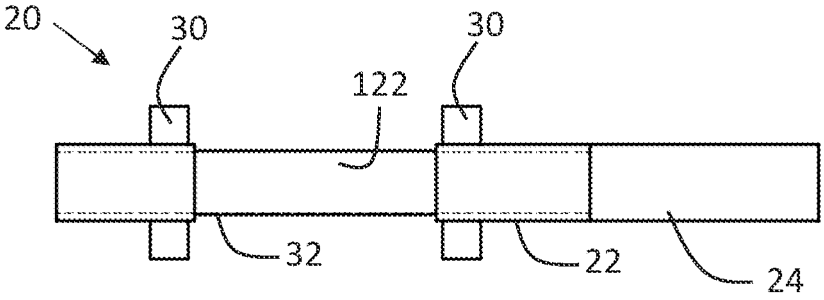
FIGS. 21A, 21B, and 21C are schematic illustrations of a the capsule including a region that surrounds the smoking material, at which a foil heating element has greater resistance than the resistance of the foil at the region at which the capsule is configured to contact electrodes, in accordance with some applications of the present invention.
Figure 21B:
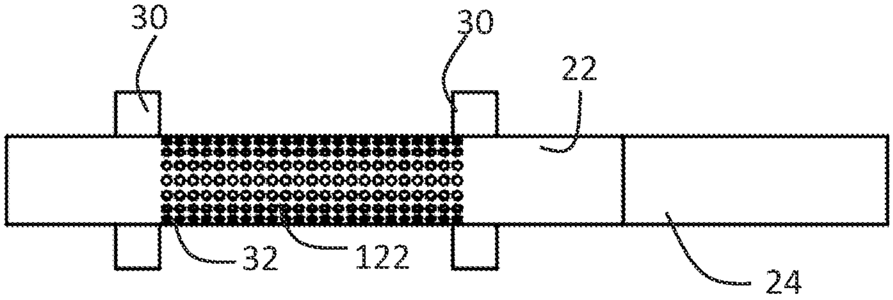
Figure 21C:
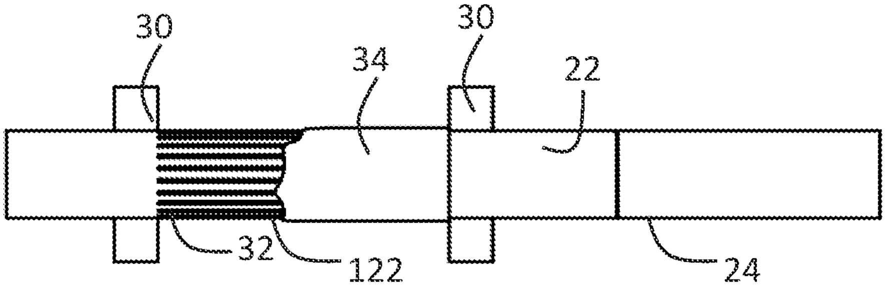

Reference is now made to FIGS. 21A, 21B, and 21C, which are schematic illustrations of capsule 20, the capsule including a region 122 that surrounds the smoking material, at which the metallic foil heating element has greater resistance than the resistance of the foil at the region at which the capsule is configured to contact electrodes 30, in accordance with some applications of the present invention. For some applications (as an alternative or in addition to coating the capsule at the region at which the capsule is configured to contact electrodes 30, as described with reference to FIGS. 20A-C), at the region at which the capsule is configured to contact electrodes 30, the foil is made thick enough to provide good electrical contact with the electrodes as well as relatively low resistance. However, within region

122, the foil has different characteristics in order to increase its resistance such as to lead to adequate resistive heating to heat the smoking material. For example, within region 122, the foil may be thinner than at the region at which the capsule is configured to contact electrodes 30, in order to increase its resistance within region 122, as shown in FIG. 21A. Alternatively or additionally, within region 122, the foil may be etched (e.g., to create openings (e.g., holes or slits) in the foil), in order to increase its resistance within region 122, as shown in FIG. 21B. Further alternatively or additionally, within region 122, the foil may have openings (e.g., holes or slits) cut from it, in order to increase its resistance within region 122, as shown in FIG. 21C. Typically, even at locations at which the foil defines openings (e.g., holes or slits), paper covering 34 does not define openings, as indicated in FIG. 21C. In this manner, the paper covering cover blocks radial airflow into the capsule, such that there is no (or minimal) radial airflow into the capsule, and substantially all of the airflow is along the axial direction. Alternatively, the openings within the foil are not covered, such as to allow radial airflow into the capsule.

For some applications, the metallic foil heating element is configured to provide a desired overall resistance, by configuring the materials, the thicknesses, and/or treatments that are applied to the foil. For example, the overall resistance may be configured to control the amount of heat that is generated, and/or to draw current from batteries of the smoking device in an efficient manner. For some applications, the overall resistance is set such as to match the internal resistance of the (one or more) batteries of the smoking device, such that current is drawn from batteries of the smoking device in an efficient manner.

Figure 22A:
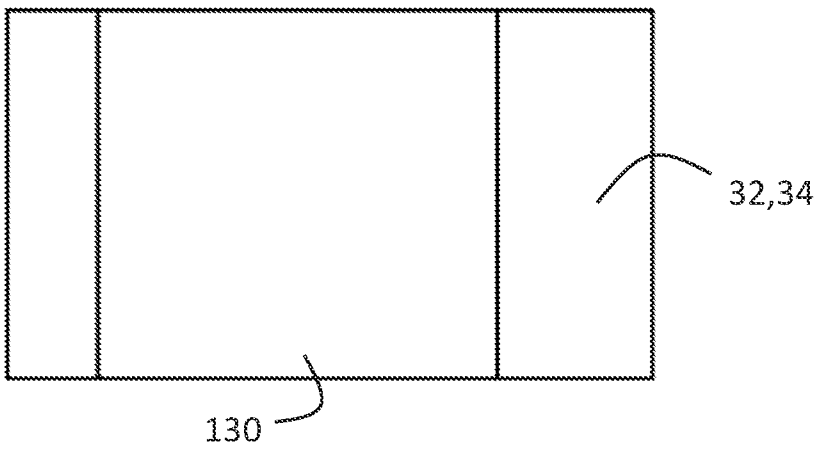
FIGS. 22A, 22B, 22C and 22D are schematic illustrations of a covering material of a capsule that includes an inner lining, in accordance with some applications of the present invention.
Figure 22B:
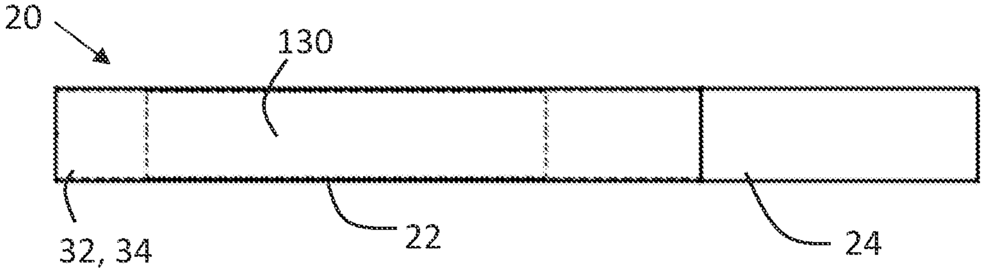
Figure 22C:
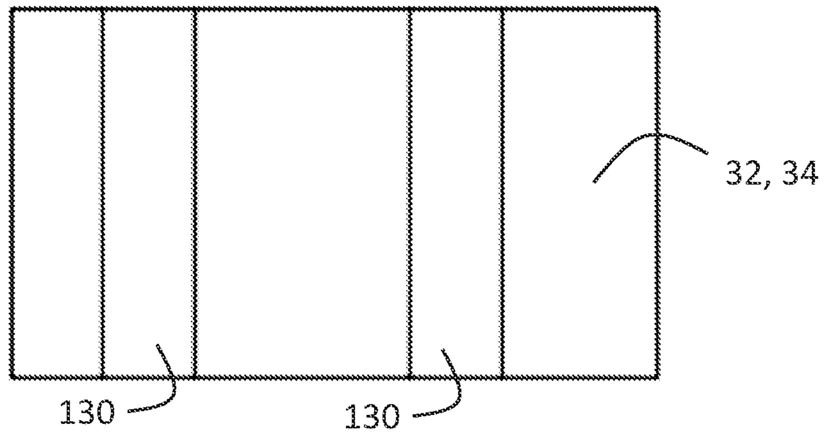
Figure 22D:
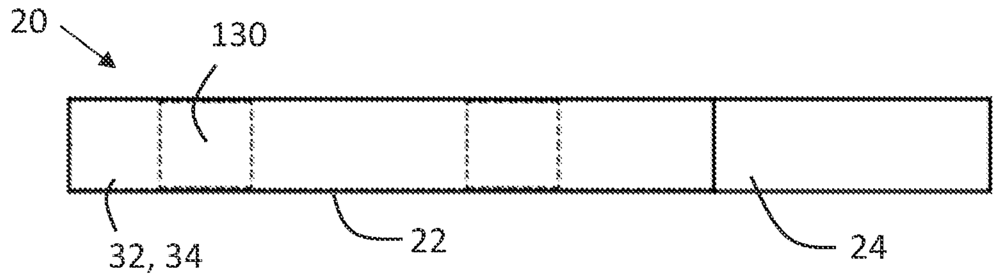

Reference is now made to FIGS. 22A, 22B, 22C and 22D, which are schematic illustrations of a covering material of capsule 20 (e.g., paper covering 34 and/or heating element 32), the covering material including an inner lining 130, in accordance with some applications of the present invention. Typically, the inner lining is flexible and is configured to diffuse heat that is generated by the heating element. For example, the inner lining may include polyimide. Typically, the inner lining acts as a barrier between the heating element and the smoking material, such that if heat isn't evenly generated across the heating element and/or if there are hotspots, the inner lining diffuses the heat across the smoking material. For some applications, the inner lining extends along a length of the capsule within which the smoking material is disposed, e.g., as shown in FIGS. 22A-B. For some applications, the inner lining is configured to add to the mechanical strength of the capsule, for example to prevent the capsule from tearing as a result of mechanical pressure that is applied to the capsule by electrodes 30. For some such applications, the inner lining is disposed at regions of the capsule that are configured to be compressed by the electrodes, as shown in FIGS. 22C-D.

For some applications, the inner lining is configured to diffuse one or more chemicals, such as flavoring, pharmaceuticals, and/or a vapor-generating chemical, such as glycerol. For some applications, the inner lining includes a phase-change material that is configured to prevent the temperature of the smoking material from exceeding the phase-change temperature of the phase-change material. Typically, the phase-change material is selected such as to prevent the temperature of the smoking material from exceeding a temperature at which the smoking material pyrolyzes. For some applications, the phase-change material is selected such as to maintain the temperature of the smoking material within an optimal range for vaporization and/or taste. For some applications the inner lining is configured to absorb chemicals that are generated by pyrolysis of the smoking material and/or other material within the capsule, such as nitric oxide and/or carbon monoxide.

Figure 23A:
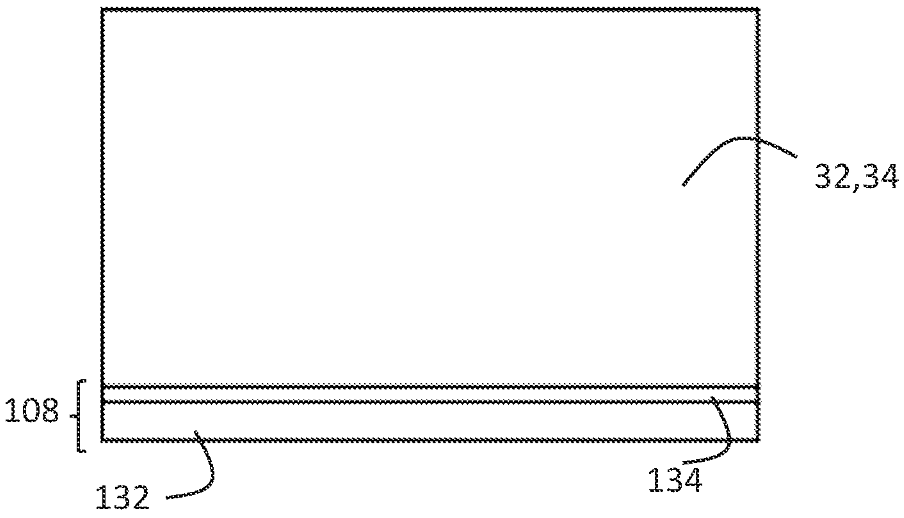
FIGS. 23A, 23B, 23C, 23D, 23E, and 23F are schematic illustrations of a covering material of a capsule that includes adhesive and/or additional material at a band of overlap of the covering material, in accordance with some applications of the present invention.
Figure 23B:
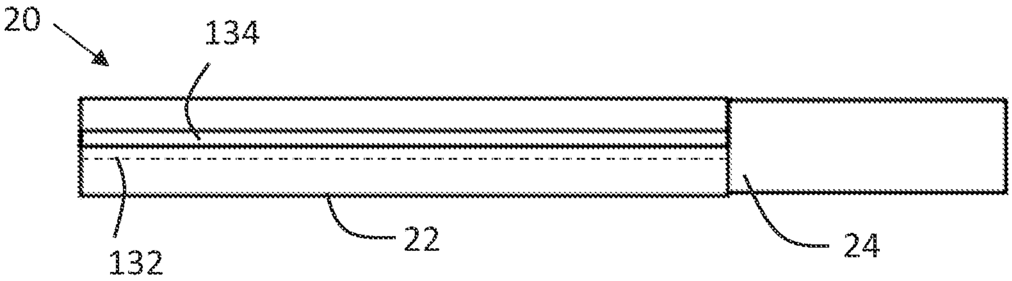
Figure 23C:
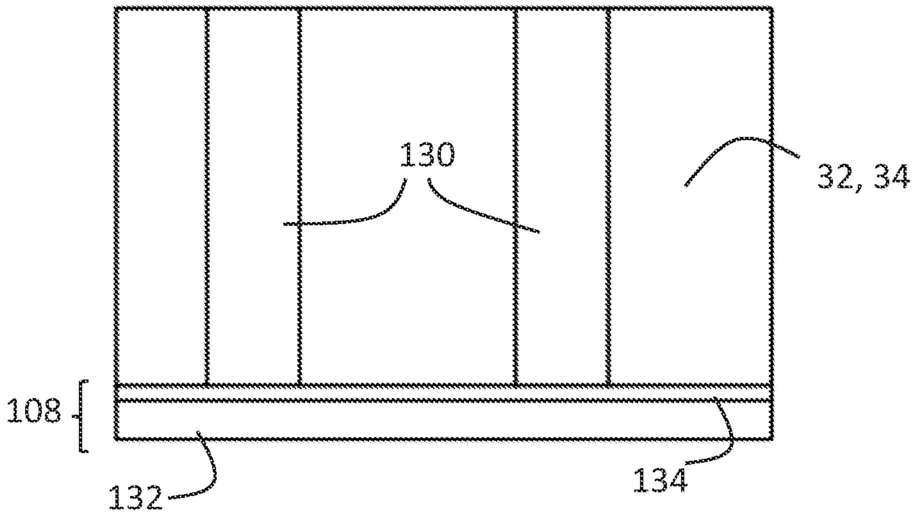
Figure 23D:
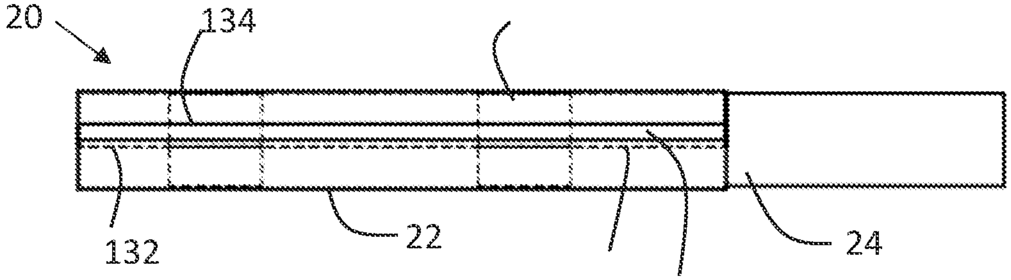

Reference is now made to FIGS. 23A, 23B, 23C, and 23D, which are schematic illustrations of a covering material of capsule 20 (e.g., paper covering 34 and/or heating element 32), the covering material including adhesive 132 and/or additional material at band 108 of overlap of the covering material, in accordance with some applications of the present invention. For some applications, the covering material is adhered to itself at the band of overlap in order to form a cylindrical shape that encases the smoking material (and/or additional elements, as described herein). For example, the adhesive may be liquid adhesive and/or double-sided adhesive. For some applications, the covering material is treated at the band of overlap in order to adhere it to itself (e.g., a UV treatment, or welding). For some applications, the covering material is treated so as to form a cylindrical shape even without having a band of overlap, e.g., via extrusion. For some applications, at least a portion of the covering material includes inner lining 130 as shown in FIGS. 23C and 23D, with the inner lining typically being as described above.

For some applications, at the band of overlap, the metallic foil and/or other conducting elements (e.g., conductive coatings) may be doubled, which can generate hotspots. For some applications, in order to prevent this, an adhesive is used that is an electrical insulator, such that the electrodes only apply current to the outer layer of the conducting elements, but the inner layer is electrically isolated from the electrodes. For some applications, an additional insulating material 134 (e.g., liquid polyimide) is added along at least a portion of the band of overlap.

Figure 23E:
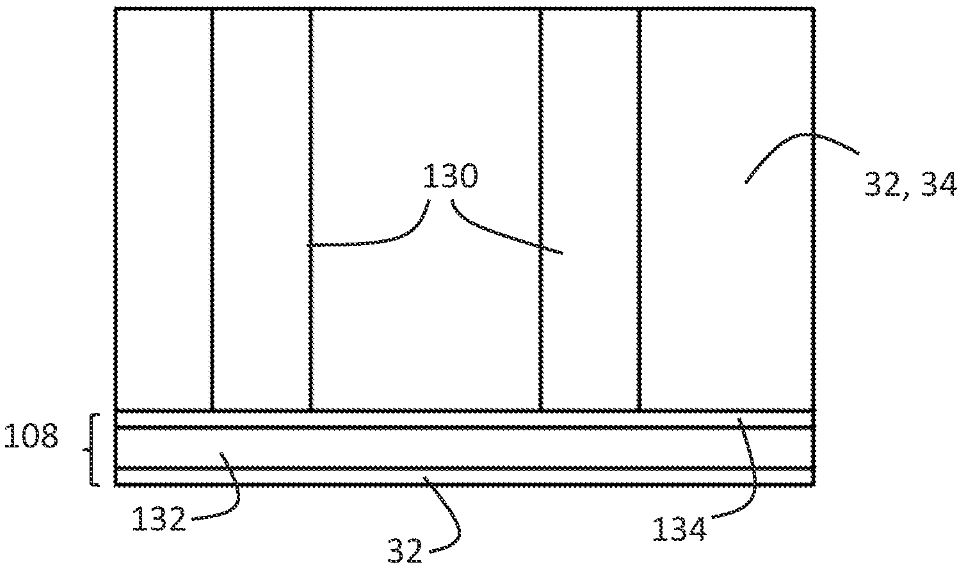
Figure 23F:
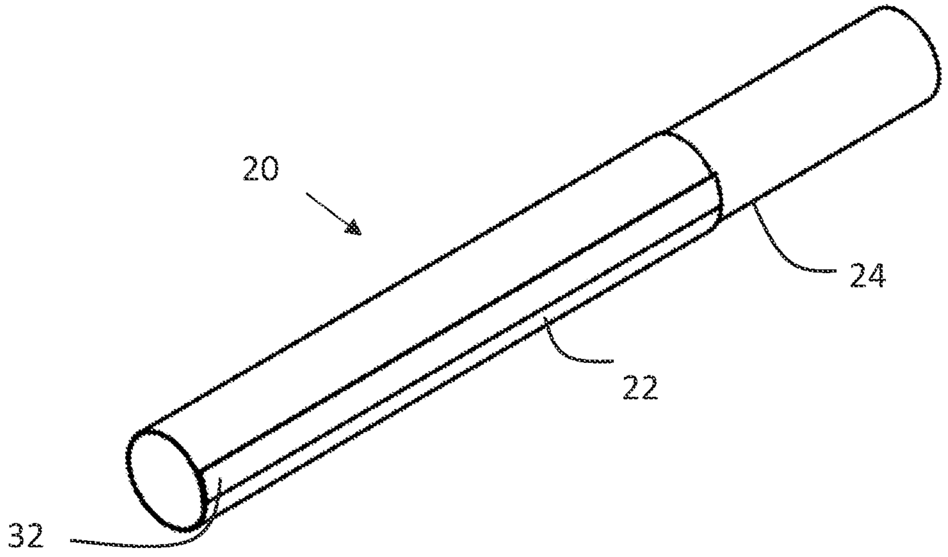

Reference is now made to FIGS. 23E and 23F, which are schematic illustrations of a covering material of capsule 20 (e.g., paper covering 34 and/or heating element 32), the covering material including adhesive 132 and/or additional material at band 108 of overlap of the covering material, in accordance with some applications of the present invention. The configuration of the covering material shown in FIGS. 23E-F is generally similar to that shown in FIGS. 23C-D, except that in the configuration shown in FIGS. 23E-F, there is a small band of heating element 32 (i.e., the metallic foil) which is configured to overlap with an inner layer of the heating element, when the covering material is made to overlap with itself such as to form a cylindrical shape. By being configured in this manner, even if one of the electrode pairs of the smoking device coincides with band 108 of overlap of the covering material, the electrodes still pass a current into the metallic foil at that circumferential location. Typically, in such cases, the electrode pair will drive the current into the outer layer of the metallic foil, which will then transfer the current to the inner layer of the metallic foil.

Figure 24A:
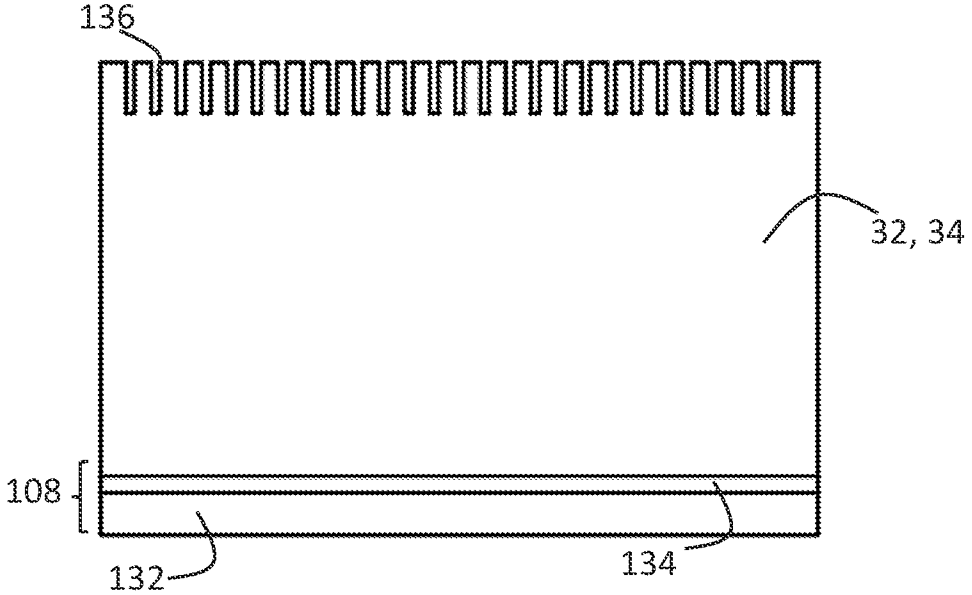
FIGS. 24A and 24B are schematic illustrations of a covering material of a capsule with slits formed in conducting elements at a band of overlap of the covering material, in accordance with some applications of the present invention.
Figure 24B:
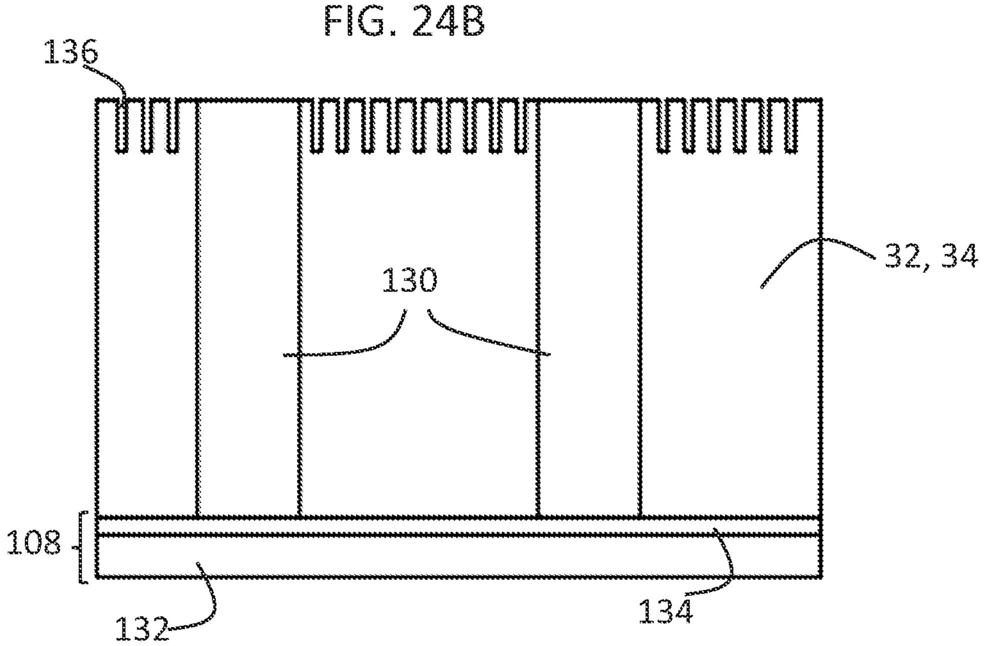

Reference is now made to FIGS. 24A and 24B, which are schematic illustrations of a covering material of capsule 20 (e.g., paper covering 34 and/or heating element 32), one or more slits 136 being formed in conducting elements (e.g., heating element 32) at band 108 of overlap of the covering material, in accordance with some applications of the present invention. For some applications, at the band of overlap, the metallic foil that typically comprises the heating element and/or other conducting elements (e.g., conductive coatings) may be doubled, which can generate hotspots. For some applications, along at least a portion of the band of overlap, slits 136 are made in the conducting elements in the circumferential direction, in order to increase resistance along the portion of the band of overlap. For some applications, at least a portion of the covering material includes inner lining 130 as shown in FIG. 24B, with the inner lining typically being as described above.

Referring again to FIGS. 19A-24B (which describe various outer coatings, inner linings, and apparatus and methods for forming a cylindrically-shaped capsule), it is noted that the scope of the present disclosure includes any one of the following capsule designs. In some applications, paper covering 34 covers at least a portion of the capsule. In some applications, the paper covering is adhered to itself along a band of overlap, such as to form a cylindrical shape, thereby making the capsule airtight (and thereby ensuring airflow in the axial direction of the cylindrical capsule).

For some applications, metallic foil (acting as heating element 32) is adhered to the inside of the paper covering. For some applications, the metallic foil overlaps with itself, as described hereinabove. For some applications, the extent of overlap of the paper covering and that of the metallic foil are not the same as each other. For some applications, the metallic foil does not overlap with itself at all. Typically, for such applications, the metallic foil still encompasses the full circumference of the capsule, by the two sides of the metallic foil contacting each other (but without overlapping with each other), such that a uniform resistance is provided by the metallic foil around the circumference of the capsule. For some such applications, the metallic foil is adhered to only a portion of the circumference of the paper covering, such that the paper covering overlaps with itself but the metallic foil does not (e.g., as shown in FIG. 19A). Typically, even in such cases, the paper covering is adhered to itself along the band of overlap, such as to form a cylindrical shape, thereby making the capsule airtight. For some applications, an inner lining (e.g., a strip of polyimide running along the length of portion 22 of the capsule) is used to hold the two sides of the metallic foil in place and to seal the capsule and make the airtight. For some applications, an inner lining is disposed along portions of the capsule at which the electrodes contact the metallic foil, in order to seal the capsule at these portions. For some applications, there is overlap between outer coatings or cover (e.g., the paper covering) and an inner lining, in order to ensure that the capsule is fully sealed.

Figure 25A:
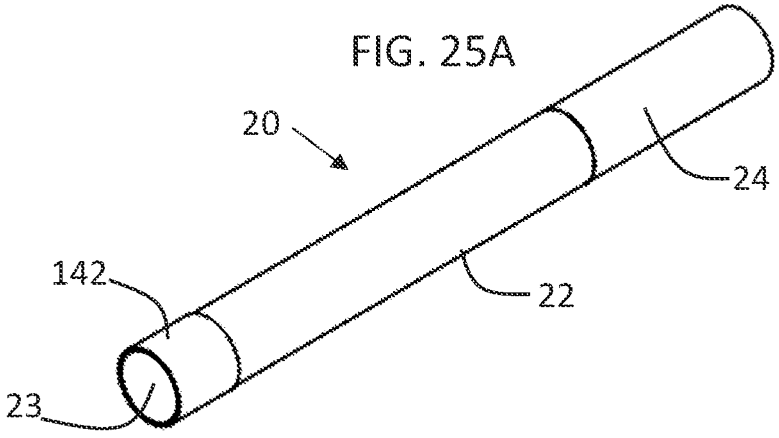
FIGS. 25A, 25B, and 25C are schematic illustrations of a capsule that includes one or more identifying features, in accordance with some applications of the present invention.
Figure 25B:
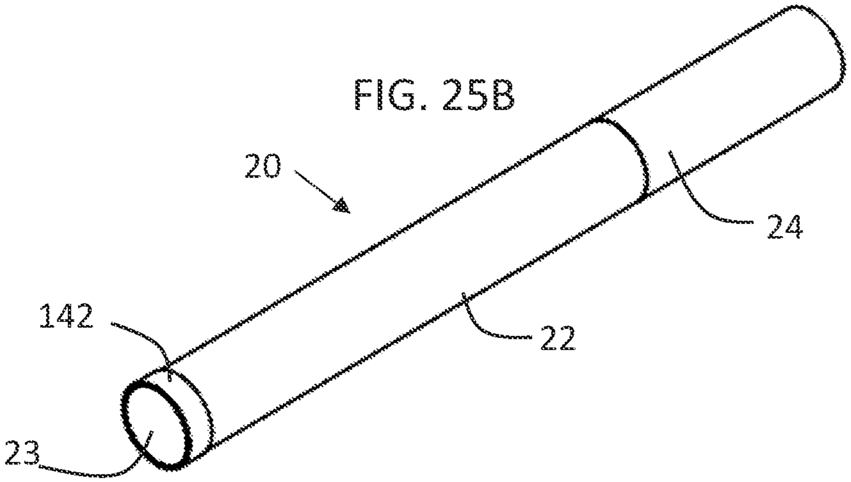
Figure 25C:
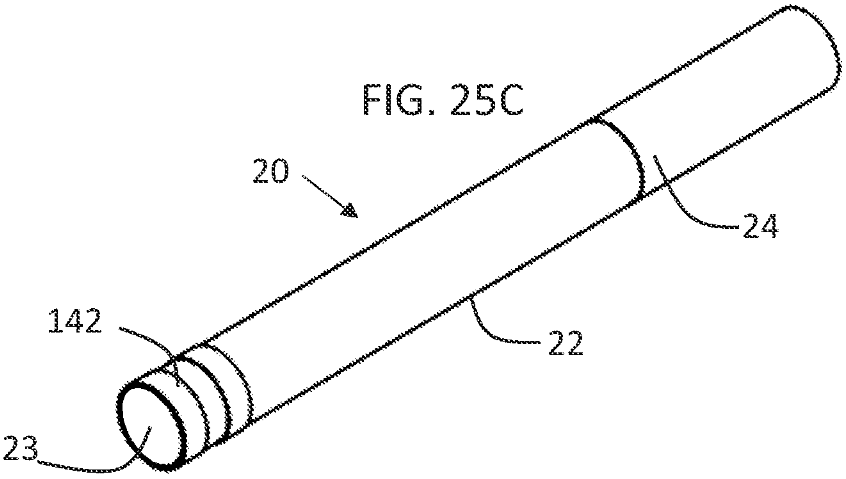

Reference is now made to FIGS. 25A, 25B, and 25C, which are schematic illustrations of capsule 20, the capsule including one or more identifying features 142, in accordance with some applications of the present invention. For some applications, smoking device 200 is configured to identify which type of capsule has been inserted and to operate in response to the type of capsule, for example, by heating the capsule to the vaporization temperature of the smoking material or according to a temperature profile that is suitable for the smoking material, controlling the amount of active agents that is vaporized, providing an output to the user regarding the category of capsule, etc. For some applications the identifying feature is a colored marking and the smoking device is configured to detect the color of the marking when the capsule is placed in the smoking device and/or during insertion of the capsule in the smoking device. For some applications, the identifying feature is a barcode, QR code, and/or a different type of patterned marking. For some applications, the identifying feature is a portion of the capsule that is configured to emit thermal radiation as the capsule is being heated. Typically, the smoking device includes an optical camera (e.g., a black-and-white camera) and/or a thermal camera that is configured to identify the aforementioned features. For some applications, the identifying feature is the resistance or a profile of resistance of the capsule. For example, the paper covering and/or a different insulating material may cover the metallic foil in a manner that defines a pattern of resistance that is identified by the smoking device. For some applications, the smoking device includes a sensor (such as an NFC antenna) that is configured to identify a package of capsules from which the capsule is sourced.

It is noted that although some applications of the present disclosure are described as being applied to a capsule that is provided to a user in a flattened configuration and/or is flattened by the smoking device, the scope of the present disclosure includes applying any one of the features of capsule 20 that are described herein to a cylindrical capsule that is configured to remain cylindrical even upon being inserted into the smoking device, mutatis mutandis. For example, any one of the features described with respect to the structure of the capsule, components of the capsule, coverings of the capsule, inner linings of the capsule, identifying features of the capsule, etc., are applicable to a cylindrical capsule that is configured to remain cylindrical even upon being inserted into the smoking device, mutatis mutandis.

Figure 26:
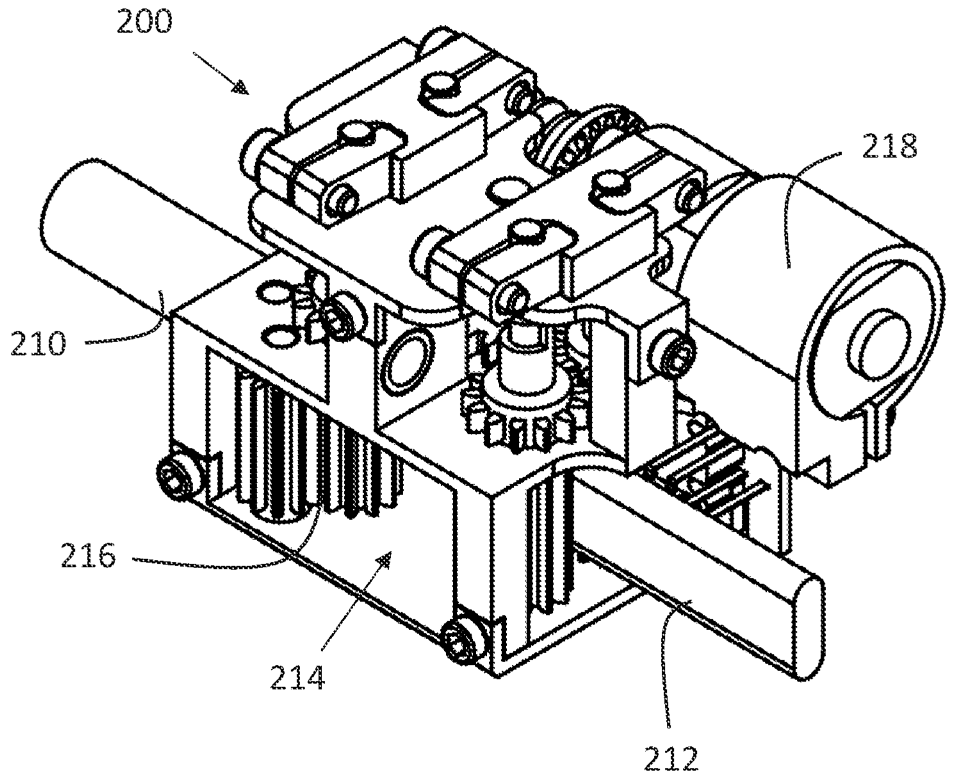
FIG. 26 is a schematic illustration of a smoking device with its cover removed (for illustrative purposes), in accordance with some applications of the present invention.

Reference is again made to FIGS. 1C and 1D, which show smoking device 200, which is configured for use with capsule 20. Reference is also made to FIG. 26, which is a schematic illustration of smoking device 200 with its cover removed (for illustrative purposes), in accordance with some applications of the present invention. Typically, the smoking device includes a button 204 and an indicator light 206 (shown in FIGS. 1C and 1D), e.g., an LED light. For some applications, the smoking device includes additional user interface components, e.g., a vibrating component. Typically, the smoking device includes a power source 237, e.g., one or more batteries (shown in FIGS. 29C and 29D), which are typically rechargeable via a charging port that is built into the device. Typically, the smoking device includes a control component 233 (e.g., a microprocessor and/or a microchip, shown in FIGS. 29C and 29D) that is configured to control heating of the capsule, identify the capsule, detect insertion of the capsule, detect puffs of the user (and/or lengths and/or depths of puffs), detect the temperature of the smoking material, and control heating of the smoking material in response thereto, as described in detail hereinabove. For some applications, the smoking device includes one or more sensors, such as an infrared temperature sensor, a thermal camera, a temperature sensor (such as a contact temperature sensor that measures the temperature of the smoking material by contacting the smoking material), and/or thermocouple sensor. For some applications, the smoking device is configured to detect electrical resistance of the capsule.

As described hereinabove, for some applications, the smoking device includes a plurality of temperature sensors, e.g., a plurality of infrared temperature sensors. For some applications, the smoking device is configured to detect puffs, lengths of puffs, and/or depths of puffs of the user and to control the heating of the smoking material or perform other functions responsively thereto. For some applications, the smoking device is configured to identify the capsule and to perform function responsively thereto. For some applications, the smoking device includes a sensor configured to detect patterns or colors, an optical camera (e.g., a black-and-white camera), a thermal camera, a sensor configured to detect resistance or conduction of given portions of the capsule. For some applications, the smoking device includes s sensor (such as an NFC antenna) that is configured to identify a package of capsules from which the capsule has been taken.

In accordance with respective applications, the smoking device is configured to flatten capsule 20, or is not configured to change the shape of capsule 20. For some applications, the smoking device is configured to heat the capsule via electrical resistive heating. Alternatively or additionally, the smoking device is configured to heat the capsule via magnetic induction heating. FIG. 26 shows an example of smoking device that is configured to flatten capsules. As shown, the capsule is configured to be inserted via a cylindrical insertion port 210, but portion 22 of the capsule (or a portion thereof) is housed within a non-cylindrical housing 212 (e.g., a housing having an elliptical, rectangular, pill-shaped, or racetrack-shaped cross-sectional shape) during heating of the smoking material, as described hereinabove. For some applications, the smoking device includes one or more mechanical elements 214 (e.g., gear wheels 216 and a motor 218, as shown) that are configured flatten the capsule. For some applications, the mechanical elements are configured to flatten the capsule by applying mechanical pressure to the sides of the capsule while the capsule is stationary. For some applications, the mechanical elements are configured to flatten the capsule by applying mechanical pressure to the sides of the capsule as the capsule moves from insertion port 210 into housing 212. For some applications, the smoking device includes a funnel, and is configured to flatten the capsule by passing the capsule through the funnel as the capsule moves from insertion port 210 into housing 212.

Figure 27A:
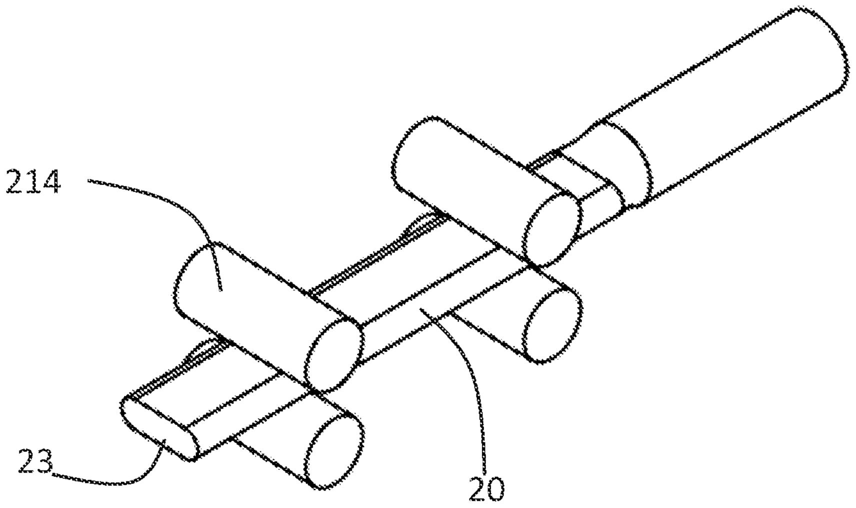
FIGS. 27A, 27B, 27C, 27D, 27E, and 27F are schematic illustrations of mechanical elements for flattening a portion of a capsule, in accordance with some applications of the present invention.
Figure 27B:
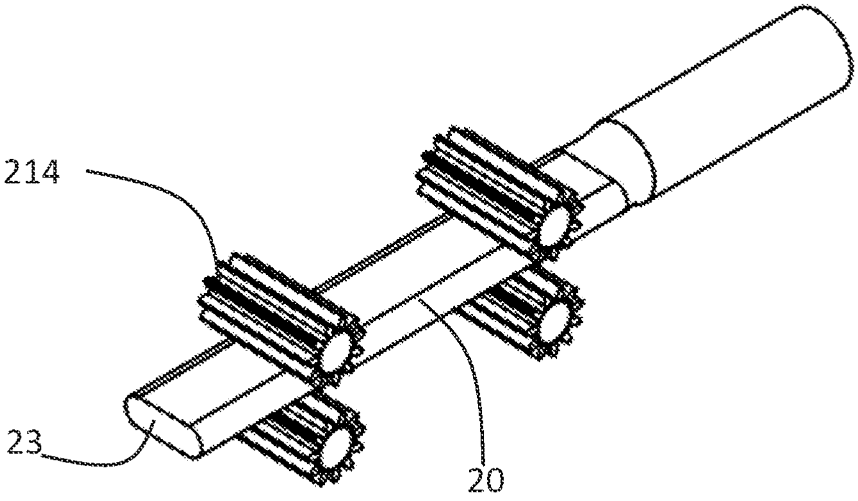
Figure 27C:
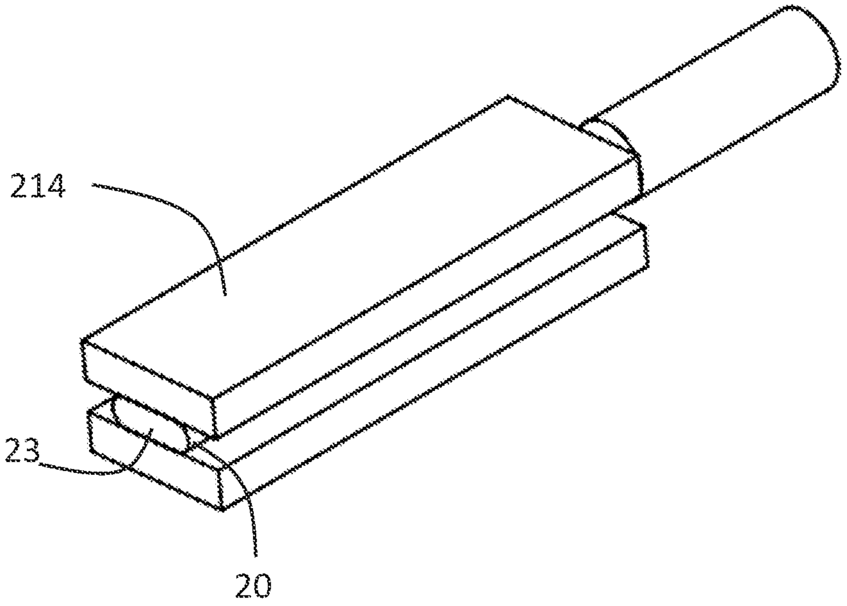
Figure 27D:
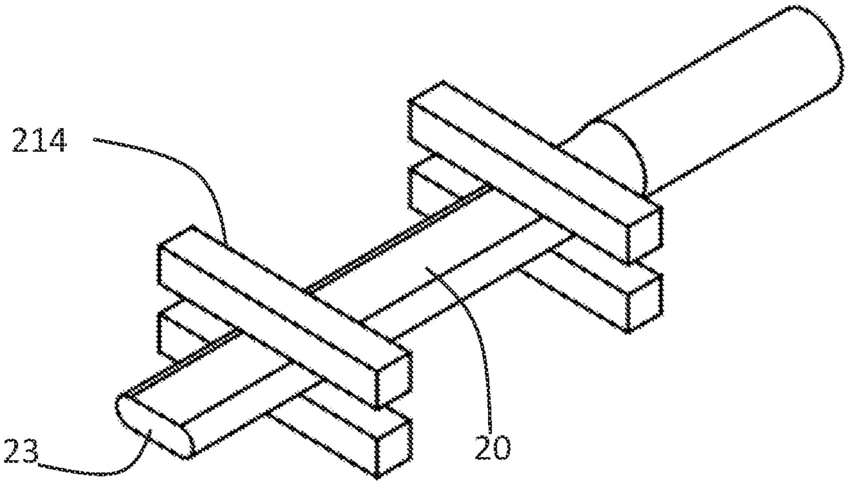
Figure 27E:
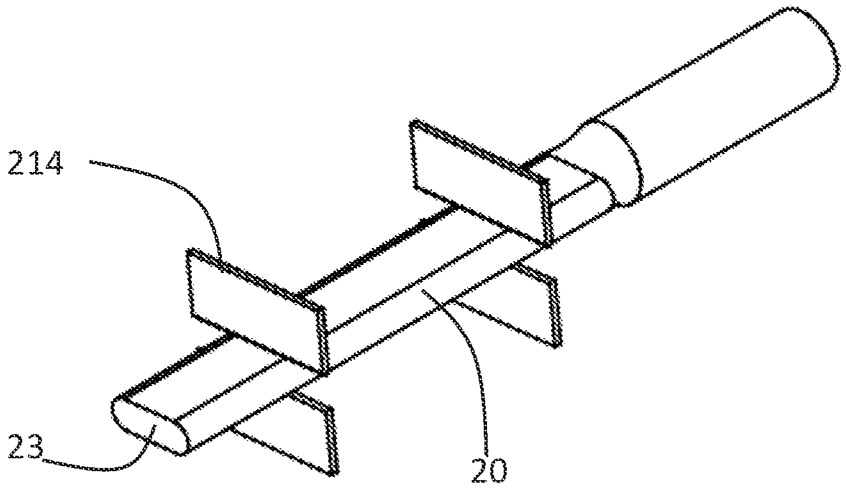

Reference is now made to FIGS. 27A, 27B, 27C, 27D, 27E, and 27F, which are schematic illustrations of mechanical elements 214 for flattening a portion of capsule 20, in accordance with some applications of the present invention. In accordance with respective embodiments, the mechanical elements may include one or more of wheels (FIG. 27A), gear wheels (27B), plates that are configured to apply even mechanical pressure along at least part of portion 22 of the capsule (FIG. 27C), cuboid elements that are configured to apply even mechanical pressure at discrete locations along of portion 22 of the capsule (FIG. 27D), and/or blade like elements (FIG. 27E). For some applications, the mechanical elements also function as electrodes and heat the smoking material via resistive heating of a heating element inside the capsule, as described in detail hereinabove. Thus, the electrodes serve a dual function of heating the smoking material via resistive heating of a heating element inside the capsule and of flattening a portion of the capsule via mechanical pressure.

For some applications, an area of contact between mechanical elements 214 and the capsule is minimized in order to reduce the loss of thermal energy from the capsule via this contact area. For some applications, thermally-insulating material is disposed between the mechanical elements and the capsule over at least a portion of the area of contact, in order to reduce the loss of thermal energy from the capsule via this contact.

Figure 27F:
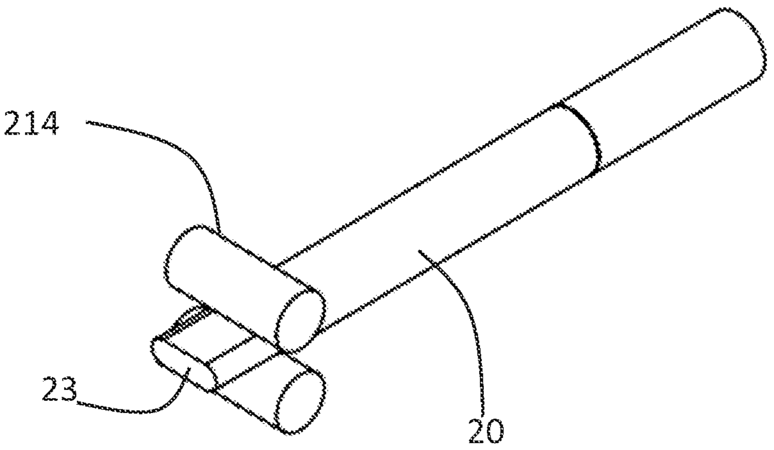

For some applications, mechanical elements (such as roller wheels, as shown in FIG. 27F) are used to flatten at least a part of portion 22 of the capsule, by rolling over the capsule as the capsule is being inserted into the smoking device. For some applications, the roller wheels assist in the axial insertion of the capsule.

Figure 28:
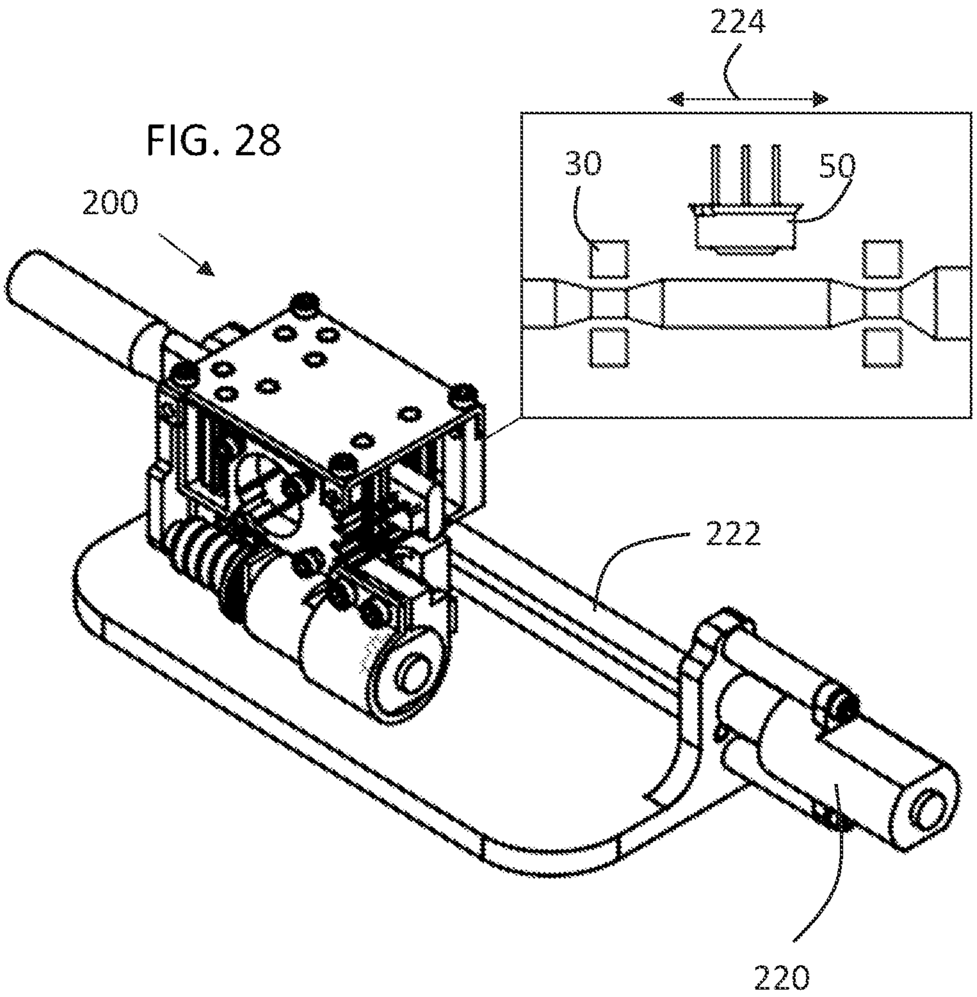
FIG. 28 is a schematic illustration of a smoking device that includes electrodes and/or mechanical elements that are configured to move axially relative to a capsule, in accordance with some applications of the present invention.

Reference is now made to FIG. 28, which is a schematic illustration of smoking device 200, the smoking device including electrodes 30 and/or mechanical elements 214 that are configured to move axially relative to capsule 20, in accordance with some applications of the present invention. For some applications, the smoking device includes a motor 220 which is configured to slide electrodes 30 and/or mechanical elements axially along a rail 222 relative to capsule 20. For some applications, the mechanical elements 214 flatten the capsule as they move over the capsule. For some applications, as the electrodes move, sensor 50 is moved with them, as indicated by arrow 224. The scope of the present disclosure includes electrodes that are configured to move axially relative to the capsule (e.g., using a generally similar mechanism to that shown in FIG. 28), one or more sensors that are configured to move configured to move axially relative to the capsule (e.g., using a generally similar mechanism to that shown in FIG. 28), or both one or more sensors and electrodes that are configured to move axially relative to the capsule (e.g., using a generally similar mechanism to that shown in FIG. 28). For some applications, the one or more sensors and electrodes are configured to move axially relative to the capsule together with each other (e.g., using a generally similar mechanism to that shown in FIG. 28).

Figure 29A:
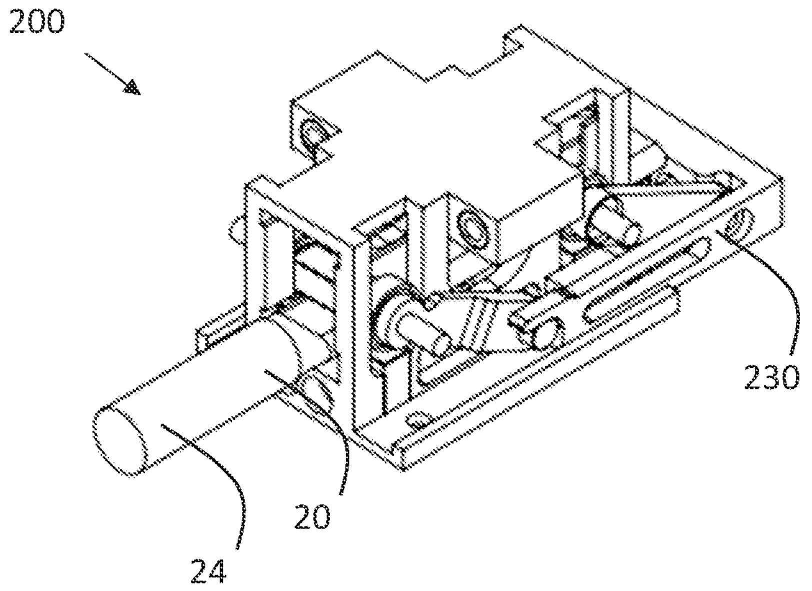
FIGS. 29A and 29B are schematic illustrations of a smoking device that includes a mechanism that is configured to bring electrodes and/or mechanical elements into pressurized contact with a capsule, in accordance with some applications of the present invention.
Figure 29B:
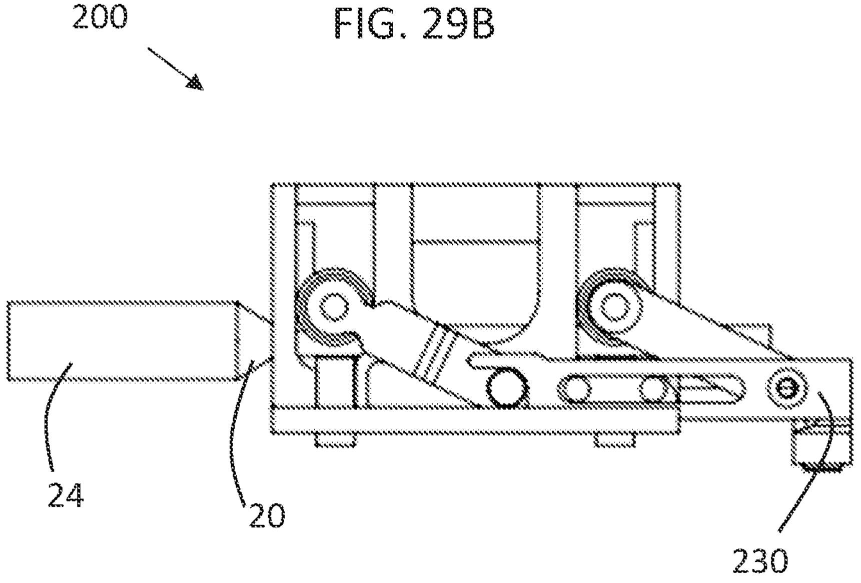

Reference is now made to FIGS. 29A and 29B, which are schematic illustrations of smoking device 200, the smoking device including a mechanism 230 that is configured to bring electrodes 30 and/or mechanical elements 214 into pressurized contact with capsule 20, in accordance with some applications of the present invention. For some applications, the mechanism is configured to bring electrodes 30 into pressurized contact with capsule 20, in order to enhance electrical contact between the electrodes and the heating element of the capsule. Alternatively or additionally, mechanism 230 is configured to bring mechanical elements 214 into pressurized contact with capsule 20 in order to flatten a portion of the capsule. As noted above, for some applications, the electrodes function as the mechanical elements.

Figure 29C:
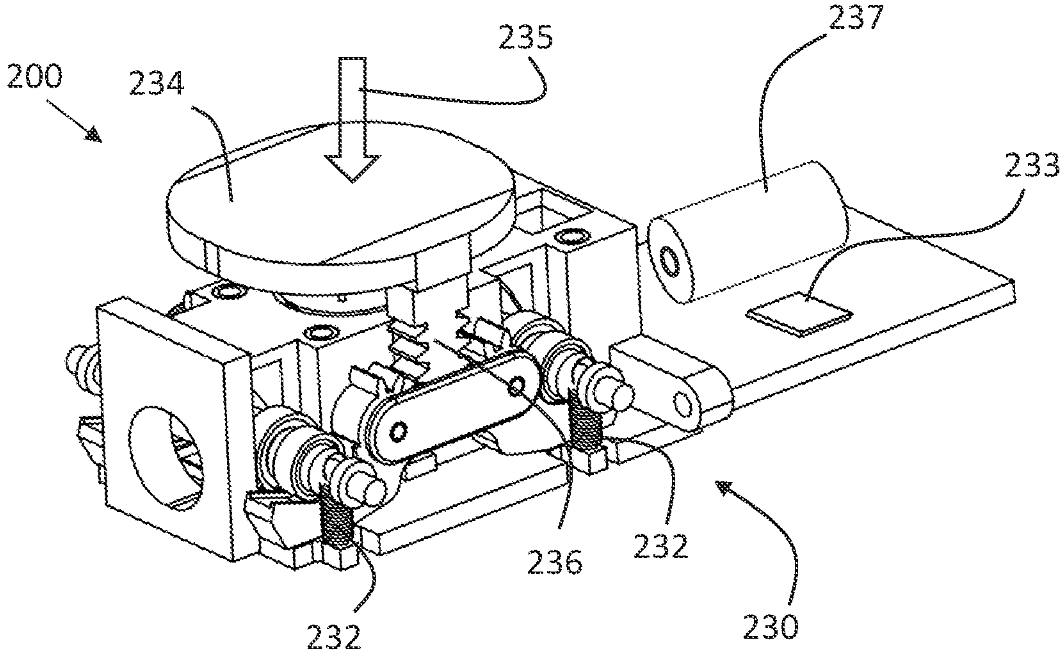
FIGS. 29C and 29D are schematic illustrations of a smoking device that includes a mechanism that is configured to bring electrodes and/or mechanical elements into pressurized contact with a capsule, in accordance with some further applications of the present invention.
Figure 29D:
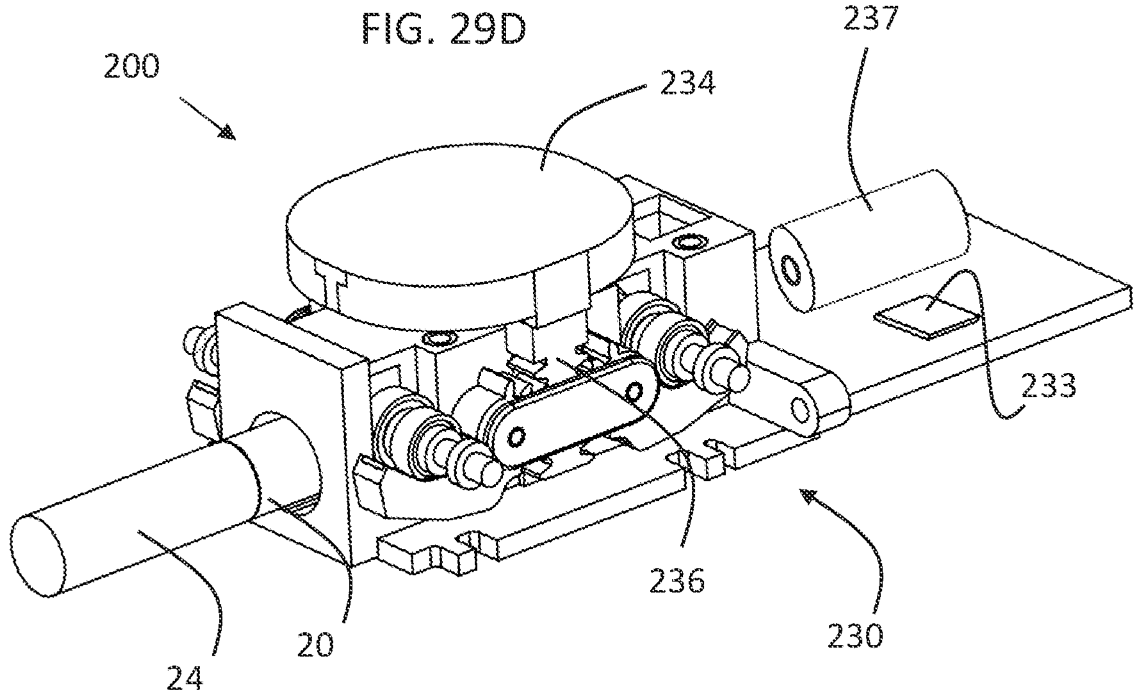

Reference is now made to FIGS. 29C and 29D, which are schematic illustrations of smoking device 200, the smoking device including a mechanism 230 that is configured to bring electrodes 30 and/or mechanical elements 214 into pressurized contact with capsule 20, in accordance with some applications of the present invention. For some applications, the mechanism is configured to bring electrodes 30 into pressurized contact with capsule 20, in order to enhance electrical contact between the electrodes and the heating element of the capsule. Alternatively or additionally, mechanism 230 is configured to bring mechanical elements 214 into pressurized contact with capsule 20 in order to flatten a portion of the capsule. As noted above, for some applications, the electrodes function as the mechanical elements. For some applications, mechanism 230 includes one or more compression springs 232 that are configured to generate a counterforce in response to being compressed. For some such applications, smoking device 200 includes a button 234 that is coupled to a gear track 236. Typically, the smoking device is configured such that insertion of capsule 20 requires button 234 to be pressed (as indicated by arrow 235 in FIG. 29C). Further typically, the pressing of the button causes compression of the compression springs, such that upon release of the button, the compression springs bring the electrodes into pressurized contact with the capsule (i.e., the configuration shown in FIG. 29D). It is noted that the compression springs are not visible in FIG. 29D.

Typically, the smoking device includes a control component 233 (e.g., a control chip and/or a control microprocessor) and a power source 237 (e.g., one or more batteries), both of which are shown in FIGS. 29C and 29D. For some applications, the one or more batteries are chargeable and the smoking device includes a charging port for charging the one or more batteries.

Figure 30A:
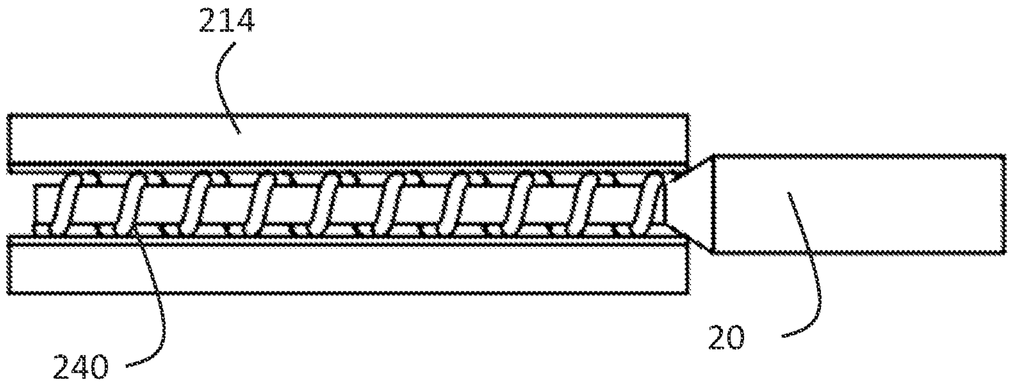
FIGS. 30A and 30B are schematic illustrations of a coil of a smoking device that is configured to be flattened by mechanical elements, in accordance with some applications of the present invention.
Figure 30B:
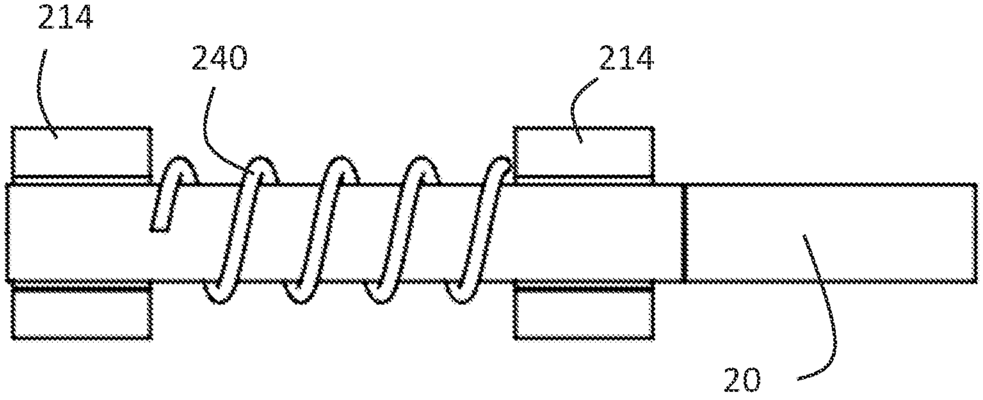

Reference is now made to FIGS. 30A and 30B, which are schematic illustrations of a coil 240 of smoking device 200 that is configured to be flattened by mechanical elements 214, in accordance with some applications of the present invention. As described hereinabove, for some applications, smoking device 200 includes a coil that is configured to generate an electromagnetic field. The coil is configured to heat one or more magnetically-heated materials (i.e., materials that are susceptible to being heated by a magnetic field (such as, magnetic materials and/or ferromagnetic materials)) within the capsule via magnetic induction. Typically, the control component of the smoking device drives an electric current through the coil in order to generate the magnetic field. In accordance with some applications, the magnetically-heated material is configured as a magnetically-heated rod 42 that is disposed along the length of the capsule (as shown in FIG. 7A), a magnetically-heated strip 44 that is disposed along the length of the capsule (as shown in FIG. 7B), a magnetically-heated tube 46 that is disposed along the length of the capsule (shown in FIG. 7C), and/or a plurality of magnetically-heated particles 48 (e.g., balls or beads) that are dispersed within the smoking material (as shown in FIG. 7D). Alternatively or additionally, a magnetically-heated material is disposed around the smoking material (e.g., underneath a paper covering), in a similar manner to that described with reference to the metallic foil that is heated via electrical resistive heating.

For some such applications, coil 240 has a circular cross section, and the coil is flattened by the mechanical elements 214 together with a portion of the capsule, subsequent to the portion of the capsule having been placed within the coil, as shown in FIG. 30A-B. The circular-cross-section of the coil typically facilitates easy insertion of the capsule to within the coil, while the flattened configuration of the capsule (and the coil) during heating of the smoking material facilitates the heating of the smoking material. For some applications, the flattened configuration of the capsule during heating of the smoking material facilitates the heating of the smoking material by reducing the distance between the magnetically-heated particles and the smoking material, as described hereinabove. For some applications, the flattened configuration of the coil facilitates the heating of the smoking material by reducing the cross-sectional area of the coil, thereby increasing the magnetic flux density through the coil relative to a coil that has a larger cross-section at a similar electrical current.

For some applications, coil 240 is integrated into a sleeve or tube within smoking device 200. Alternatively or additionally, the coil includes an inner and/or an outer lining (e.g., a polyimide inner and/or outer coating).

Figure 31A:
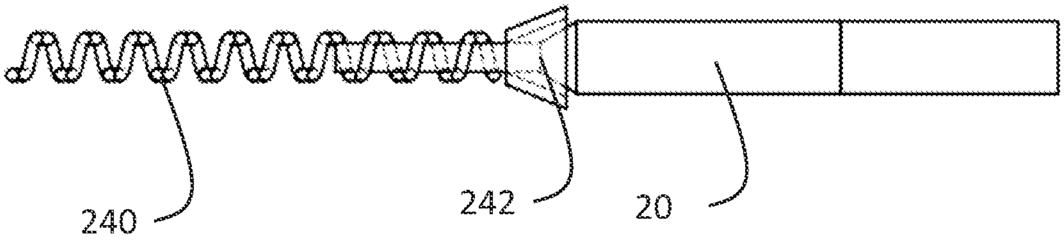
FIGS. 31A, 31B, 31C, and 31D are schematic illustrations of a coil of a smoking device that is pre-shaped in a flattened configuration, in accordance with some applications of the present invention.
Figure 31B:
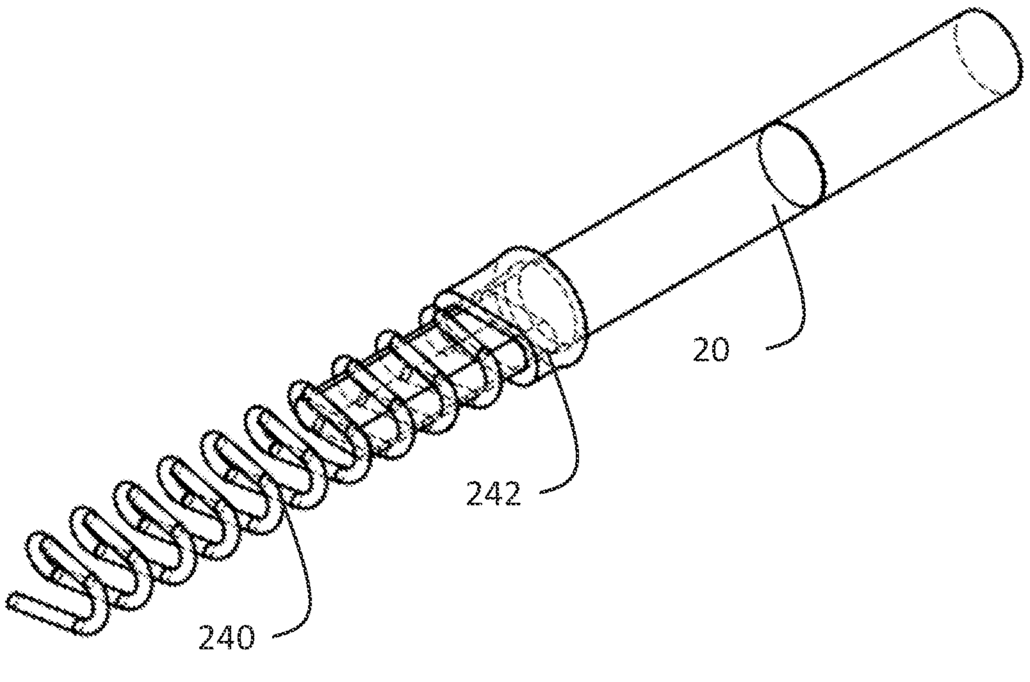
Figure 31C:
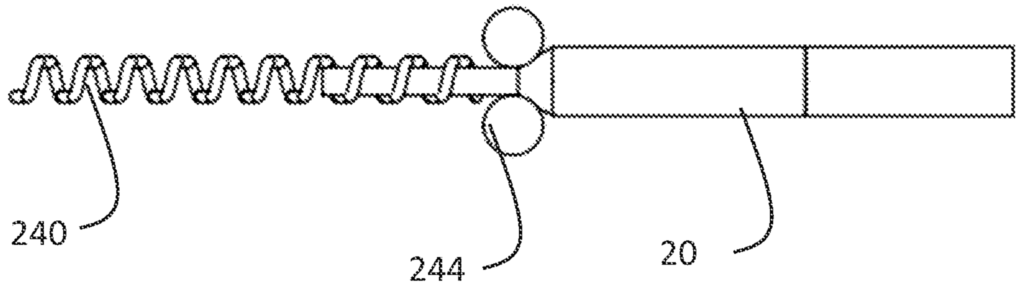
Figure 31D:
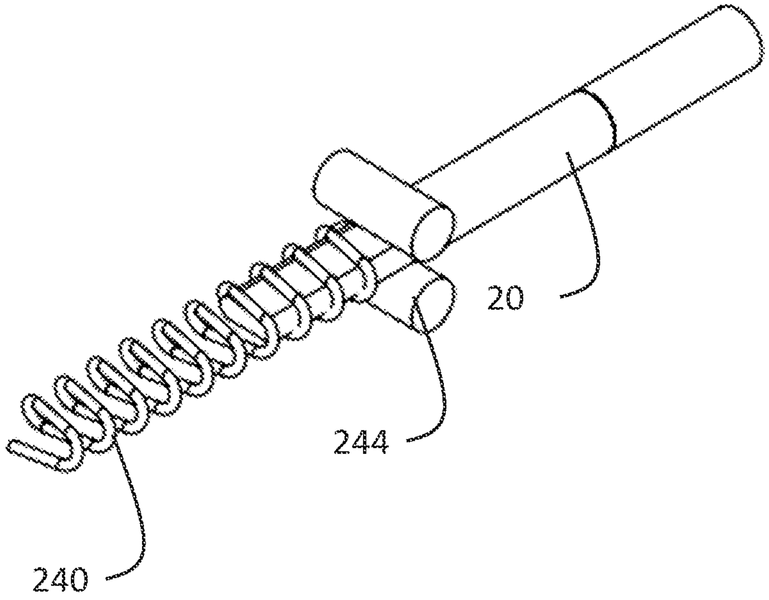

Reference is now made to FIGS. 31A, 31B, 31C, and 31D which are schematic illustrations of coil 240 of smoking device 200 that is pre-shaped in a flattened configuration (i.e., such that it is in the flattened configuration even in the absence of mechanical force acting on the coil), in accordance with some applications of the present invention. For some applications, a portion of the capsule is flattened as it is being inserted into the coil. For example, the portion of the capsule may be flattened via a funnel 242 (as shown in FIGS. 31A-B), and or by roller wheels 244 (as shown in FIGS. 31C-D). As described with reference to FIGS. 30A-B, for some applications, the flattened configuration of the capsule during heating of the smoking material facilitates the heating of the smoking material by reducing the distance between the magnetically-heated particles and the smoking material. For some applications, the flattened configuration of the coil facilitates the heating of the smoking material by reducing the cross-sectional area of the coil, thereby increasing the magnetic flux density through the coil relative to a coil that has a larger cross-section at a similar electrical current.

Figure 32A:
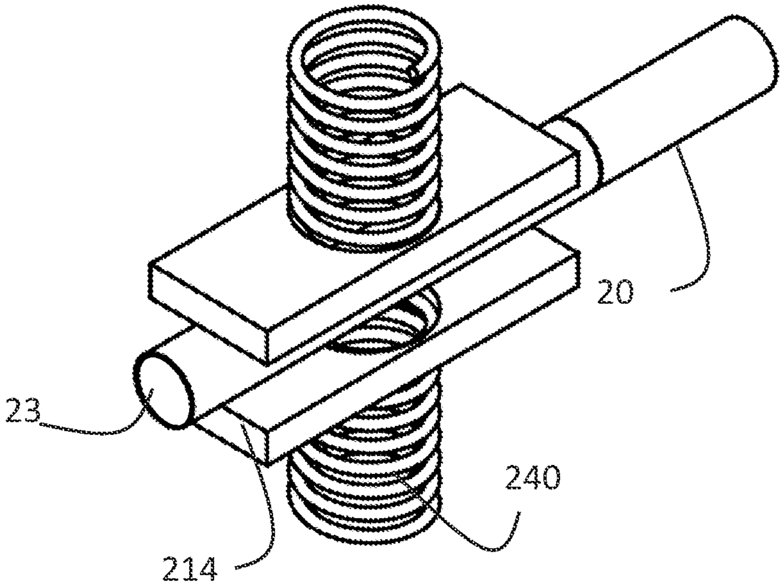
FIGS. 32A and 32B are schematic illustrations of a coil of a smoking device, in accordance with some applications of the present invention.
Figure 32B:
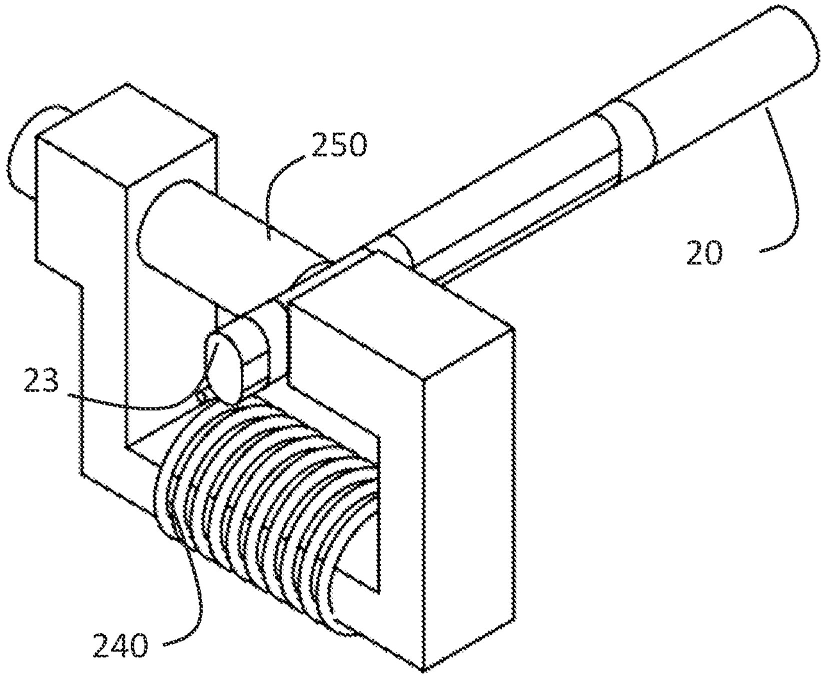

Reference is now made to FIGS. 32A and 32B, which are schematic illustrations of coil 240 of smoking device 200, in accordance with some applications of the present invention. For some applications, the capsule is not inserted into coil 240. For example, the axis of the coil may be perpendicular to the axis of the capsule and intersect the axis of the capsule (as shown in FIG. 32A), or the axis of the coil may be perpendicular with the axis of the capsule and not intersect the axis of the capsule (as shown in FIG. 32B). For some applications a material 250 with high magnetic permeability directs the magnetic field to the capsule, as shown in FIG. 32B. For some applications, material 250 is shaped in to define a magnetic circuit, with the capsule being inserted into a gap in the circuit. For some such applications, material 250 is configured to apply mechanical pressure to at least a portion of the capsule, thereby flattening the portion capsule, as shown in FIG. 32B. For some applications, the flattened configuration of the capsule during heating of the smoking material facilitates the heating of the smoking material by reducing the distance between the magnetically-heated particles and the smoking material, as described hereinabove. For some applications, by flattening the capsule, the gap in the magnetic circuit defined by material 250 is reduced, thereby increasing the magnetic permeability of the magnetic circuit and increasing magnetic flux through the capsule, relative to if the gap was larger.

Figure 33:
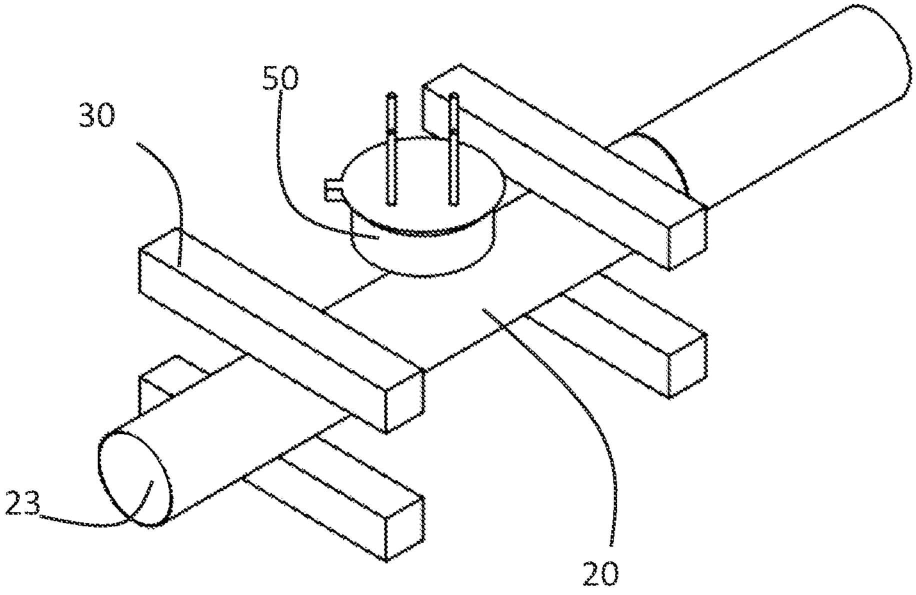
FIG. 33 is a schematic illustration of a capsule being heated, while the capsule is in a non-flattened, cylindrical shape, in accordance with some applications of the present invention.

Reference is now made to FIG. 33, which is a schematic illustration of capsule 20 being heated, while the capsule is in a non-flattened, cylindrical shape, in accordance with some applications of the present invention. As noted hereinabove, although some applications of the present disclosure are described as being applied to a capsule that is provided to a user in a flattened configuration and/or is flattened by the smoking device, the scope of the present disclosure includes applying any one of the features of capsule 20 that are described herein to a cylindrical capsule that is configured to remain cylindrical even upon being inserted into the smoking device, mutatis mutandis. For example, any one of the features described with respect to the structure of the capsule, components of the capsule, coverings of the capsule, inner linings of the capsule, identifying features of the capsule, etc., are applicable to a cylindrical capsule that is configured to remain cylindrical even upon being inserted into the smoking device, mutatis mutandis.

Figure 34:
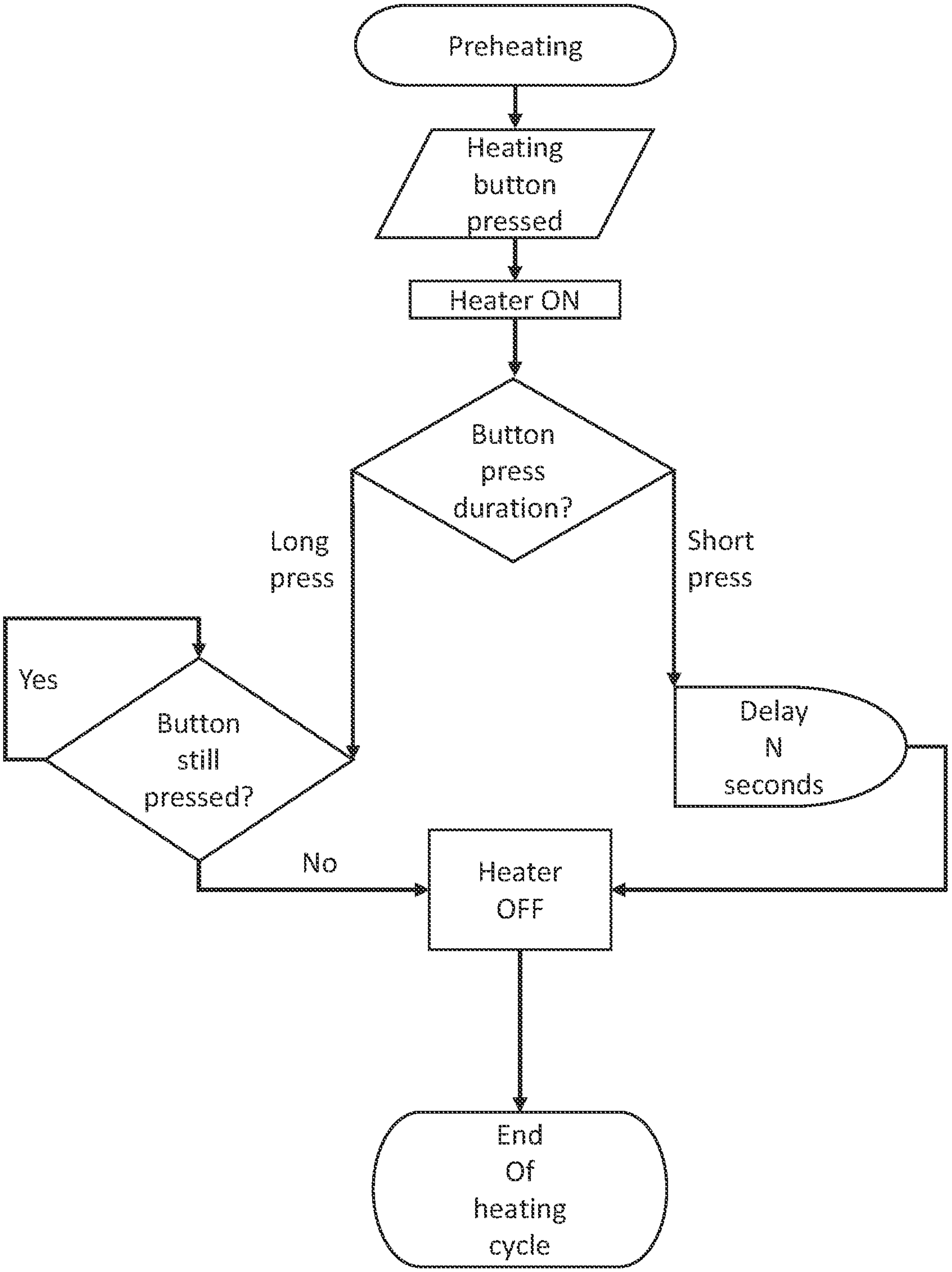
FIG. 34 is a flowchart showing steps that are performed by a smoking device, in accordance with some applications of the present invention.

Reference is now made to FIG. 34, which is a flowchart showing steps that are performed by smoking device 200, in accordance with some applications of the present invention. Typically, users have different smoking preferences from each other and some users' preferences vary. Some users wish to smoke a full capsule during a relatively short period, while others may wish to puff only occasionally. For users who wish to smoke a full capsule during a relatively short period it is typically more appropriate to heat the smoking material to the vaporization temperature of the active agents for a predefined period of time, to enable instant and prolonged vaporization of the active agents. For users who wish to puff only occasionally it is typically more appropriate to heat the smoking material to the vaporization temperature of the active agents only when the user actually wishes to puff from the capsule, such as to preserve the active agents while allowing for delays between puffs. (It is noted that, in some cases, prolonged heating versus intermittent heating will also influence the nature of the vapors released from the smoking material (such as taste, intensity, amount of vapors, etc.), and respective users may have different preferences.

Therefore, for some applications, the control component receives an indication from the user indicating whether they wish to smoke the active agents in a first mode or a second mode. Typically, the first mode is suitable for users who wish to smoke a full capsule during a relatively short period, whereas the second mode is suitable for users who wish to puff occasionally. Typically, in response to receiving an indication that the user wishes to smoke the active agents in the first mode, the control component heats the smoking material to the vaporization temperature of the one or more active agents for a predefined period of time (e.g., a period of time of between 60 seconds and 600 seconds). Further typically, in response to receiving an indication that the user wishes to smoke the active agents in the second mode, the control component heats the smoking material to the vaporization temperature only while receiving an active input from the user that they wish for the smoking material to be heated. For some applications, the smoking device includes a heating button (e.g., button 204 shown in FIG. 26) configured to be pressed by the user. The user pressing the button for a short press (i.e., for a duration that is less than a threshold duration (e.g., a threshold duration of between 0 seconds and 2 seconds)), is interpreted by the control component as meaning that the user wishes to smoke in the first mode, and the user pressing the button for a long press (i.e., for more than the threshold duration), is interpreted by the control component to mean that the user wishes to smoke the active agents in the second mode. For some applications, in the second mode, the heating is turned off either immediately upon release of the button, or a after a short delay (e.g., a delay of between 0 seconds and 5 seconds). For some applications, the smoking device is configured such that during a smoking session, the user can switch from the first mode to the second mode by pressing the button for a long press (i.e., for more than the threshold duration), and/or from the second mode to the first mode by pressing the button for a short press (i.e., for less than the threshold duration).

For some applications, the control component is configured to preheat the smoking material to a temperature that is below the vaporization temperature of the one or more active agents, prior to receiving the indication from a user indicating whether they wish to smoke the active agents in a first mode or a second mode. For example, the control component is configured to preheat the smoking material to the temperature that is below the vaporization temperature of the one or more active agents automatically, in response to the capsule being inserted into the smoking device. Alternatively or additionally, the control component is configured to preheat the smoking material to the temperature that is below the vaporization temperature of the one or more active agents, in response to an input from the user (e.g., an initial push of button 204). For some applications, when operating in the second mode, the control component preheats the smoking material to the temperature that is below the vaporization temperature of the one or more active agents in between presses of the button by the user. Typically, preheating the smoking material to a temperature that is below the vaporization temperature of the one or more active agents allows the heating of the smoking material to the vaporization temperature to occur more quickly and/or more uniformly than if the smoking material is not preheated. Typically, the preheating does not release the active agents since the preheating is performed to a lower temperature than the vaporization temperature of the active agents. For some applications, the smoking device is configured to preheat the smoking material in the manner described in the present paragraph, even without being configured to perform both the first and second modes of heating.

Referring again to FIG. 34, some of the above-described steps are shown in the flowchart. For some applications, the smoking material is initially preheated. In response to the button being pressed, the heating is switched on. If the button is pressed for a long press, the heating continues so long as the button is still being pressed, whereas if the button is pressed for a short press, the heating in turned off after predefined delay of N seconds (e.g., a period of time of between 60 seconds and 600 seconds).

In accordance with some applications of the present invention, control component 233 of smoking device 200 is configured to detect (a) whether a capsule 20 has been inserted into the device, (b) whether a capsule has been removed from the device, (c) whether there is a fault with the capsule, (d) whether there is a fault with the smoking device, and/or (e) whether there is a problem with the electrical connection between electrodes 30 and the capsule (e.g., due to dirt or the paper covering coming between the electrodes and the metallic foil). For some applications, the control component generates an output to the user indicating the detection of one or more of the aforementioned occurrences.

For some applications, when the device is on, a test current is periodically driven through the electrodes, and the insertion and/or removal of a capsule from the smoking device is detected based on the response to the test current. Typically, if no capsule is present, there will be an incomplete circuit and the current will not flow from the negative electrode to the positive electrode, whereas if a capsule is present a current will flow from the negative electrode to the positive electrode and the capsule will provide a given resistance profile. For some applications, in response to detecting the insertion of the capsule, preheating of the capsule is initiated by the control component, e.g., as described hereinabove. For some applications, is response to detecting the removal of the capsule, the control component overrides an input from the user indicating that the a heat cycle should be initiated (e.g., a push of button 204).

For some applications, the control component measures the resistance between the electrodes in response to the test current, in order to verify that it is within an acceptable range. (Purely by way of example, if the capsule is inserted and there are no faults, the capsule may be expected to provide a resistance of between 0.3 and 0.5 Ohm.) Alternatively or additionally, the control component measures an increase in temperature of the smoking material in response to the test current. (Purely by way of example, a 10 ms pulse may be expected to increase the temperature of the plant material by approximately 2-8 Celsius (e.g., approximately 5 Celsius) if the capsule is inserted and there are no faults.) For some applications, in response to detecting that the resistance and/or the temperature increase is not within a predetermined range, the control component determines that the capsule has been removed from the device, there is a fault with the capsule, there is a fault with the smoking device, and/or there is a problem with the electrical connection between the electrodes and the capsule (e.g., due to dirt or the paper covering coming between the electrodes and the metallic foil). For some applications, the control component measures the temperature change at a plurality of locations along the capsule and determines the source of the fault in response thereto. For example, if there is a hotspot at the contact between the electrode and the capsule, this may indicate a fault with the electrical contact between the electrode and the capsule (e.g., due to dirt or the paper covering coming between the electrodes and the metallic foil).

For some applications, generally similar apparatus techniques to those described hereinabove are application to a liquid material that is configured to be vaporized by the smoking device, mutatis mutandis. Some examples of capsules for use with such techniques are shown in FIGS. 35A-55B.

Figure 35C:
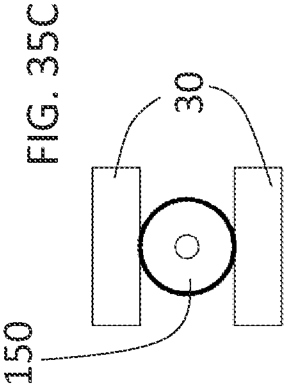
FIGS. 35A, 35B, and 35C are schematic illustrations of respective views of a capsule for use with a liquid material that is configured to be vaporized by a smoking device, the capsule including a layer of absorbent material, in accordance with some applications of the present invention.
Figure 35A:
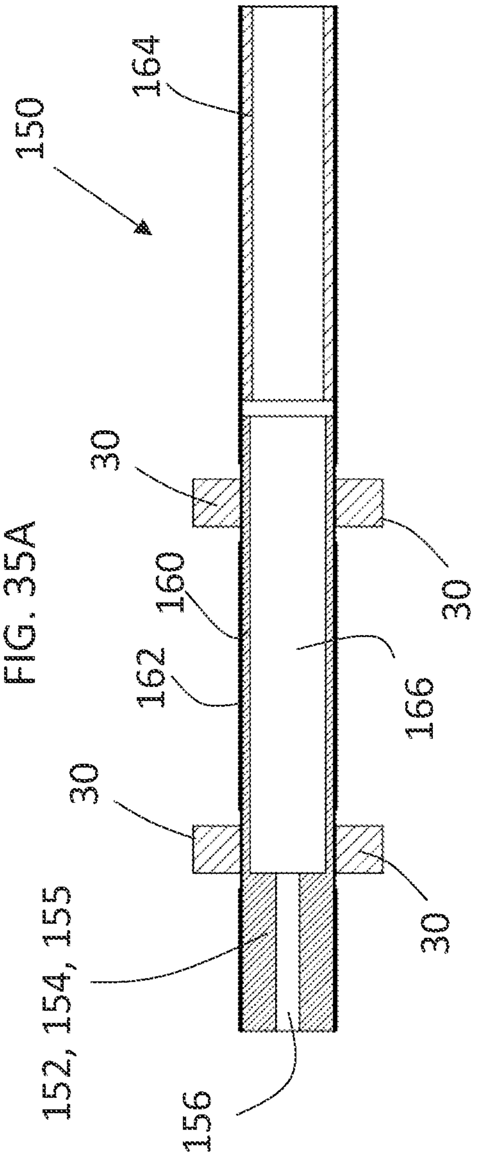
Figure 35B:
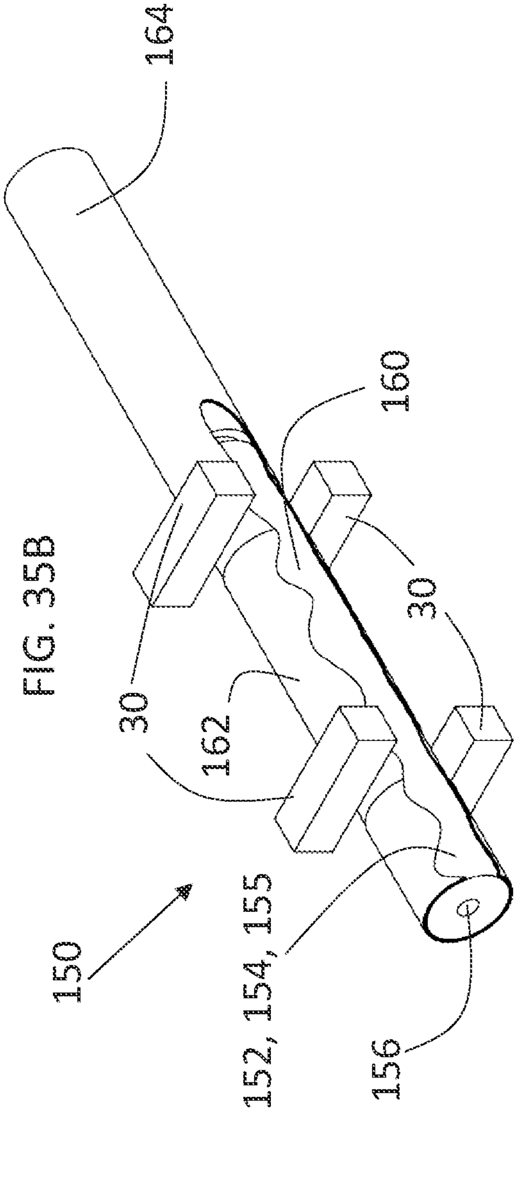

Reference is now made to FIGS. 35A, 35B, and 35C, which are schematic illustrations of respective views of a capsule 150 for use with a liquid material 152 that is configured to be vaporized by smoking device 200 (or a different smoking device), in accordance with some applications of the present invention. Typically, for such applications, the capsule is a "vaping" capsule and the smoking device acts as a "vaping device." Thus, all examples of capsule 150 may be referred to herein as a vaping capsule and device 200 (or a different device designed solely for use with a vaping capsule) may be referred to as a vaping device. Device 200 is generally referred to herein as a smoking device, since it is typically also used with a capsule that is used for smoking (typically in a heat-not-burn manner).

As noted, for some applications, smoking device 200 (described hereinabove) is configured to be used both with capsules that contain a solid smoking material (such as a plant material, e.g., tobacco, for example, capsule 20, described hereinabove) and with capsules that contain a liquid material that is configured to be vaporized (such as capsule 150). Typically, the smoking device heats the solid smoking material in a heat-not-burn manner, as described hereinabove. For some applications, capsule 150 is configured to be used with a different smoking device from capsule 20. It is noted that unless explicitly stated otherwise, for some applications, features of capsule 20 described hereinabove (including but not limited to, the structures of the heating elements, the structure of the mouthpiece, coatings, linings, the mouthpiece, etc.) are incorporated into capsule 150, mutatis mutandis.

For some applications, the liquid material includes vegetable glycerin, propylene glycol, nicotine, nicotine salt and/or additional taste and/or scent materials.

Each of FIGS. 35A-C shows the capsule disposed between electrodes 30. FIGS. 35A and 35C show respective cross-sectional views of the capsule and 35B shows an oblique view of the capsule with some of the covering layers peeled away for illustrative purposes. For some applications, liquid material 152 is held within a reservoir 154 that comprises an absorbent material 155 with the liquid material absorbed therein. Typically, the absorbent material is solid and/or flexible, is capable of withstanding the high temperatures that might develop during the vaporization process, and is safe for human inhalation. For example, the absorbent material may include cotton, hemp, wool, plastic material, cellulose material, paper, woven or non-woven fabrics, threads, etc. (In other instances of an "absorbent material" being described in the present disclosure, the term "absorbent material" should be interpreted as including any one of the aforementioned types of material or a combination thereof.) Typically, the reservoir defines an air inlet 156 therethrough, to facilitate the inflow of air to the capsule. For some such applications, a layer 160 of material extends from reservoir 154 around the circumference of the capsule. For some applications, the layer of material is made of a similar absorbent material to the absorbent material disposed within the reservoir. Typically, the layer of material has a thickness of more than 0.1 mm (e.g., more than 0.2 mm), and/or less than 3 mm (e.g., less than 1 mm), for example between 0.1 mm and 3 mm, or between 0.2 mm and 1 mm.

The layer of material is typically configured such that the liquid material flows from the reservoir along the layer of material via capillary forces. For some applications, metallic foil 162 (which is typically generally similar to metallic foil 32 described hereinabove) is disposed around the outside of the layer of material. The metallic foil is typically heated via the electrodes (via resistive heating), in a generally similar manner to that described hereinabove. Typically, the metallic foil thereby heats and vaporizes the liquid material within the layer of material. Typically, the capsule comprises a mouthpiece 164 (which is typically generally similar to mouthpiece 90 described hereinabove). Typically, the user puffs from the capsule via the mouthpiece.

In accordance with respective applications, capsule 150 is rigid or is flexible. For some applications, the capsule is configured to be flattened, for example, using the techniques described hereinabove. For example, the capsule may be flattened in order to enhance electrical contact between the electrodes and the metallic foil, by applying mechanical pressure to the capsule using the electrodes. For some applications, the capsule is flattened in order to generate a desired heating profile and/or a desired airflow profile. For some applications, the smoking device includes a non-contact temperature sensor (such as an infrared temperature sensor) as described hereinabove. For some such applications, the portion of the capsule at which the sensor is configured to sense the temperature (i.e., a portion of the capsule that is configured to be adjacent to the temperature sensor) is flattened such as to facilitate the temperature sensing (typically by creating a flat surface upon which to perform the temperature sensing). For some applications, the capsule is flattened in order to increase capillary flow through an absorbent material disposed within the capsule (such as layer 160 of material). It is noted that the aforementioned techniques associated with flattening a capsule are typically applicable to any one of the embodiments of capsule 20 and/or capsule 150 described herein.

For some applications, the capsule and the smoking device with which the capsule is configured to be used are configured such that the capsule is heated without being flattened. For some applications, capsules 20 and 250 are configured to be used with smoking device 200. In cases in which capsule 20 (which contains solid smoking material) is being used with the smoking device 200, the smoking device is configured to flatten the capsule, whereas in cases in which capsule 150 (which contains liquid material) is being used with the smoking device 200, the smoking device is not configured to flatten the capsule. For some applications, the capsule type is identified (e.g., using the techniques described hereinabove), and a heating profile is applied based upon the identity of the capsule.

For some applications, the capsule defines an airway therethrough. Typically, the air inlet 156 and mouthpiece 164 each comprises a portion of the airway. For some applications, the capsule defines an interior region 166 that is surrounded by layer 160 of material, with the interior region comprising a portion of the airway. For some applications, vapor that is generated from the liquid material flows into interior region 166 of the capsule. A combination of the vapors and air (which enters the interior region via air inlet 156) flows from the interior region into the user's mouth via the mouthpiece. For some applications, the interior region is hollow. For some applications, one or more internal support components (which are typically non-porous, with low heat conductivity, not shown) are used in order to mechanically couple the liquid-flow layer to the metallic foil and/or to direct airflow heated location and then toward the mouthpiece.

Figure 36A:
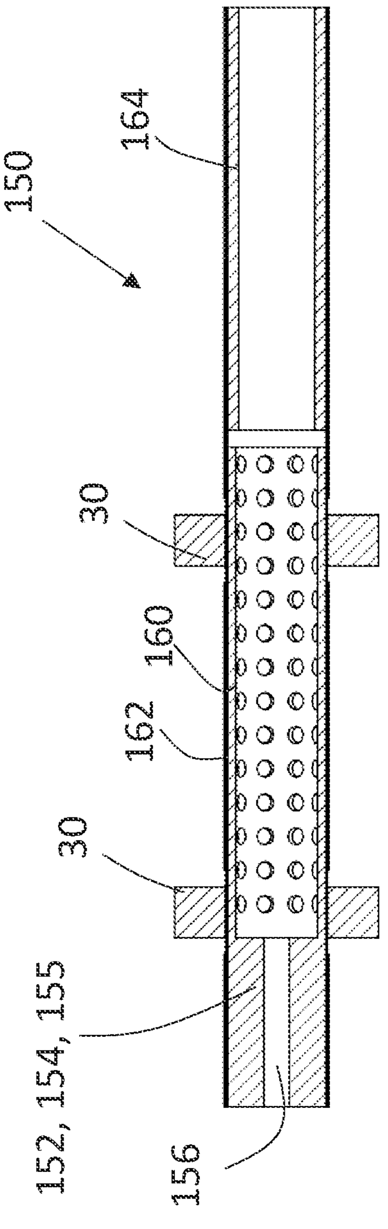
FIGS. 36A and 36B are schematic illustrations of respective views of a capsule for use with a liquid material that is configured to be vaporized by a smoking device, the capsule including a layer of absorbent material with holes therethrough, in accordance with some applications of the present invention.
Figure 36B:
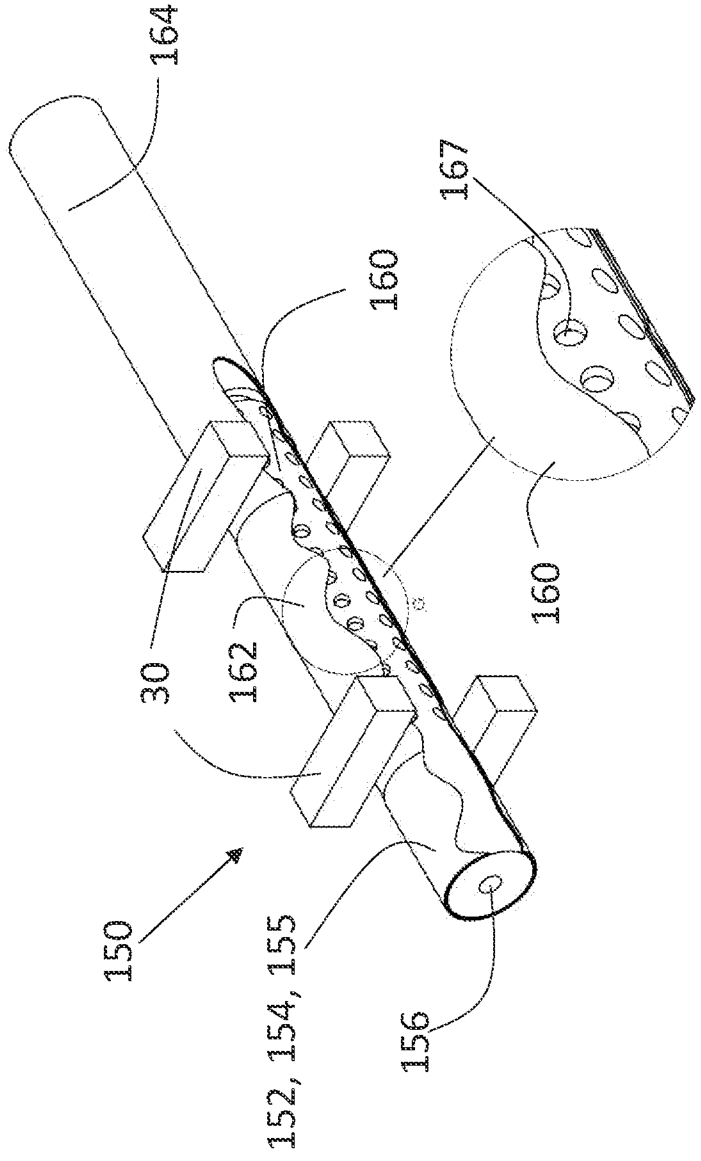

Reference is now made to FIGS. 36A and 36B, which are schematic illustrations of respective views of capsule 150 for use with a liquid material that is configured to be vaporized by a smoking device, the capsule including layer 160 of absorbent material with the layer of absorbent material defining holes 167 therethrough, in accordance with some applications of the present invention. Each of FIGS. 36A-B shows the capsule disposed between electrodes 30. FIG. 36A shows a cross-sectional view of the capsule and FIG. 36B shows an oblique view of the capsule with some of the covering layers peeled away for illustrative purposes. Capsule 150 is generally similar to that shown in FIGS. 35A-C except that in FIGS. 36A-B the layer of material defines holes therethrough. For some applications, the holes are configured to create hot spots in order to vaporize the liquid at the hotspots. Alternatively or additionally, the holes are configured to provide a low (or zero) resistance path for the generated vapors into interior region 166. For some applications, the holes have diameters of more than 0.7 mm (e.g., more than 1 mm) and/or less than 3 mm (e.g., less than 2 mm), for example, between 0.7 mm and 3 mm, or between 1 mm and 2 mm.

Figure 37A:
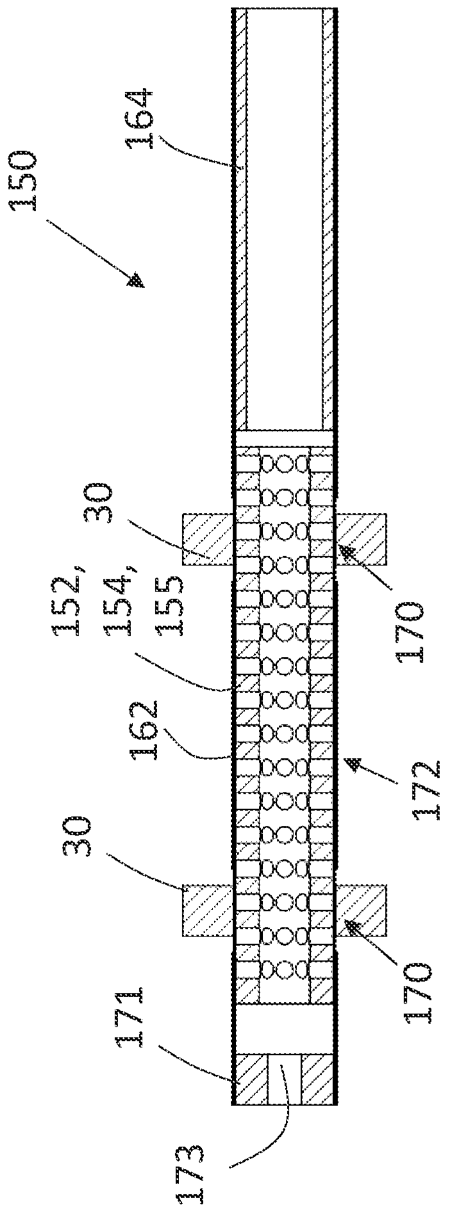
FIGS. 37A and 37B are schematic illustrations of respective views of a capsule for use with a liquid material that is configured to be vaporized by a smoking device, the capsule including a reservoir of the liquid material absorbed within an absorbent material, only portions of the absorbent material being configured to be heated, in accordance with some applications of the present invention.
Figure 37B:
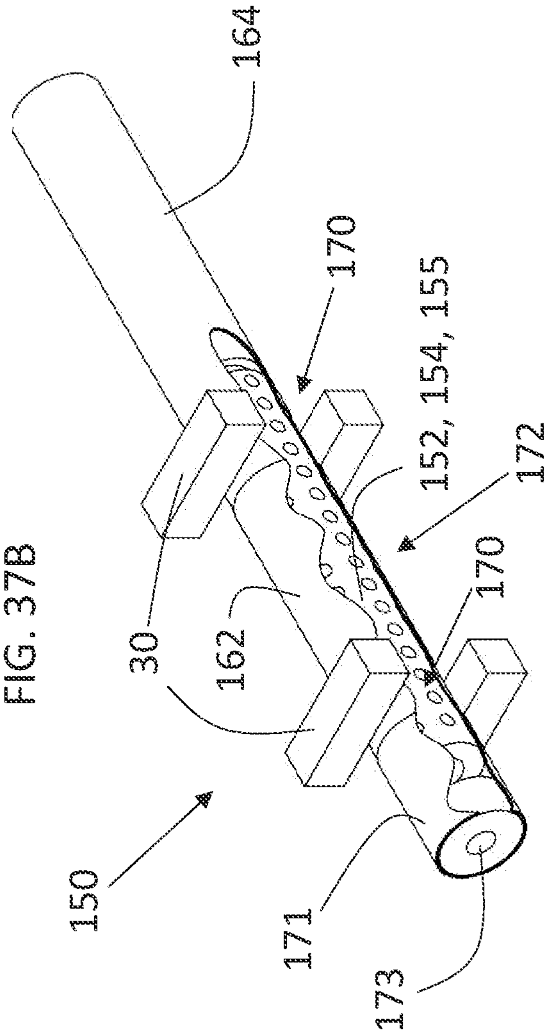

Reference is now made to FIGS. 37A and 37B, which are schematic illustrations of respective views of capsule 150 for use with liquid material 152 that is configured to be vaporized by a smoking device, the liquid material is absorbed being absorbed within absorbent material 155 within reservoir 154, and only portions of the reservoir being configured to be heated, in accordance with some applications of the present invention. Each of FIGS. 37A-B shows the capsule disposed between electrodes 30. FIG. 37A shows a cross-sectional view of the capsule and FIG. 37B shows an oblique view of the capsule with some of the covering layers peeled away for illustrative purposes. For some applications, reservoir is disposed along a region of the capsule at which the metallic foil is disposed. For some such applications, the capsule includes a stopper or filter 171 at the opposite end of the capsule from mouthpiece 164, with the stopper or filter defining an air inlet 173 therethrough. Typically, the absorbent material within the reservoir has a thickness of more than 0.1 mm (e.g., more than 0.2 mm), and/or less than 3 mm (e.g., less than 1 mm), for example between 0.1 mm and 3 mm, or between 0.2 mm and 1 mm.

For some applications, electrodes 30 are configured to contact metallic foil 162 at a first set of locations 170, and metallic foil is configured to contact the absorbent material within the reservoir at a second set of regions 172. Typically, the absorbent material within the reservoir is only directly heated at the regions 172 at which the metallic foil contacts the reservoir. For some applications, within regions 172, the absorbent material within the reservoir defines holes therethrough to thereby limit the contact area between the metallic foil and the absorbent material. For some applications, respective regions of the metallic foil have respective properties, coatings, and/or inner linings, e.g., as is generally described hereinabove with reference to capsule 20. For some applications, localized heating (e.g., by heating at selected regions, and/or by heating an absorbent material defines holes therethrough to thereby limit the contact area between the metallic foil and the absorbent material) is used to limit the vaporization rate in order to enable a large number of small, fast generated puffs without heating all of the liquid material to vaporization temperatures.

Figure 38A:
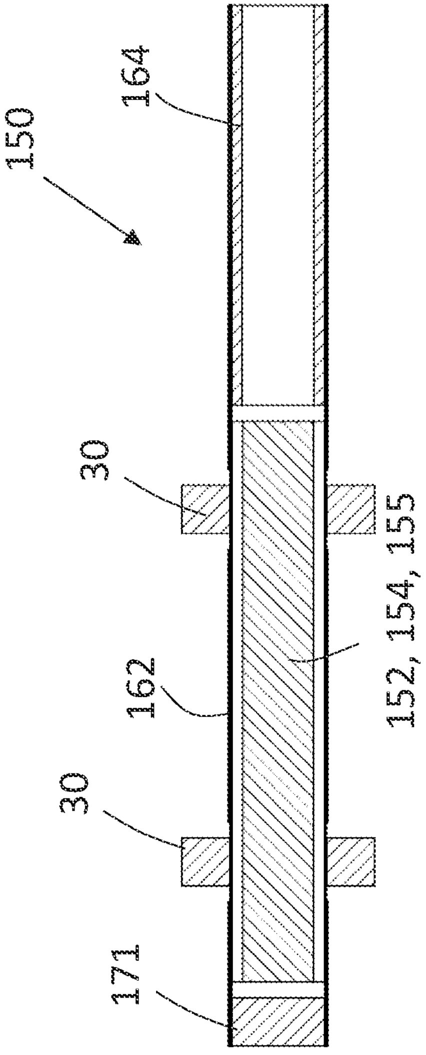
FIGS. 38A and 38B are schematic illustrations of respective views of a capsule for use with a liquid material that is configured to be vaporized by a smoking device, the capsule including a reservoir of the liquid material absorbed within an absorbent material, the absorbent material defining airflow channels along its perimeter, in accordance with some applications of the present invention.
Figure 38B:
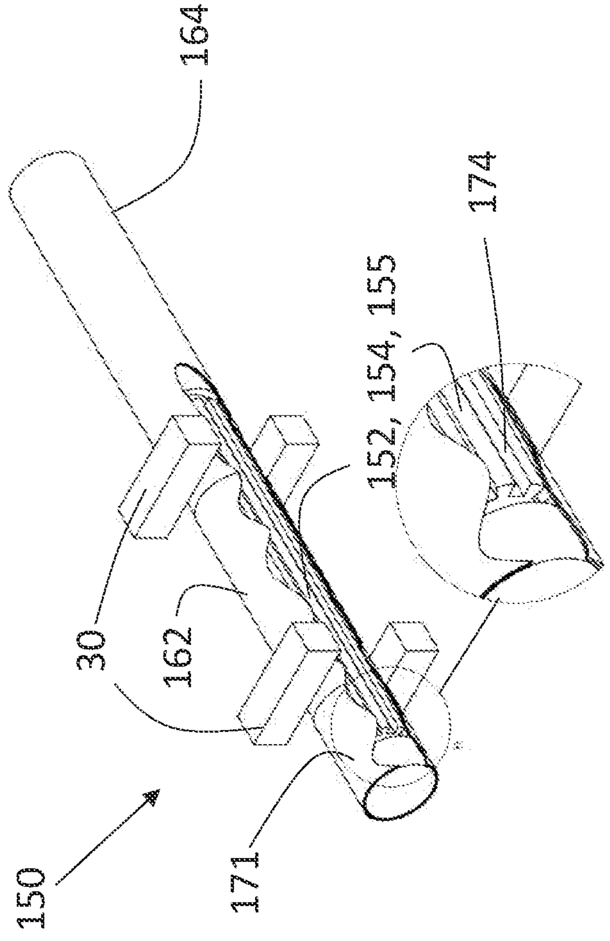

Reference is now made to FIGS. 38A and 38B, which are schematic illustrations of respective views of capsule 150 for use with liquid material 152 that is configured to be vaporized by a smoking device, the capsule including reservoir 154 of the liquid material absorbed within absorbent material 155, the absorbent material defining airflow channels 174 along its perimeter, in accordance with some applications of the present invention. Each of FIGS. 38A-B shows the capsule disposed between electrodes 30. FIG. 38A shows a cross-sectional view of the capsule and FIG. 38B shows an oblique view of the capsule with some of the covering layers peeled away for illustrative purposes. Typically, the perimeter of the reservoir does not contact the metallic foil at circumferential locations at which the absorbent material defines the airflow channels. For some applications, in this manner heat transfer into the reservoir is limited, by localizing the vaporization to the contact area between the heated portion of the metallic foil and the absorbent material in which the liquid material is absorbed.

For some applications, generally similar techniques and configurations to that described with reference to reservoir with respect to FIGS. 37A-38B are applied to layer 160 of absorbent material described with reference to FIGS. 35A-C. For example, the layer of material may be heated only at selected regions, and the layer of material may be shaped to define airway flow channels around the outside or in the inside of the layer of material.

Figure 39A:
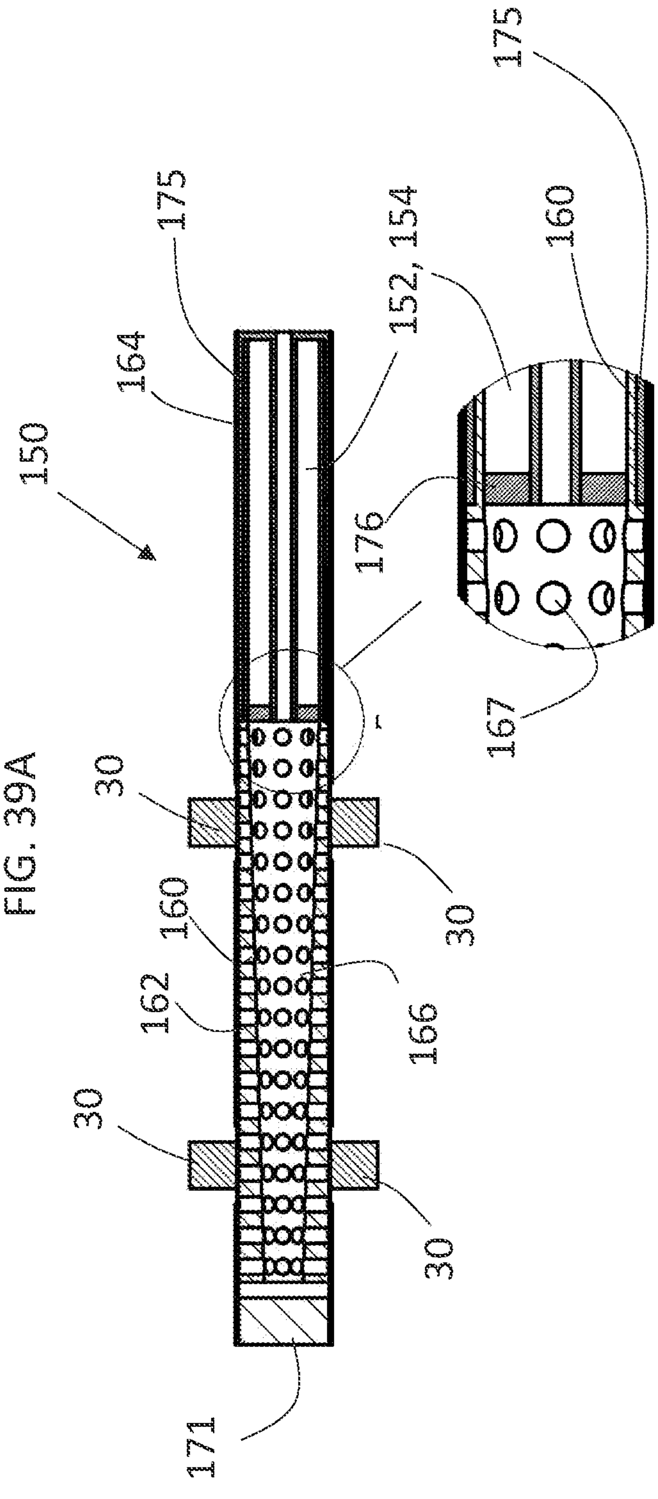
FIGS. 39A and 39B are schematic illustrations of a capsule for use with a liquid material that is configured to be vaporized by a smoking device, the capsule including a layer of absorbent material having a non-uniform thickness, in accordance with respective applications of the present invention.
Figure 39B:
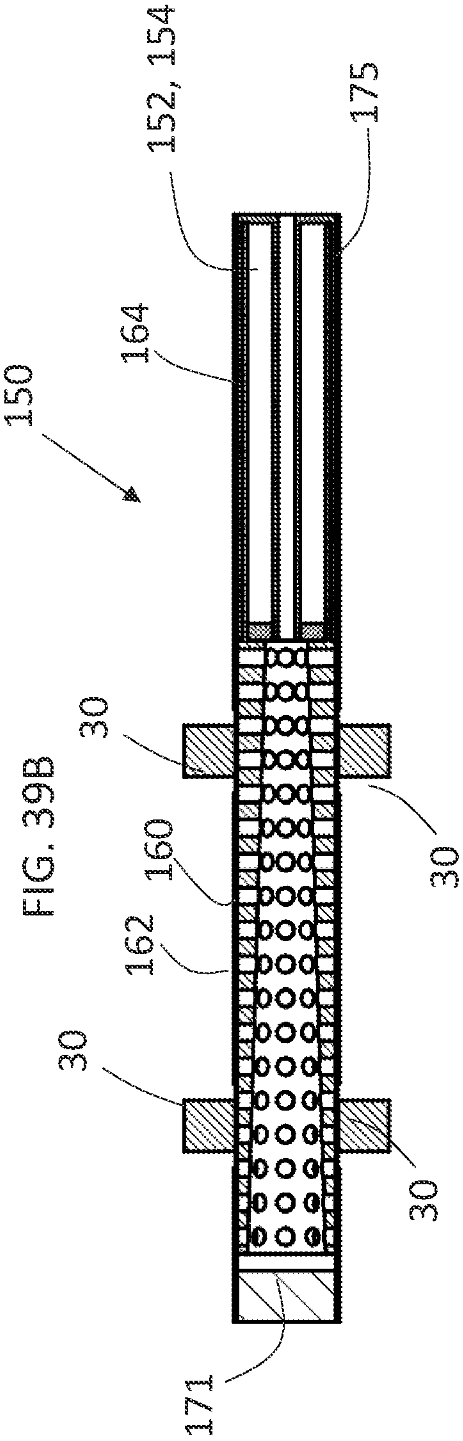

Reference is now made to FIGS. 39A and 39B, which are schematic illustrations of respective views of capsule 150 for use with liquid material 152 that is configured to be vaporized by a smoking device, the capsule including layer 160 of absorbent material, the layer having a non-uniform thickness, in accordance with some applications of the present invention. Each of FIGS. 39A-B shows the capsule disposed between electrodes 30. FIGS. 39A and 39B show cross-sectional views of respective embodiments of the layer of material having a non-uniform thickness. Capsule 150 is generally similar to that shown in FIGS. 37A-B, except for the following differences. For some applications, reservoir 154 is disposed within mouthpiece 164. For some such applications, the reservoir comprises an absorbent material with the liquid material absorbed therein (not shown in FIGS. 39A-B). Alternatively or additionally, the reservoir comprises unabsorbed liquid material 152 contained within a solid housing 175, as shown. For some applications, the housing includes a stopper 176, to prevent the liquid material leaking from the reservoir. Typically, layer 160 of material extends from the reservoir along a portion of the device at which the layer of material is heated to thereby heat and vaporize the liquid material. For some applications, the thickness of the layer of material increases (typically in a gradual manner) in the direction leading away from the reservoir, as shown in FIG. 39A. For some applications, the thickness of the layer of material decreases (typically in a gradual manner) in the direction leading away from the reservoir, as shown in FIG. 39B. Typically, the thickness varies in order to control capillary flow from the reservoir and/or in order to control the heating of the layer of material at the location at which it contacts the metallic foil. For some applications, the layer of material defines holes 167 therethrough, as described hereinabove.

For some applications, generally similar techniques and configurations to that described with reference to layer 160 of absorbent material with respect to FIGS. 39A-39B are applied to reservoir of absorbent material described with reference to FIGS. 37A-38B.

Figure 40A:
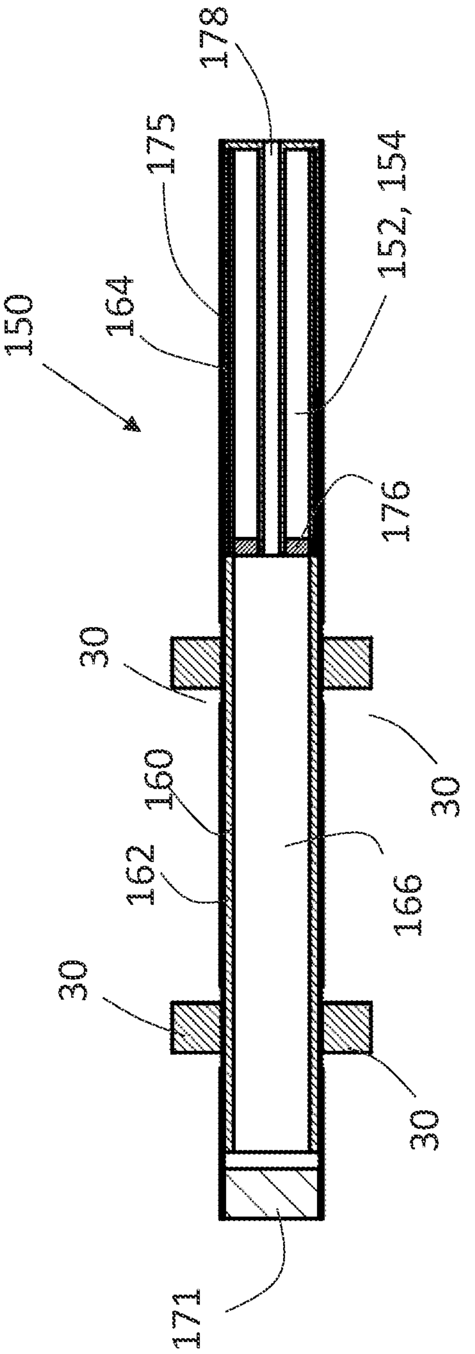
FIGS. 40A and 40B are schematic illustrations of respective views of a capsule for use with a liquid material that is configured to be vaporized by a smoking device, the capsule including a reservoir that contains the liquid material, in accordance with some applications of the present invention.
Figure 40B:
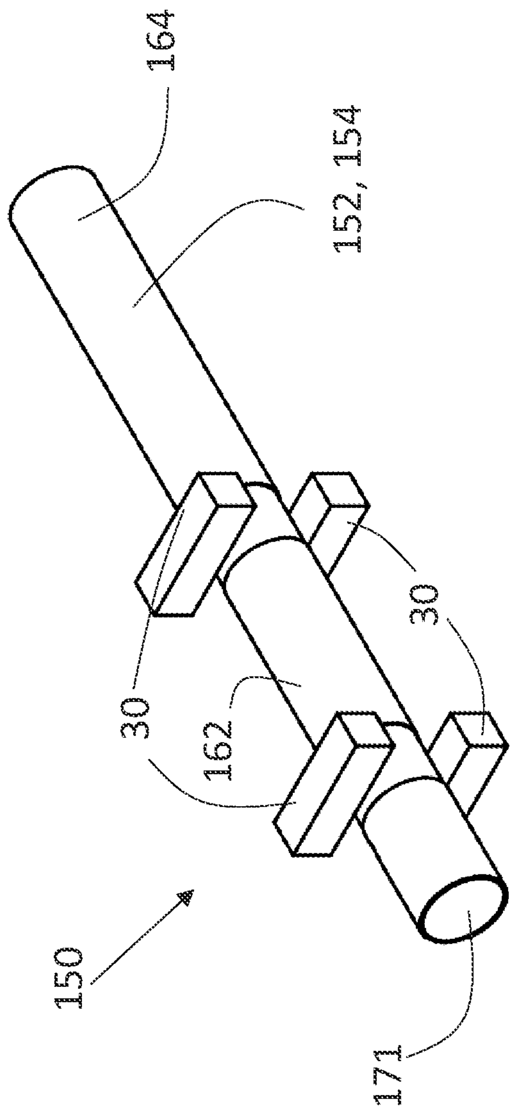

Reference is now made to FIGS. 40A and 40B, which are schematic illustrations of respective views of capsule 150 for use with a liquid material that is configured to be vaporized by a smoking device, the capsule including reservoir 154 disposed within mouthpiece 164 of the capsule, in accordance with some applications of the present invention. Each of FIGS. 40A-B shows the capsule disposed between electrodes 30. FIG. 40A shows a cross-sectional view of the capsule and FIG. 40B shows an oblique view of the capsule with some of the covering layers peeled away for illustrative purposes. As described with reference to FIGS. 39A-B, for some applications, the reservoir comprises unabsorbed liquid material 152 contained within a solid housing 175, as shown. For some applications, the housing includes a stopper 176, to prevent the liquid material leaking from the reservoir. Typically, layer 160 of material extends from the reservoir along a portion of the device at which the layer of material is heated to thereby heat and vaporize the liquid material. For some applications, the mouthpiece defines an airway 178 that passes through the reservoir, and through which the heated air and vapors are drawn from the capsule by the user. Typically, the relatively high temperature of the air and vapors passing through the airway heat the liquid (and air, if present) within the reservoir, thereby increasing the internal pressure within the reservoir, and, in turn, thereby increasing liquid flow out of the reservoir and along the layer of absorbent material. For some applications, the flow of the vapors and air through the reservoir cools the air and vapors before they enter the user's mouth.

It is noted that the scope of the present disclosure includes combining the various features of layer 160 of absorbent material and/or of reservoir 154 described with reference to FIGS. 35A-40B with each other. For example, the layer 160 of absorbent material may have holes therethrough, may only be heated at selected locations, may define airflow channels along its perimeter, may have a non-uniform thickness, etc. Similarly, reservoir 154 in any of the examples of capsule 150 described herein may include the liquid absorbed within absorbent material 155, or unabsorbed and housed within solid housing 175. In addition, the reservoir may be disposed within the mouthpiece (as shown in FIGS. 39A-40B, for example) or at a different location, such as toward the other end of the capsule from the mouthpiece (as shown in FIGS. 35A-36B, for example), or within the portion of the capsule that is heated (as shown in FIGS. 37A-38B, for example).

Figure 41A:
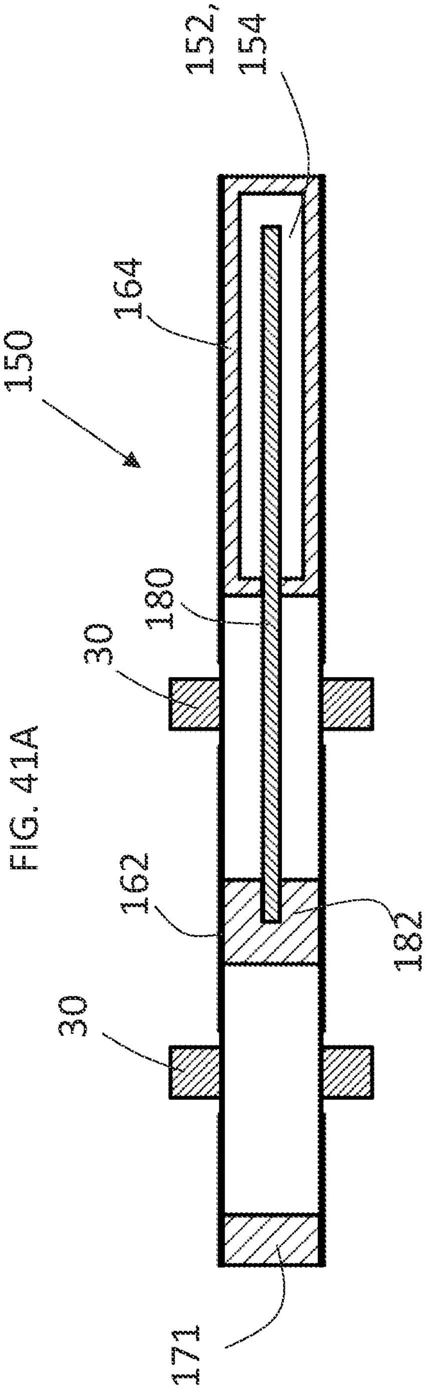
FIGS. 41A, 41B, and 41C are schematic illustrations of respective views of a capsule for use with a liquid material that is configured to be vaporized by a smoking device, the capsule including a capillary-force-delivery element configured to deliver the liquid material to a heating element, in accordance with some applications of the present invention.
Figure 41C:
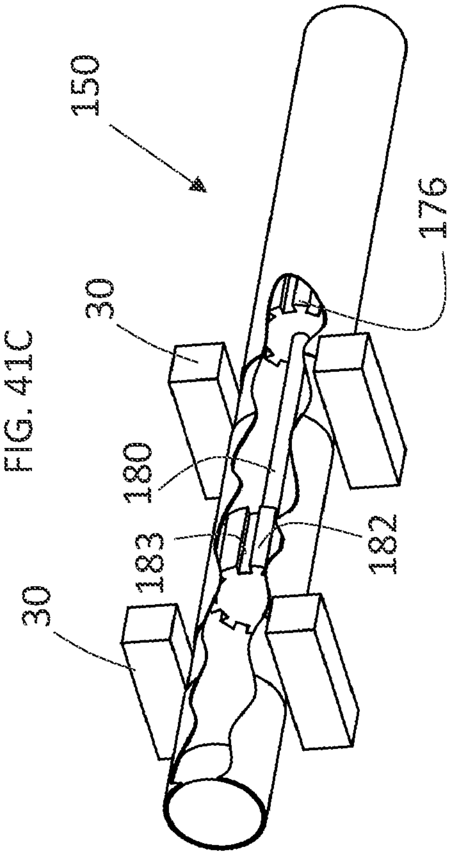
Figure 41B:
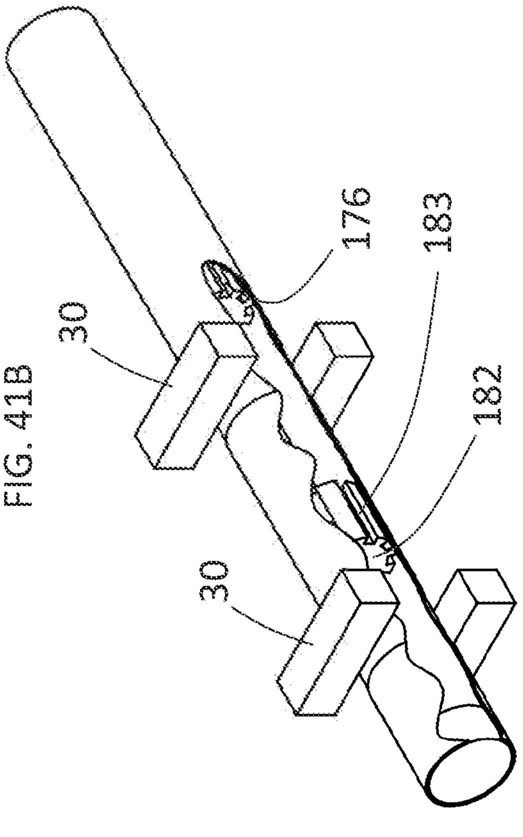

Reference is now made to FIGS. 41A, 41B, and 41C, which are schematic illustrations of respective views of capsule 150 for use with liquid material 152 that is configured to be vaporized by a smoking device, the capsule including a capillary-force-delivery element 180 configured to deliver the liquid material to heating element 182 via capillary forces from reservoir 154, in accordance with some applications of the present invention. Each of FIGS. 41A-C shows the capsule disposed between electrodes 30. FIG. 41A shows a cross-sectional view of the capsule and FIG. 41B-C show respective oblique views of the capsule with some of the covering layers peeled away for illustrative purposes. In accordance with respective applications, capillary-force-delivery element 180 is an absorbent material (e.g., as described hereinabove), a capillary tube, and/or an absorbent material disposed within a tube. Typically, capillary-force-delivery element 180 is configured to transport the liquid material by capillary means, pressure equalization, or any other applicable way of delivering a steady flow of liquid material to replace liquid material that has already been vaporized. The capillary-force-delivery element 180 extends from the reservoir to the heating element. For some applications, heating element 182 includes an absorbent material extends radially to the metallic foil from the location to which the capillary-force-delivery element 180 delivers the liquid material. Thus, upon being delivered to the heating element by the capillary-force-delivery element 180, the liquid material flows radially outwardly toward the metallic foil, where it is heated and vaporized. For some applications, the heating element defines grooves 183 on its perimeter. Typically, the grooves are configured to facilitate axial airflow past the heating element, with the airflow typically picking up the vaporized liquid material as it flows past the heating element.

Figure 42A:
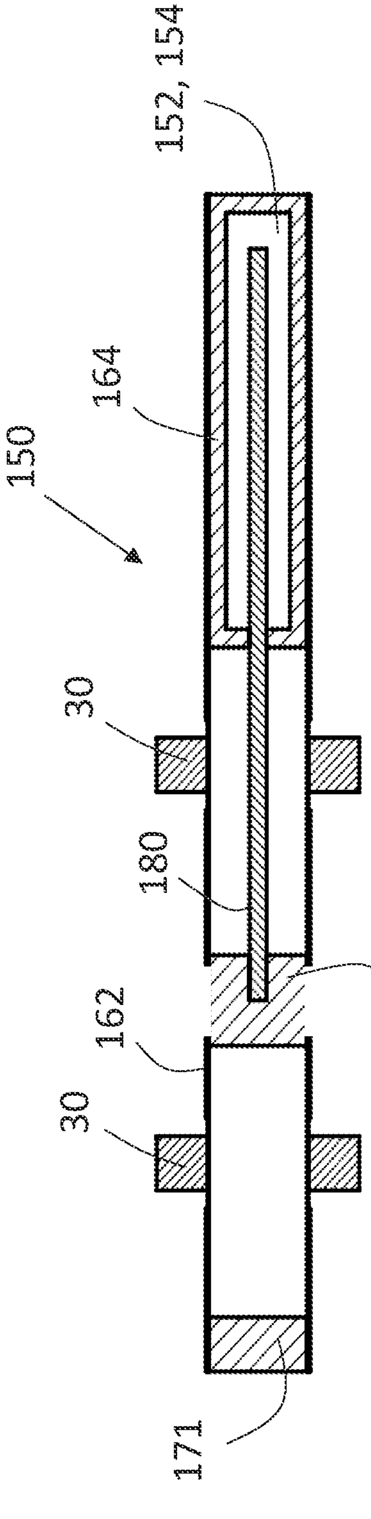
FIGS. 42A, 42B, and 42C are schematic illustrations of respective views of a capsule for use with a liquid material that is configured to be vaporized by a smoking device, the capsule including a capillary-force-delivery element configured to deliver the liquid material to an internal heating element disposed within the capsule, in accordance with some applications of the present invention.
Figure 42B:
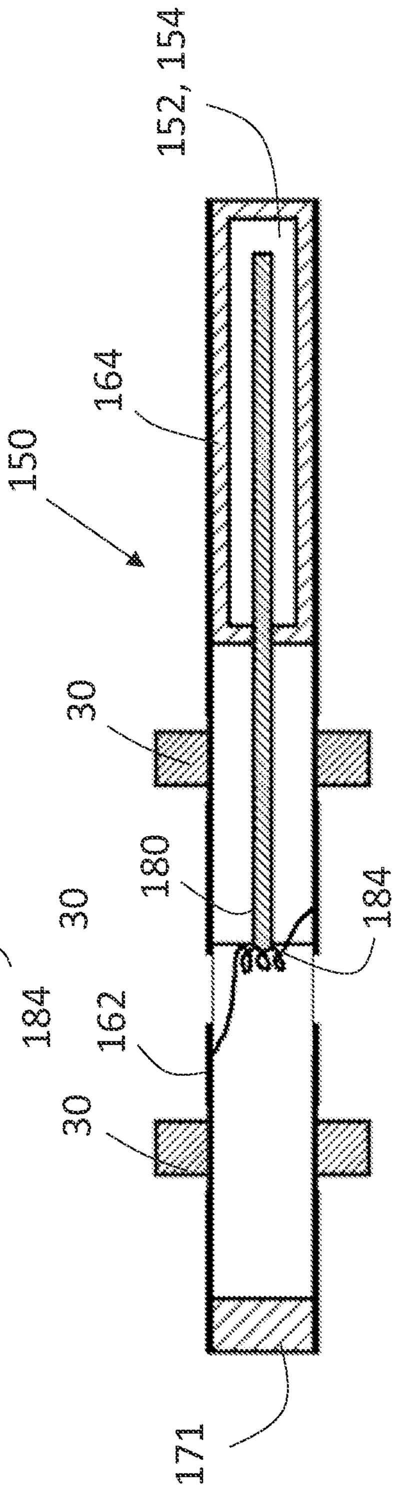
Figure 42C:
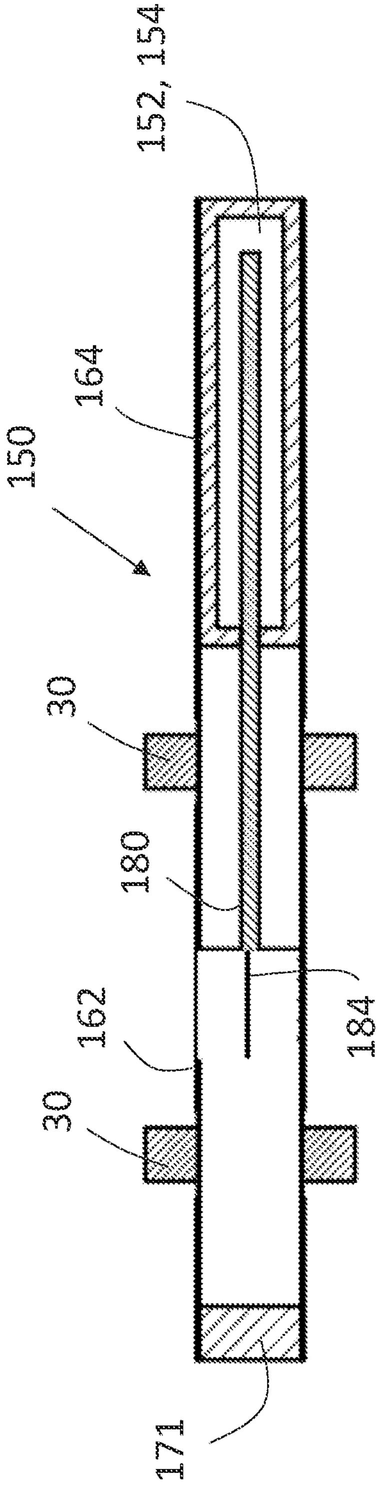

Reference is now made to FIGS. 42A, 42B, and 42C, which are schematic illustrations of respective views of capsule 150 for use with liquid material 152 that is configured to be vaporized by a smoking device, the capsule including capillary-force-delivery element 180 configured to deliver the liquid material to an internal heating element 184 via capillary forces from reservoir 154, in accordance with some applications of the present invention. Each of FIGS. 42A-C shows the capsule disposed between electrodes 30. FIGS. 42A-C show cross-sectional views of respective embodiments of the internal heating element. In accordance with respective applications, capillary-force-delivery element 180 is an absorbent material (e.g., as described hereinabove), a capillary tube, and/or an absorbent material disposed within a tube. The capillary-force-delivery element 180 extends from the reservoir to the internal heating element and delivers the liquid material from the reservoir to the internal heating element via capillary forces. For applications as shown in FIGS. 42A-C, the internal heating element heats the liquid material from within the capsule (as an alternative or in addition to metallic foil directly heating the liquid material). Referring to FIG. 42B, for some applications, the internal heating element is a coil (e.g., a miniature coil). Referring to FIG. 42C, for some applications, the internal heating element is shaped as a strip, or a rod. Alternatively or additionally, the internal heating element is shaped as a mesh or in a different shape.

For some applications, the capsule includes metallic foil 162 and the internal heating element is connected to the electrodes via the metallic foil (although the foil itself is typically not used to directly heat the liquid material in such embodiments). For some applications, the internal heating element (also referred to herein as an "atomizer") is heated via resistive heating (e.g., using techniques described herein). For some such applications, the internal heating element is a resistive element (i.e., an element comprising an electrically resistive material (for example, the internal heating element includes a metallic element)) and receives electrical current from electrodes 30 of the smoking device. Alternatively or additionally, the internal heating element is connected to the electrodes via internal wires. For some applications, the internal heating element is connected to the electrodes using techniques described hereinbelow with reference to FIGS. 43A-D or with reference to FIGS. 44A-D. Typically, the capsule is designed to enable flow of the generated vapors to the user.

For some applications, the internal heating element includes an electrically-resistive element (typically having intermediate electric resistance and ability to withstand high temperatures), such as a metallic coil, metallic wire, metallic mesh, metallic foil, surface-mount resistor or any other electrically-resistive element. For example, iron-nickel alloy, tungsten, iron-chromium-aluminum alloy, nickel chrome, stainless steel, nickel and/or titanium. Typically, the heating element is configured to be stable in air when hot. In some cases techniques are applied to mitigate the risk of an insulating layer forming on the heating element as a result of the heating element becoming heated. For example, such techniques may be used when iron-chromium-aluminum alloy is used in the heating element, because iron-chromium-aluminum alloy forms a protective layer of aluminum oxide (an electrical insulator) when heated. For some such applications, the electrical connections are configured to dissipate heat, in order to cool the electrical contact point to a temperature below the temperature at which an insulating layer may be formed. For some applications, in order to prevent the heating element from continuing to heat after finishing the vaporization of all the vaporizing liquid, the heating element is configured to self-fuse, by over-heating and melting in case there is no liquid material to cool the heating element (due to the liquid material having vaporized).

For some applications, the internal heating element includes one or more magnetically-heated materials that are susceptible to being heated by a magnetic field (such as, magnetic materials and/or ferromagnetic materials), and is heated via a coil disposed within the smoking device, e.g., as described hereinabove. Typically, the induction-heated internal heating element is disposed within the capsule such as to be only partially in contact with the liquid material to be vaporized, in order to focus the heating and control the amount of vapors generated. Typically, the internal heating element is thermally coupled to at least a portion of the liquid material to be vaporized.

Figure 43A:
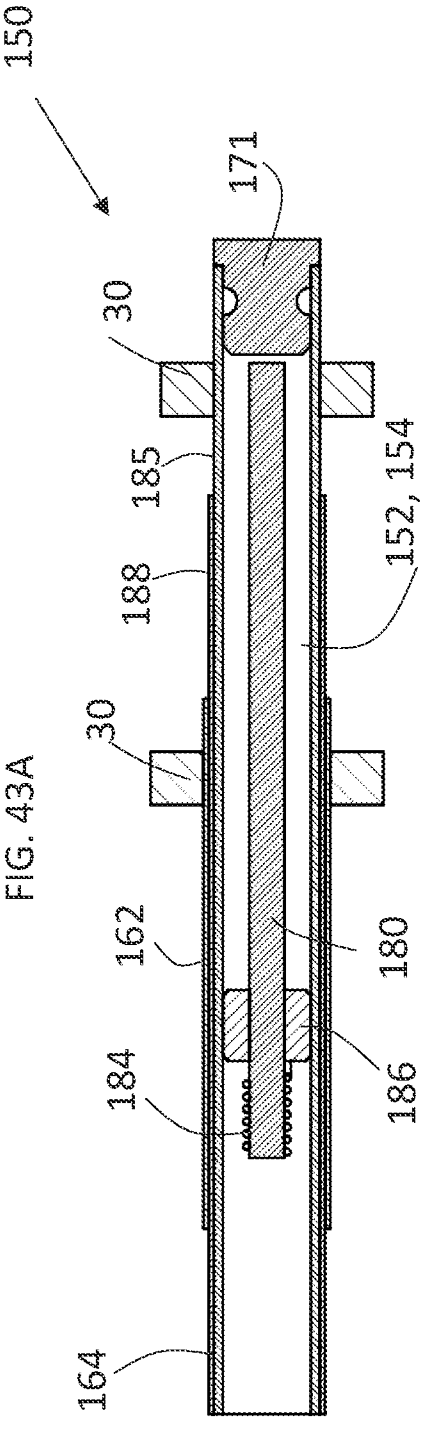
FIGS. 43A, 43B, 43C, and 43D are schematic illustrations of respective views of a capsule for use with a liquid material that is configured to be vaporized by a smoking device, the capsule including a capillary-force-delivery element configured to deliver the liquid material to an internal heating element, in accordance with some applications of the present invention.
Figure 43B:
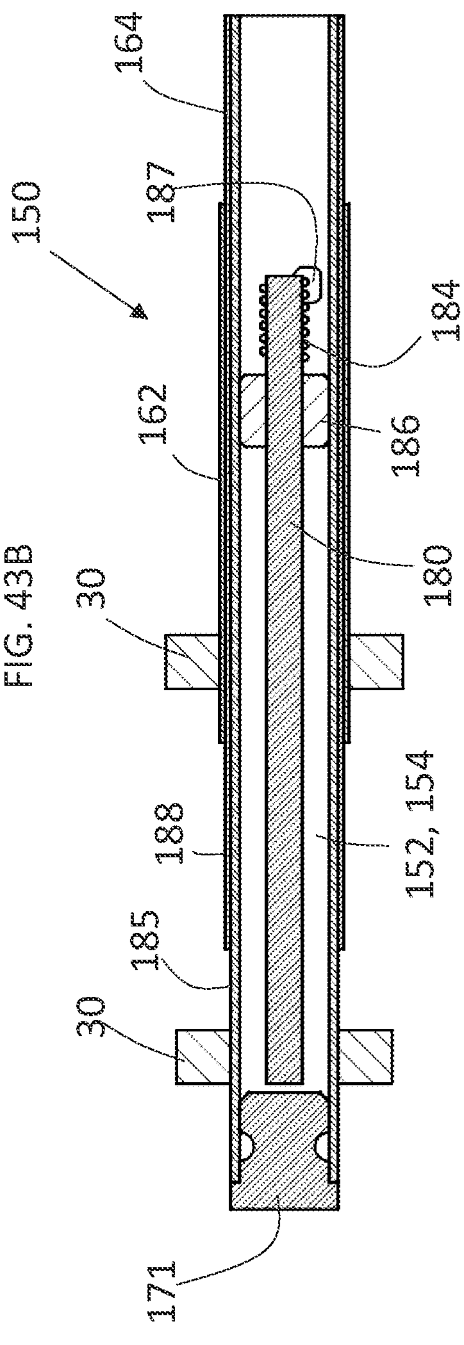
Figure 43D:
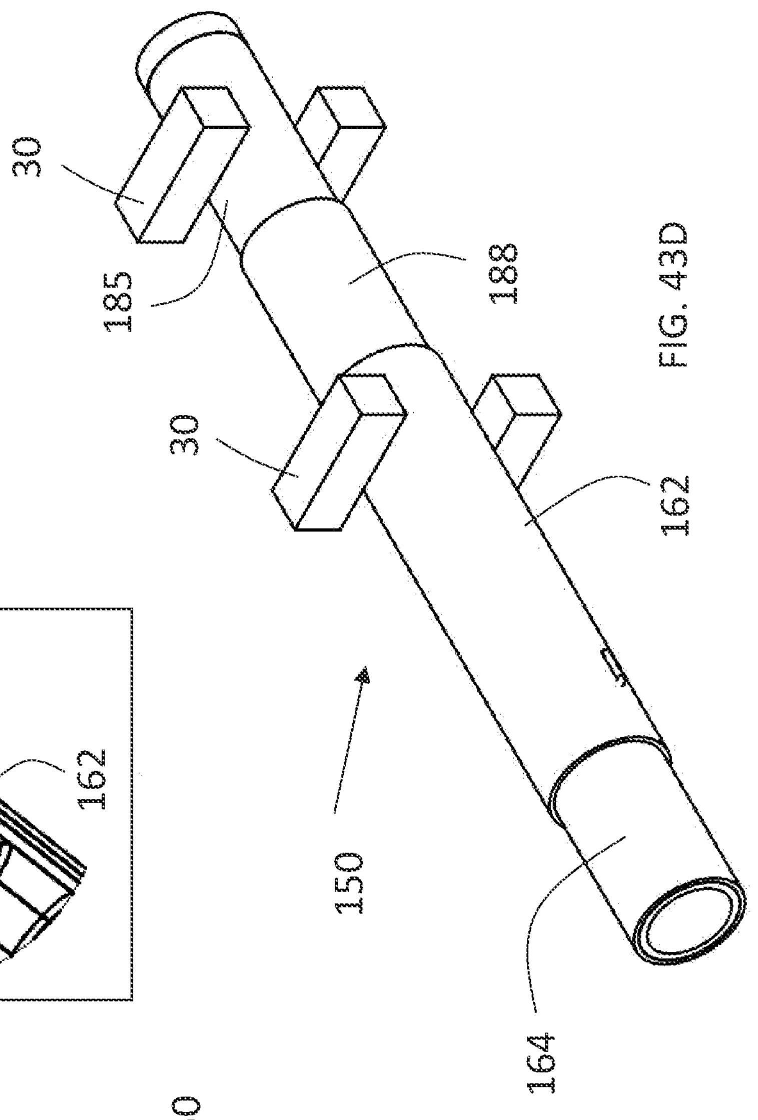
Figure 43C:
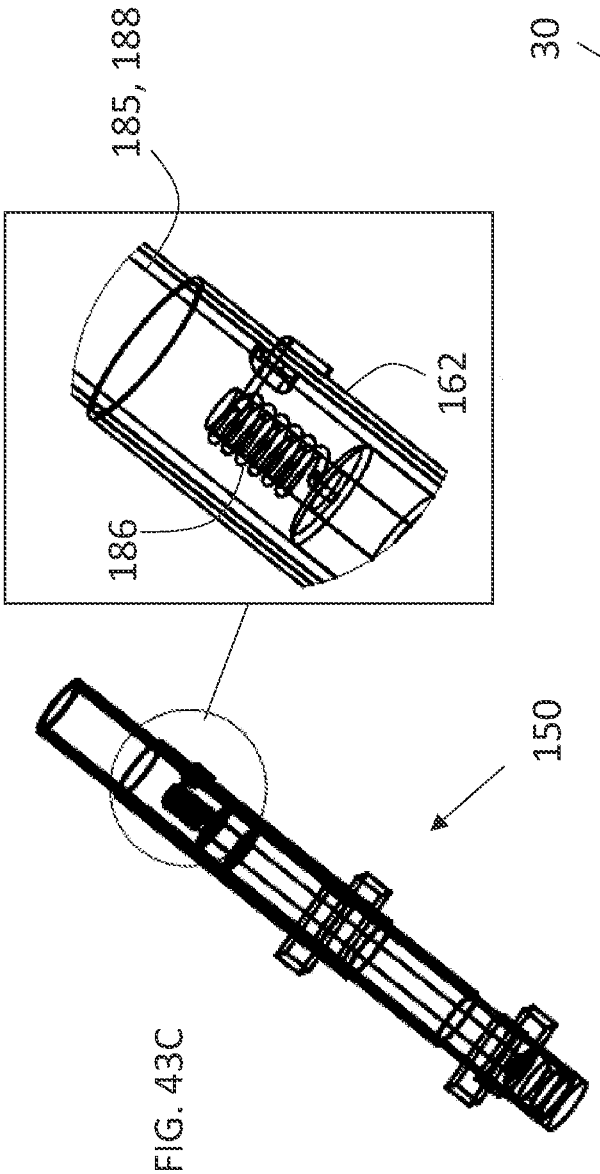

Reference is now made to FIGS. 43A, 43B, 43C, and 43D, which are schematic illustrations of respective views of capsule 150 for use with liquid material 152 that is configured to be vaporized by a smoking device, the capsule including capillary-force-delivery element 180 configured to deliver the liquid material to internal heating element 184, in accordance with some applications of the present invention. Each of FIGS. 43A-D shows the capsule disposed between electrodes 30. FIGS. 43A and 43B show respective cross-sectional views of the capsule and FIGS. 43C-D show respective oblique views of the capsule with FIG. 43C showing some portions as transparent, for illustrative purposes. For some applications, the capsule includes reservoir 154 with the reservoir comprising a housing 185 within which the liquid material is housed (in unabsorbed form and/or absorbed within an absorbent material. Typically stopper 171 (described hereinabove) and stopper 186 seal the liquid material within the reservoir. Capillary-force-delivery element 180 delivers the liquid material to internal heating element 184, as described with reference to FIGS. 42A-C.

As described with reference to FIG. 42B, for some applications, the internal heating element is heated via resistive heating (e.g., using techniques described herein). For some such applications, the internal heating element includes an electrically resistive material (for example, the internal heating element is a metallic portion) and receives electrical current from electrodes 30. For some applications, the internal heating element is a coil (e.g., a miniature coil). For some applications, housing 185 of the capsule is conductive. Conductive housing 185 and metallic foil 162 are electrically insulated from each other via an insulating layer 188 and the capsule is configured such that, when disposed within the smoking device, one of the first and second electrodes is electrically coupled to the conductive housing and the other one of the first and second electrodes is coupled to the metallic foil. Typically, a first end of the coil is coupled to the conductive housing and a second end of the coil is coupled to the metallic foil, such that the first and second electrodes drive a current through the coil via the conductive housing and the metallic foil. For some applications, stopper 186 (which is disposed in the vicinity of the coil) is covered with a conductive material and electrically couples one end of the coil to the conductive housing. Typically, the other end of the coil extends to the metallic foil via a hole 187 in housing 185 and insulating layer 188.

For some applications, the conductive housing includes aluminum, copper, stainless steel, bronze, plastic coated with a conductive (e.g., metallic) layer, or any other type of pipe/tube/cylinder. For some applications, the conductive housing has a non-cylindrical cross-sectional shape. Alternatively, the conductive housing has a cylindrical cross-sectional shape. For some applications, insulating layer 188 includes a separate layer or an insulating coating, adhesive tape (for example, polyimide-FEP fluoropolymer substrate (e.g., Kapton®), double sided adhesive tape, and/or another type of insulating layer.

Figure 44A:
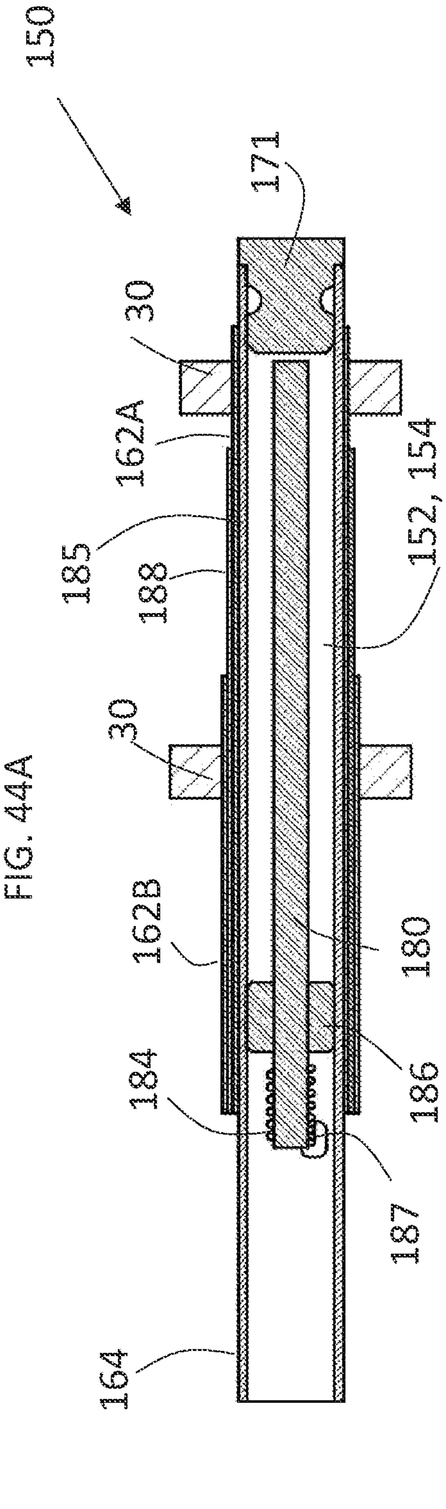
FIGS. 44A, 44B, 44C, and 44D are schematic illustrations of respective views of a capsule for use with a liquid material that is configured to be vaporized by a smoking device, the capsule including a capillary-force-delivery element configured to deliver the liquid material to an internal heating element, in accordance with some alternative applications of the present invention.
Figure 44B:
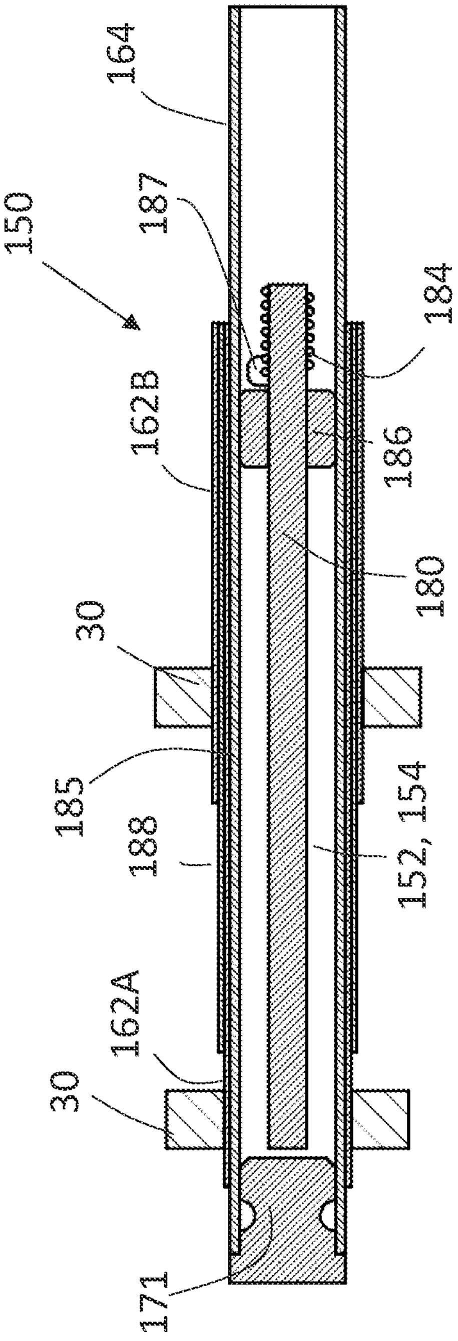
Figure 44C:
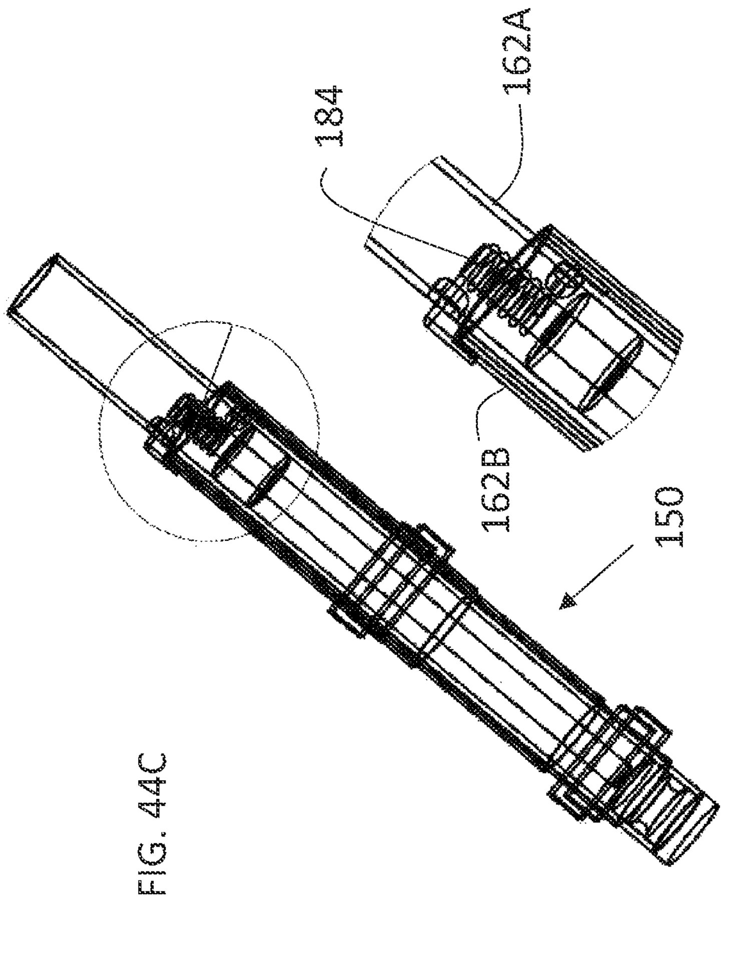
Figure 44D:
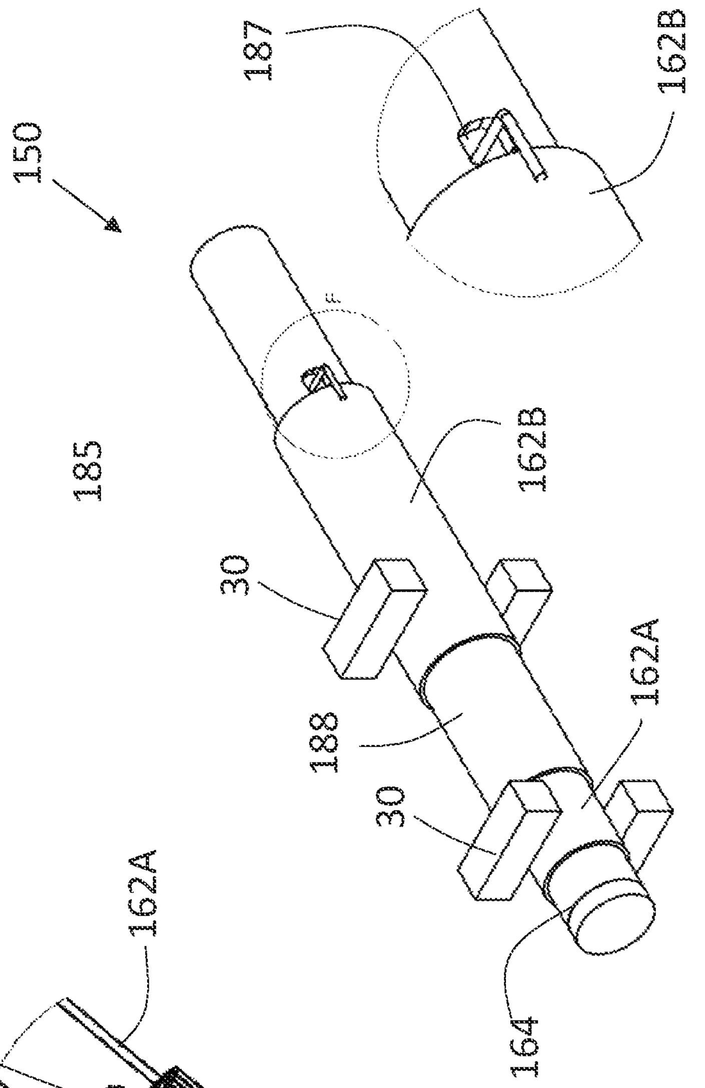

Reference is now made to FIGS. 44A, 44B, 44C, and 44D, which are schematic illustrations of respective views of capsule 150 for use with liquid material 152 that is configured to be vaporized by a smoking device, the capsule including capillary-force-delivery element 180 configured to deliver the liquid material to internal heating element 184, in accordance with some applications of the present invention. Each of FIGS. 44A-D shows the capsule disposed between electrodes 30. FIGS. 44A and 44B show respective cross-sectional views of the capsule and FIGS. 44C-D show respective oblique views of the capsule with FIG. 44C showing some portions as transparent, for illustrative purposes. FIGS. 44A-D show a generally similar embodiment of capsule 150 to that shown in FIGS. 43A-D, except for the following differences. For some applications the capsule comprises first and second metallic foils 162A and 162B that are electrically insulated from each other via insulating layer 188 and which are electrically coupled to respective ends of the coil, and the capsule is configured such that, upon being inserted into the smoking device, one of the first and second electrodes is electrically coupled to the first metallic foil and the other one of the first and second electrodes is coupled to the second metallic foil. Typically, a first end of the coil is coupled to the first metallic foil and a second end of the coil is coupled to the second metallic foil, such that the first and second electrodes drive a current through the coil via the first and second metallic foils. For some such applications, housing 185 of the capsule is not conductive. Rather, the housing is typically made of a plastic, paper, or other material. In some cases, this reduces the manufacturing costs of the capsule and/or reduces the use of non-biodegradable materials in the manufacture of the capsule, relative to if a conductive housing is used. For some such applications, stopper 186 does not include a conductive coating. Typically, the ends of the coil extend to metallic foils 162A and 162B via holes in the capsule housing and insulating layer 188.

Figures 45A, 45B, 45C, 45D:
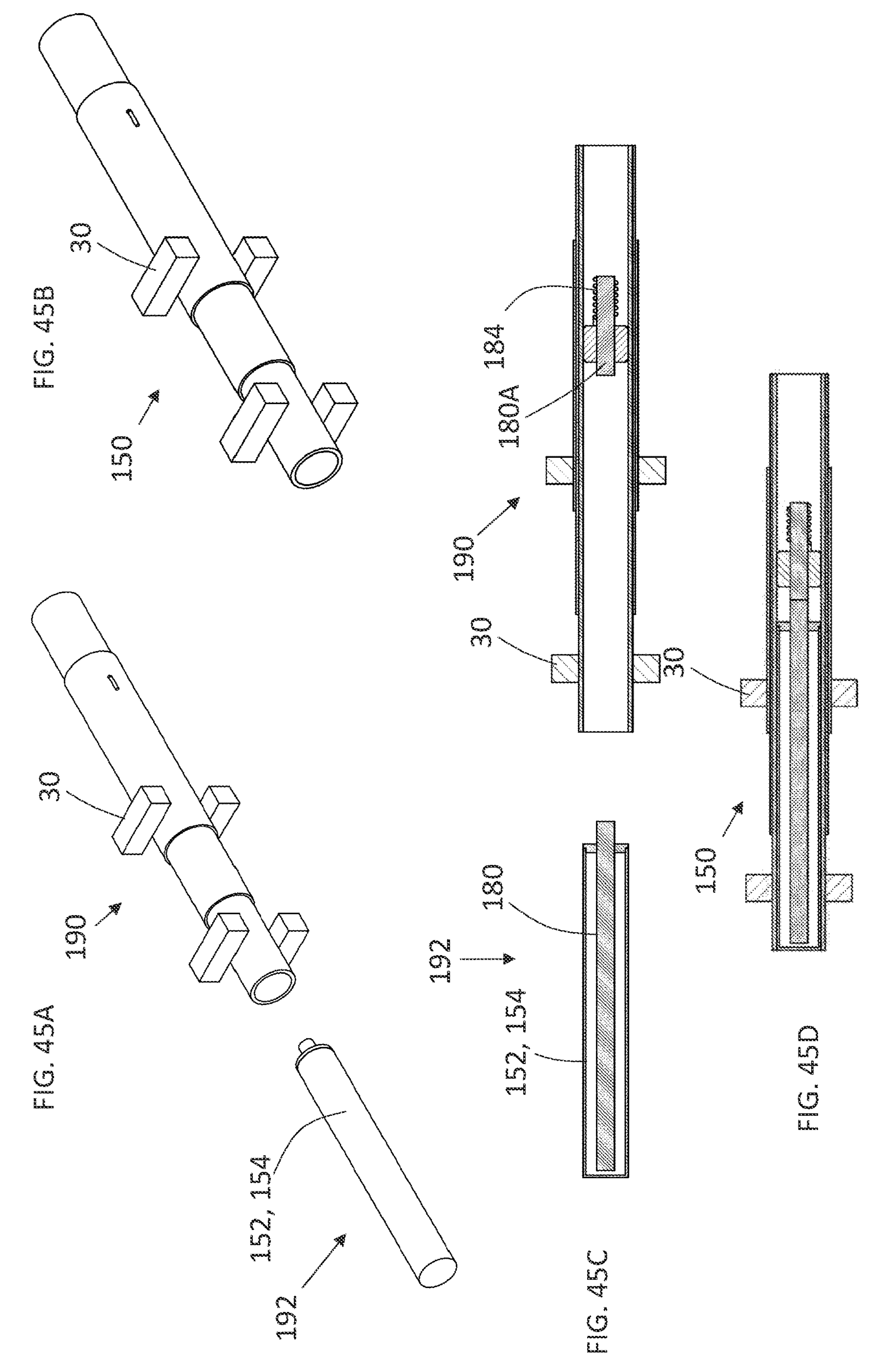
FIGS. 45A, 45B, 45C, and 45D are schematic illustrations of respective views of a capsule for use with a liquid material that is configured to be vaporized by a smoking device, the capsule including a capillary-force-delivery element configured to deliver the liquid material to an internal heating element and including a reusable portion and a disposable portion, in accordance with some applications of the present invention.

Reference is now made to FIGS. 45A, 45B, 45C, and 45D, which are schematic illustrations of respective views of capsule 150 for use with liquid material 152 that is configured to be vaporized by a smoking device, the capsule including a capillary-force-delivery element 180 configured to deliver the liquid material to internal heating element 184 and including a capsule housing 190 and a disposable portion 192, in accordance with some applications of the present invention. Each of FIGS. 45A-D shows the capsule disposed between electrodes 30. FIGS. 45A-B show oblique views of the capsule, respectively before and after the disposable portion has been inserted into the reusable portion, FIGS. 45C-D show cross-sectional views of the capsule, respectively before and after the disposable portion has been inserted into the reusable portion.

Capsule 150 is generally similar to that shown in FIGS. 43A-D, but in the embodiment shown in FIGS. 45A-D, the capsule includes capsule housing 190 (which is typically reusable and) that typically includes the internal heating element (and/or other conductive portions that are configured to contact electrodes of the smoking device), and disposable portion 192 that includes reservoir 154 containing the liquid material, and typically includes capillary-flow-delivery element 180. The capsule housing typically receives the disposable capsule portion such as to form a capsule and such that that the capillary-force-delivery element extends to the internal heating element, such as to transport the liquid material from the reservoir to the internal heating element via capillary forces. For some applications, a second portion 180A of the capillary-flow-delivery element is disposed within the reusable portion of the capsule, and the capsule is configured such that when the disposable portion of the capsule is inserted into the capsule housing, the liquid material flows to the second portion of the capillary-flow-delivery element 180 and then to the internal heating element via capillary forces. Alternatively, the entire capillary-flow-delivery element is disposed within disposable portion 192. Typically, including the reservoir in the disposable portion of the capsule, lengthen the period of time during which the housing of the capsule is usable, thereby reducing costs and environmental damage. For some applications, housing 190 of the capsule is built into the smoking device, and reusable portion 192 is inserted into the smoking device.

For some applications, the internal heating element 184 is also disposed within disposable portion 192 and is configured to become electrically coupled to portions of the housing upon the disposable portion being inserted into the housing. Upon the capsule being inserted into the smoking device, the internal heating element becomes electrically coupled to the electrodes of the smoking device via conductive portions of housing 190.

Figure 46B:
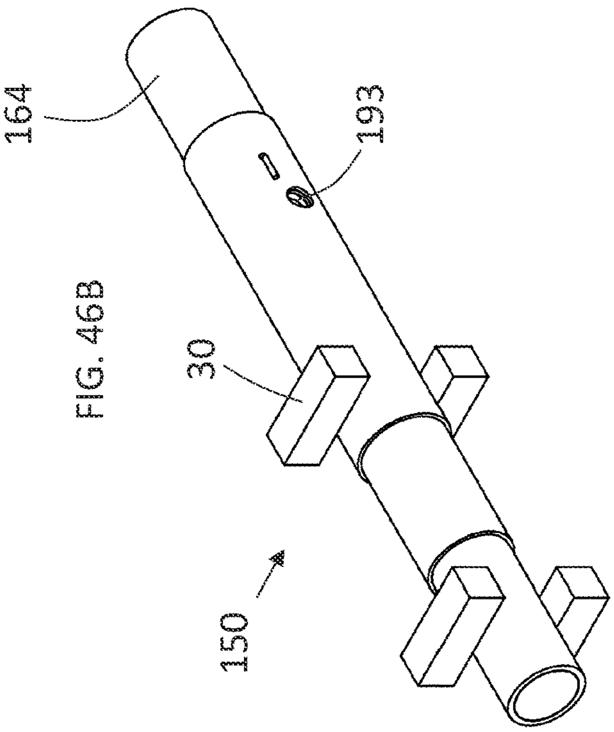
FIGS. 46A and 46B are schematic illustrations of respective views of a capsule for use with a liquid material that is configured to be vaporized by a smoking device, the capsule including a capillary-force-delivery element configured to deliver the liquid material to an internal heating element and the capsule defining an opening in close proximity to the heating element, in accordance with some applications of the present invention.
Figure 46A:
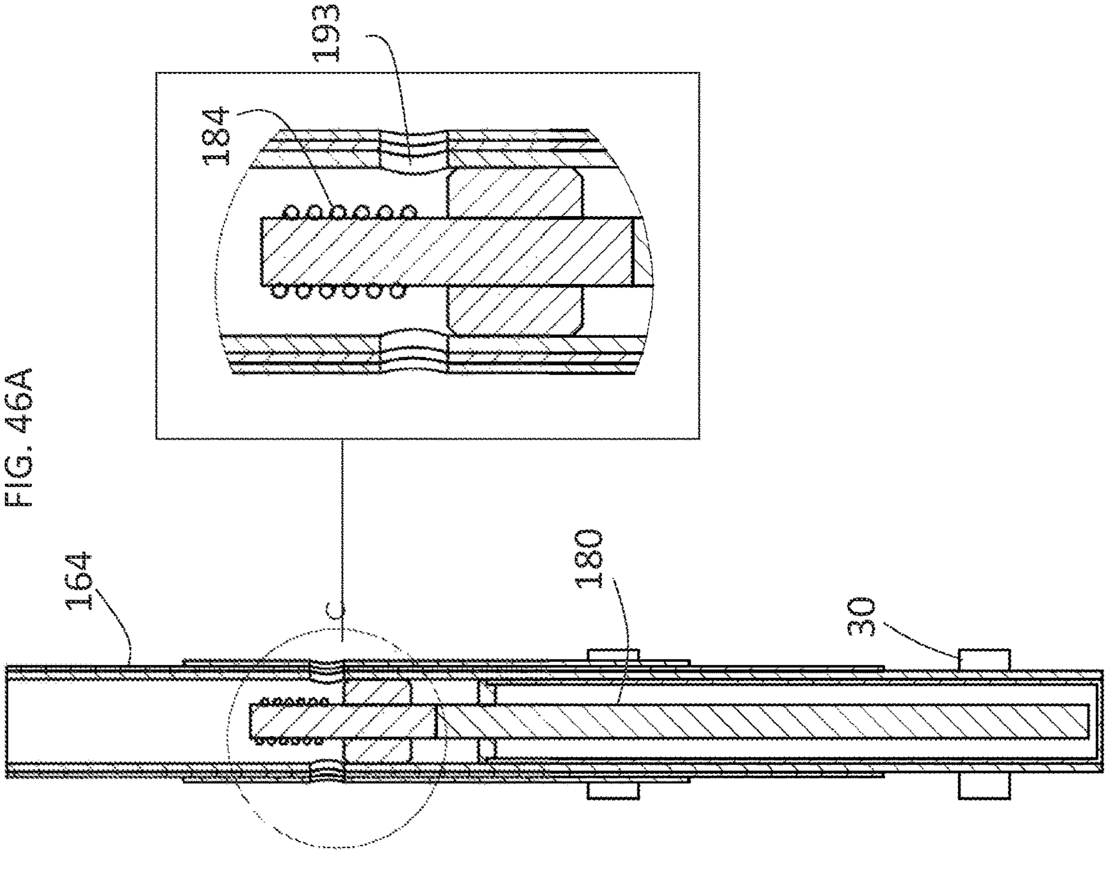

Reference is now made to FIGS. 46A and 46B, which are schematic illustrations of respective views of capsule 150 for use with a liquid material that is configured to be vaporized by a smoking device, the capsule including capillary-force-delivery element 180 configured to deliver the liquid material to internal heating element 184, and the capsule defining an opening 193 in close proximity to the internal heating element, in accordance with some applications of the present invention. Each of FIGS. 46A-B shows the capsule disposed between electrodes 30. FIG. 46A shows a cross-sectional view of the capsule and FIG. 46B shows an oblique view. Capsule 150 is generally similar to that shown in FIGS. 43A-D, but the capsule defining an opening 193 in close proximity to the internal heating element. As described hereinabove, for some applications, capsule 150 defines an airway through the entire capsule. Alternatively, for some applications, the internal heating element is disposed in close proximity to the mouthpiece (e.g., within 30 mm of the mouthpiece, for example within between 15 and 30 mm of the mouthpiece) and the opening is disposed in close proximity to the internal heating element (e.g., within 30 mm of the mouthpiece, for example within between 15 and 30 mm of the mouthpiece). The capsule typically defines an airway extending from the opening to the mouthpiece configured such that the vaporized liquid material enters the airway.

Figure 47A:
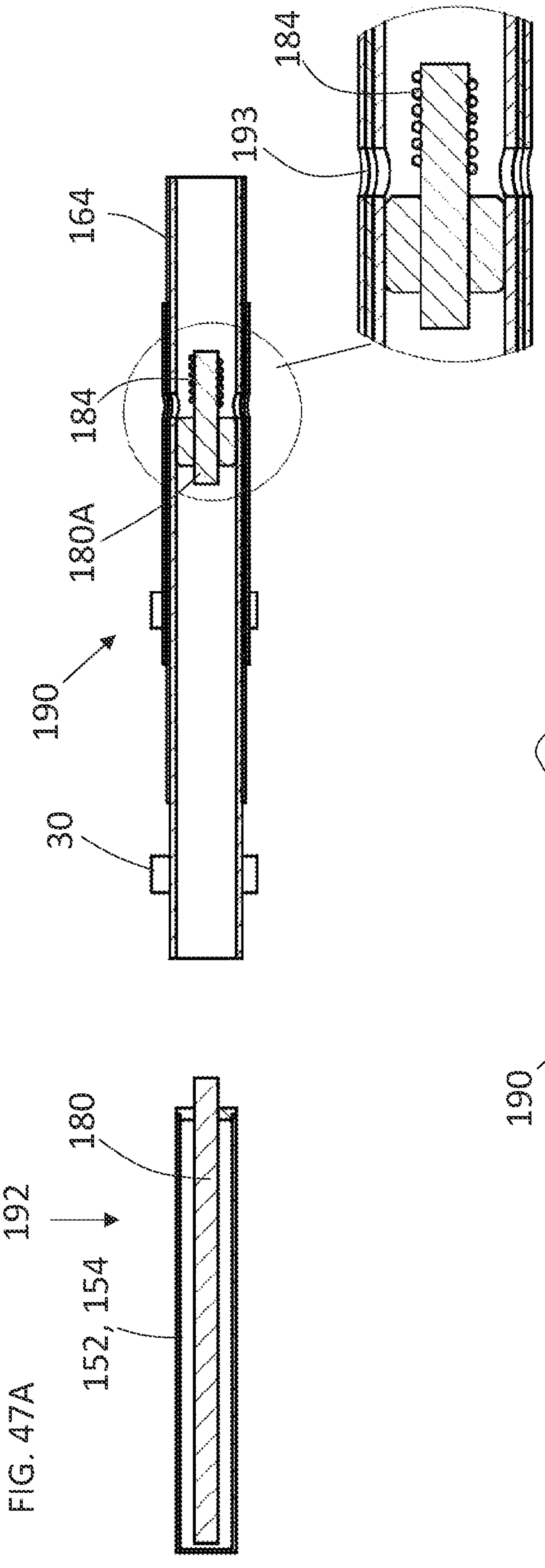
FIGS. 47A and 47B are schematic illustrations of respective views of a capsule for use with a liquid material that is configured to be vaporized by a smoking device, the capsule including a capillary-force-delivery element configured to deliver the liquid material to an internal heating element and the capsule defining an opening in close proximity to the heating element and the capsule including a reusable portion and a disposable portion, in accordance with some applications of the present invention.
Figure 47B:
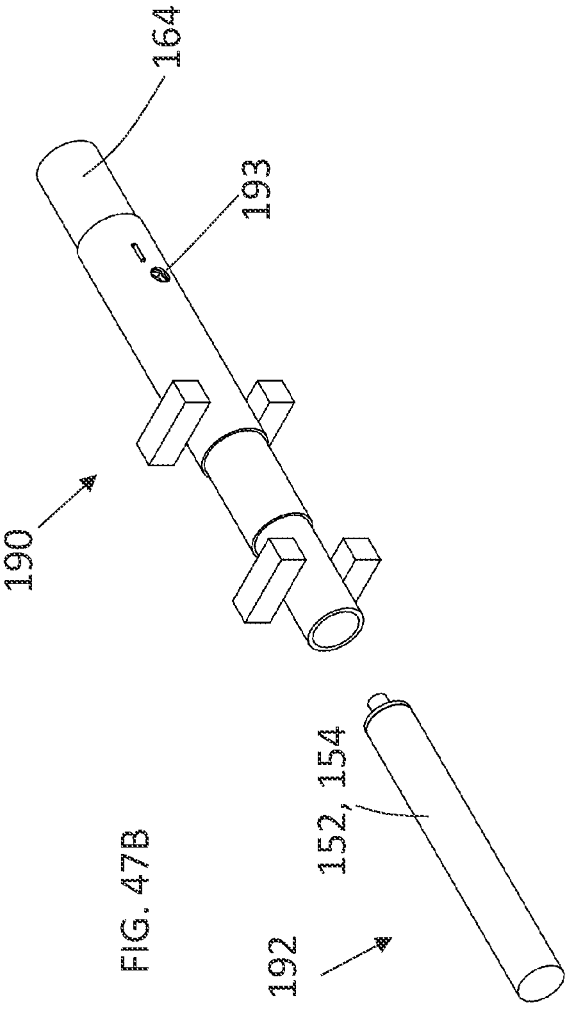

Reference is now made to FIGS. 47A and 47B, which are schematic illustrations of respective views of capsule 150 for use with liquid material 152 that is configured to be vaporized by a smoking device, in accordance with some applications of the present invention. Each of FIGS. 47A-B shows the capsule disposed between electrodes 30. FIG. 47A shows a cross-sectional view of the capsule and FIG. 47B shows an oblique view. For some applications, the capsule including capillary-force-delivery element 180 configured to deliver the liquid material to internal heating element 184, and the capsule defines an opening 193 in close proximity to the internal heating element, as described with reference to FIGS. 46A-B. For some such applications, the capsule includes capsule housing 190 (which is typically reusable and) that typically includes the internal heating element (and/or other conductive portions that are configured to contact electrodes of the smoking device), and disposable portion 192 that includes reservoir 154 containing the liquid material, and typically includes capillary-flow-delivery element 180, as described with reference to FIGS. 45A-D. The capsule housing typically receives the disposable capsule portion such as to form a capsule and such that that the capillary-force-delivery element extends to the internal heating element, such as to transport the liquid material from the reservoir to the internal heating element via capillary forces. For some applications, a second portion 180A of the capillary-flow-delivery element is disposed within the reusable portion of the capsule, and the capsule is configured such that when the disposable portion of the capsule is inserted into the capsule housing, the liquid material flows to the second portion of the capillary-flow-delivery element 180 and then to the internal heating element via capillary forces. Alternatively, the entire capillary-flow-delivery element is disposed within disposable portion 192. Typically, including the reservoir in the disposable portion of the capsule, lengthen the period of time during which the housing of the capsule is usable, thereby reducing costs and environmental damage. For some applications, housing 190 of the capsule is built into the smoking device, and reusable portion 192 is inserted into the smoking device.

Figure 48A:
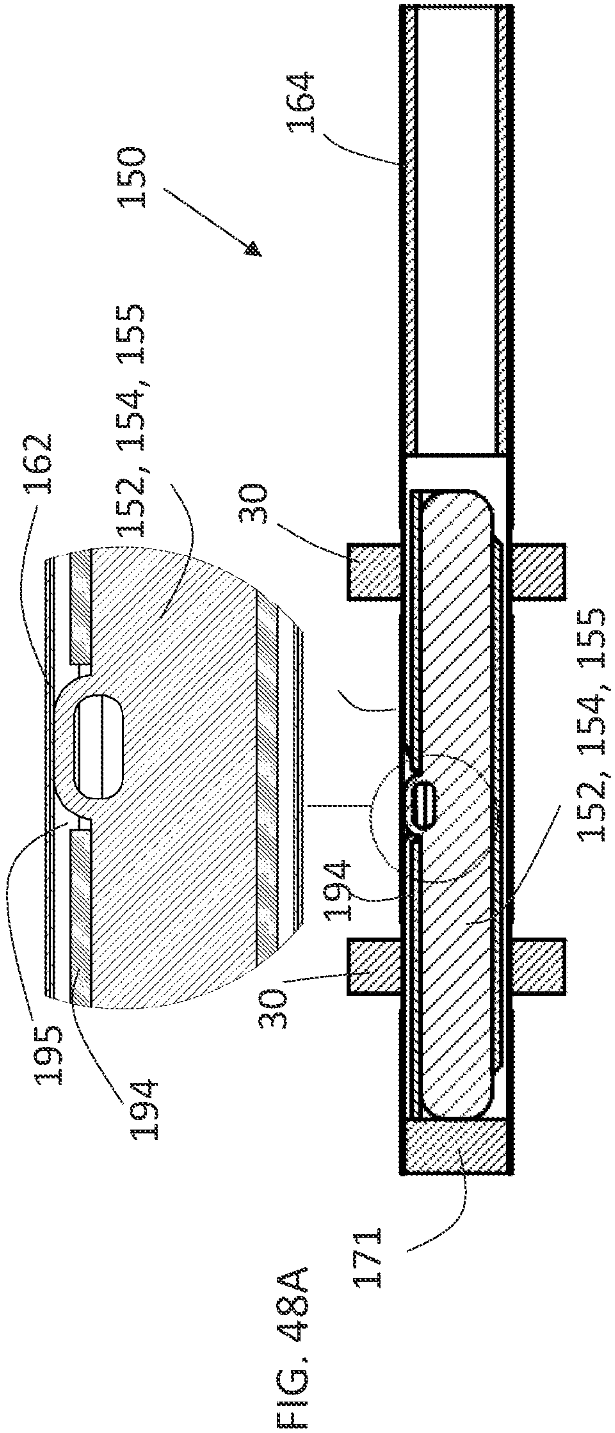
FIGS. 48A and 48B are schematic illustrations of respective views of a capsule for use with a liquid material that is configured to be vaporized by a smoking device, the capsule including a housing disposed around the absorbent material that has the liquid material absorbed therein, the housing being an electrical insulator and defining one or more lateral windows, in accordance with some applications of the present invention.
Figure 48B:
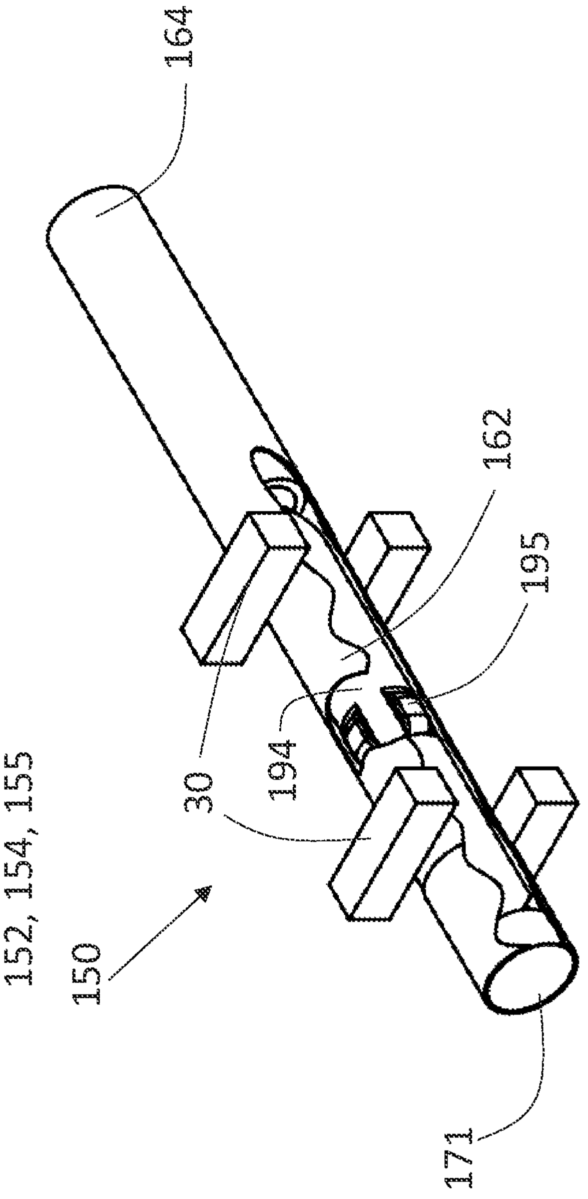

Reference is now made to FIGS. 48A and 48B, which are schematic illustrations of respective views of capsule 150 for use with liquid material 152 that is configured to be vaporized by a smoking device, the capsule including a housing 194 that houses reservoir 154 of absorbent material 155 that has the liquid material absorbed therein, in accordance with some applications of the present invention. Each of FIGS. 48A-B shows the capsule disposed between electrodes 30. FIG. 48A shows a cross-sectional view of the capsule and FIG. 48B shows an oblique view. Typically, the housing is an electrical insulator and is impermeable to the liquid material. Further typically, the housing defines one or more lateral windows 195. The absorbent material is configured such that the liquid material flows to the lateral windows via capillary forces. Typically, at the lateral windows the liquid material within the absorbent material is exposed to metallic foil 162 of the capsule, and the liquid material is thereby vaporized.

For some applications, housing 194 is a cylindrical container (e.g., a plastic, cylindrical container). In accordance with respective applications, the cylindrical container is flexible or rigid. As described hereinabove, for some applications, the capsule is configured to be flattened, for example in order to facilitate temperature sensing and/or in order to enhance capillary flow through the absorbent material. For some such applications, housing 194 is flexible to facilitate the flattening of the capsule. Typically, housing 194 has a smaller diameter than metallic foil 162 in order to enable air flow along the axial direction of the capsule. For some applications, the capsule includes an airway therethrough. For some such applications, air enters the airway via filter or stopper 171. For example, the filter or stopper may define an air inlet opening therethrough, as described hereinabove.

For some applications, housing 194 defines a plurality of lateral windows at which the absorbent material is exposed to metallic foil 162 of the capsule, for example as shown in FIG. 48B. For some applications, housing 194 defines a single lateral window at which the absorbent material is exposed to metallic foil 162 of the capsule. For some applications, at the one or more lateral windows, threads or fibers of the absorbent material are separated from the rest of absorbent material, to thereby contact the metallic foil. For some applications, the one or more lateral windows the capsule defines a slotted surface in order to facilitate air flow and/or vapor generation. Typically, the metallic foil contacts the electrodes at locations that are remote from each of the one or more lateral windows.

Typically, apart from at the one or more lateral windows, housing 194 is impermeable. For some applications, apart from at the one or more lateral windows, housing 194 is at least partially permeable, such that the liquid material flows through the housing in a controlled manner to be heated and vaporized by the metallic foil.

Figure 49A:
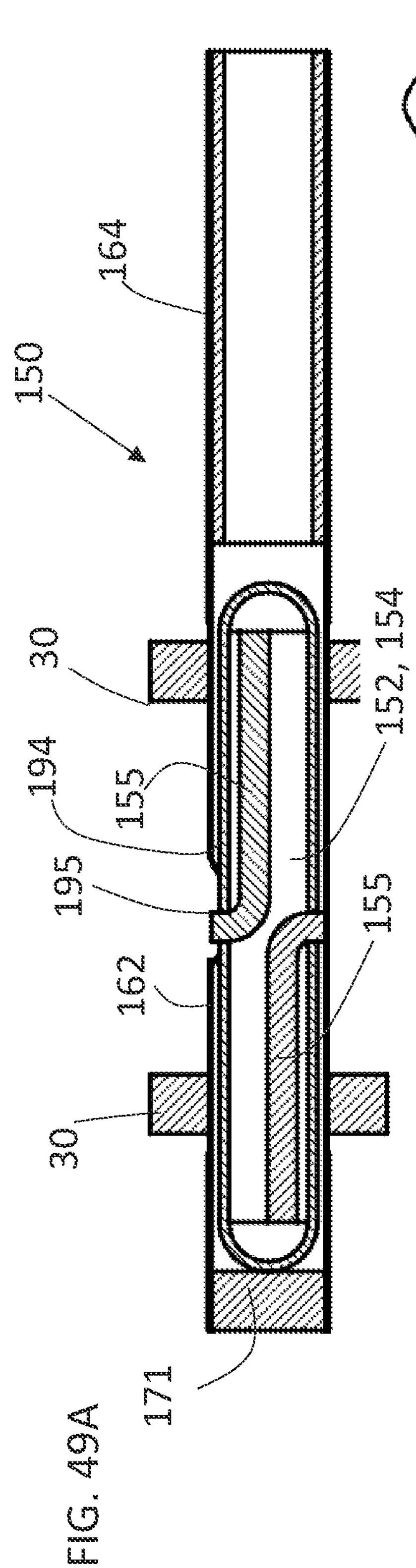
FIGS. 49A and 49B are schematic illustrations of respective views of a capsule for use with a liquid material that is configured to be vaporized by a smoking device, the capsule including a housing disposed around a reservoir containing the liquid material, the housing being an electrical insulator and defining one or more lateral windows, in accordance with some alternative applications of the present invention.
Figure 49B:
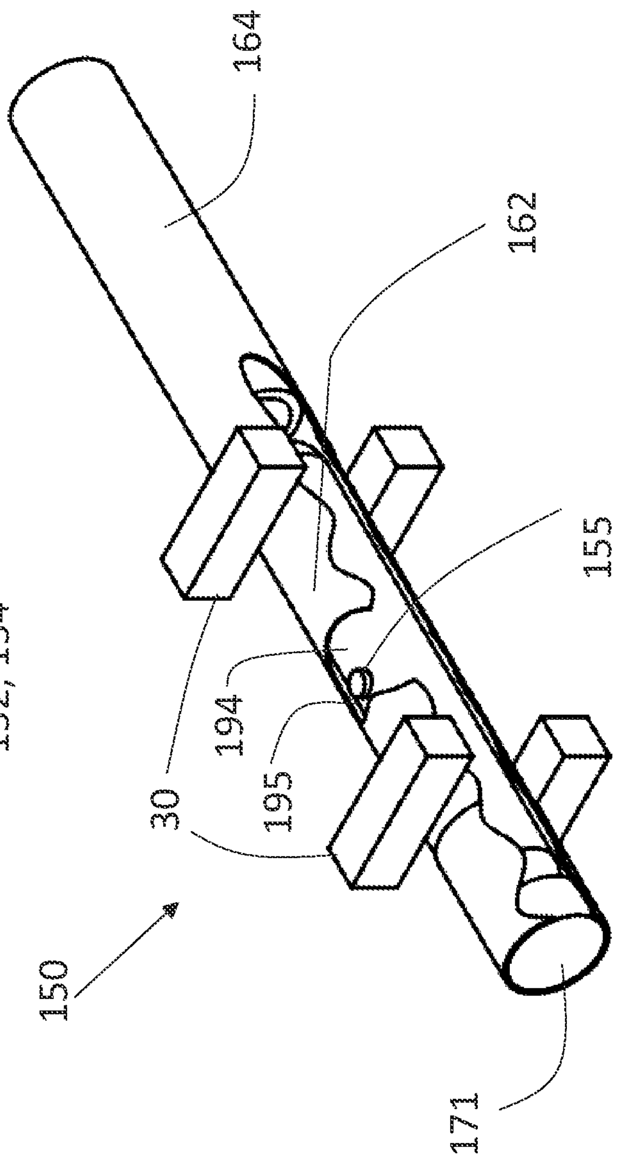
Figure 50A:
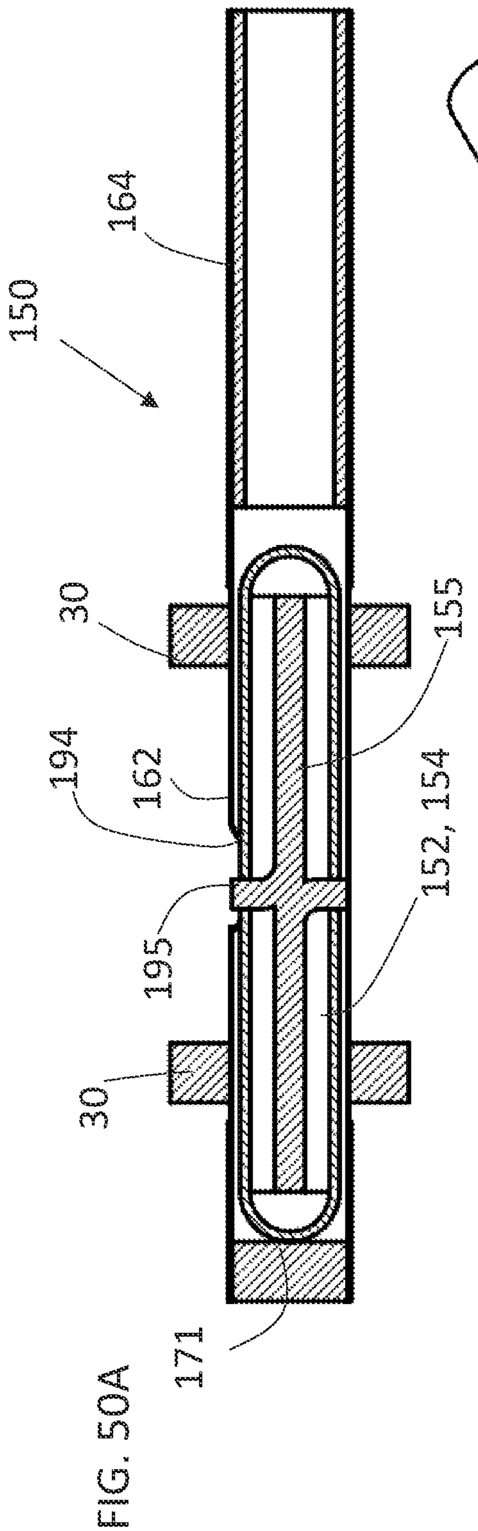
FIGS. 50A and 50B are schematic illustrations of respective views of a capsule for use with a liquid material that is configured to be vaporized by a smoking device, the capsule including a housing disposed around a reservoir containing the liquid material, the housing being an electrical insulator and defining one or more lateral windows, in accordance with some applications of the present invention.
Figure 50B:
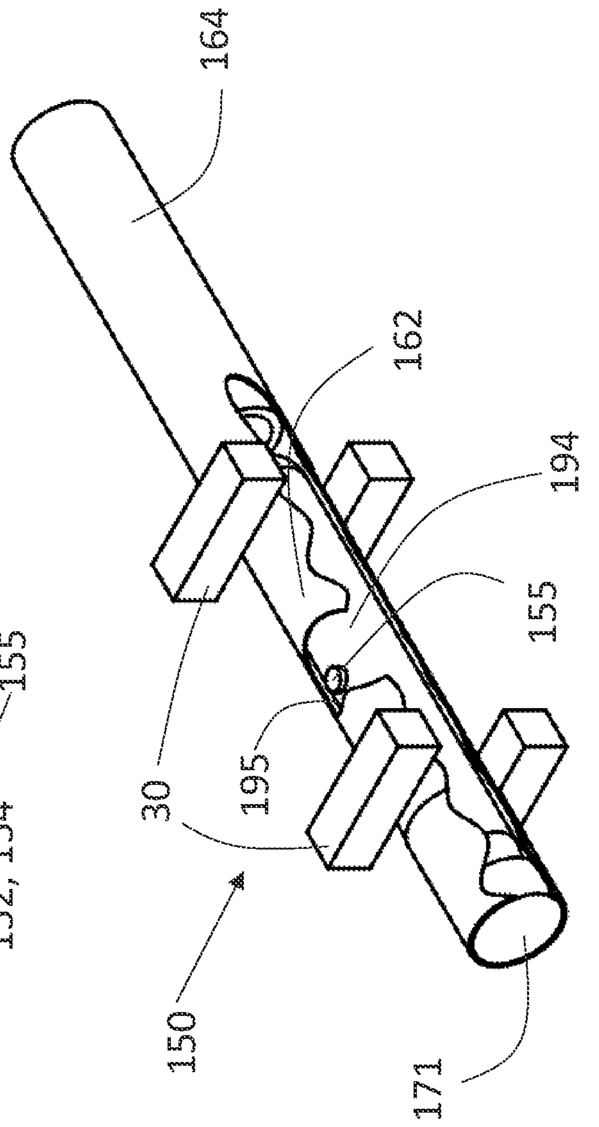

Reference is now made to FIGS. 49A and 49B, as well as FIGS. 50A and 50B, which are schematic illustrations of respective views of capsule 150 for use with liquid material 152 that is configured to be vaporized by a smoking device, the capsule including a housing 194 that houses reservoir 154 of the liquid material, in accordance with some applications of the present invention. Each of FIGS. 49A-B and 50A-B shows the capsule disposed between electrodes 30. FIGS. 49A and 50A show cross-sectional views of respective embodiments of the capsule and FIGS. 49B and 50B show oblique views of respective embodiments of the capsule, with some layers being peeled away for illustrative purposes. Typically, the housing is an electrical insulator and is impermeable to the liquid material. Further typically, the housing defines one or more lateral windows 195. (As described hereinabove, for some applications, the housing is partially permeable to the liquid material.) For some applications, absorbent material 155 is disposed within the reservoir with the absorbent material extending from the reservoir to the one or more lateral windows, the absorbent material being configured to transport the liquid material from the reservoir to the one or more lateral windows via capillary forces. Typically, at the lateral windows the liquid material within the absorbent material is exposed to metallic foil 162 of the capsule, and the liquid material is thereby vaporized. Typically, the metallic foil contacts the electrodes at locations that are remote from each of the one or more lateral windows. For some applications, the capsule includes an airway therethrough. For some such applications, air enters the airway via filter or stopper 171. For example, the filter or stopper may define an air inlet opening therethrough, as described hereinabove. The examples of capsule 150 shown in FIGS. 49A-B and 50A-B respectively are examples in which the absorbent material is shaped such as to enhance capillary flow of the liquid material toward the lateral windows, in accordance with some applications of the present invention.

FIGS. 35A-50B show several embodiments of capsule 150, which is configured to contain a liquid material that is vaporized by a smoking device, such as smoking device 200 and/or a different smoking device. With reference to all of the examples of capsule 150 described with reference to FIGS. 35A-50B the following is noted. In accordance with respective applications, capsule 150 is rigid or is flexible. For some applications, the capsule is configured to be flattened, for example, using the techniques described hereinabove. For example, the capsule may be flattened in order to enhance electrical contact between the electrodes and the metallic foil, by applying mechanical pressure to the capsule using the electrodes. For some applications, the capsule is flattened in order to generate a desired heating profile and/or a desired airflow profile. For some applications, the smoking device includes a non-contact temperature sensor (such as an infrared temperature sensor) as described hereinabove. For some such applications, the portion of the capsule at which the sensor is configured to sense the temperature (i.e., a portion of the capsule that is configured to be adjacent to the temperature sensor) is flattened such as to facilitate the temperature sensing (typically by creating a flat surface upon which to perform the temperature sensing). For some applications, the capsule is flattened in order to increase capillary flow through an absorbent material disposed within the capsule (such as layer 160 of material, reservoir 154 of the material, and/or material that comprises a portion of capillary-flow-delivery element 180). For some applications in which capsule 150 is configured to be flattened the capsule includes one or more collapse-prevention elements, e.g., as described hereinabove with reference to FIGS. 9A-16B, mutatis mutandis. For some applications in which capsule 150 is configured to be flattened the capsule includes one or more elements that act as springs (e.g., an elastic housing that is generally similar to a collapse-prevention element 60 described hereinabove with reference to FIG. 14) configured such that in response to pressure being applied to the housing (for example by electrodes 30 and/or by other compression elements as described hereinabove), the capsule becomes flattened by a predetermined amount. Typically, for such applications, the capsule is configured such that compression of the capsule is sufficient to enhance capillary flow through absorbent material within the capsule and/or to ensure good electrical contact between the electrodes and the metallic foil, but such that the capsule has not been compressed to such an extent that there is insufficient airflow through the capsule. It is noted that the aforementioned techniques associated with flattening a capsule are typically applicable to any one of the embodiments of capsule 20 and/or capsule 150 described herein.

With reference to all of the examples of capsule 150 described with reference to FIGS. 35A-50B the following is additionally noted. For some applications, the capsule is configured such that airflow through the capsule is substantially in an axial direction along a length of the capsule, e.g., as described hereinabove with reference to capsule 20 mutatis mutandis. For some applications, the capsule is shaped to define a cross-sectional shape having a ratio of more than 2:1 between a long side of the cross-sectional shape and a short side of the cross-sectional shape, e.g., as described hereinabove with reference to capsule 20 mutatis mutandis. For some applications, the capsule includes a metallic foil that is configured to be heated via resistive heating by the first electrode driving a current to the second electrode through the metallic foil, such as to vaporize liquid material, e.g., as described hereinabove with reference to capsule 20 mutatis mutandis. For some applications, metallic foil of the capsule (e.g., metallic foil 162, 162A, or 162B) has a thickness of between 1 micron and 20 microns. For some applications, the metallic foil has a thickness of between 3 microns and 10 microns, e.g., as described hereinabove with reference to capsule 20 mutatis mutandis. For some applications, the metallic foil is configured to be heated via resistive heating by the first electrode driving a current to the second electrode along a length of more than 5 mm (e.g., more than 15 mm) in an axial direction along the metallic foil, e.g., as described hereinabove with reference to capsule 20 mutatis mutandis. For some applications, the capsule further comprises a paper covering that covers the metallic foil, the paper covering defining openings via which the electrodes are configured to make electrical contact with the metallic foil, e.g., as described hereinabove with reference to capsule 20 mutatis mutandis. For some applications, the metallic foil comprises a plurality of regions, each of the regions having a respective, different electrical resistance profile, such that upon a given current being driven through the metallic foil each of the regions heats to a respective, different temperature, e.g., as described hereinabove with reference to capsule 20 mutatis mutandis. For some applications, the capsule further comprises an electrical-contact coating that coats the metallic foil at locations at which the electrodes are configured to contact the capsule, e.g., as described hereinabove with reference to capsule 20 mutatis mutandis. For some applications, the metallic foil has a first configuration at locations at which the electrodes are configured to contact the metallic foil, and a second configuration along a region in which the metallic foil heats the liquid material that is between the locations at which the electrodes are configured to contact the metallic foil, e.g., as described hereinabove with reference to capsule 20 mutatis mutandis. For some applications, the capsule further comprises an inner lining that lines an inside of the metallic foil, the inner lining being configured to diffuse heat that is generated by the metallic foil, e.g., as described hereinabove with reference to capsule 20 mutatis mutandis. For some applications, the smoking device includes one or more batteries, and wherein an overall resistance to the current that is provided by the capsule is configured to substantially match an internal resistance of the one or more batteries of the smoking device, e.g., as described hereinabove with reference to capsule 20 mutatis mutandis. For some applications, at least a portion of the capsule is configured to be flattened by the smoking device prior to a layer of absorbent material being heated by the smoking device, e.g., as described hereinabove with reference to capsule 20 mutatis mutandis. For some applications, the layer of absorbent material is configured such that the flattening of the portion of the capsule increases capillary flow of the liquid material through the layer of absorbent material, e.g., as described hereinabove with reference to capsule 20 mutatis mutandis. For some applications, the capsule has a circular cross-sectional shape and is configured to be flattened to define a non-circular cross-sectional shape, e.g., as described hereinabove with reference to capsule 20 mutatis mutandis. For some applications, the capsule is configured to be flattened such as to define a cross-sectional shape having a ratio of more than 2:1 between a long side of the cross-sectional shape and a short side of the cross-sectional shape, e.g., as described hereinabove with reference to capsule 20 mutatis mutandis. For some applications, the capsule comprises an elongate capsule having a length of between 15 mm and 150 mm, e.g., as described hereinabove with reference to capsule 20 mutatis mutandis. For some applications, the elongate capsule has a length of between 50 mm and 90 mm, e.g., as described hereinabove with reference to capsule 20 mutatis mutandis. Electrical current is typically supplied to the capsule as a result of a user input (for example a press of a button) or automatically by a use of a puff detector, e.g., as described hereinabove with reference to capsule 20 mutatis mutandis. Power supply is typically by means of a constant voltage, direct connection to battery voltage, current limitation or any other method, e.g., as described hereinabove with reference to capsule 20 mutatis mutandis.

For some applications, only certain regions of capsule 150 are heated. For example, capsule 150 may include any one of the coatings, metallic foil configurations, inner linings, paper covering, etc. described hereinabove with reference to capsule 20, mutatis mutandis, configured in such a way that the metallic foil only heats certain regions of layer 160 of absorbent material 155, and/or only heats certain regions of reservoir 154.

Mouthpiece 164 of capsule 150 is typically generally similar to mouthpiece 90 of capsule 20. Mouthpiece 164 is typically round as in a traditional combustion cigarette, or is designed with different shapes. For some applications, the mouthpiece is manufactured as a separate removable or unremovable part. For some applications, the mouthpiece at least in part assists in concealing the electrical connections between a heating element and additional conductive components, such as a conductive housing and/or metallic foil. For some applications, the mouthpiece is configured to facilitate the electrical connections between a heating element and additional conductive components, such as a conductive housing and/or metallic foil. In some cases the mouthpiece can include inlet openings designed to control the amount of air flowing into the capsule or to control the resistance to draw of the capsule, e.g., as described hereinabove with reference to FIGS. 18D-F.

For some applications, the capsule is selectively coated with an external layer of paper and/or other materials for insulation and/or esthetic reasons, e.g., as described hereinabove. As noted hereinabove, unless explicitly stated otherwise, for some applications, features of capsule 20 described hereinabove (including but not limited to, the structures of the heating elements, the structure of the mouthpiece, coatings, linings, the mouthpiece, etc.) are incorporated into capsule 150, mutatis mutandis.

Typically, when smoking device 200 is used with capsule 150, the smoking device has a generally similar configuration to that described hereinabove. Further typically, the above described inputs, outputs, and heating algorithms (e.g., the flowchart shown in FIG. 34, and techniques described with reference to FIG. 34) that are described as being implemented by smoking device 200 are typically implemented when smoking device 200 is used with capsule 150, mutatis mutandis.

For some applications, the smoking device includes a non-contact temperature sensor (such as an infrared temperature sensor), as described hereinabove. For some applications, when either capsule 20 or capsule 150 is used with a smoking device, the smoking device is configured to detect the temperature of the capsule and to control heating of the capsule responsively thereto. For some applications, when the smoking device is used with capsule 150 (which contains a liquid material), the smoking device is configured to heat the capsule by applying predetermined amounts of power to resistively heat the capsule, and without detecting the temperature of the capsule. For example, during initial preheating phase of the capsule the control component may provide a predetermined amount of power to the capsule. Subsequently, whenever the control component detects that the user is drawing from the capsule, a predetermined amount of power is supplied in order to vaporize the piqued material. For some applications, the control component determines the amount of power to be supplied based on parameters of the user's puffs that are detected by the control component (e.g., using the techniques described hereinabove).

It is noted that the term "metallic" as used herein in the description and in the claims should be interpreted to include a material that includes a metal and/or an alloy, such as iron-nickel alloy, tungsten, iron-chromium-aluminum alloy, nickel chrome, stainless steel, nickel and/or titanium.

The present application is related to:

International application PCT/IB2023/052518 to Raichman, filed Mar. 15, 2023, entitled "Smoking capsule with flattened profile";

International application PCT/IB2023/052519 to Raichman, filed Mar. 15, 2023, entitled "Smoking capsule with resistive heating element";

International application PCT/IB2023/052520 to Raichman, filed Mar. 15, 2023, entitled "Coating for smoking capsule";

International application PCT/IB2023/052521 to Raichman, filed Mar. 15, 2023, entitled "Smoking device with flattening function";

International application PCT/IB2023/052523 to Raichman, filed Mar. 15, 2023, entitled "Smoking device with flattening electrodes";

International application PCT/IB2023/052526 to Raichman, filed Mar. 15, 2023, entitled "Smoking device with inductive heating coil";

each of which PCT applications claims priority from U.S. Provisional Patent Application 63/438,643 to Raichman, filed Jan. 12, 2023, entitled "Smoking device and capsule for use therewith."

All of the above-referenced applications are incorporated herein by reference. The scope of the present disclosure includes combining the methods and apparatus described herein with the methods and apparatus described in any one of the above-referenced PCT applications.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for use with a smoking device that includes at least first and second electrodes, the apparatus comprising:

a capsule comprising:

an absorbent material having a liquid material containing one or more active agents absorbed therein;

a housing disposed around the absorbent material, the housing being an electrical insulator, and the housing defining one or more lateral windows; and metallic foil surrounding the housing, the metallic foil being configured to be heated via resistive heating by the first electrode driving a current to the second electrode through the metallic foil, such as to vaporize liquid material within the absorbent material that is disposed at the one or more lateral windows, wherein the capsule further comprises a covering that covers the metallic foil, the covering defining openings via which the electrodes are configured to make electrical contact with the metallic foil.

2. The apparatus according to claim 1, wherein the housing is impermeable to the liquid material, apart from at the one or more lateral windows.

3. The apparatus according to claim 1, wherein the housing is partially permeable to the liquid material, apart from at the one or more lateral windows.

4. The apparatus according to claim 1, wherein the capsule is configured such that the metallic foil contacts the first and second electrodes at locations that are remote from the one or more lateral windows.

5. The apparatus according to claim 1, wherein the capsule is configured such that airflow through the capsule is substantially in an axial direction along a length of the capsule.

6. The apparatus according to claim 1, wherein the metallic foil comprises a plurality of regions, each of the regions having a respective, different electrical resistance profile, such that upon a given current being driven through the metallic foil each of the regions heats to a respective, different temperature.

7. The apparatus according to claim 1, wherein the capsule further comprises an electrical-contact coating that coats the metallic foil at locations at which the electrodes are configured to contact the capsule.

8. The apparatus according to claim 1, wherein the metallic foil has a first configuration at locations at which the electrodes are configured to contact the metallic foil, and a second configuration along a region in which the metallic foil contacts the absorbent material that is between the locations at which the electrodes are configured to contact the metallic foil.

9. The apparatus according to claim 1, wherein the capsule further comprises an inner lining that lines an inside of the metallic foil, the inner lining being configured to diffuse heat that is generated by the metallic foil.

10. The apparatus according to claim 1, wherein the smoking device includes one or more batteries, and wherein an overall resistance to the current that is provided by the capsule is configured to substantially match an internal resistance of the one or more batteries of the smoking device.

11. The apparatus according to claim 1, wherein the capsule is shaped to define a cross-sectional shape having a ratio of more than 2:1 between a long side of the cross-sectional shape and a short side of the cross-sectional shape.

12. The apparatus according to claim 1, wherein at least a portion of the capsule is configured to be flattened by the smoking device prior to the metallic foil being heated by the smoking device.

13. The apparatus according to claim 12, wherein the capsule has a circular cross-sectional shape and is configured to be flattened to define a non-circular cross-sectional shape.

14. The apparatus according to claim 12, wherein the capsule is configured to be flattened such as to define a cross-sectional shape having a ratio of more than 2:1 between a long side of the cross-sectional shape and a short side of the cross-sectional shape.

15. The apparatus according to claim 12, wherein the absorbent material is configured such that the liquid material flows toward the one or more lateral windows via capillary flow.

16. The apparatus according to claim 15, wherein the absorbent material is configured such that the flattening of the portion of the capsule increases capillary flow of the liquid material through the absorbent material.

17. The apparatus according to claim 1, wherein the metallic foil has a thickness of between 1 micron and 20 microns.

18. The apparatus according to claim 1, wherein the metallic foil is configured to be heated via resistive heating by the first electrode driving a current to the second electrode along a length of more than 5 mm in an axial direction along the metallic foil.

19. The apparatus according to claim 1, wherein the capsule comprises an elongate capsule having a length of between 15 mm and 150 mm.

20. Apparatus for use with a smoking device that includes at least first and second electrodes, the apparatus comprising:

a capsule comprising:

an absorbent material having a liquid material containing one or more active agents absorbed therein;

a housing disposed around the absorbent material, the housing being an electrical insulator, and the housing defining one or more lateral windows; and metallic foil surrounding the housing, the metallic foil being configured to be heated via resistive heating by the first electrode driving a current to the second electrode through the metallic foil, such as to vaporize liquid material within the absorbent material that is disposed at the one or more lateral windows, wherein:

at least a portion of the capsule is configured to be flattened by the smoking device prior to the metallic foil being heated by the smoking device, the absorbent material is configured such that the liquid material flows toward the one or more lateral windows via capillary flow; and the absorbent material is configured such that the flattening of the portion of the capsule increases capillary flow of the liquid material through the absorbent material.

* * * * *